(12) United States Patent
Nakashima

(10) Patent No.: US 10,713,834 B2
(45) Date of Patent: Jul. 14, 2020

(54) INFORMATION PROCESSING APPARATUS AND METHOD

(71) Applicant: COLOPL, Inc., Tokyo (JP)

(72) Inventor: Kento Nakashima, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 16/396,077

(22) Filed: Apr. 26, 2019

(65) Prior Publication Data

US 2019/0333261 A1 Oct. 31, 2019

(30) Foreign Application Priority Data

| Apr. 27, 2018 | (JP) | ................................ 2018-087777 |
| Apr. 27, 2018 | (JP) | ................................ 2018-087779 |
| Apr. 27, 2018 | (JP) | ................................ 2018-087780 |
| Apr. 27, 2018 | (JP) | ................................ 2018-087781 |
| Apr. 27, 2018 | (JP) | ................................ 2018-087782 |
| Apr. 27, 2018 | (JP) | ................................ 2018-087784 |
| Apr. 27, 2018 | (JP) | ................................ 2018-087785 |
| Apr. 27, 2018 | (JP) | ................................ 2018-087787 |

(51) Int. Cl.

| G06T 13/40 | (2011.01) |
| G06F 3/01 | (2006.01) |
| G06F 3/147 | (2006.01) |
| G06Q 20/10 | (2012.01) |
| G06T 15/20 | (2011.01) |

(52) U.S. Cl.
CPC .............. *G06T 13/40* (2013.01); *G06F 3/012* (2013.01); *G06F 3/147* (2013.01); *G06Q 20/10* (2013.01); *G06T 15/20* (2013.01); *G06F 3/013* (2013.01); *G06T 2200/04* (2013.01)

(58) Field of Classification Search
None
See application file for complete search history.

(56) References Cited

U.S. PATENT DOCUMENTS

| 2011/0319167 A1 | 12/2011 | Sakurai et al. |
| 2016/0204834 A1 | 7/2016 | Yabuki et al. |
| 2018/0262717 A1 | 9/2018 | Imaoka |

FOREIGN PATENT DOCUMENTS

| JP | 2011-255053 A | 12/2011 |
| JP | 2013-52285 A | 3/2013 |

(Continued)

OTHER PUBLICATIONS

Office Action in JP Application No. 2018-087787, dated Dec. 4, 2018. 6pp.

(Continued)

*Primary Examiner* — Robert J Craddock
(74) *Attorney, Agent, or Firm* — Hauptman Ham, LLP

(57) ABSTRACT

A method includes defining a virtual space comprising a first avatar and a second avatar, wherein the first avatar is associated with a first user, and the second avatar is associated with a second user. The method further includes receiving a first input from the first user. The method further includes performing charging-related processing based on the received first input. The method further includes requesting a performance by the second avatar in response to performance of the charging-related processing. The method further includes detecting a motion of the second user in response to the requesting of the performance. The method further includes moving the second avatar in accordance with detected motion of the second user.

20 Claims, 113 Drawing Sheets

(56) References Cited

FOREIGN PATENT DOCUMENTS

| | | | |
|---|---|---|---|
| JP | 2015-167828 | A | 9/2015 |
| JP | 2016-25633 | A | 2/2016 |
| JP | 2016-129584 | A | 7/2016 |
| JP | 2017-64081 | A | 4/2017 |
| JP | 6203369 | B1 | 9/2017 |
| JP | 2017-176728 | A | 10/2017 |
| JP | 6215441 | B1 | 10/2017 |
| JP | 2018-7828 | A | 1/2018 |
| JP | 2018-94326 | A | 6/2018 |

OTHER PUBLICATIONS

Notice of Allowance in JP Application No. 2018-087779, dated Oct. 30, 2018. 5pp.

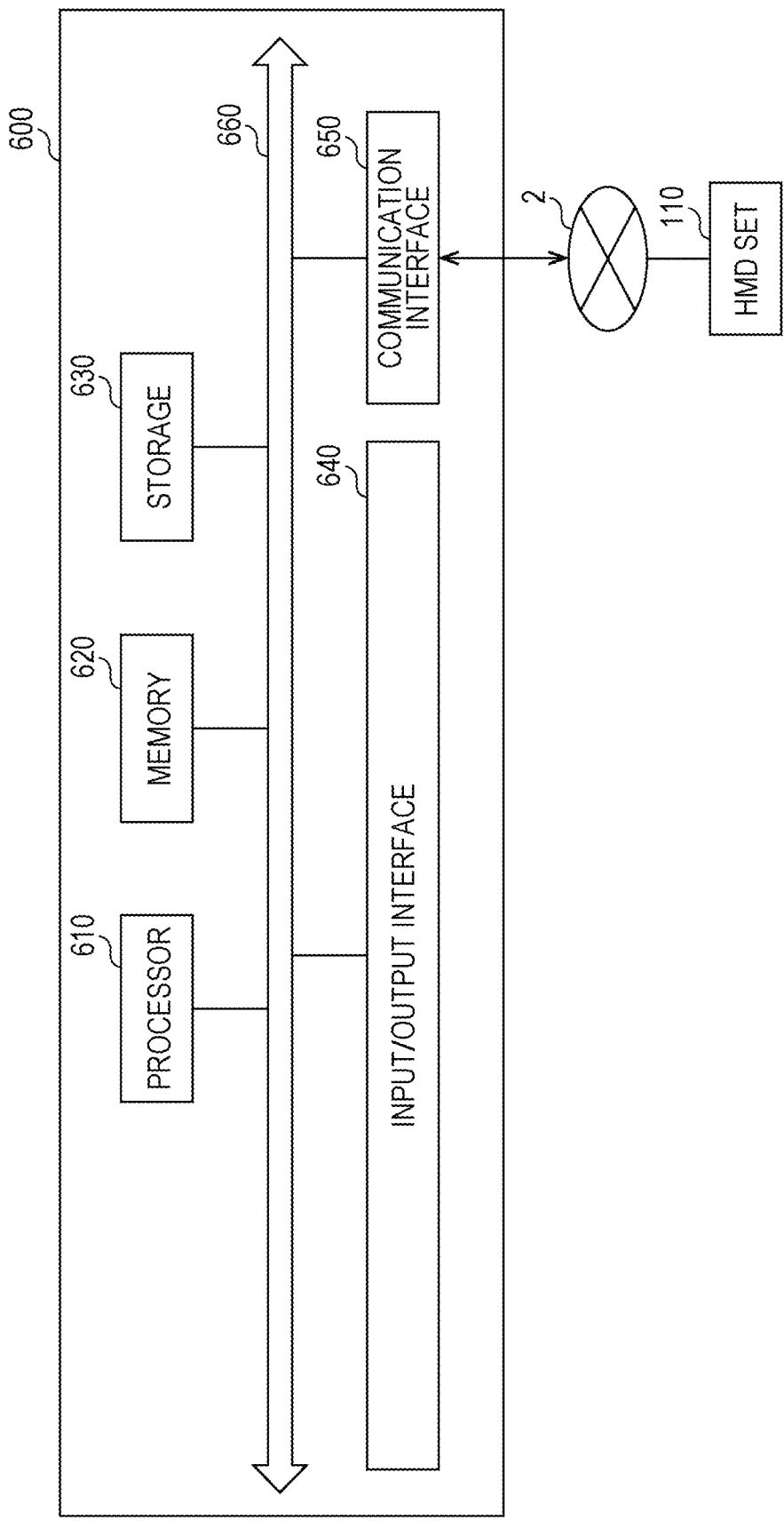

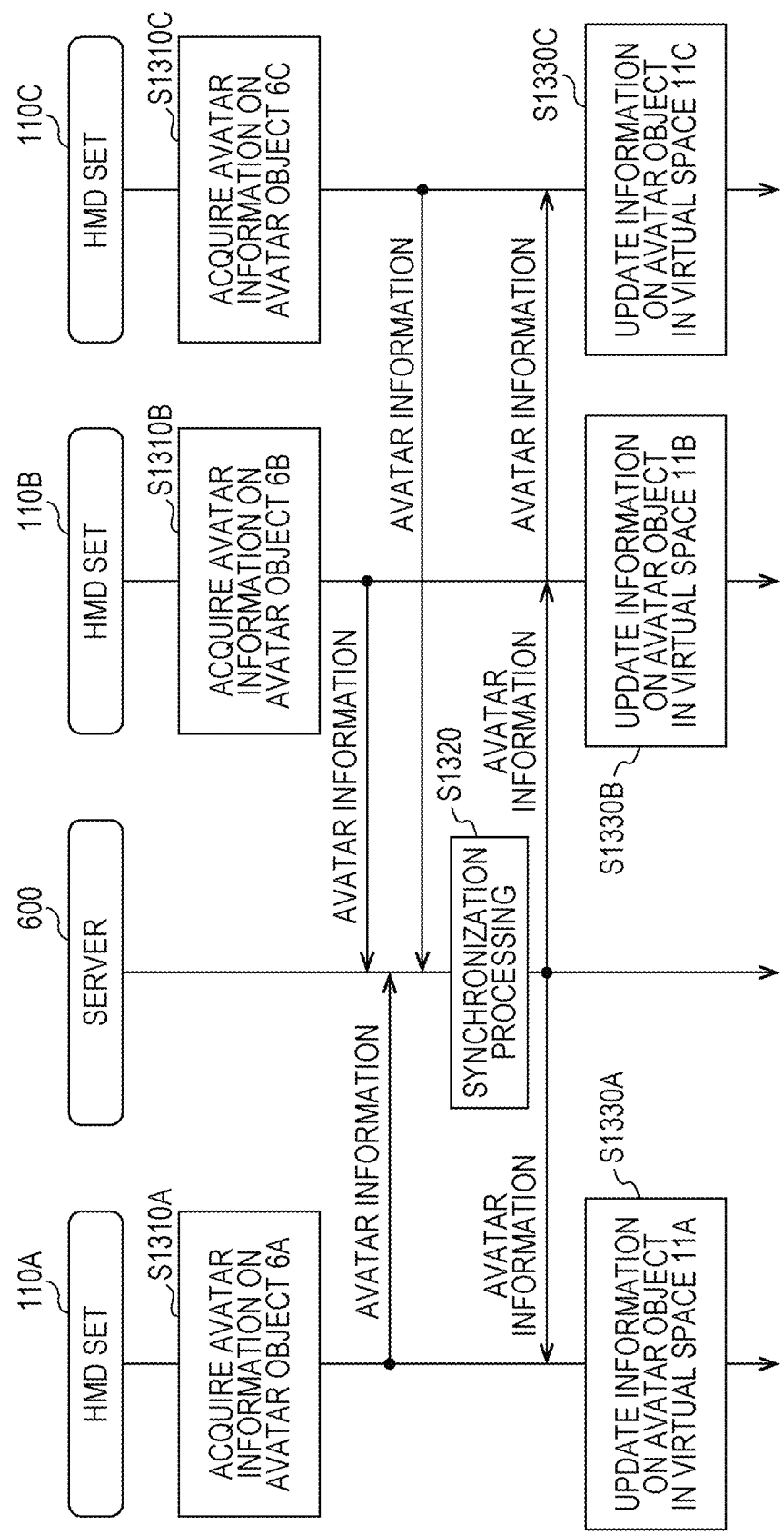

FIG. 19

|  | x | y | z |
|---|---|---|---|
| HEAD | x1 | y1 | z1 |
| LOW BACK | x2 | y2 | z2 |
| LEFT HAND | x3 | y3 | z3 |
| RIGHT HAND | x4 | y4 | z4 |
| LEFT FOOT | x5 | y5 | z5 |
| RIGHT FOOT | x6 | y6 | z6 |

FIG. 20

| BODY HEIGHT | L1 |
|---|---|
| SHOULDER WIDTH | L2 |
| ARM LENGTH | L3 |
| FOOT LENGTH | L4 |
| HEAD-TO-SHOULDER HEIGHT | L5 |

FIG. 22

|  | u | v | w |
|---|---|---|---|
| LEFT ELBOW | u1 | v1 | w1 |
| RIGHT ELBOW | u2 | v2 | w2 |
| LEFT KNEE | u3 | v3 | w3 |
| ... | ... | ... | ... |

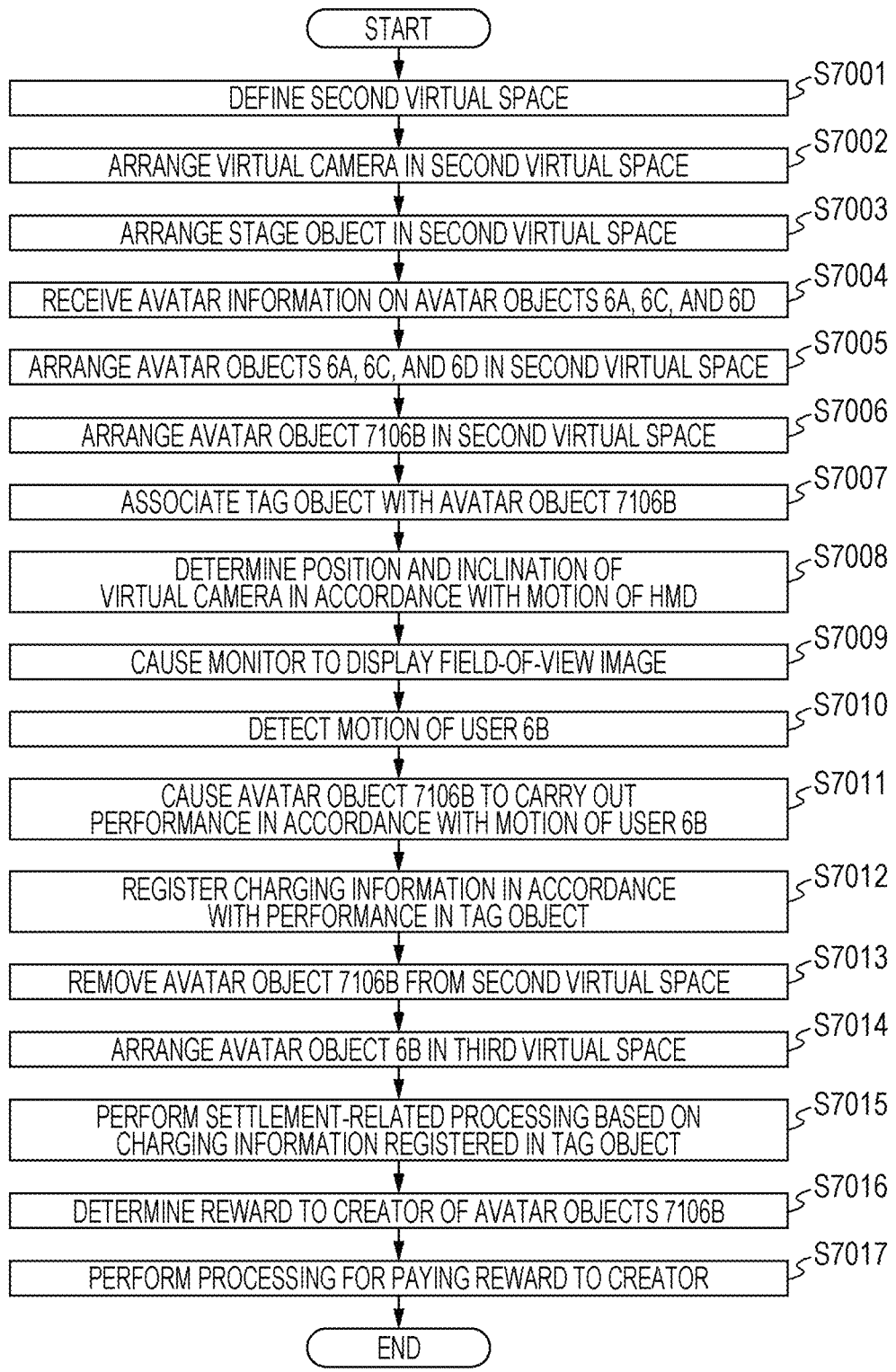

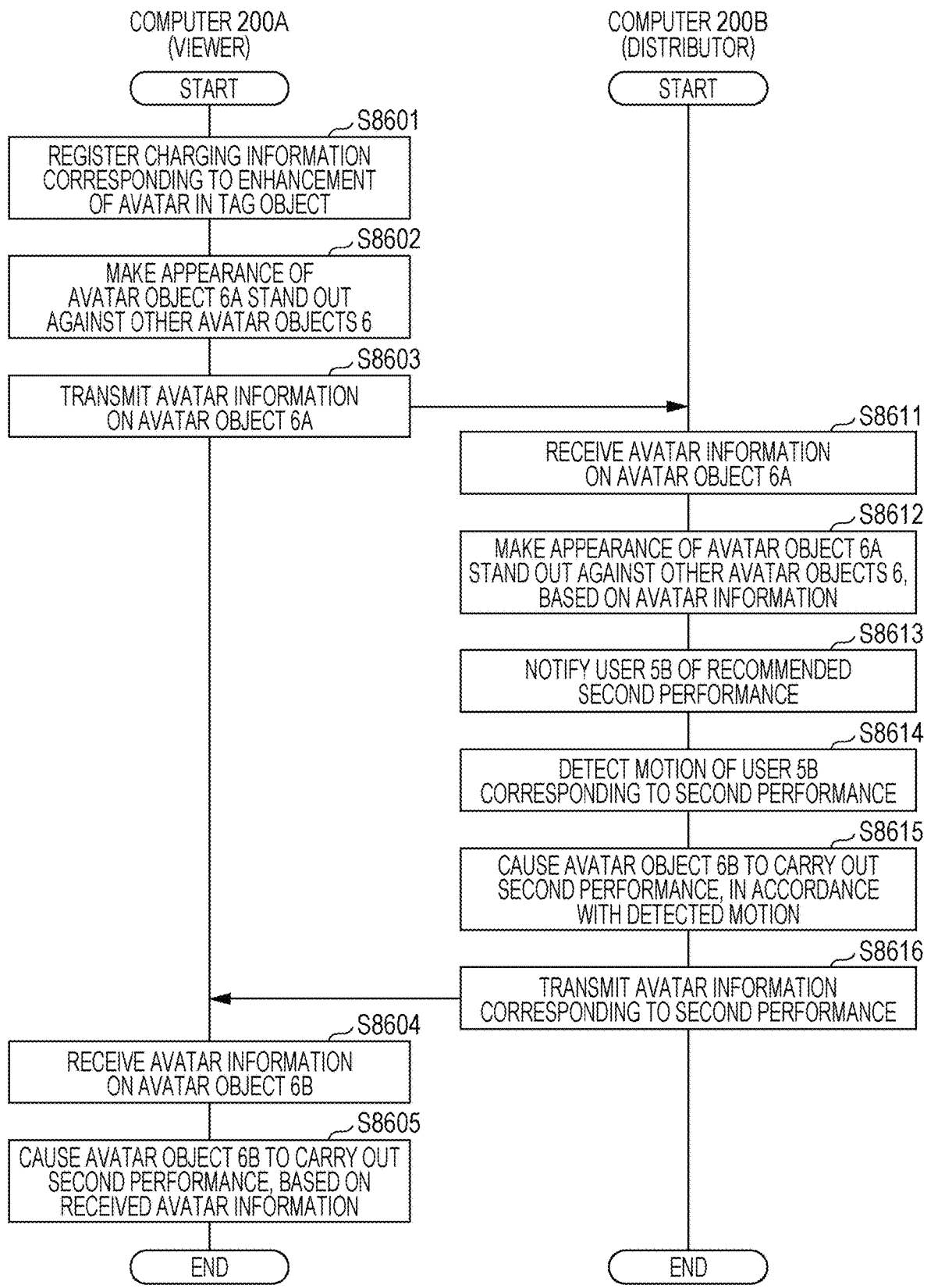

FIG. 91

| SECOND PERFORMANCE | FIRST USER INFORMATION |
|---|---|
| POINTING POSE | 5A |
| WAVING HANDS | |
| THROWING KISS | 5C, 5D |
| ⋮ | ⋮ |

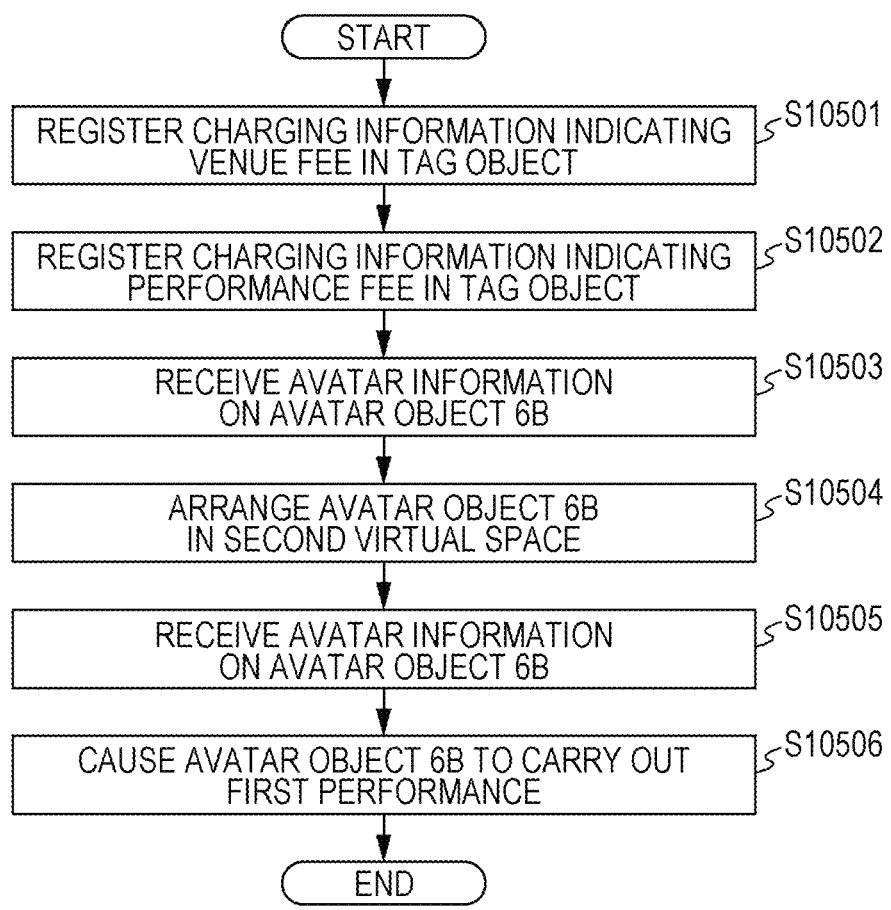

INFORMATION PROCESSING APPARATUS AND METHOD

RELATED APPLICATIONS

The present application claims priority to Japanese Application Nos. 2018-087777, 2018-087779, 2018-087780, 2018-087781, 2018-087782, 2018-087784, 2018-087785 and 2018-087787, all filed on Apr. 27, 2018, the disclosures of which applications are hereby incorporated by reference herein in their entirety.

TECHNICAL FIELD

The present disclosure relates to an information processing apparatus and a method.

BACKGROUND

Patent Documents 1 to 3 describe example techniques for allowing users to view content in a virtual space.

CITATION LIST

Patent Document

[Patent Document 1] JP 2017-176728 A
[Patent Document 2] JP 2018-007828 A
[Patent Document 3] JP 2016-025633 A

SUMMARY

Some techniques still have room for improvement in attractiveness of virtual experiences of users in a virtual space.

An object of at least one embodiment of the present disclosure is to further improve attractiveness of virtual experiences of users in a virtual space.

At least one embodiment provides a program stored on a non-transitory computer readable medium. The program is to be executed by a first computer including a first processor to provide a first user with a virtual experience. The program causes the first processor to execute: a step of defining a virtual space to provide the virtual experience to the first user; a step of arranging a first avatar associated with the first user and a second avatar associated with a second user in the virtual space; a step of causing the second avatar to carry out a first performance in accordance with a motion of the second user; a step of performing charging-related processing, based on an entry made by the first user; a step of requesting a second performance made by the second avatar from the second user when the charging-related processing is performed; and a step of causing the second avatar to carry out the second performance, in accordance with a motion of the second user, after the second performance is requested.

At least one embodiment provides a program stored on a non-transitory computer readable medium. The program is to be executed by a second computer including a second processor to provide a second user with a virtual experience. The program causes the second processor to execute: a step of defining a virtual space to provide the virtual experience to the second user; a step of arranging a first avatar associated with a first user and a second avatar associated with the second user in the virtual space; a step of detecting a motion of the second user's body; a step of causing the second avatar to carry out a first performance in accordance with a motion of the second user; in accordance with charging-related processing performed based on an entry made by the first user, a step of conveying information on a second performance to the second user when the second user is requested to cause the second avatar to carry out the second performance; and a step of causing the second avatar to carry out the second performance, in accordance with a motion of the second user, after the information on the second performance is conveyed to the second user.

At least one embodiment helps to improve attractiveness of virtual experiences of users in a virtual space.

BRIEF DESCRIPTION OF DRAWINGS

FIG. 9 A block diagram of a hardware configuration of a server according to at least one embodiment of this disclosure.

FIG. 13 A sequence diagram of processing to be executed by a system including an HMD interacting in a network according to at least one embodiment of this disclosure.

FIG. 19 A table of position information according to at least one embodiment of this disclosure.

FIG. 20 A table of size data according to at least one embodiment of this disclosure.

FIG. 22 A table of rotation directions according to at least one embodiment of this disclosure.

FIG. 70 A flowchart of processing to be executed by a system including an HMD set according to at least one embodiment of this disclosure.

Figure 73:
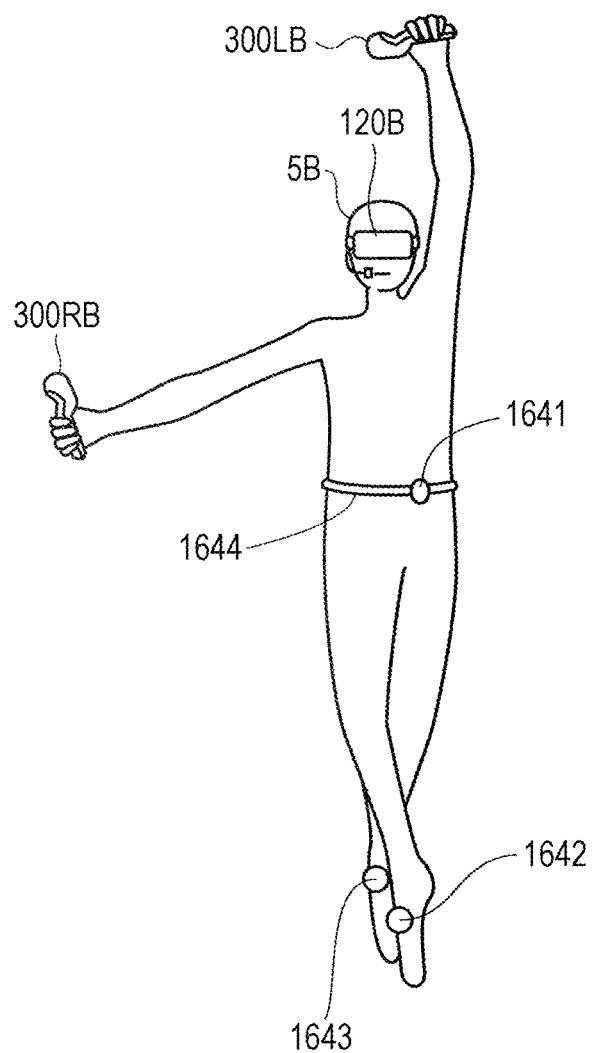

FIG. 73 A diagram of a user's posture according to at least one embodiment of this disclosure.

Figure 74A:
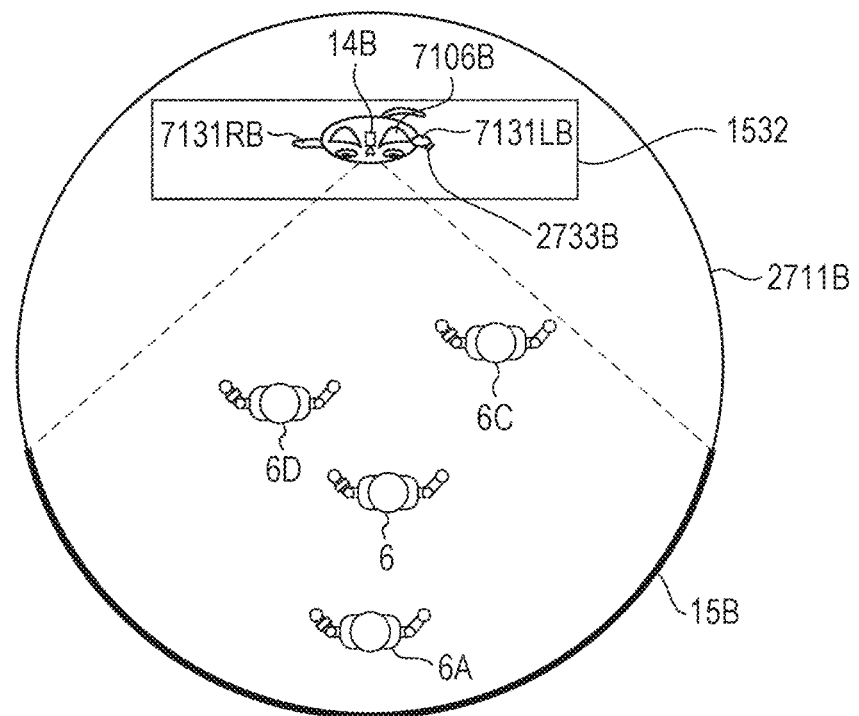

FIG. 74A A diagram of a virtual space according to at least one embodiment of this disclosure.

Figure 74B:
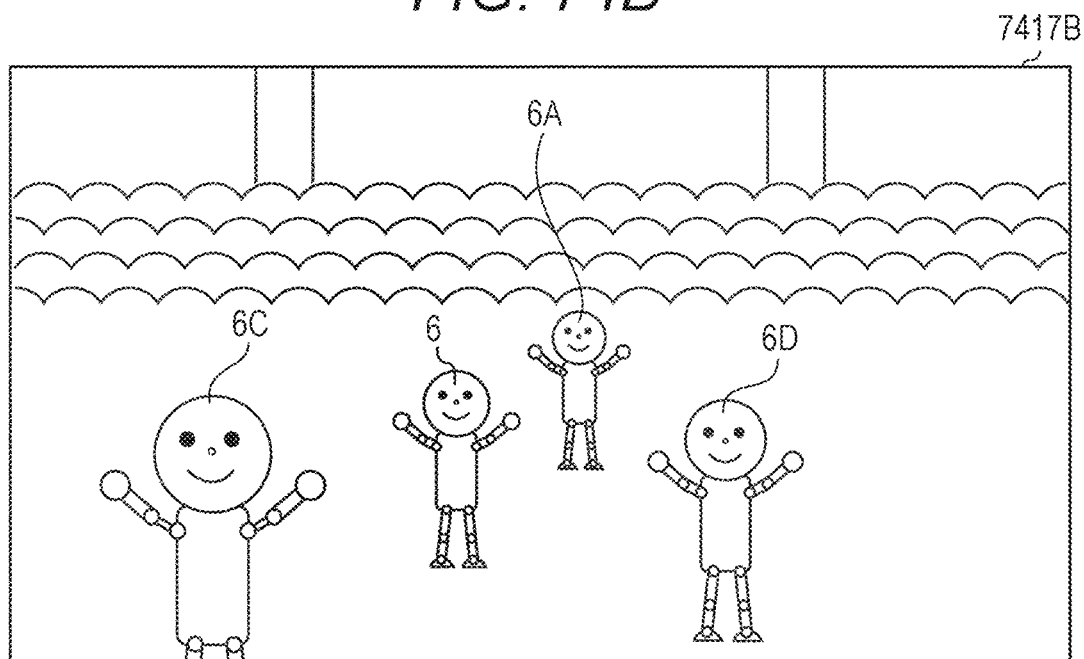

FIG. 74B A diagram of a field-of-view image according to at least one embodiment of this disclosure.

Figure 75A:
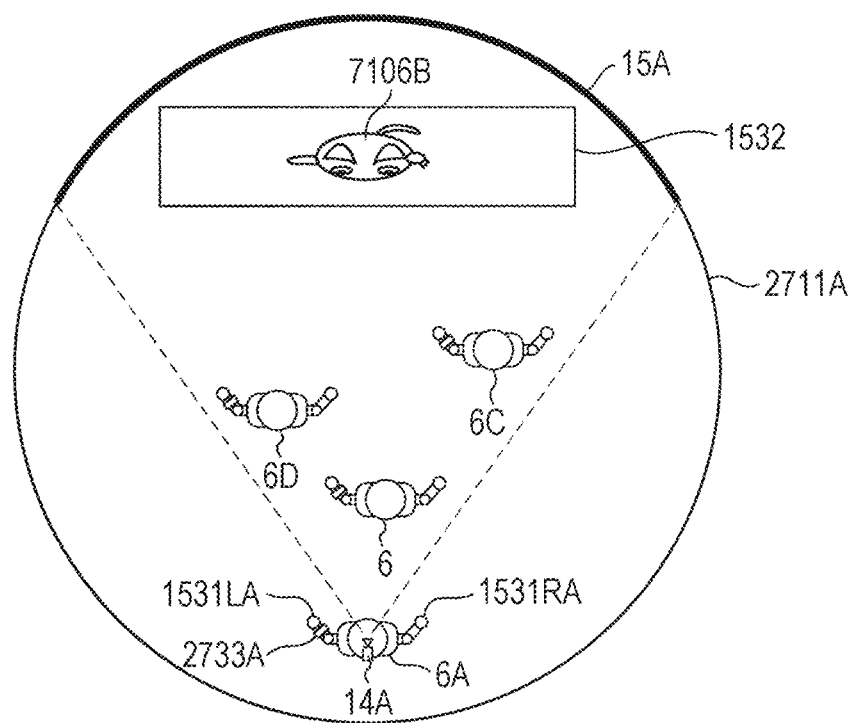

FIG. 75A A diagram of a virtual space according to at least one embodiment of this disclosure.

Figure 75B:
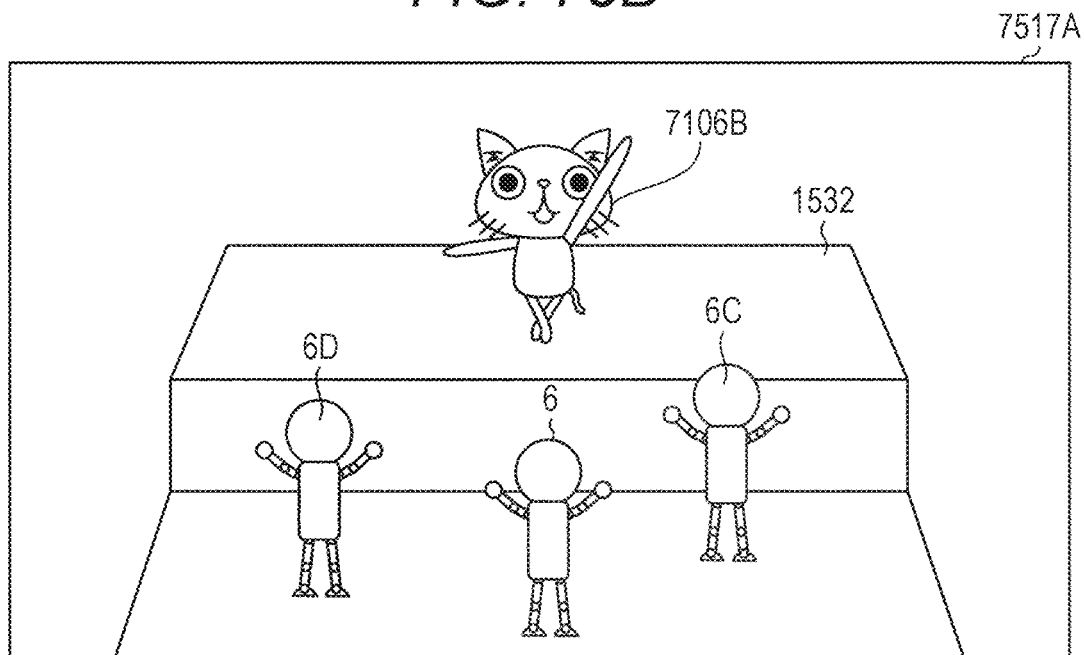

FIG. 75B A diagram of a field-of-view image according to at least one embodiment of this disclosure.

Figure 76A:
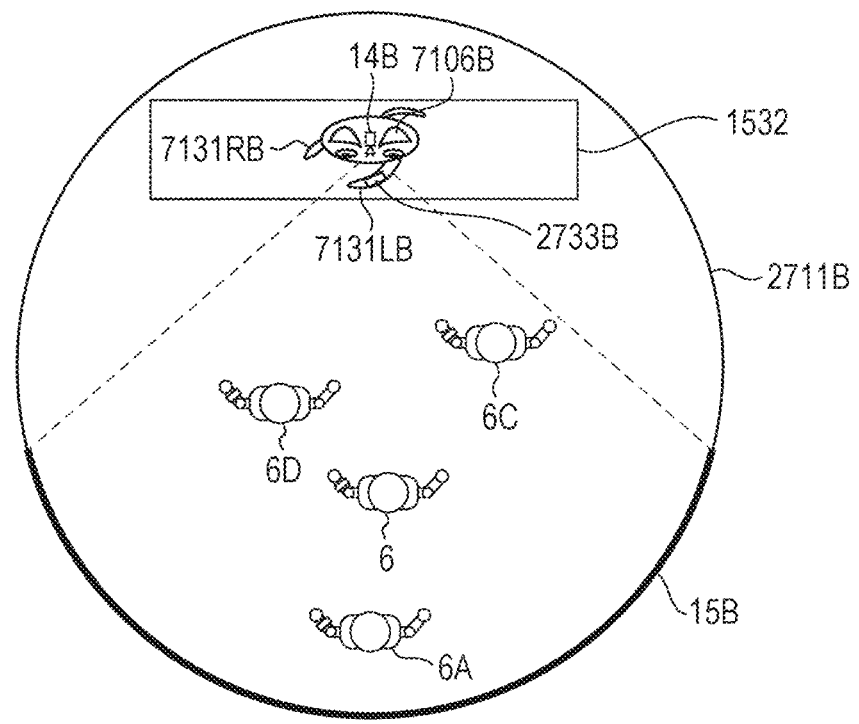

FIG. 76A A diagram of a virtual space according to at least one embodiment of this disclosure.

Figure 76B:
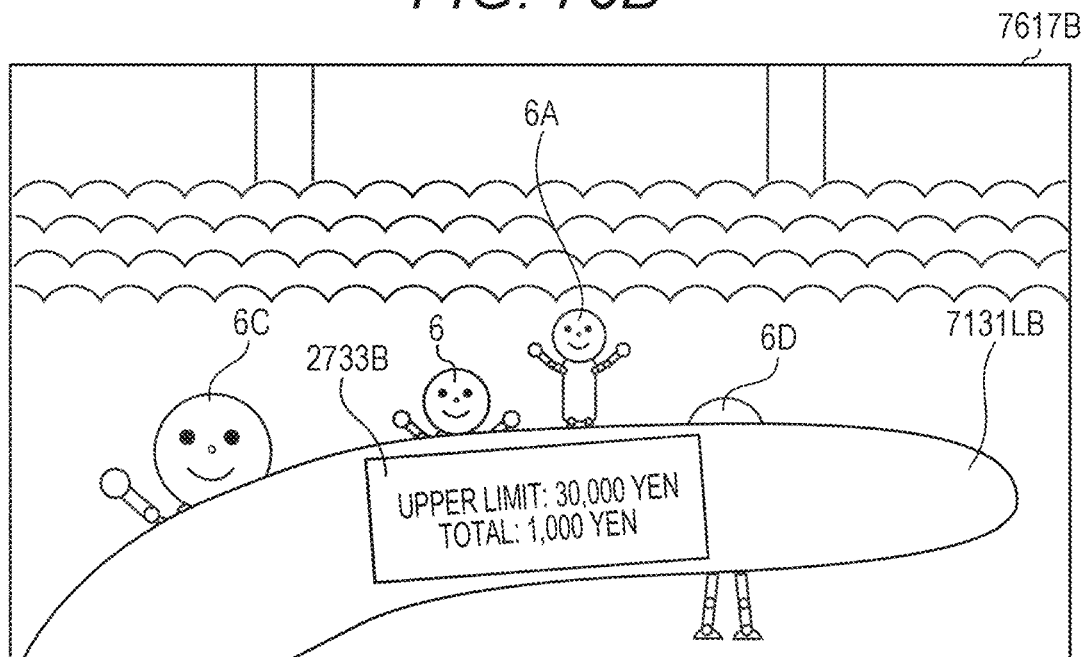

FIG. 76B A diagram of a field-of-view image according to at least one embodiment of this disclosure.

Figure 77A:
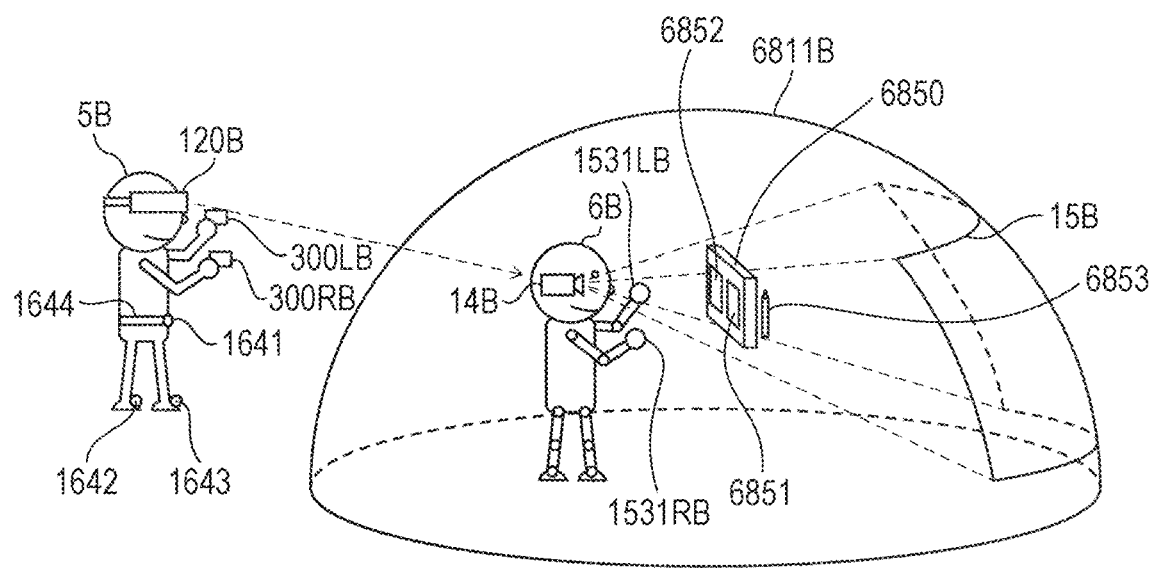

FIG. 77A A diagram of a virtual space according to at least one embodiment of this disclosure.

Figure 77B:
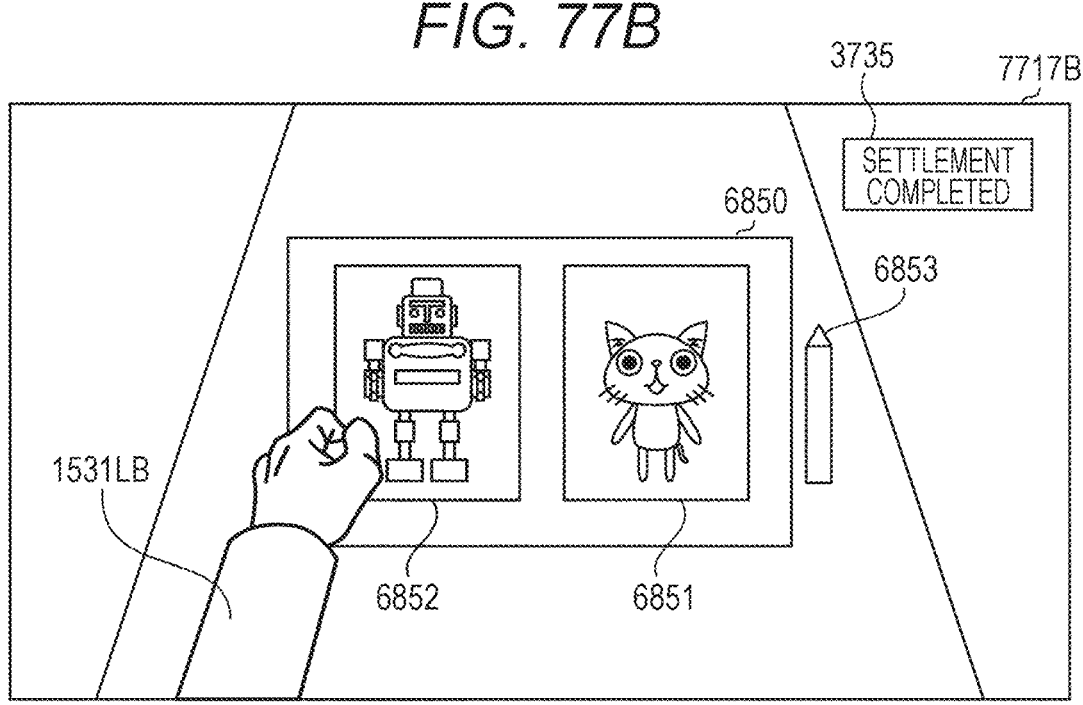

FIG. 77B A diagram of a field-of-view image according to at least one embodiment of this disclosure.

Figure 78:
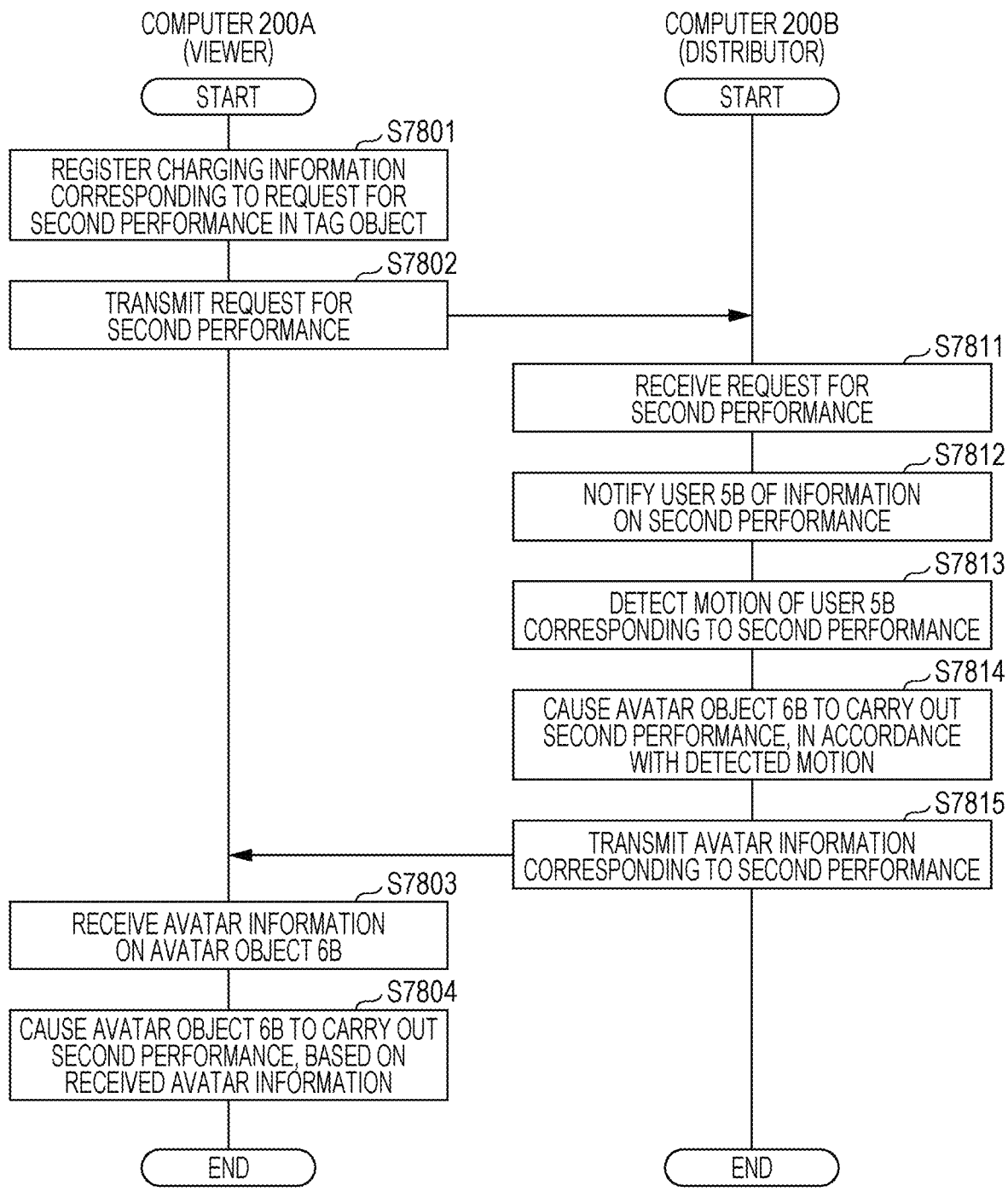

FIG. 78 A sequence chart of a processing to be executed by an HMD system according to at least one embodiment of this disclosure.

Figure 79A:
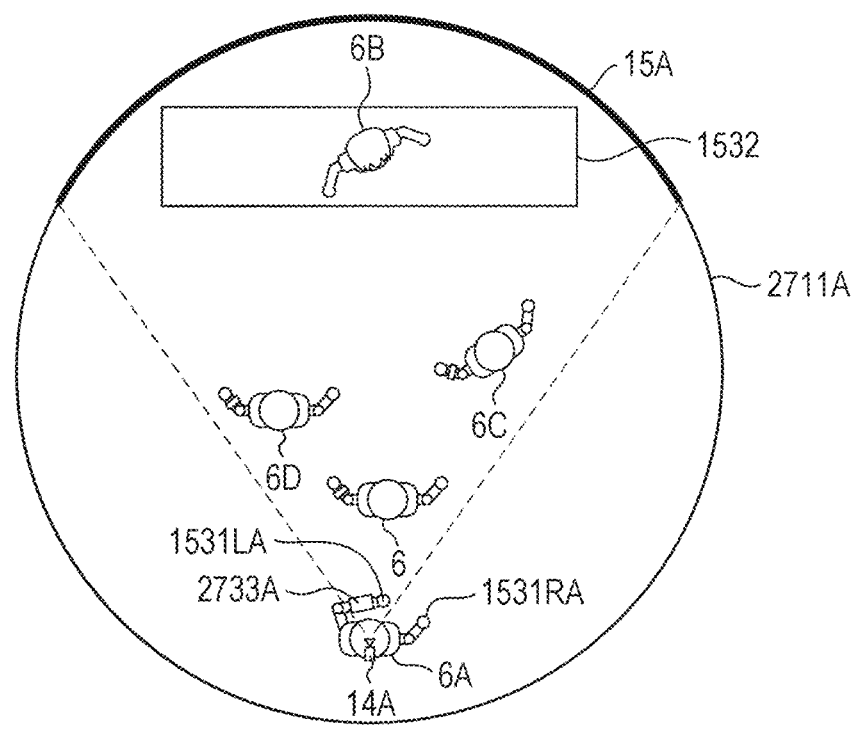

FIG. 79A A diagram of a virtual space according to at least one embodiment of this disclosure.

Figure 79B:
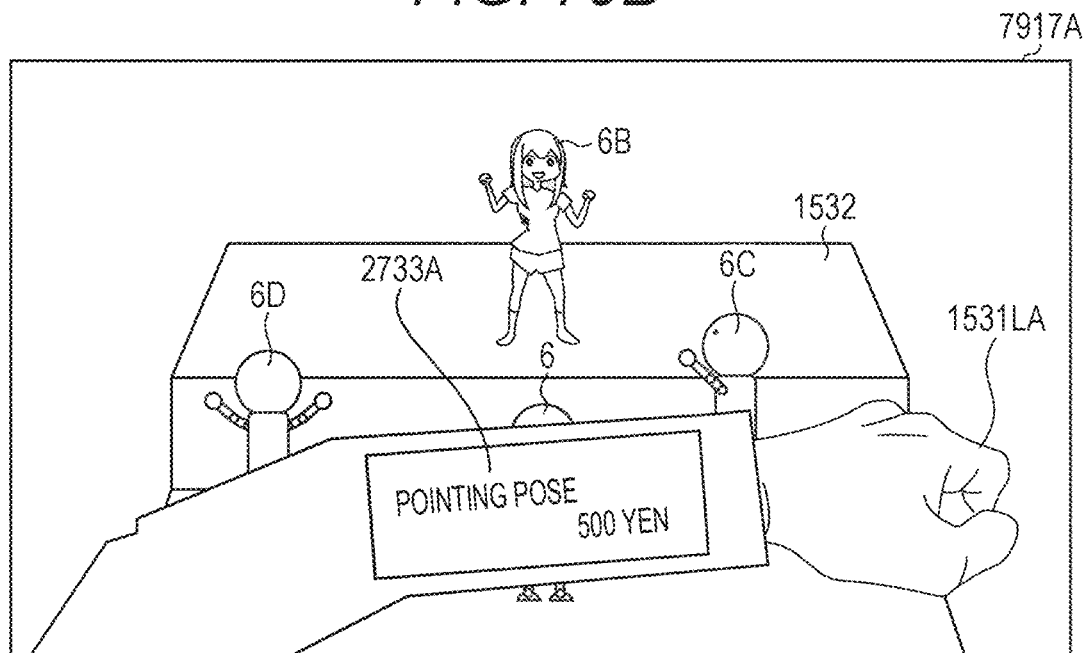

FIG. 79B A diagram of a field-of-view image according to at least one embodiment of this disclosure.

Figure 80A:
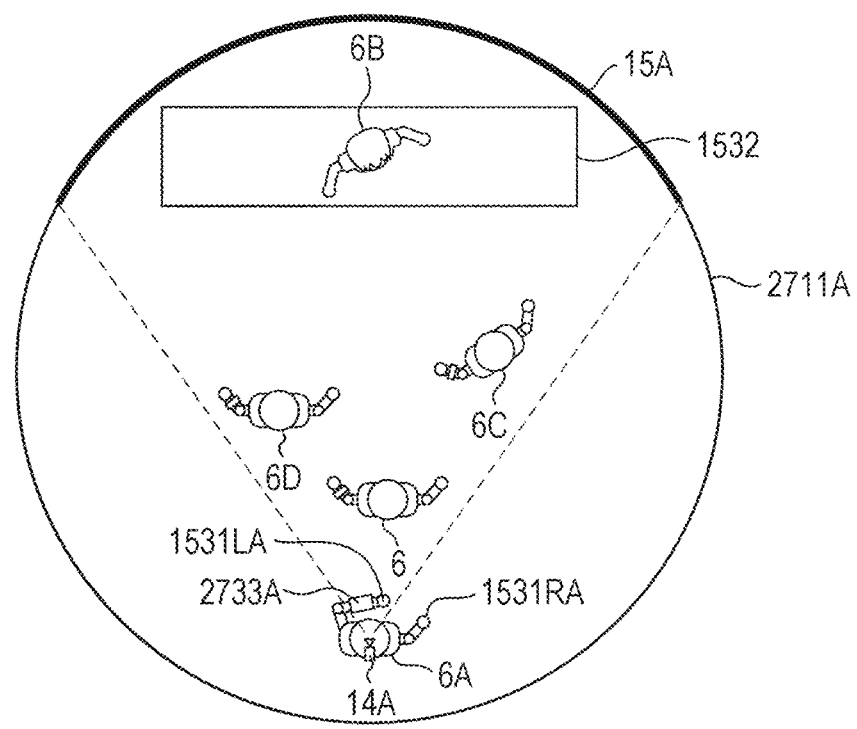

FIG. 80A A diagram of a virtual space according to at least one embodiment of this disclosure.

Figure 80B:
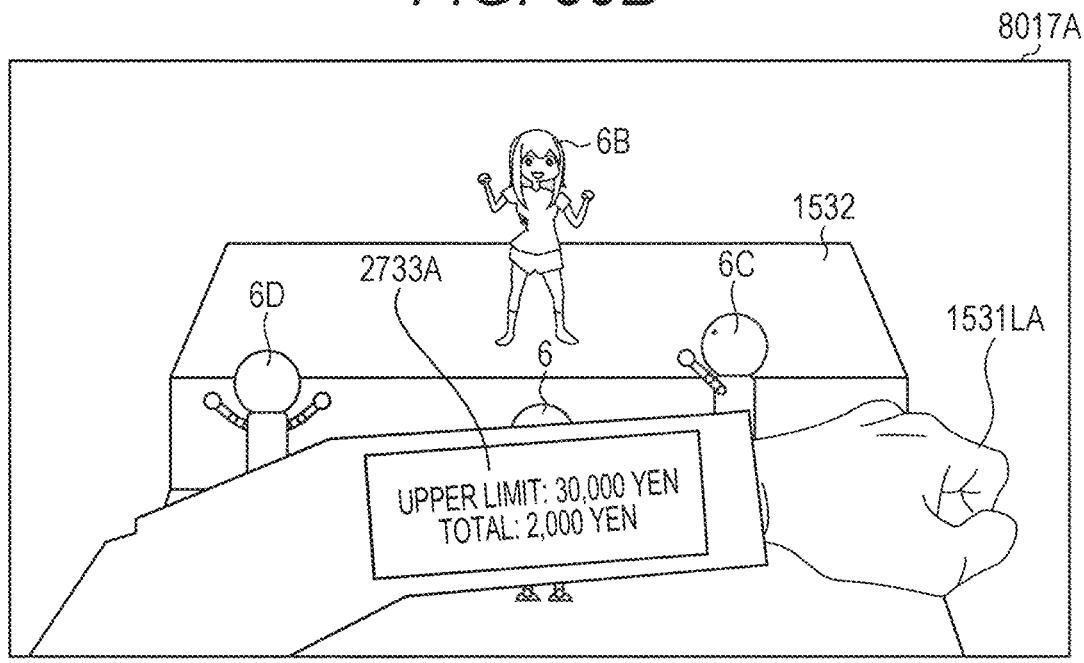

FIG. 80B A diagram of a field-of-view image according to at least one embodiment of this disclosure.

Figure 81A:
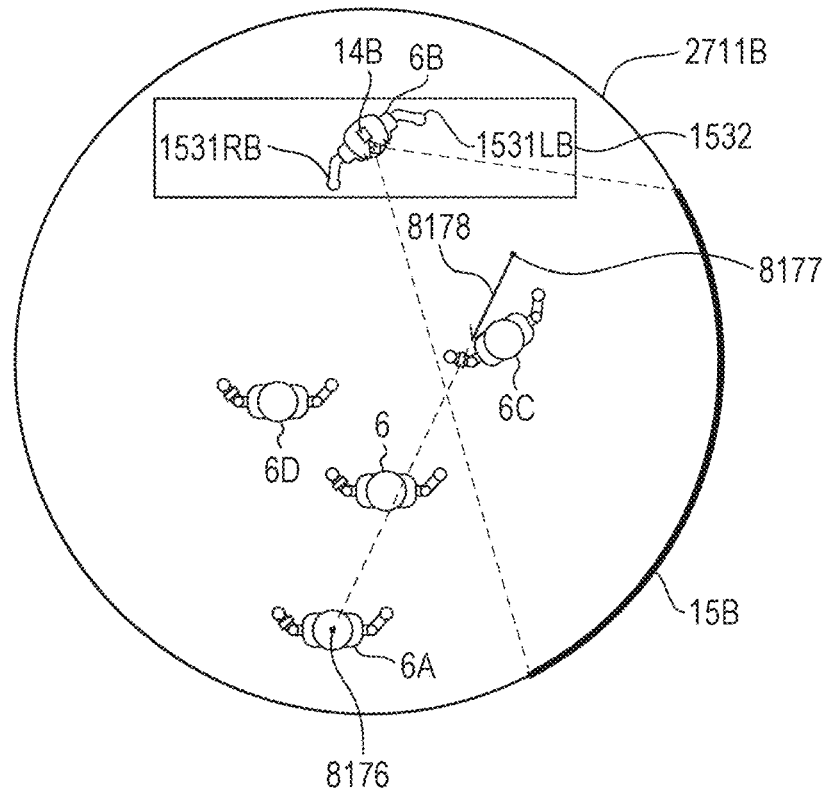

FIG. 81A A diagram of a virtual space according to at least one embodiment of this disclosure.

Figure 81B:
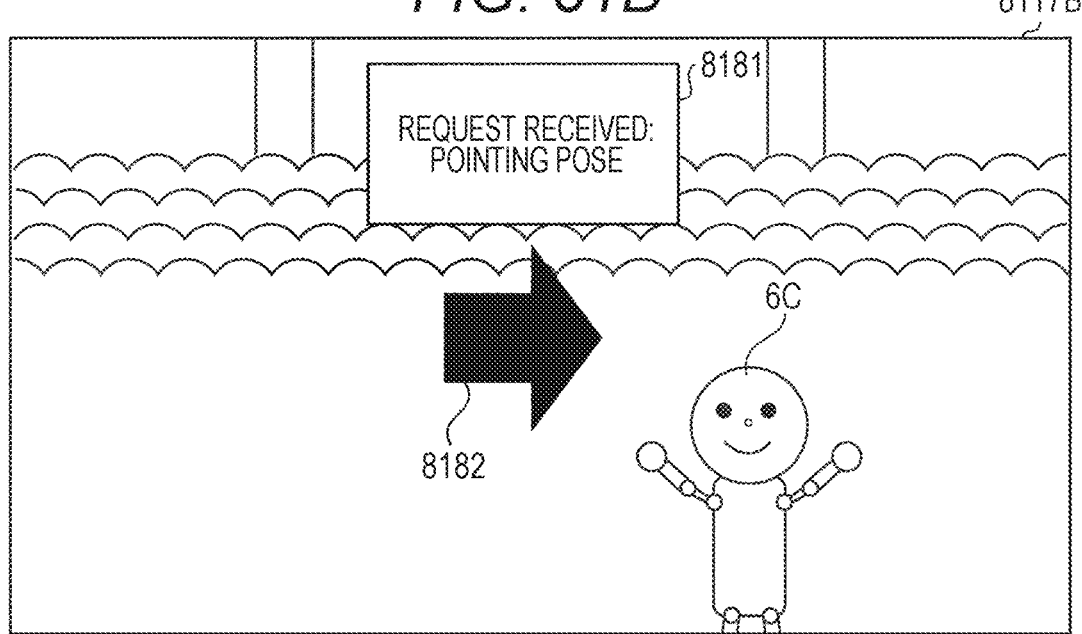

FIG. 81B A diagram of a field-of-view image according to at least one embodiment of this disclosure.

Figure 82A:
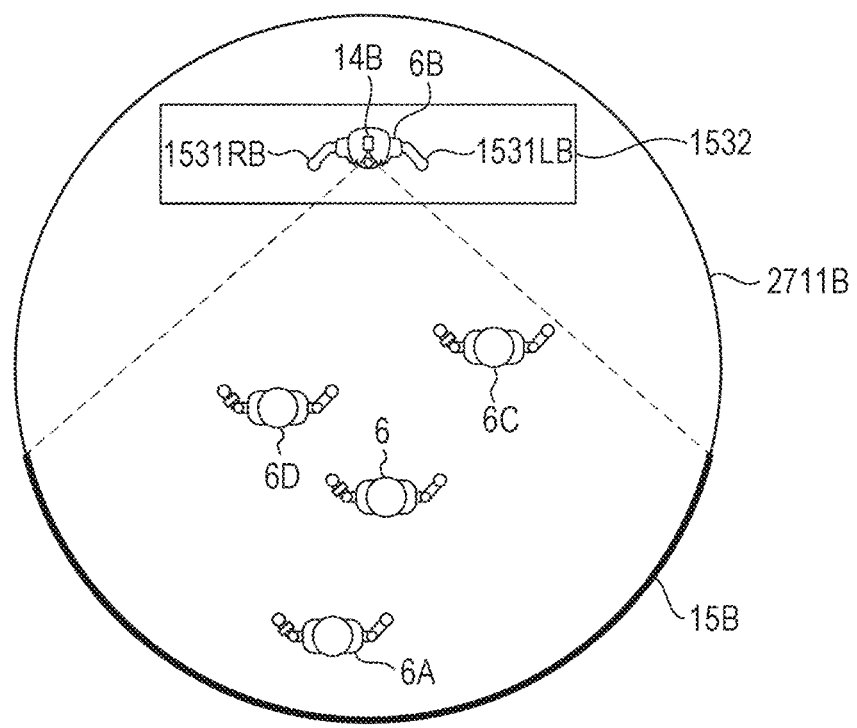

FIG. 82A A diagram of a virtual space according to at least one embodiment of this disclosure.

Figure 82B:
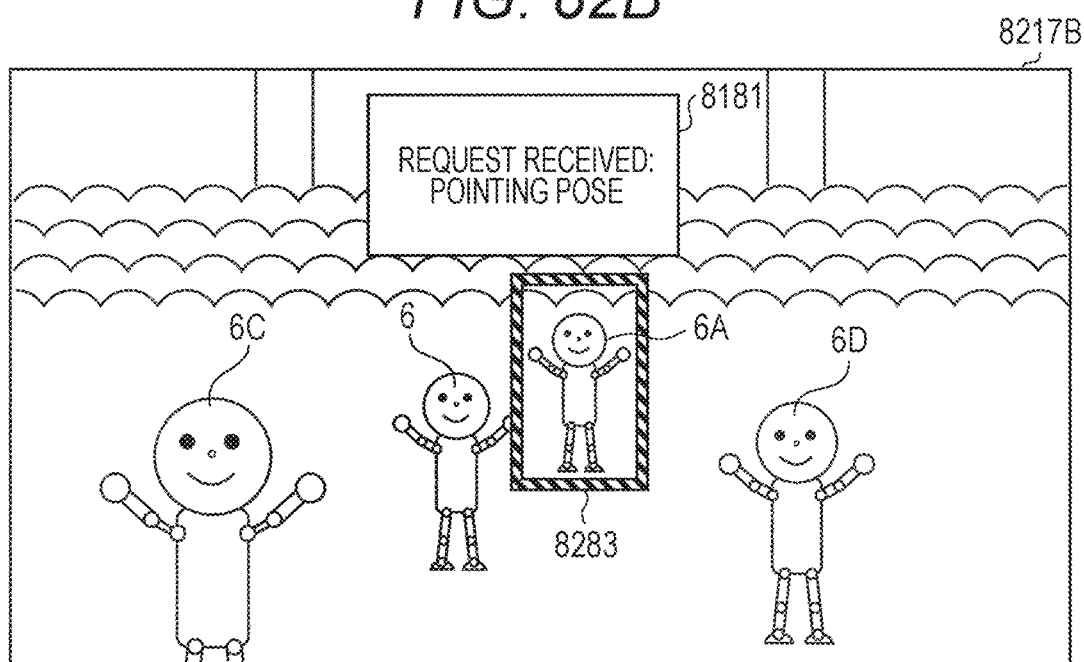

FIG. 82B A diagram of a field-of-view image according to at least one embodiment of this disclosure.

Figure 83:
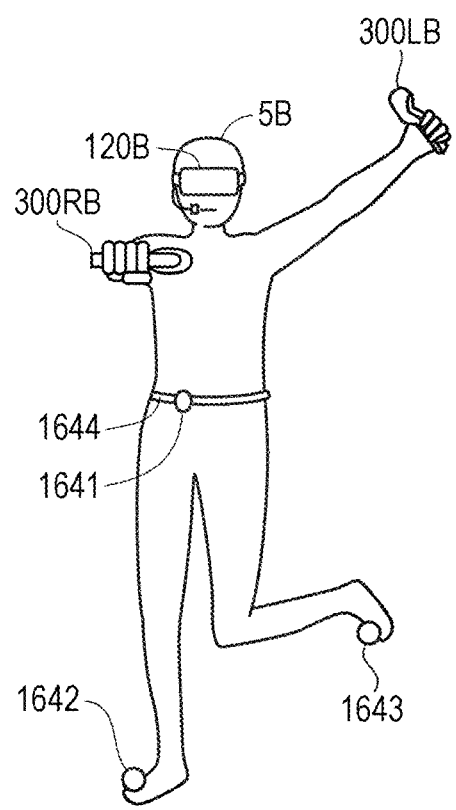

FIG. 83 A diagram of a user's posture according to at least one embodiment of this disclosure.

Figure 84A:
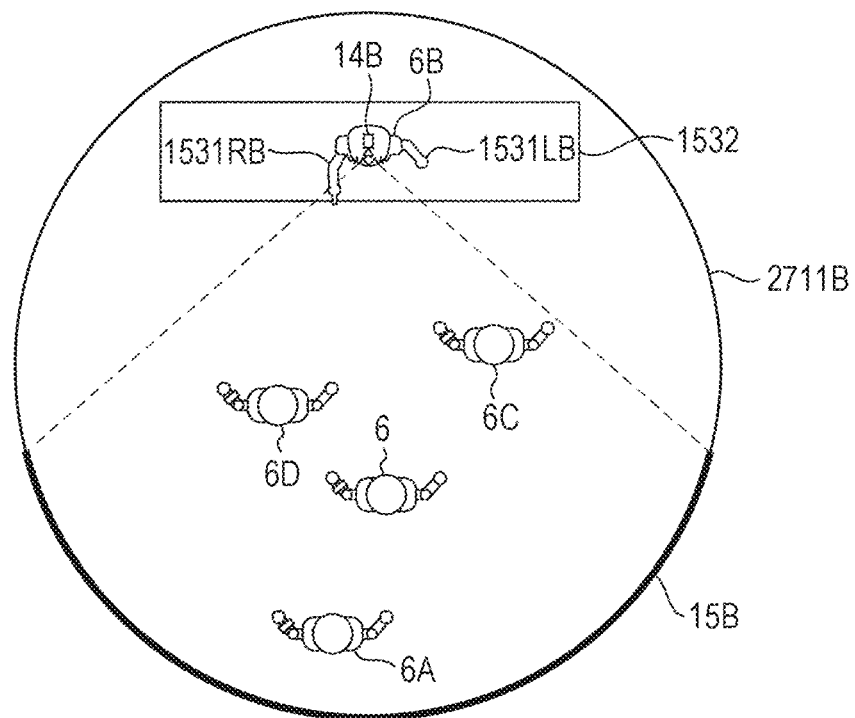

FIG. 84A A diagram of a virtual space according to at least one embodiment of this disclosure.

Figure 84B:
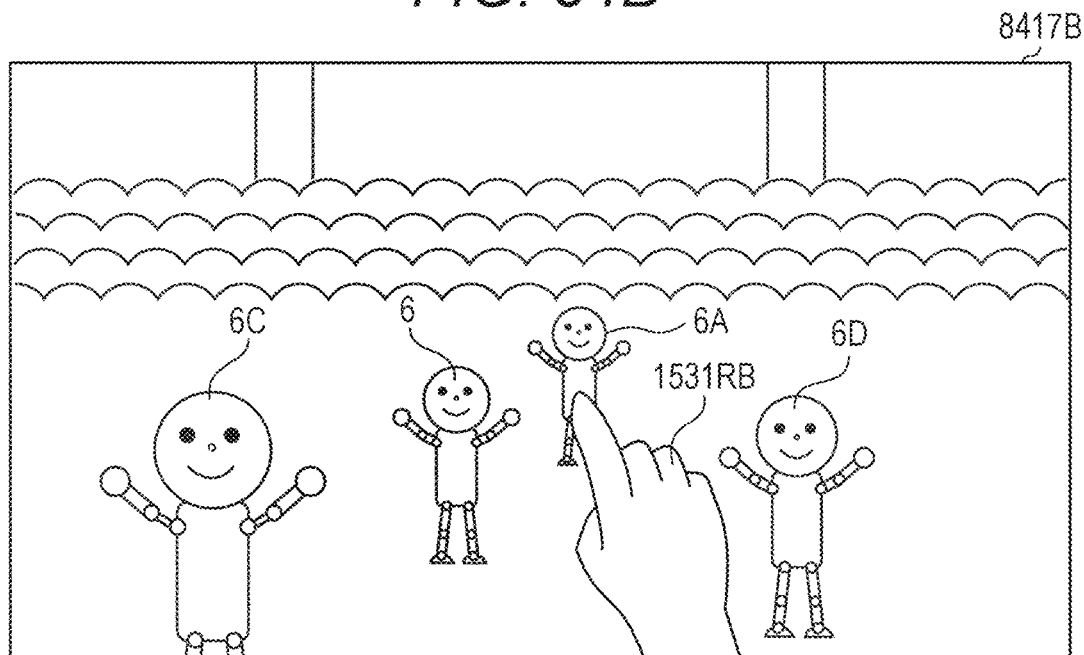

FIG. 84B A diagram of a field-of-view image according to at least one embodiment of this disclosure.

Figure 85A:
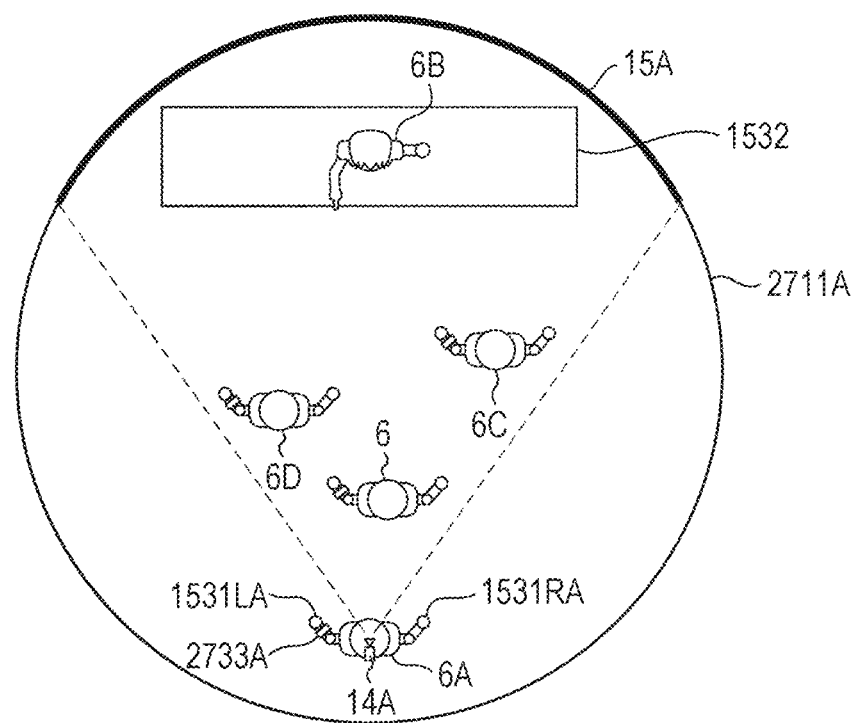

FIG. 85A A diagram of a virtual space according to at least one embodiment of this disclosure.

Figure 85B:
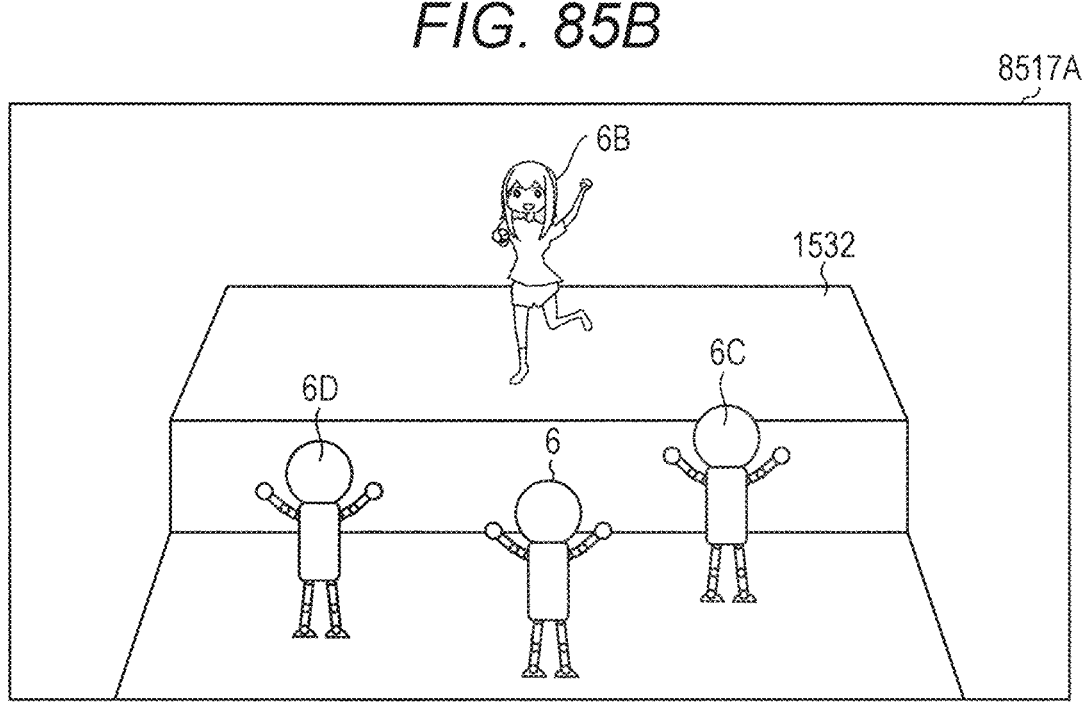

FIG. 85B A diagram of a field-of-view image according to at least one embodiment of this disclosure.

FIG. 86 A sequence chart of a processing to be executed by an HMD system according to at least one embodiment of this disclosure.

Figure 87A:
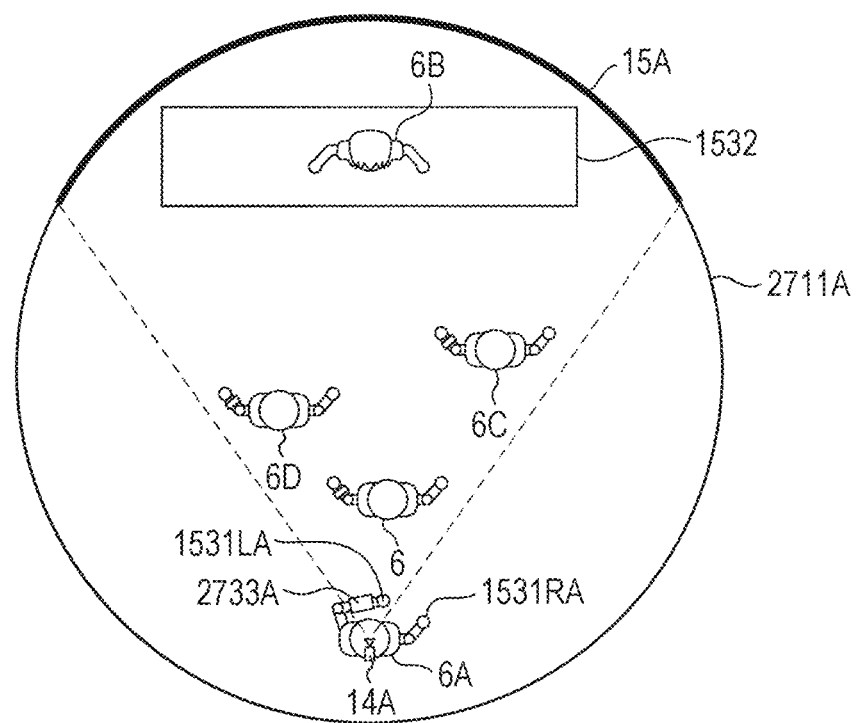

FIG. 87A A diagram of a virtual space according to at least one embodiment of this disclosure.

Figure 87B:
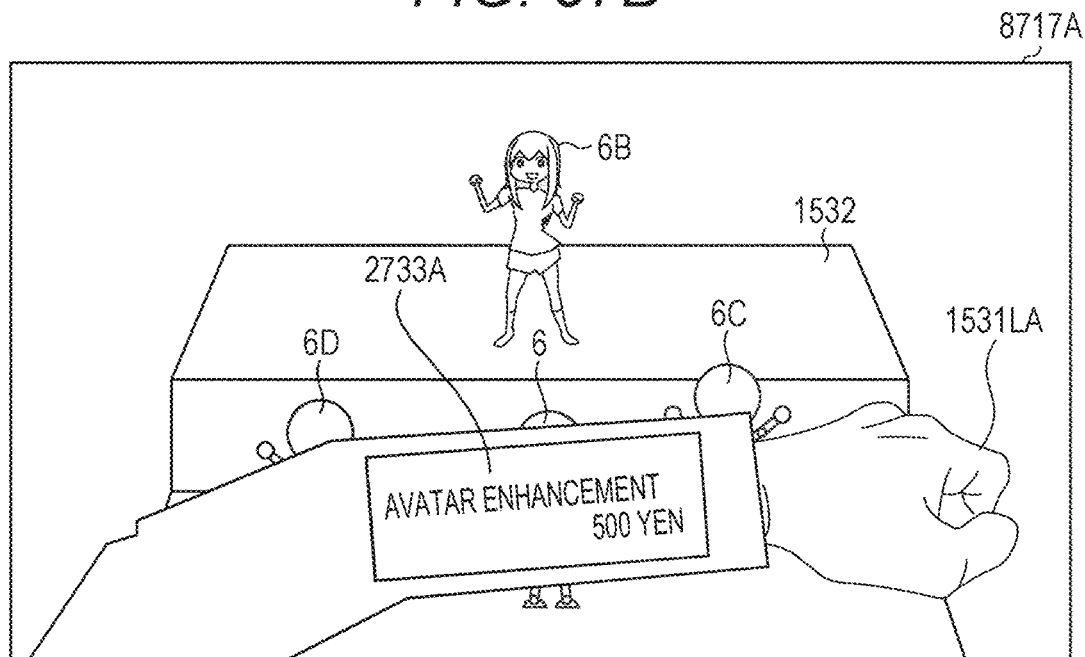

FIG. 87B A diagram of a field-of-view image according to at least one embodiment of this disclosure.

Figure 88A:
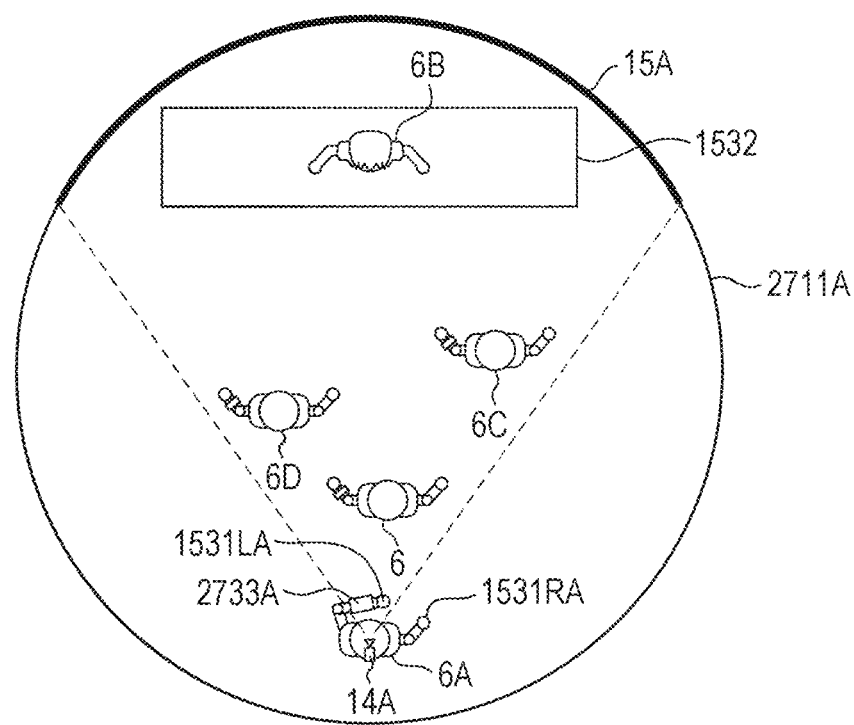

FIG. 88A A diagram of a virtual space according to at least one embodiment of this disclosure.

Figure 88B:
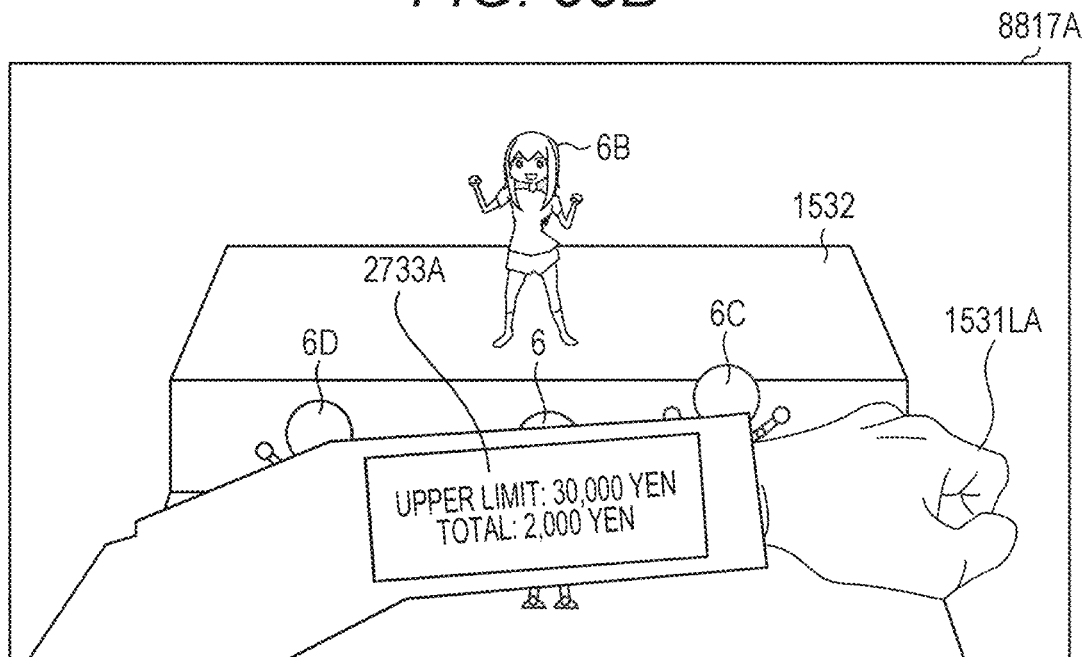

FIG. 88B A diagram of a field-of-view image according to at least one embodiment of this disclosure.

Figure 89A:
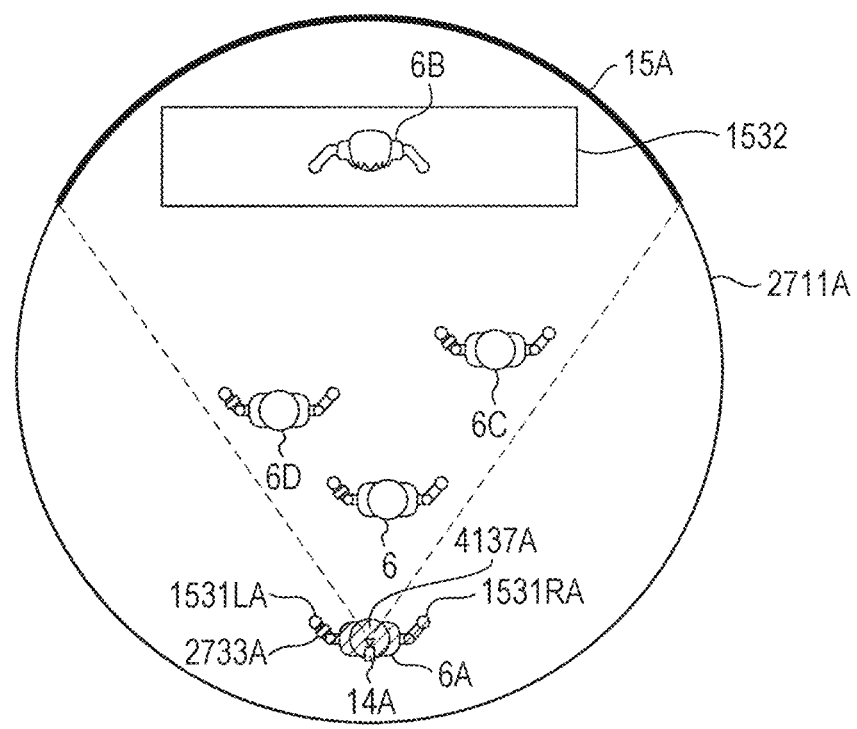

FIG. 89A A diagram of a virtual space according to at least one embodiment of this disclosure.

Figure 89B:
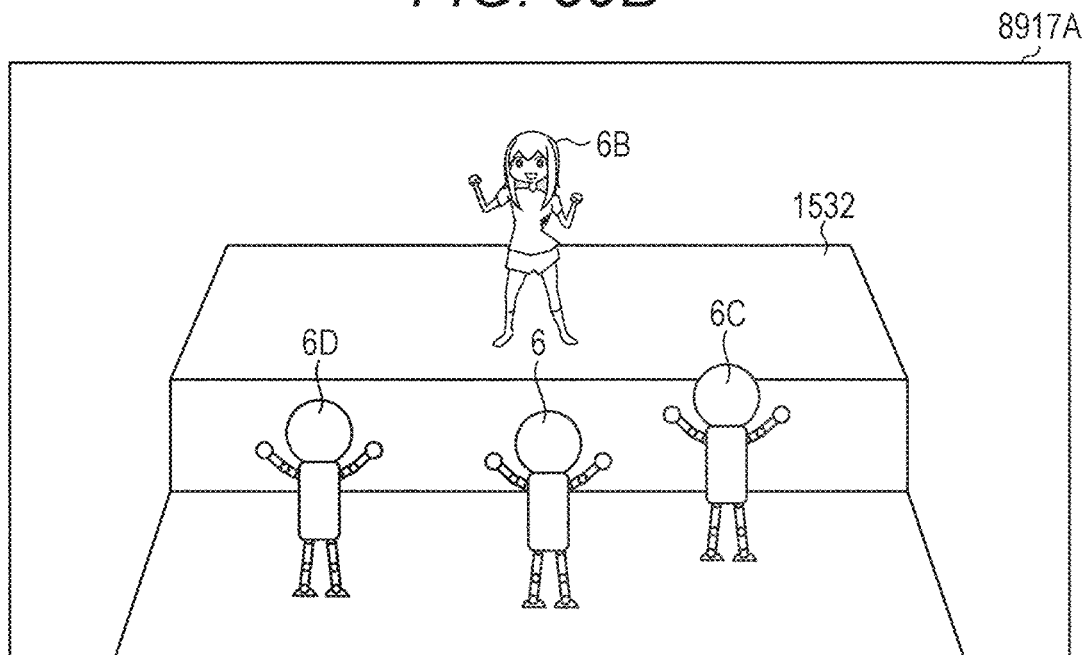

FIG. 89B A diagram of a field-of-view image according to at least one embodiment of this disclosure.

Figure 90A:
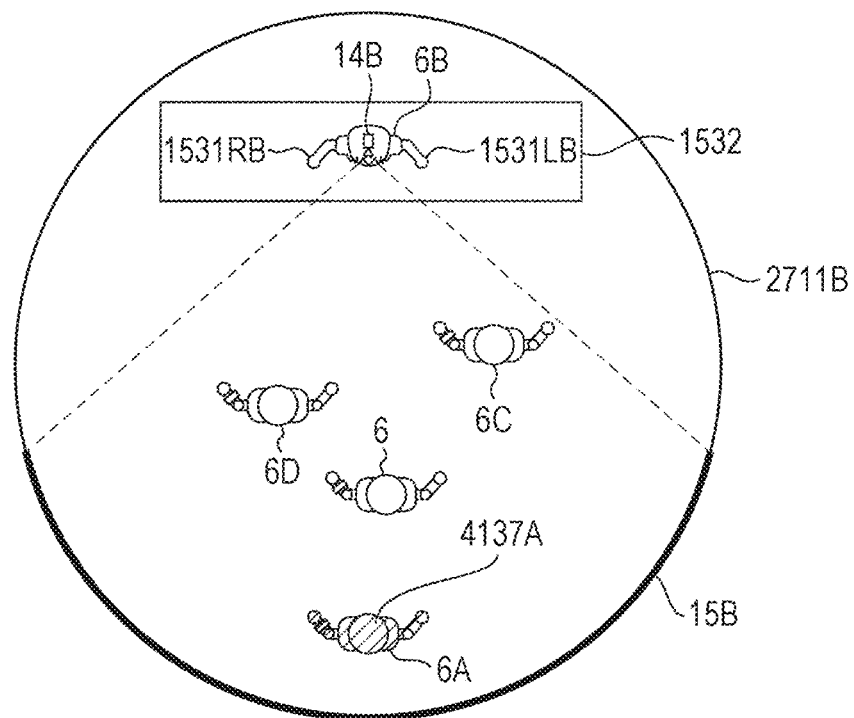

FIG. 90A A diagram of a virtual space according to at least one embodiment of this disclosure.

Figure 90B:
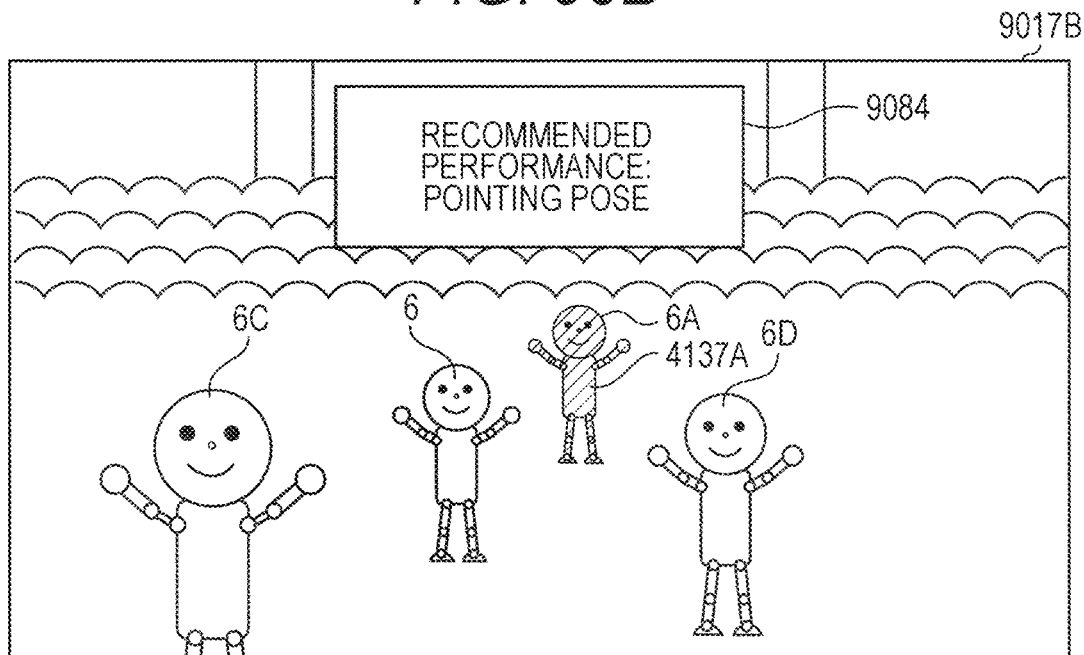

FIG. 90B A diagram of a field-of-view image according to at least one embodiment of this disclosure.

FIG. 91 A table of data referred to by a processor to notify a user of at least one second performance.

Figure 92A:
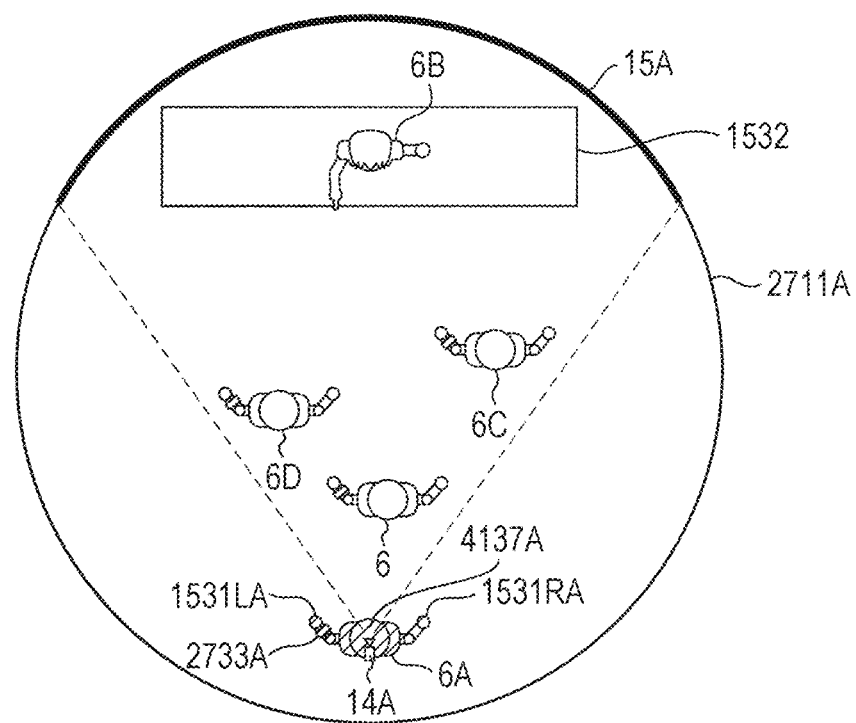

FIG. 92A A diagram of a virtual space according to at least one embodiment of this disclosure.

Figure 92B:
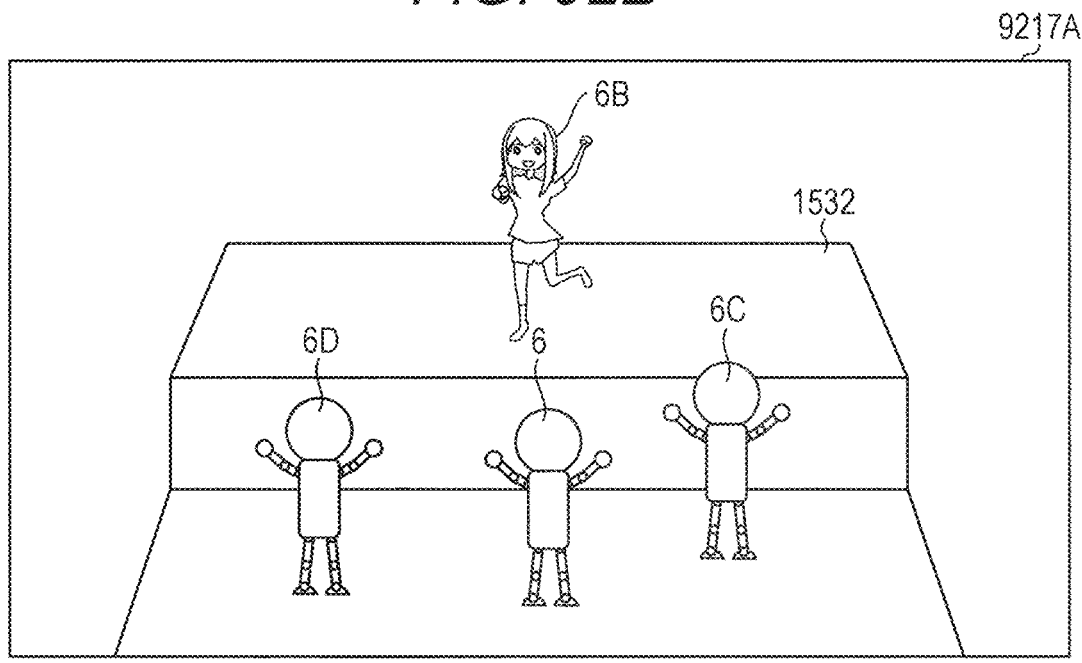

FIG. 92B A diagram of a field-of-view image according to at least one embodiment of this disclosure.

Figure 93:
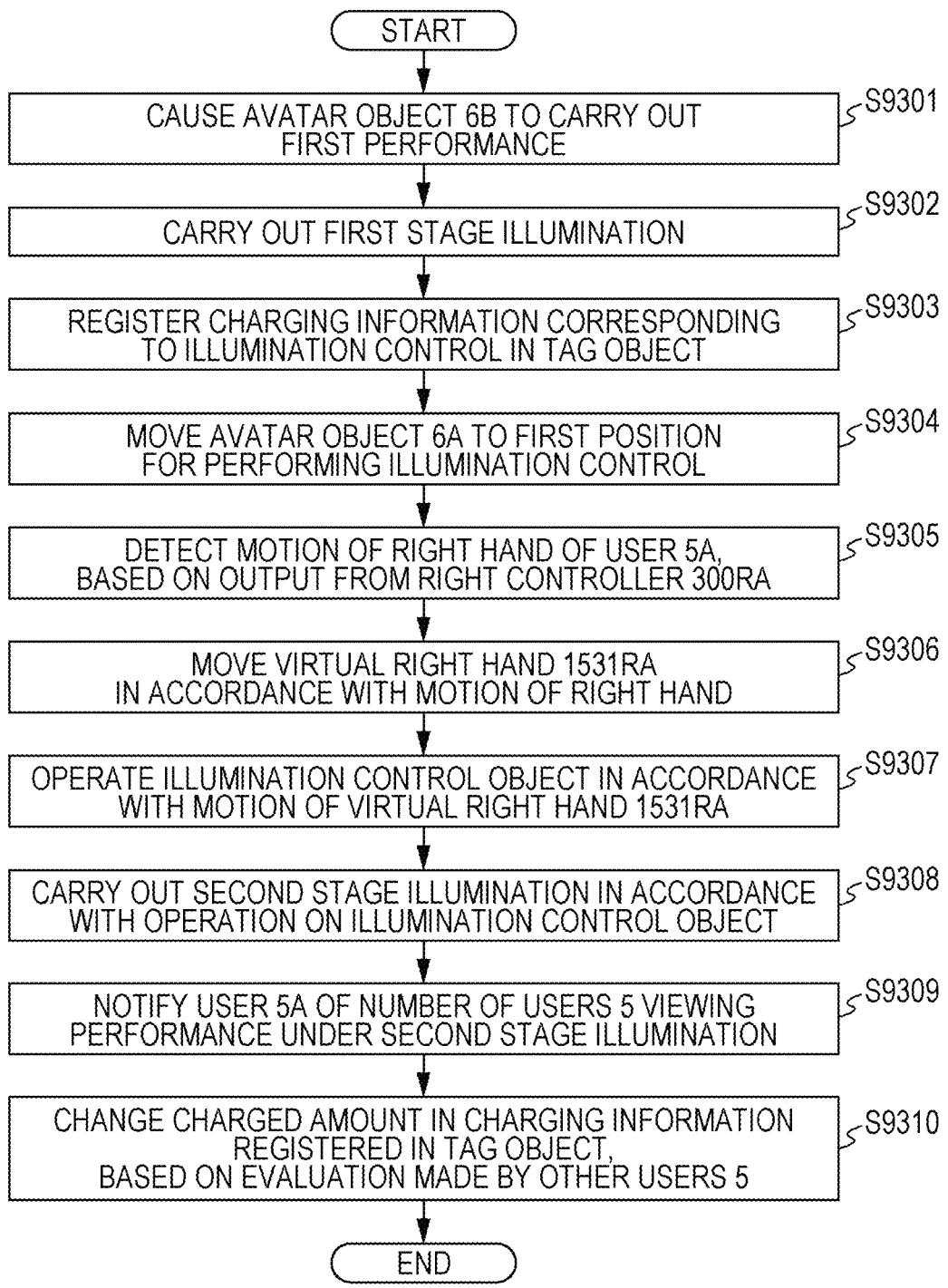

FIG. 93 A flowchart of a processing to be executed by an HMD system according to at least one embodiment of this disclosure.

Figure 94A:
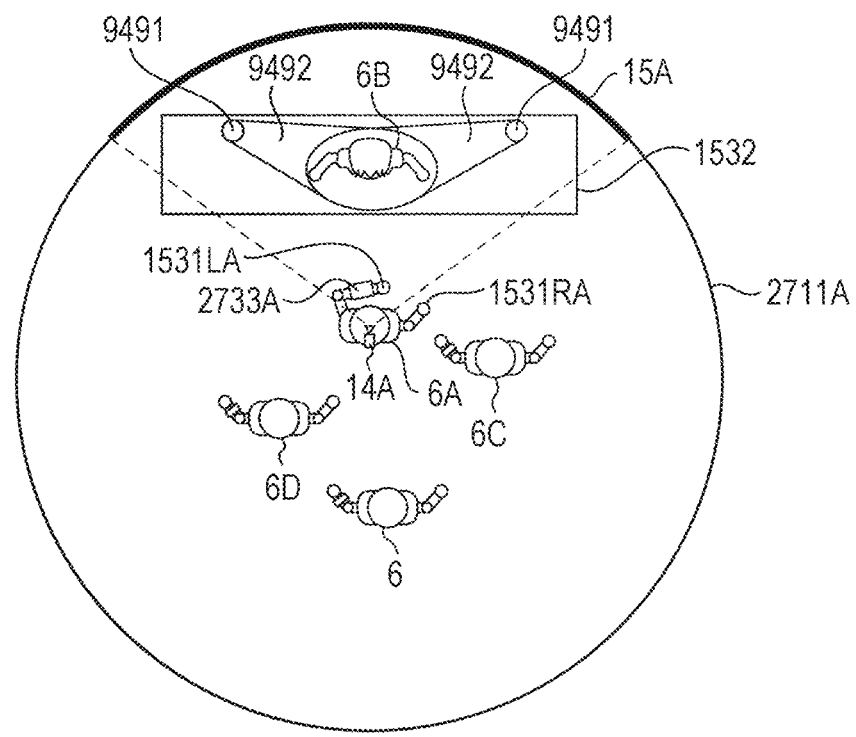

FIG. 94A A diagram of a virtual space according to at least one embodiment of this disclosure.

Figure 94B:
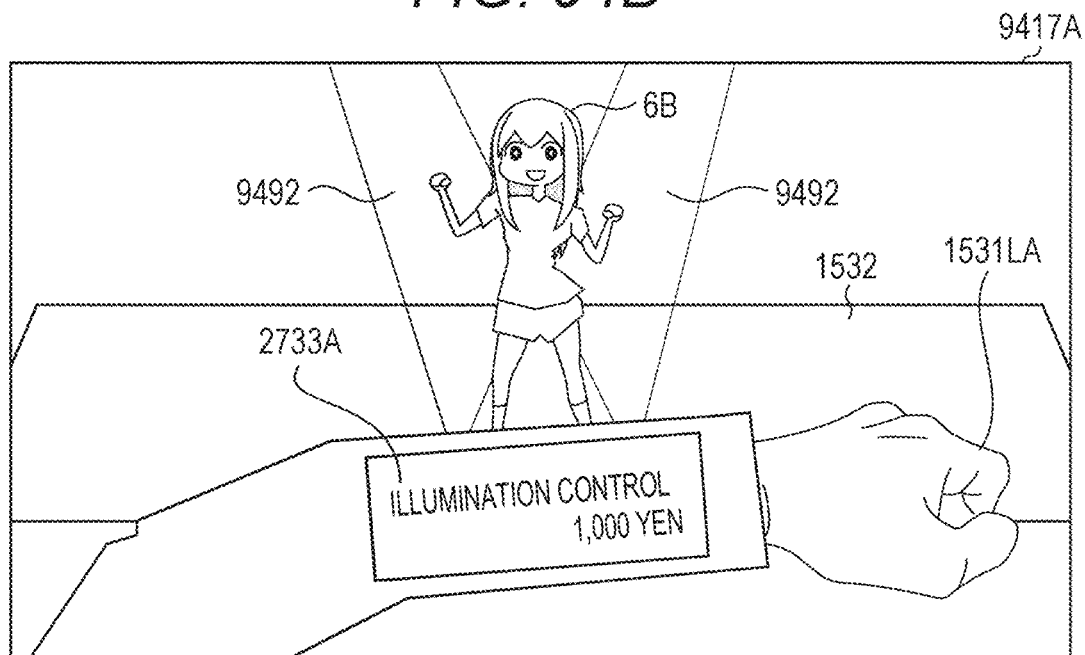

FIG. 94B A diagram of a field-of-view image according to at least one embodiment of this disclosure.

Figure 95A:
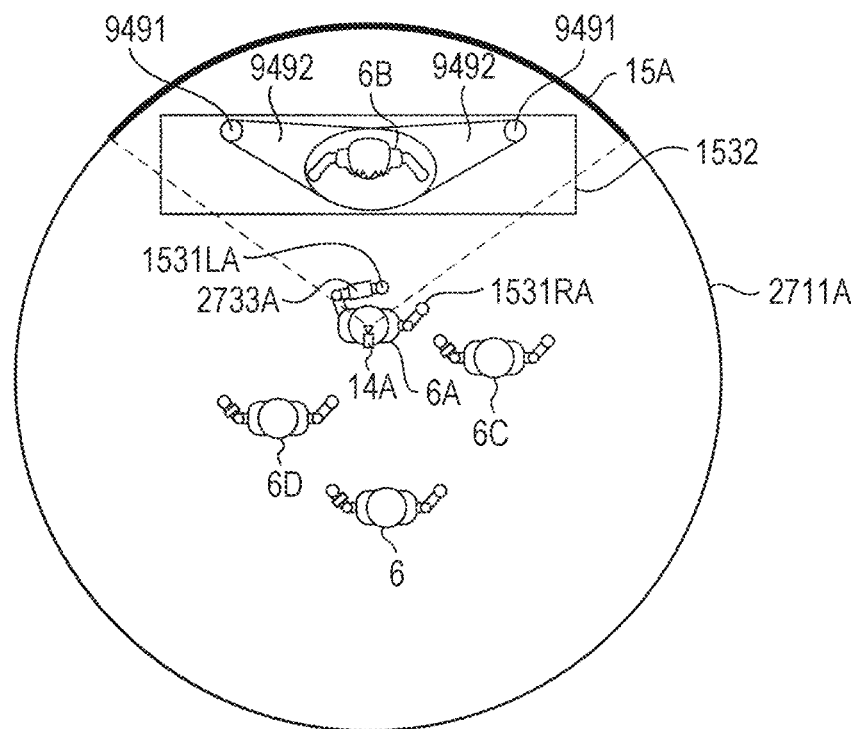

FIG. 95A A diagram of a virtual space according to at least one embodiment of this disclosure.

Figure 95B:
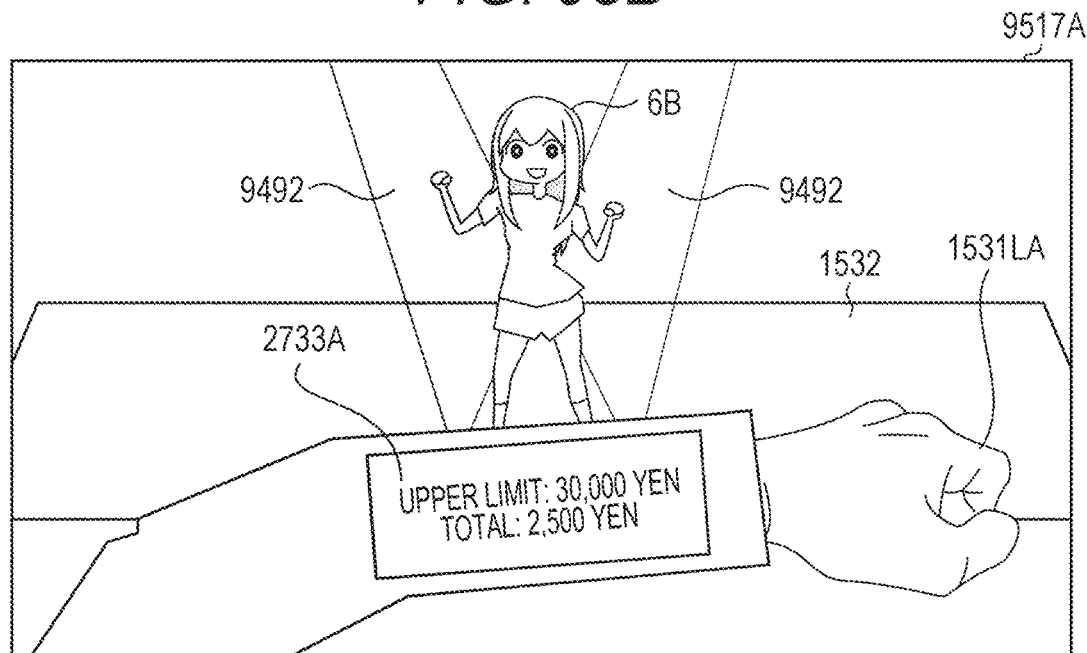

FIG. 95B A diagram of a field-of-view image according to at least one embodiment of this disclosure.

Figure 96A:
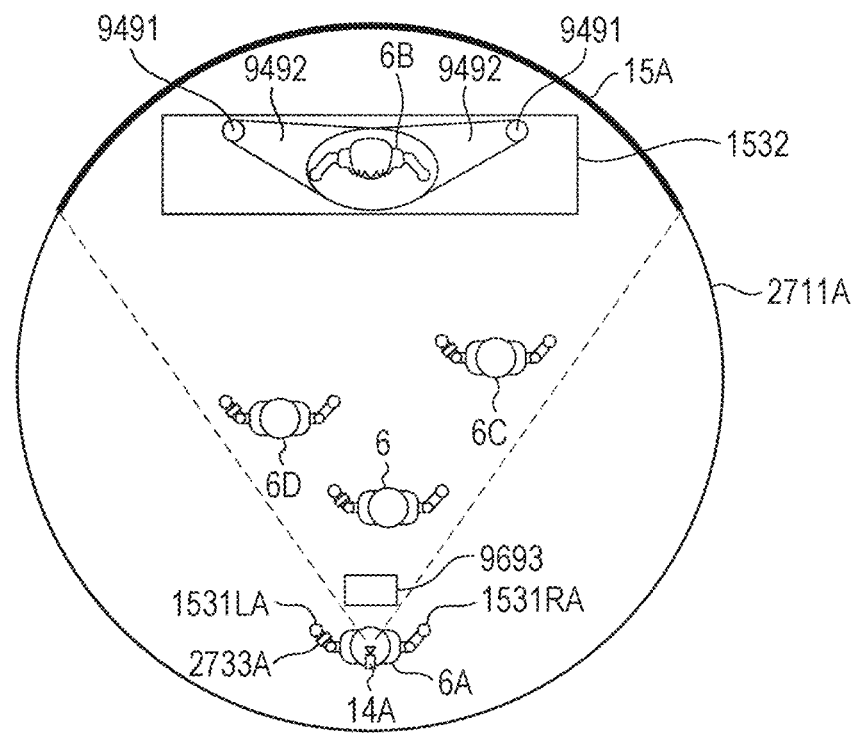

FIG. 96A A diagram of a virtual space according to at least one embodiment of this disclosure.

Figure 96B:
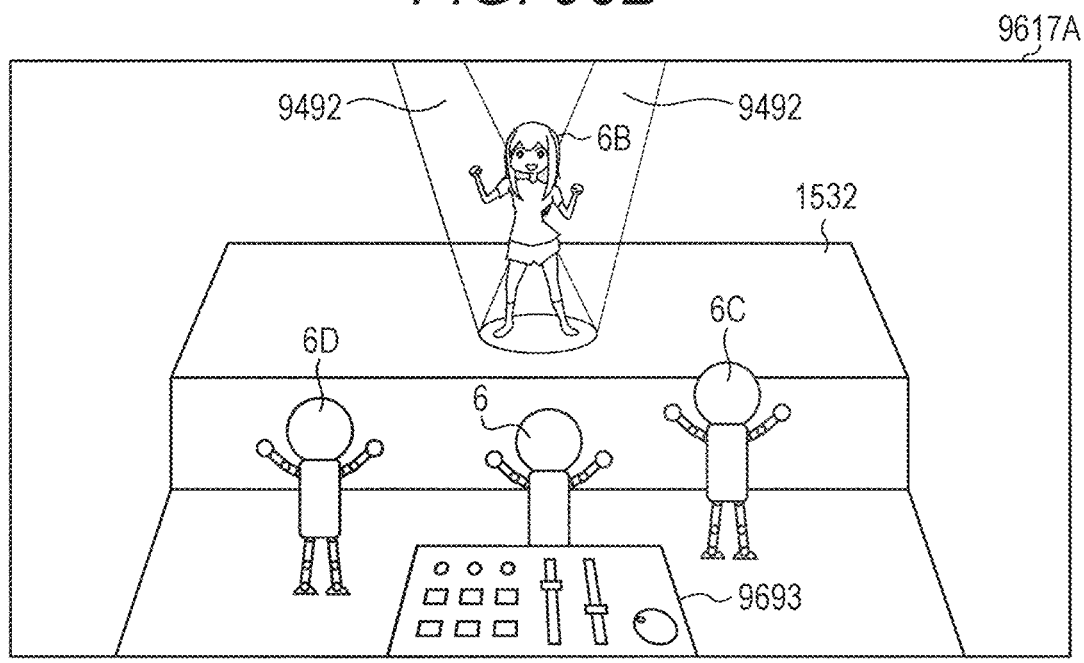

FIG. 96B A diagram of a field-of-view image according to at least one embodiment of this disclosure.

Figure 97A:
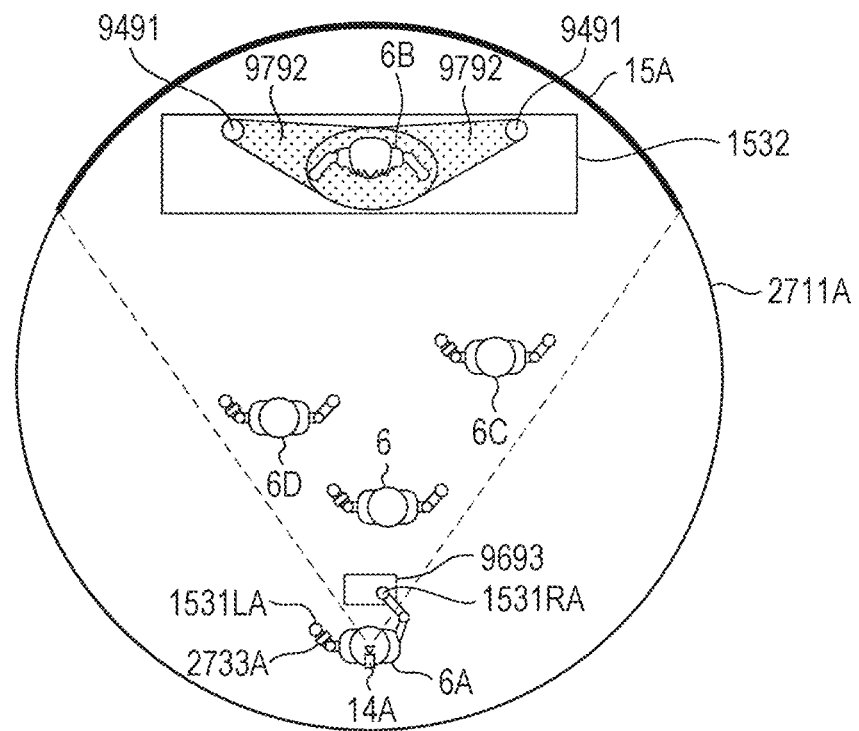

FIG. 97A A diagram of a virtual space according to at least one embodiment of this disclosure.

Figure 97B:
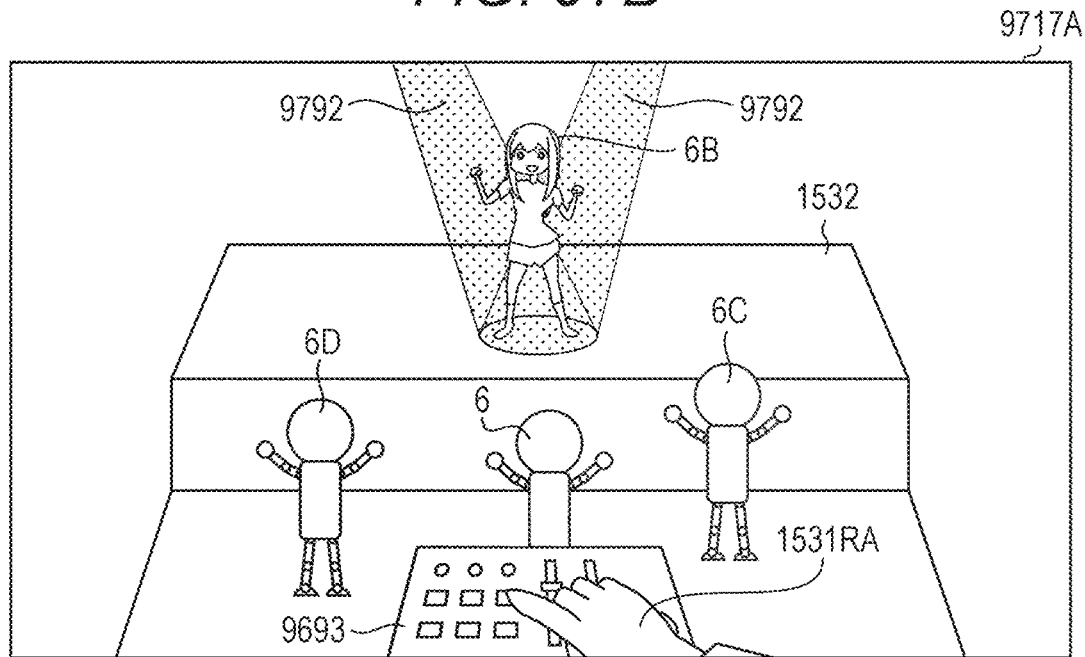

FIG. 97B A diagram of a field-of-view image according to at least one embodiment of this disclosure.

Figure 98A:
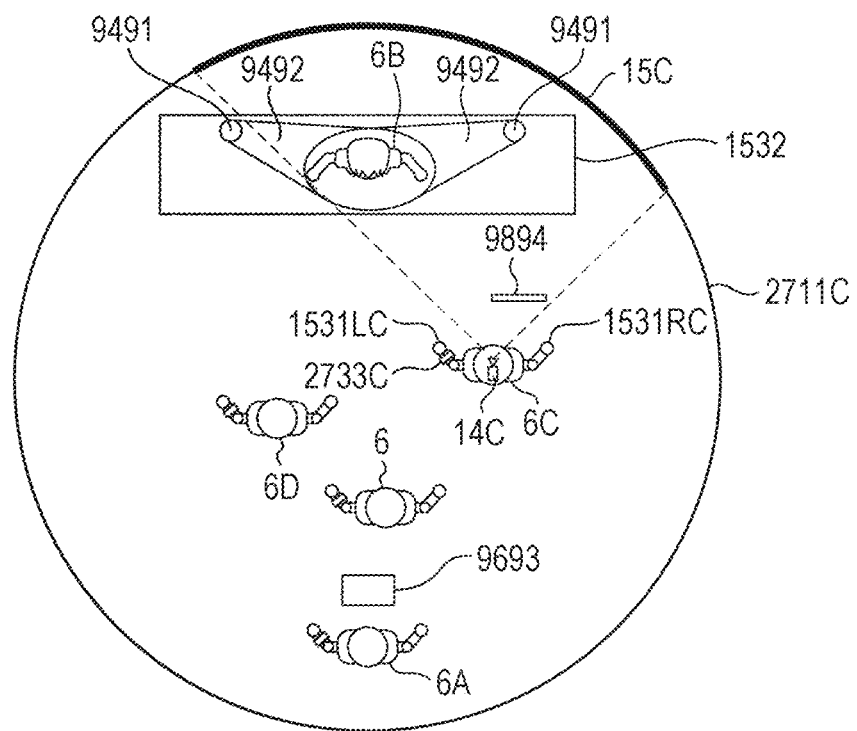

FIG. 98A A diagram of a virtual space according to at least one embodiment of this disclosure.

Figure 98B:
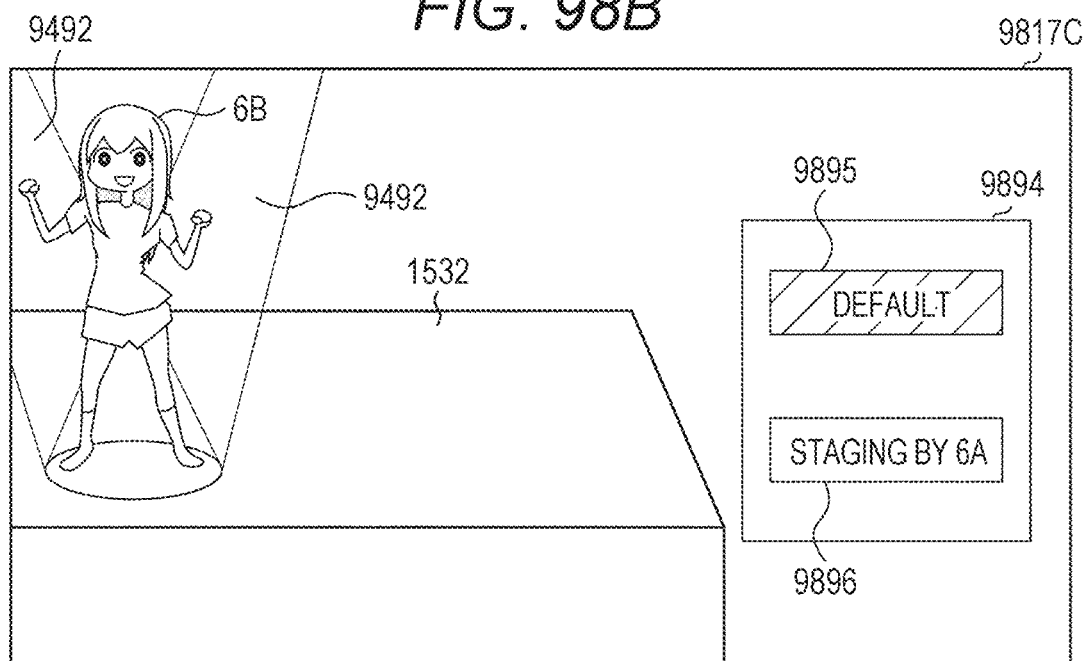

FIG. 98B A diagram of a field-of-view image according to at least one embodiment of this disclosure.

Figure 99A:
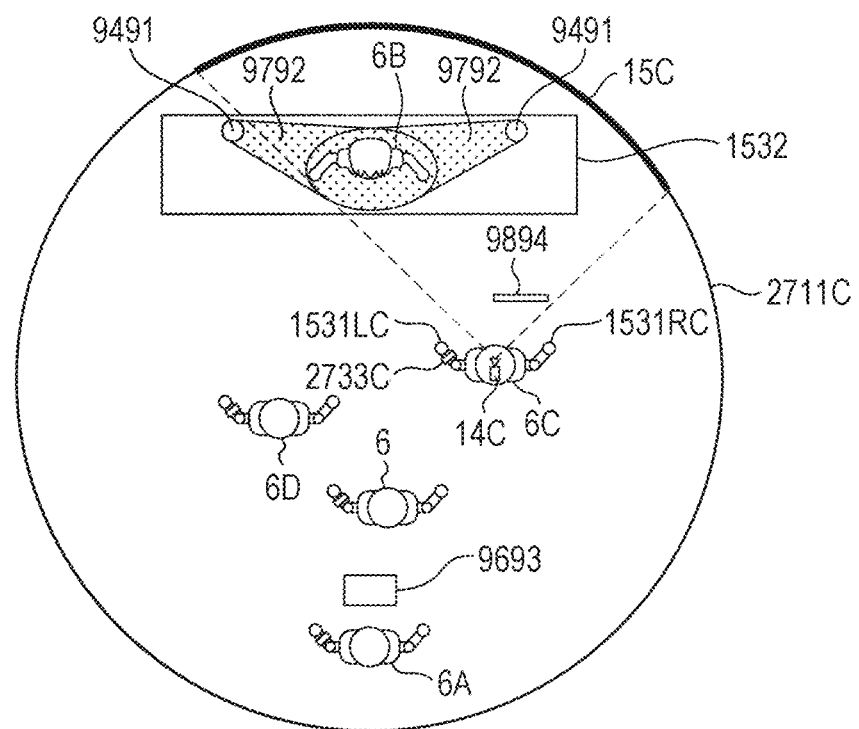

FIG. 99A A diagram of a virtual space according to at least one embodiment of this disclosure.

Figure 99B:
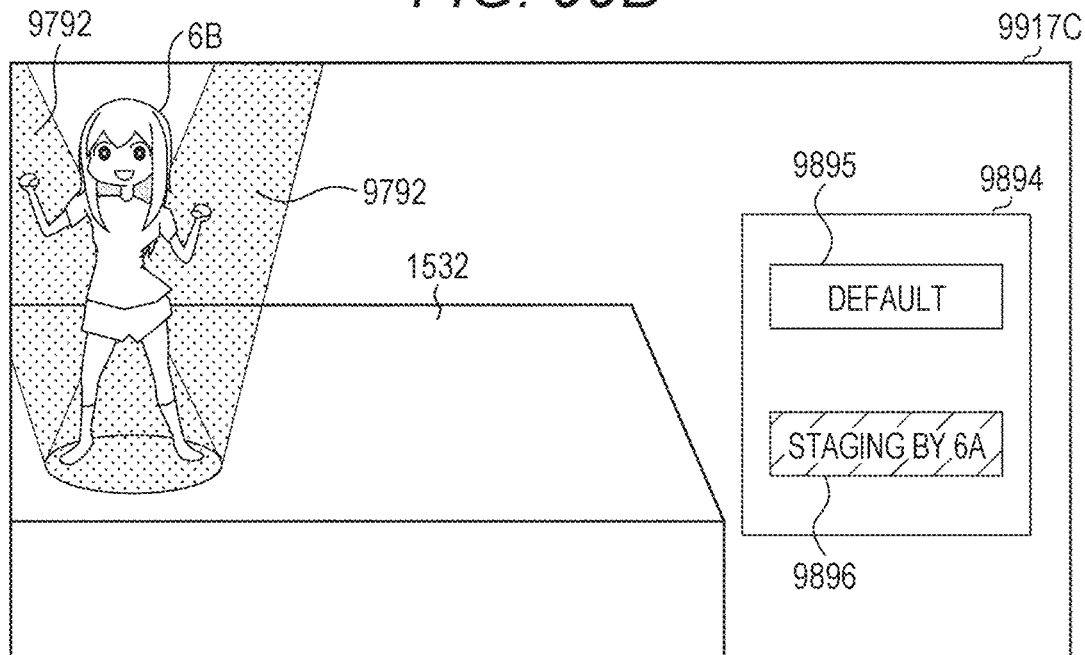

FIG. 99B A diagram of a field-of-view image according to at least one embodiment of this disclosure.

Figure 100A:
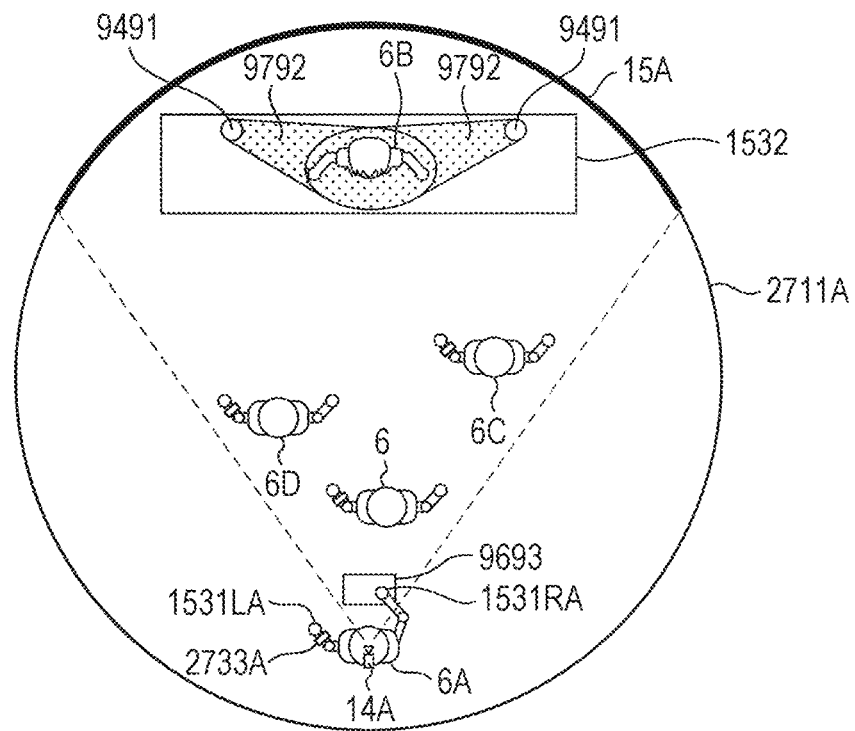

FIG. 100A A diagram of a virtual space according to at least one embodiment of this disclosure.

Figure 100B:
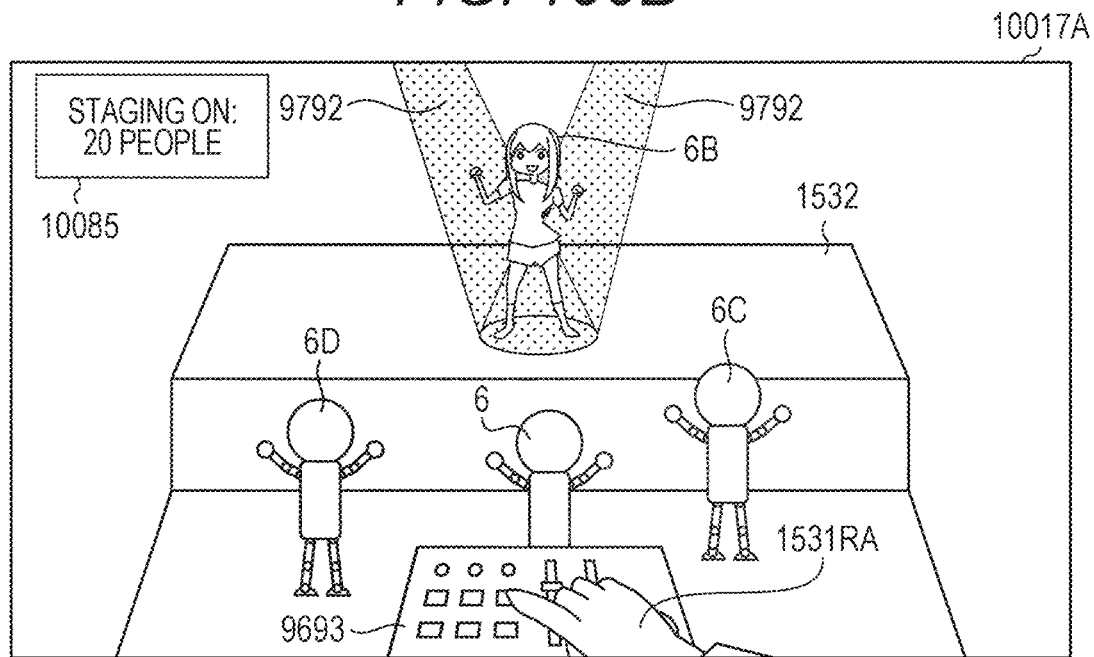

FIG. 100B A diagram of a field-of-view image according to at least one embodiment of this disclosure.

Figure 101A:
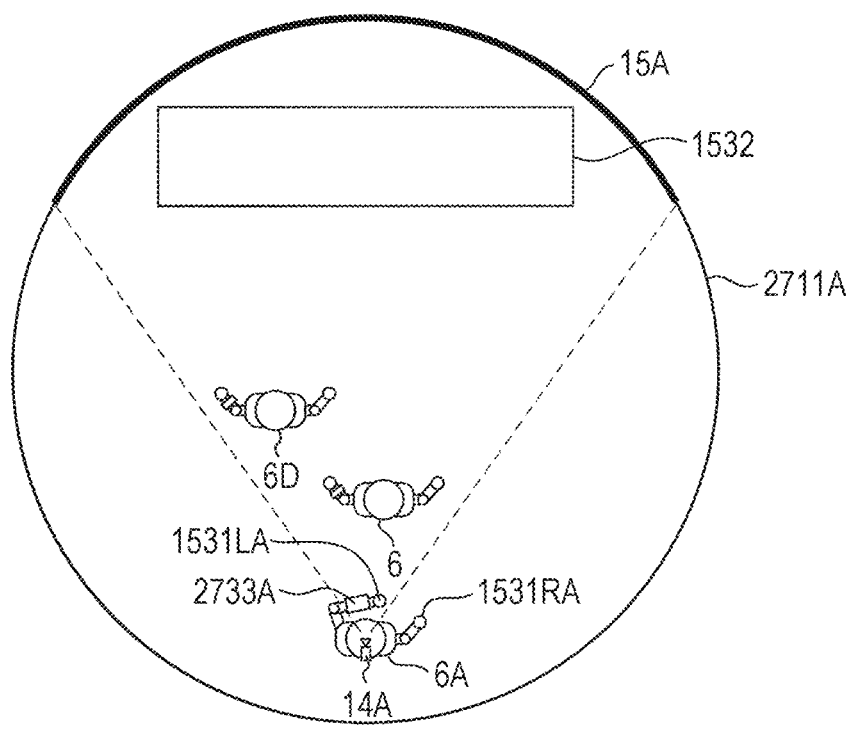

FIG. 101A A diagram of a virtual space according to at least one embodiment of this disclosure.

Figure 101B:
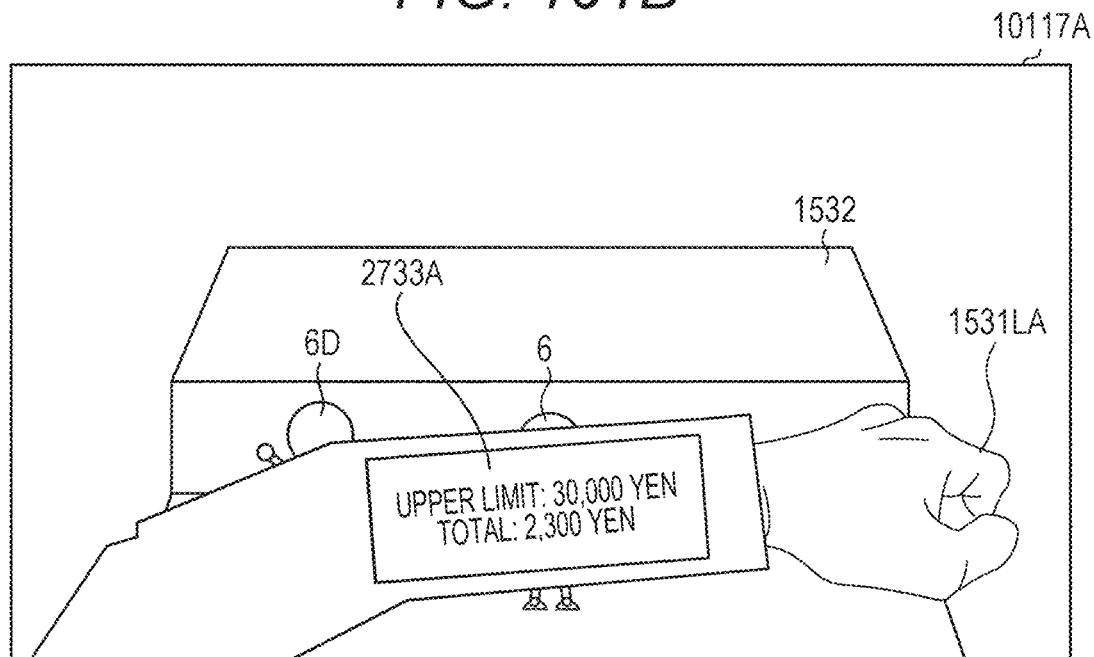

FIG. 101B A diagram of a field-of-view image according to at least one embodiment of this disclosure.

Figure 102A:
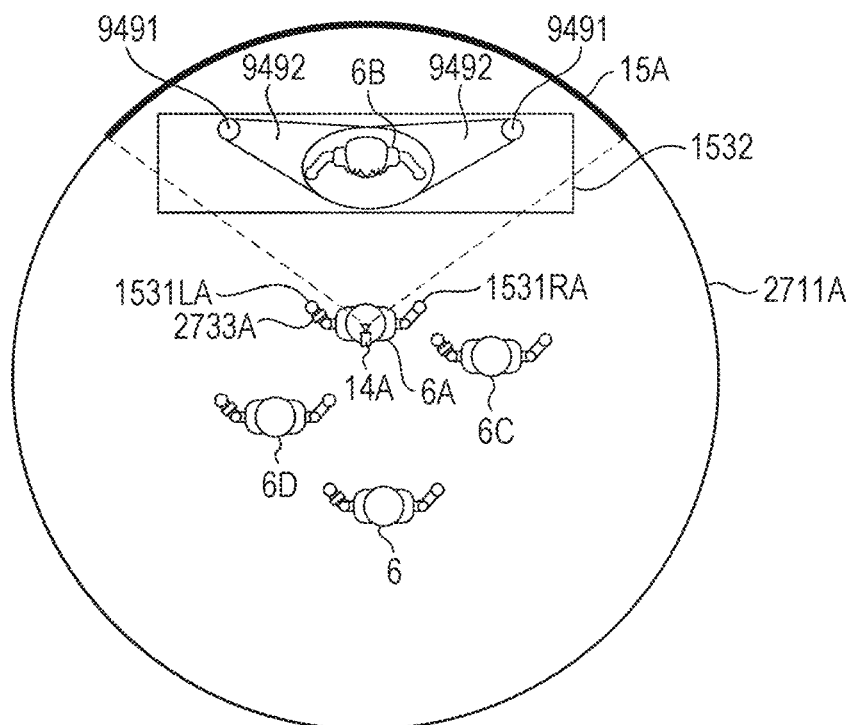

FIG. 102A A diagram of a virtual space according to at least one embodiment of this disclosure.

Figure 102B:
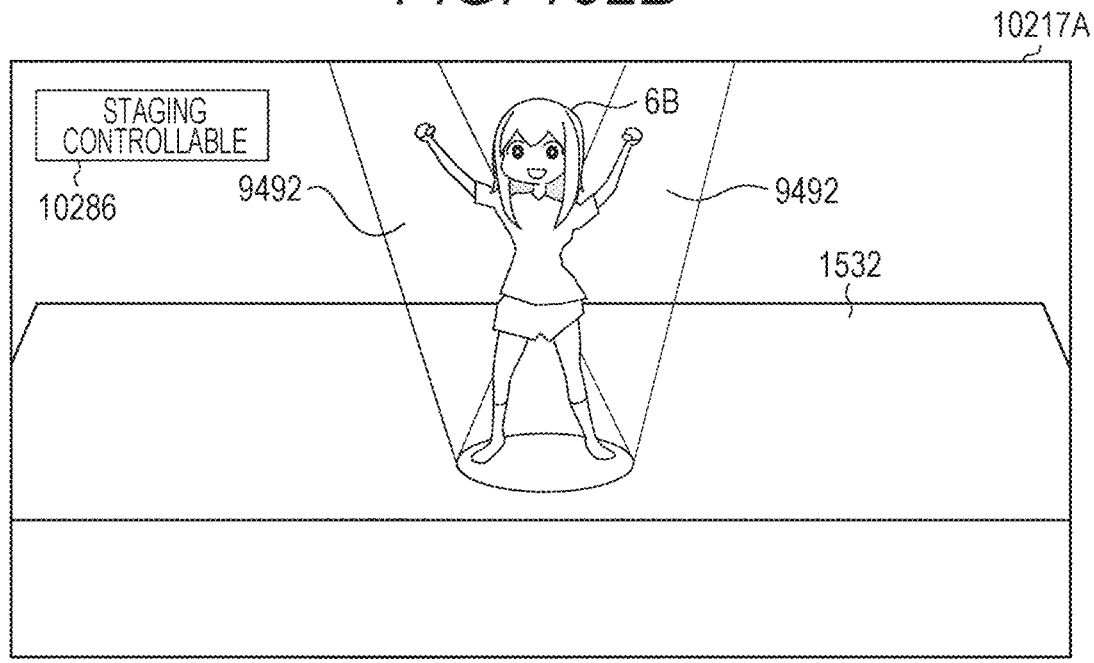

FIG. 102B A diagram of a field-of-view image according to at least one embodiment of this disclosure.

Figure 103A:
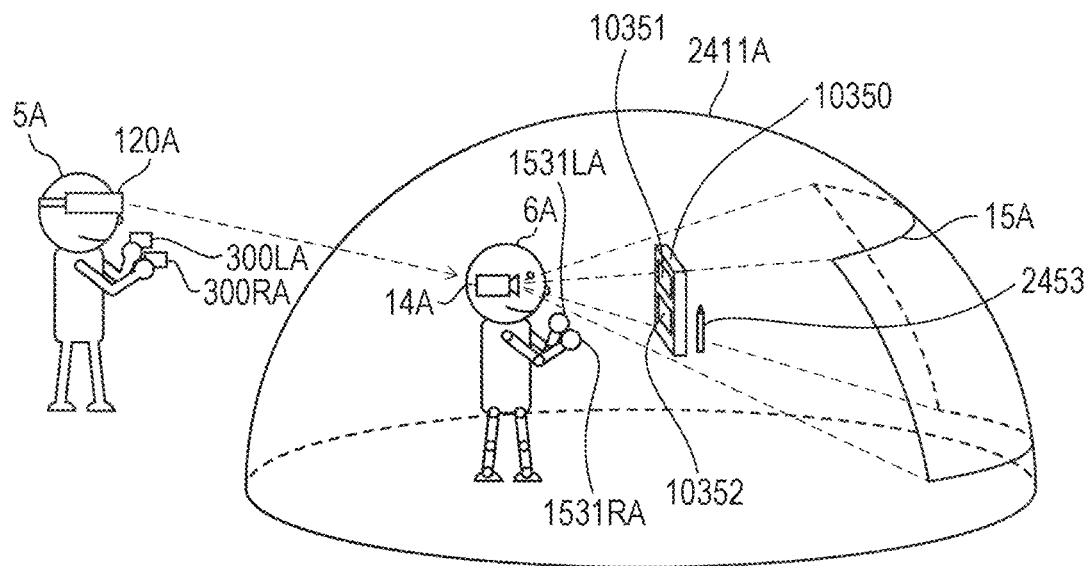

FIG. 103A A diagram of a virtual space according to at least one embodiment of this disclosure.

Figure 103B:
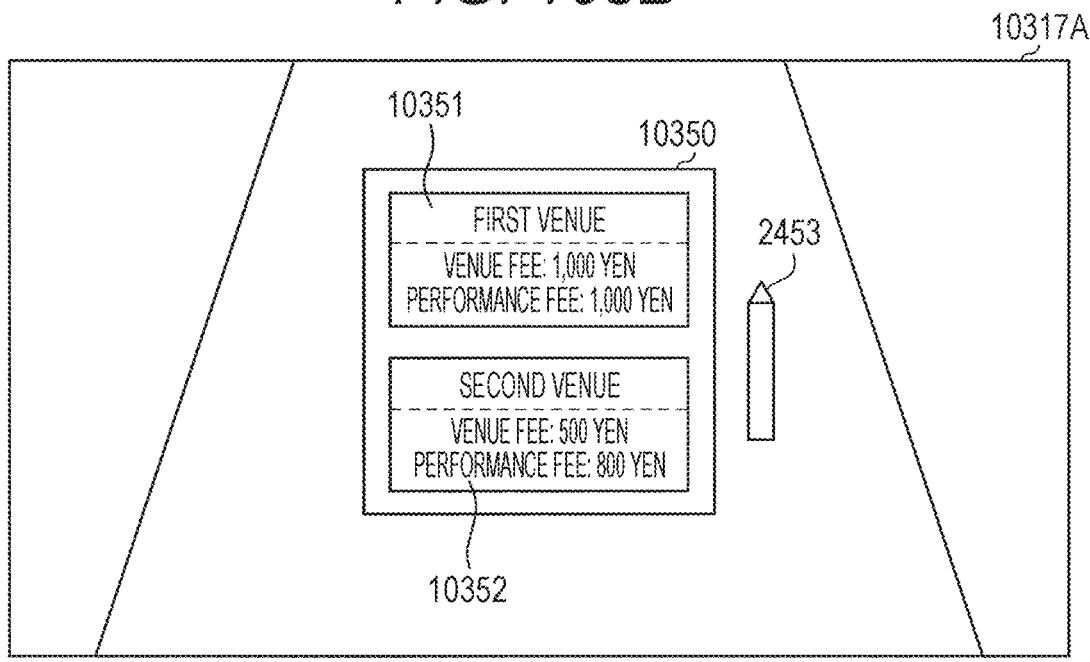

FIG. 103B A diagram of a field-of-view image according to at least one embodiment of this disclosure.

Figure 104A:
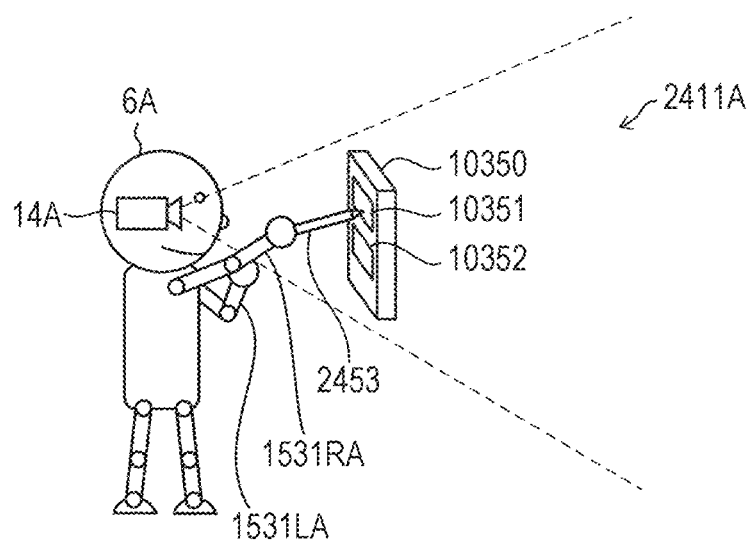

FIG. 104A A diagram of a virtual space according to at least one embodiment of this disclosure.

Figure 104B:
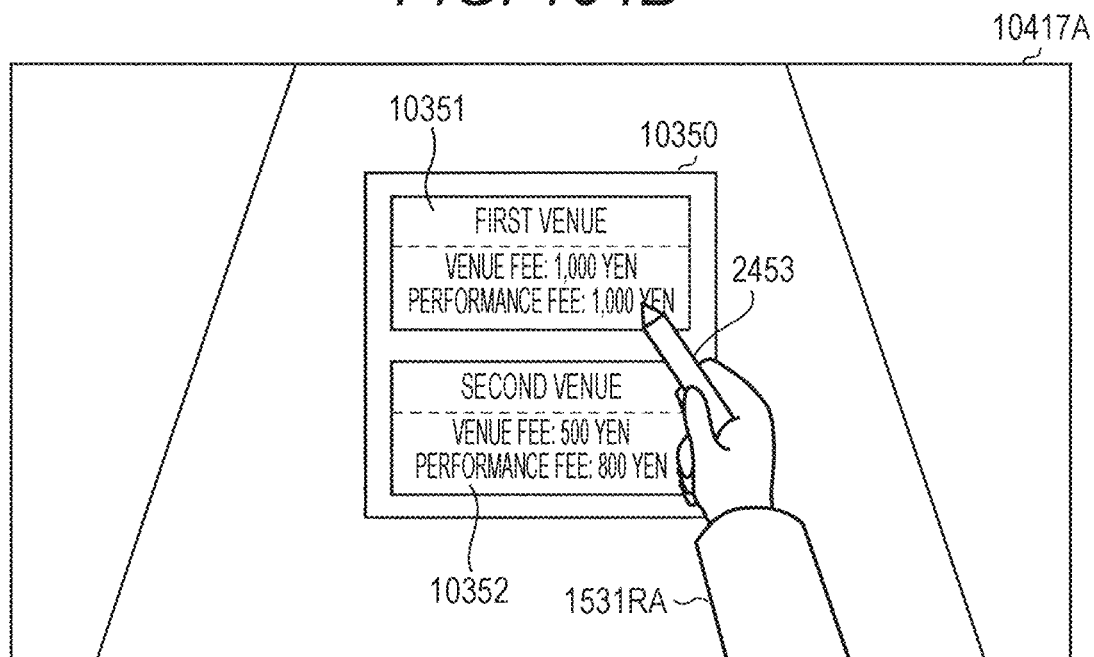

FIG. 104B A diagram of a field-of-view image according to at least one embodiment of this disclosure.

FIG. 105 A flowchart of processing to be executed by a system including an HMD set according to at least one embodiment of this disclosure.

Figure 106A:
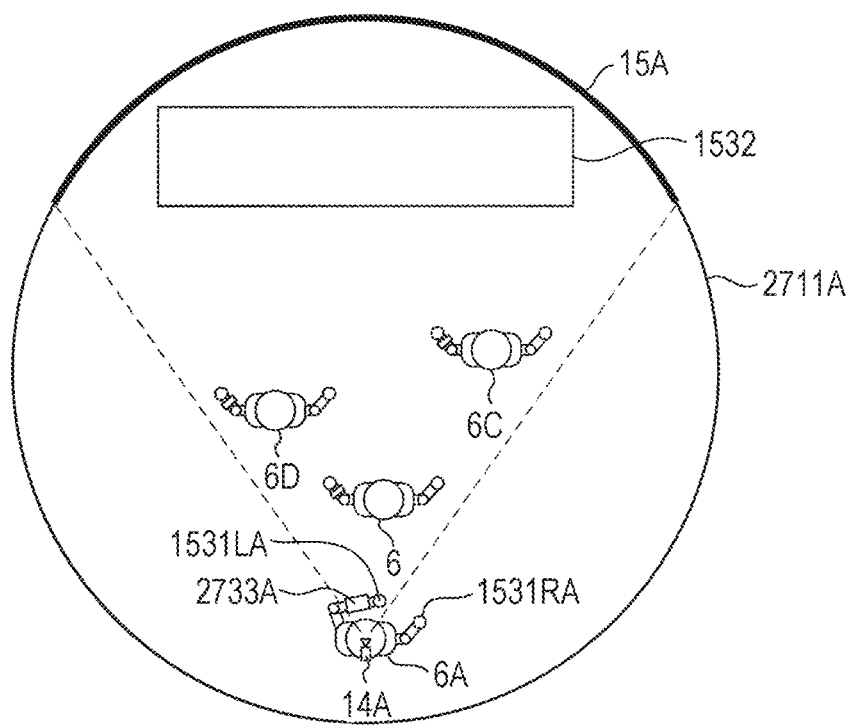

FIG. 106A A diagram of a virtual space according to at least one embodiment of this disclosure.

Figure 106B:
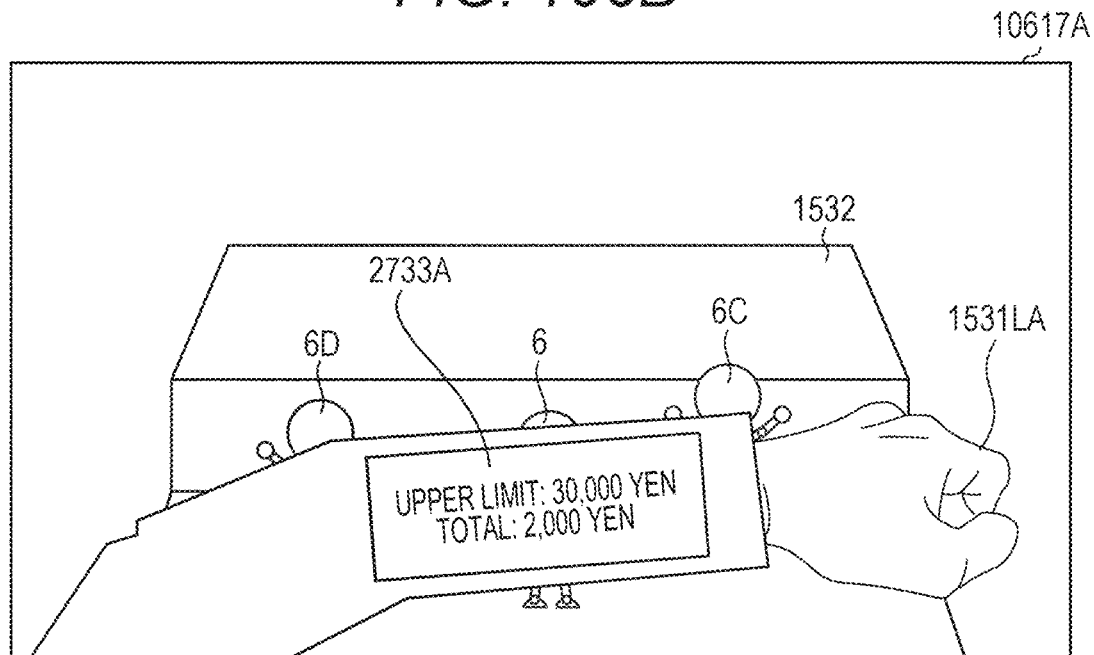

FIG. 106B A diagram of a field-of-view image according to at least one embodiment of this disclosure.

Figure 107A:
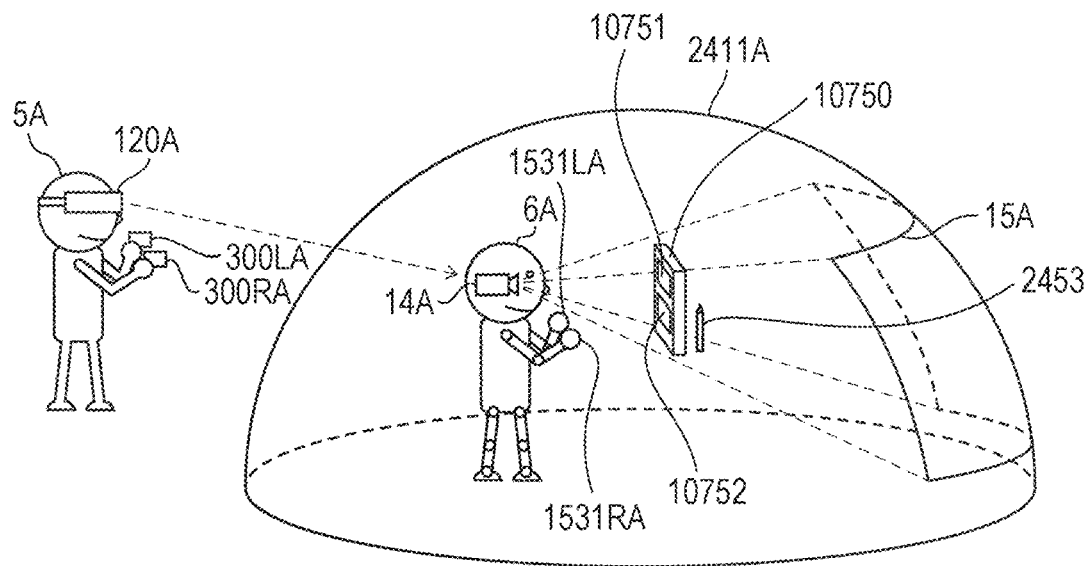

FIG. 107A A diagram of a virtual space according to at least one embodiment of this disclosure.

Figure 107B:
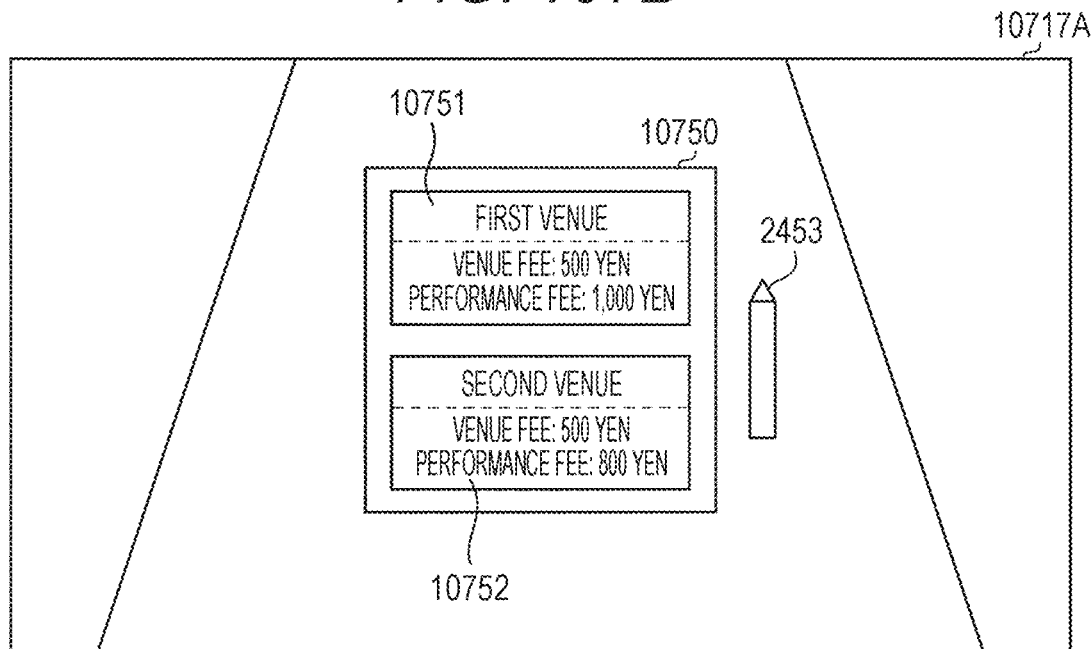

FIG. 107B A diagram of a field-of-view image according to at least one embodiment of this disclosure.

Figure 108A:
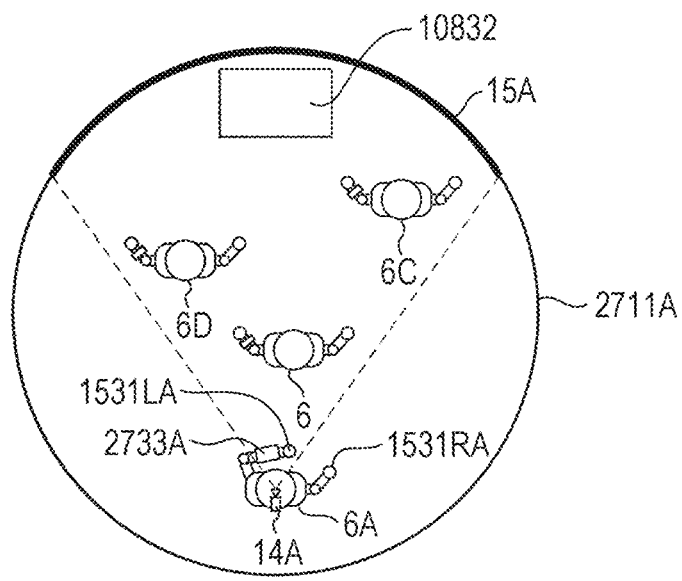

FIG. 108A A diagram of a virtual space according to at least one embodiment of this disclosure.

Figure 108B:
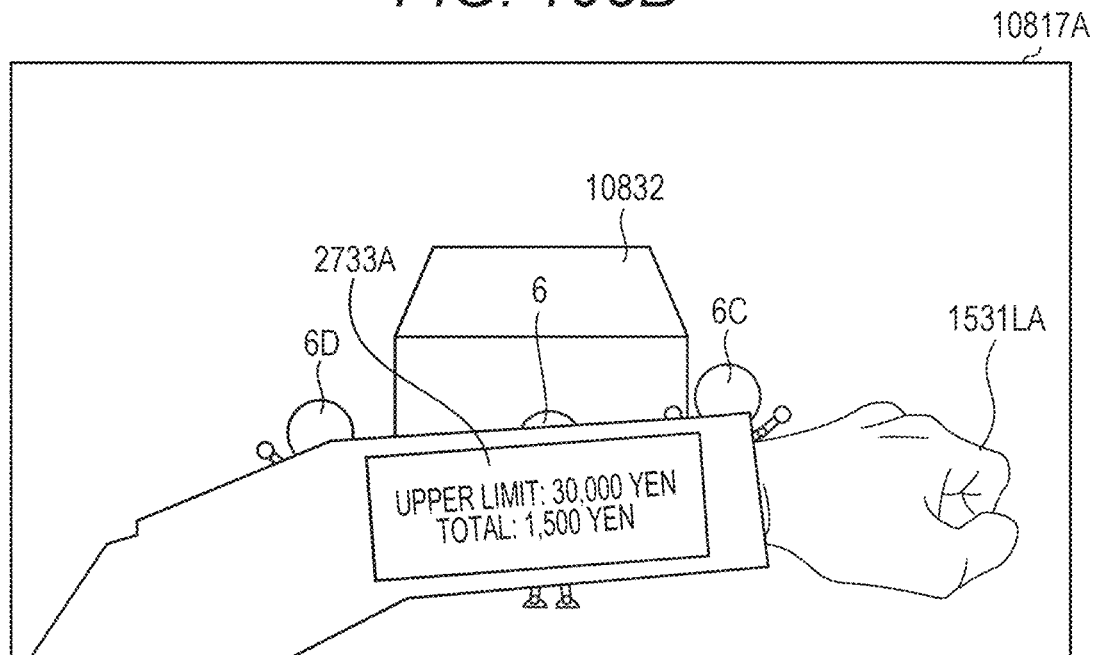

FIG. 108B A diagram of a field-of-view image according to at least one embodiment of this disclosure.

Figure 109A:
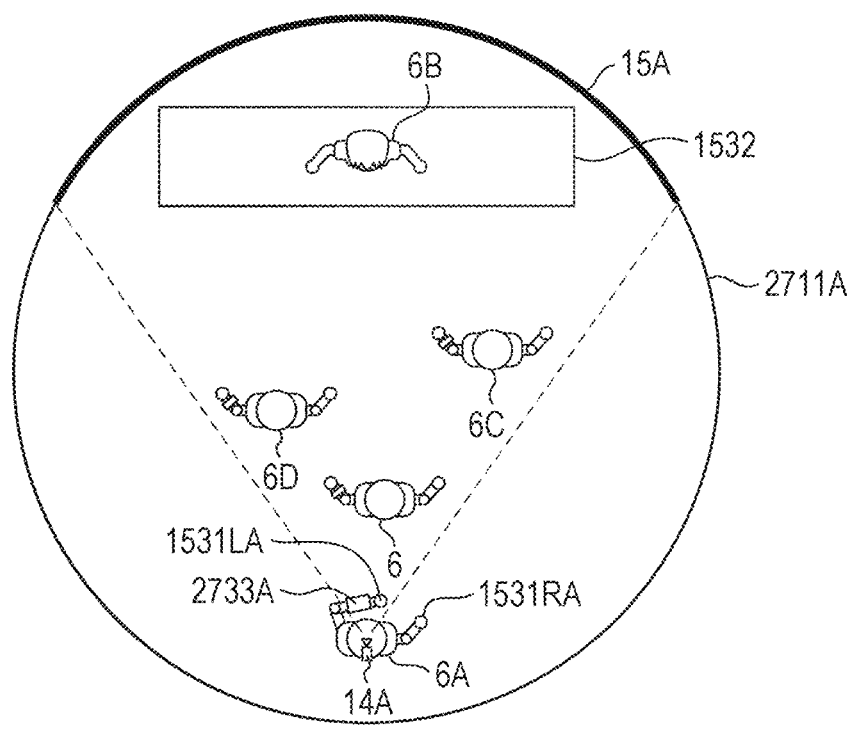

FIG. 109A A diagram of a virtual space according to at least one embodiment of this disclosure.

Figure 109B:
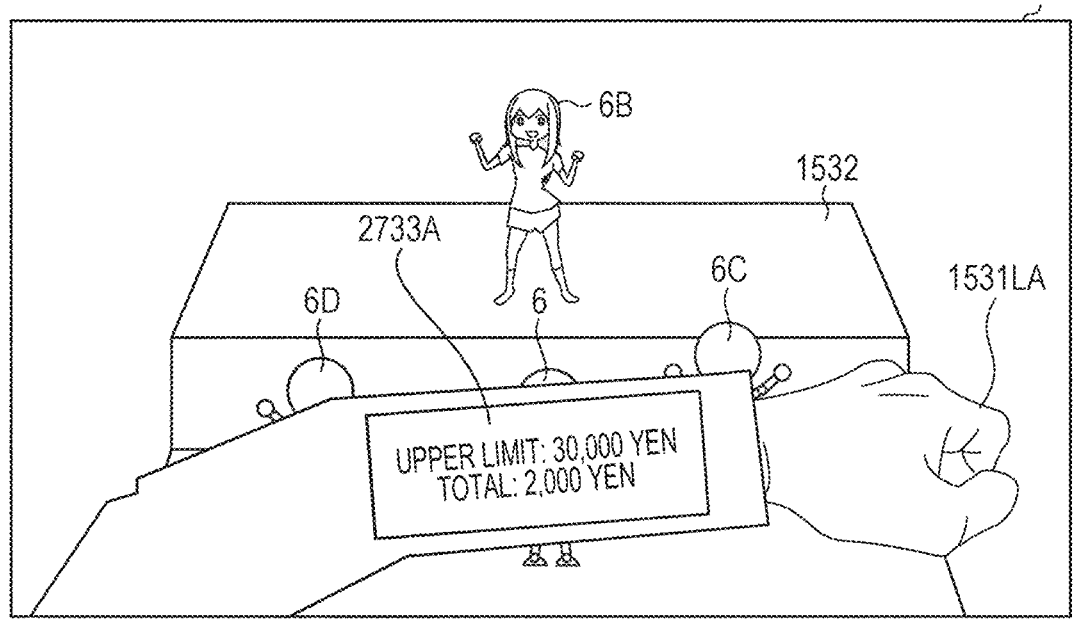

FIG. 109B A diagram of a field-of-view image according to at least one embodiment of this disclosure.

Figure 110A:
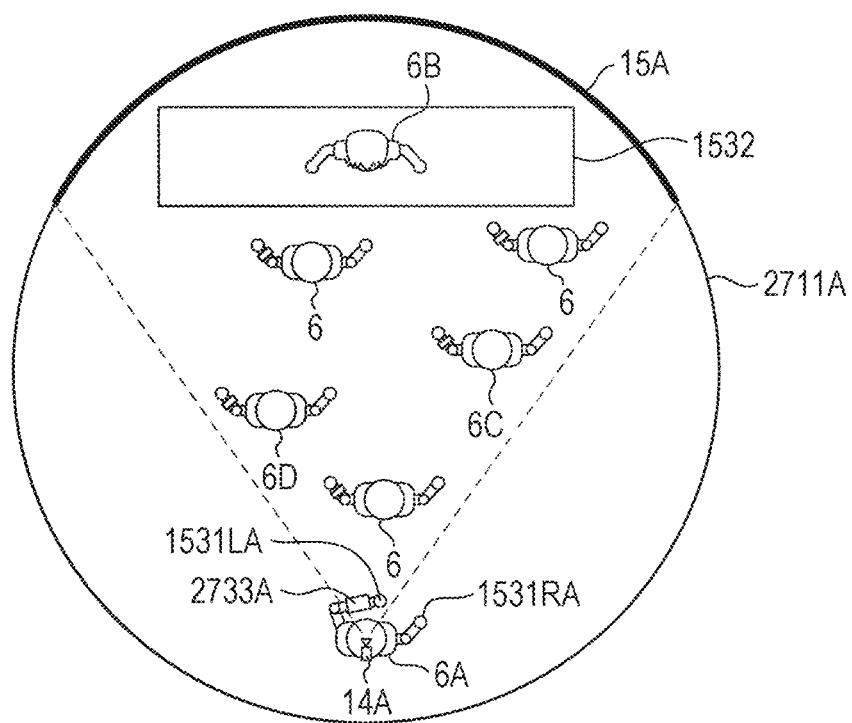

FIG. 110A A diagram of a virtual space according to at least one embodiment of this disclosure.

Figure 110B:
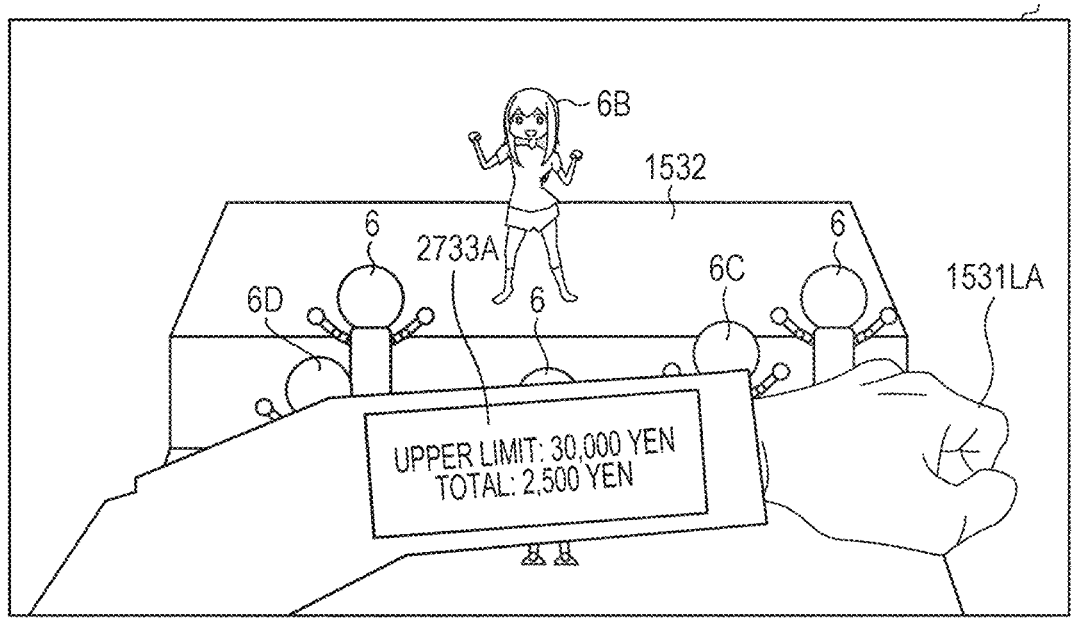

FIG. 110B A diagram of a field-of-view image according to at least one embodiment of this disclosure.

Figure 111A:
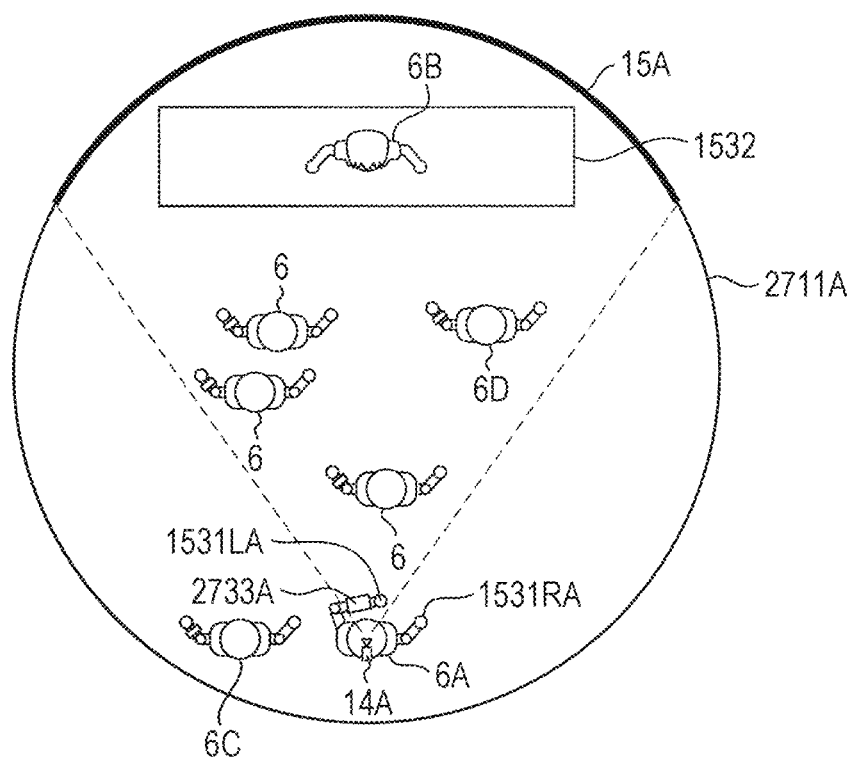

FIG. 111A A diagram of a virtual space according to at least one embodiment of this disclosure.

Figure 111B:
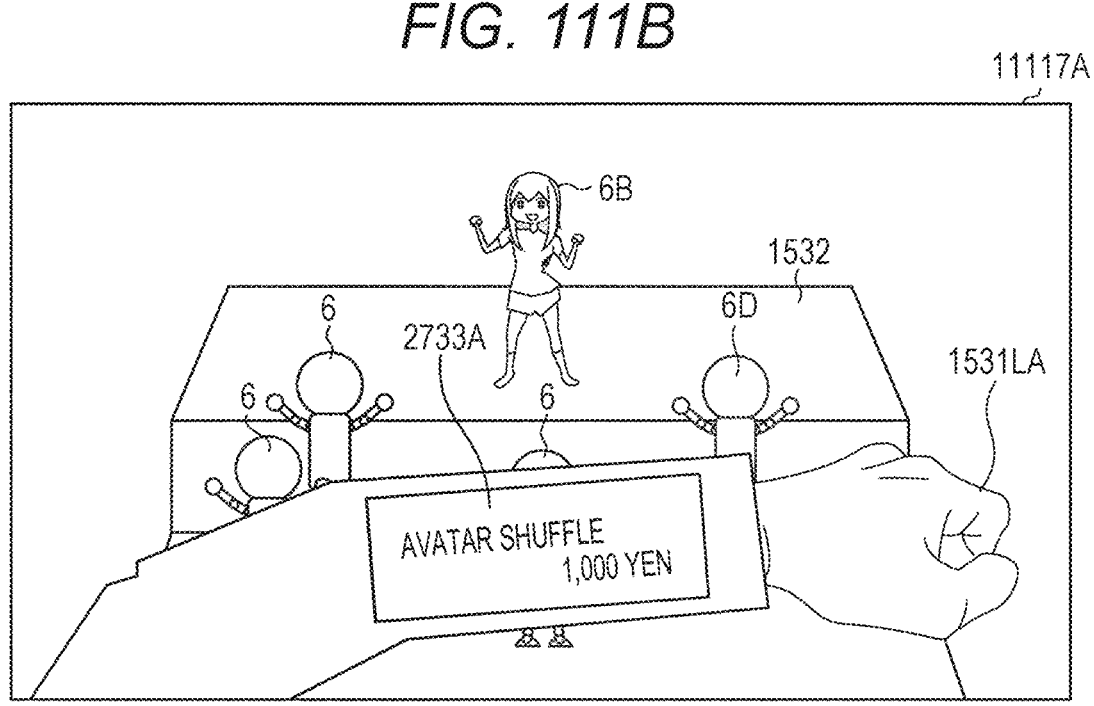

FIG. 111B A diagram of a field-of-view image according to at least one embodiment of this disclosure.

Figure 112A:
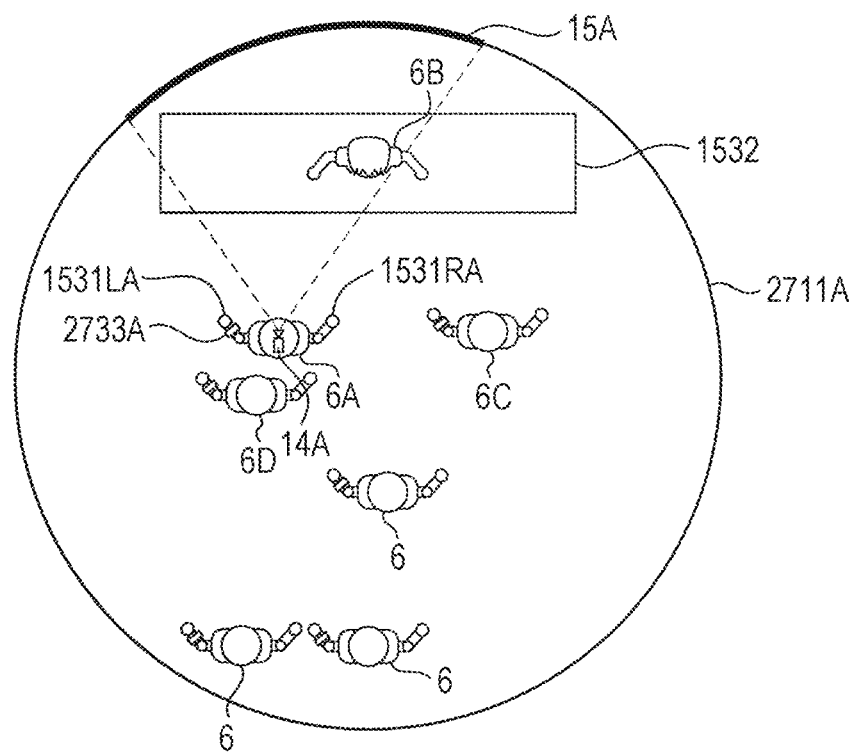

FIG. 112A A diagram of a virtual space according to at least one embodiment of this disclosure.

Figure 112B:
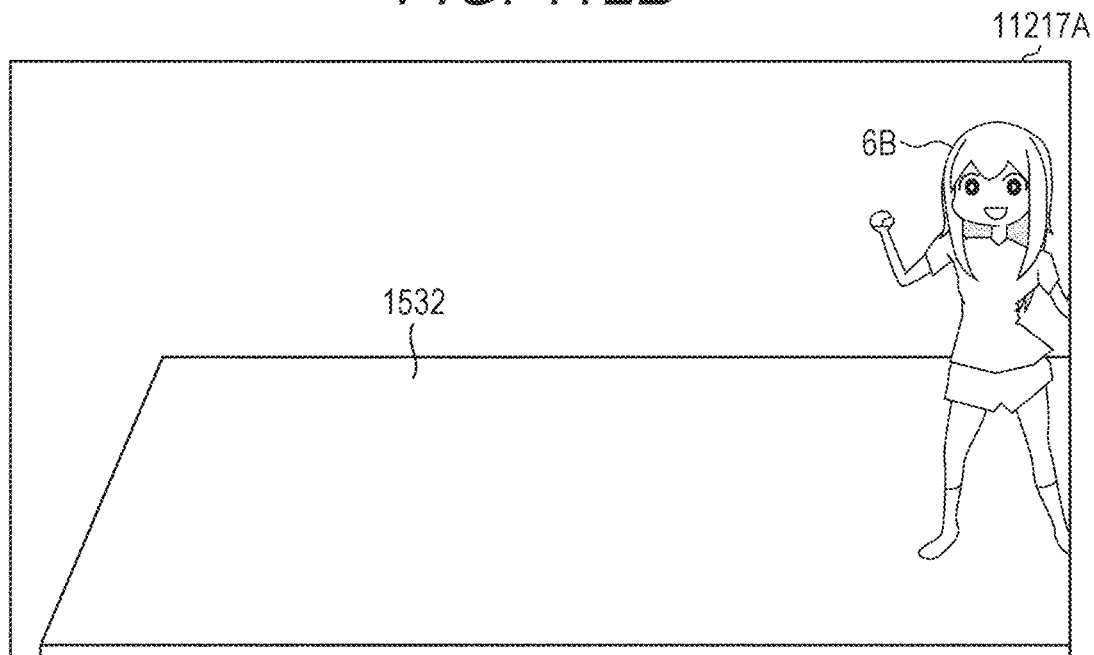

FIG. 112B A diagram of a field-of-view image according to at least one embodiment of this disclosure.

Figure 113A:
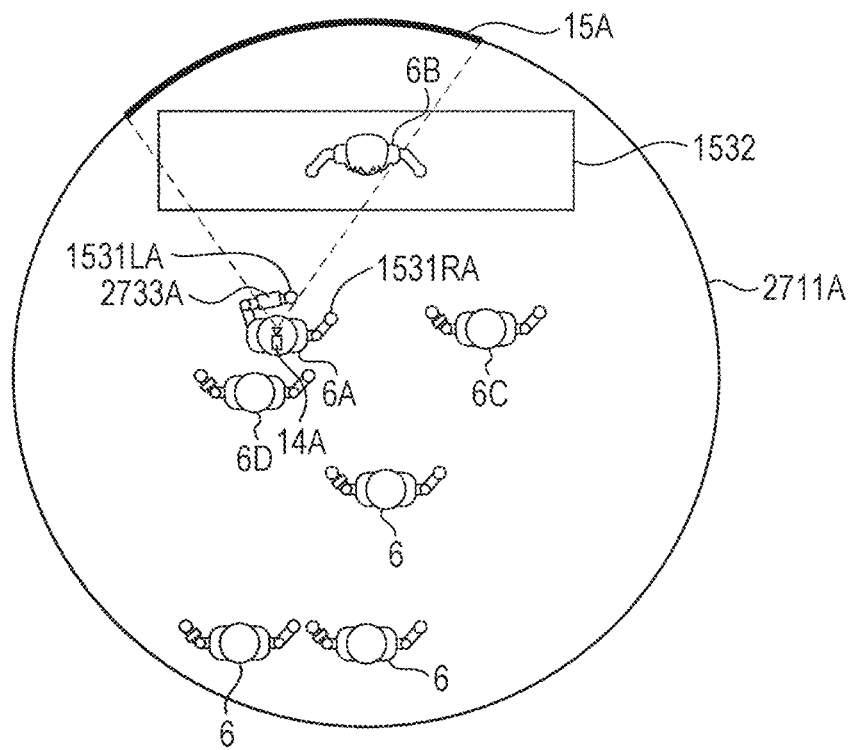

FIG. 113A A diagram of a virtual space according to at least one embodiment of this disclosure.

Figure 113B:
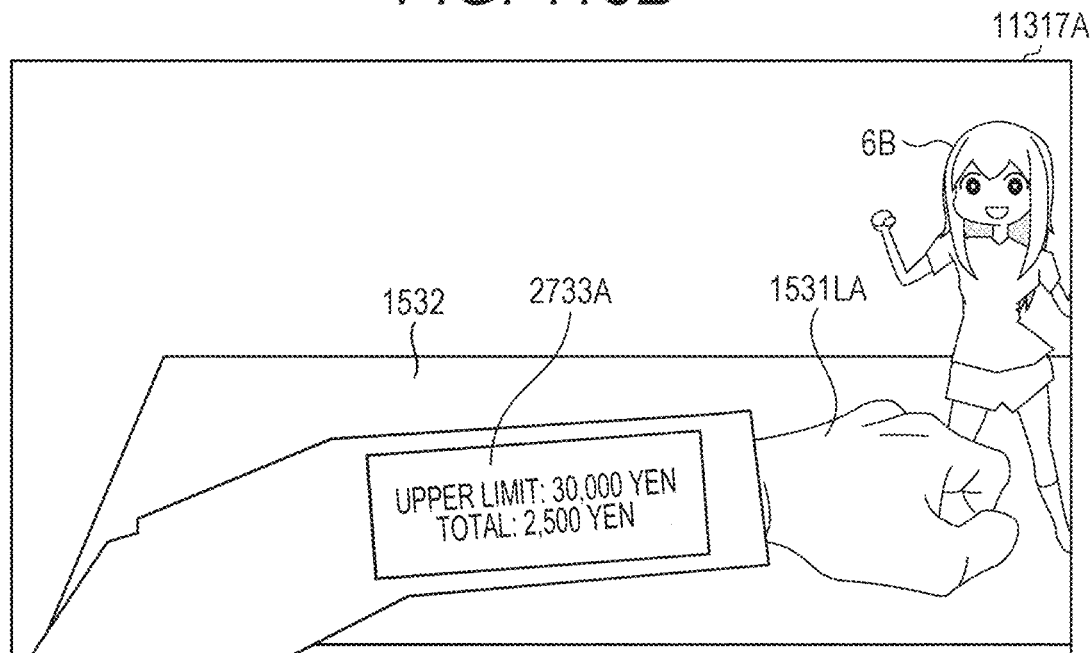

FIG. 113B A diagram of a field-of-view image according to at least one embodiment of this disclosure.

Figure 114A:
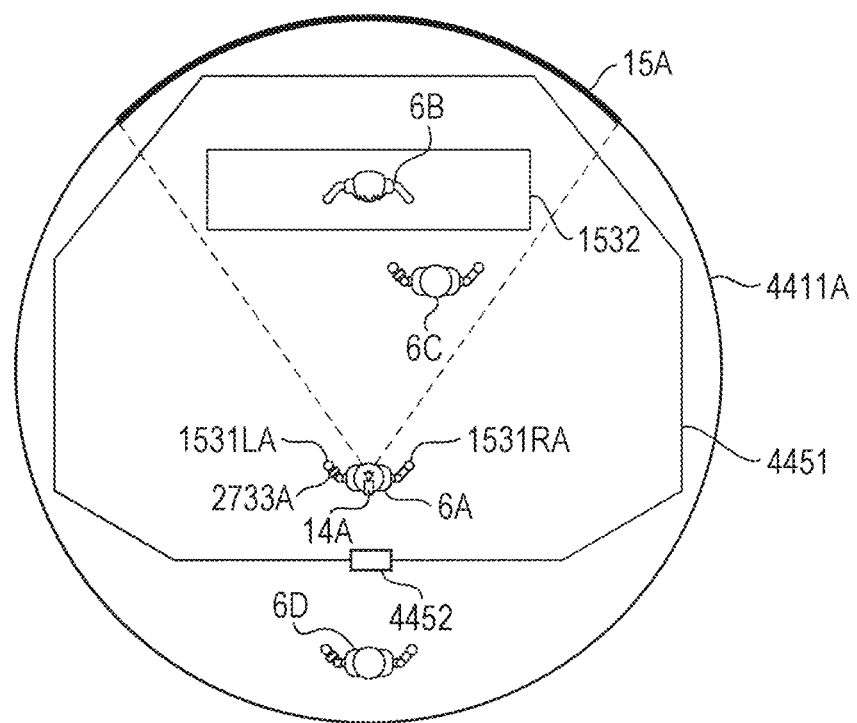

FIG. 114A A diagram of a virtual space according to at least one embodiment of this disclosure.

Figure 114B:
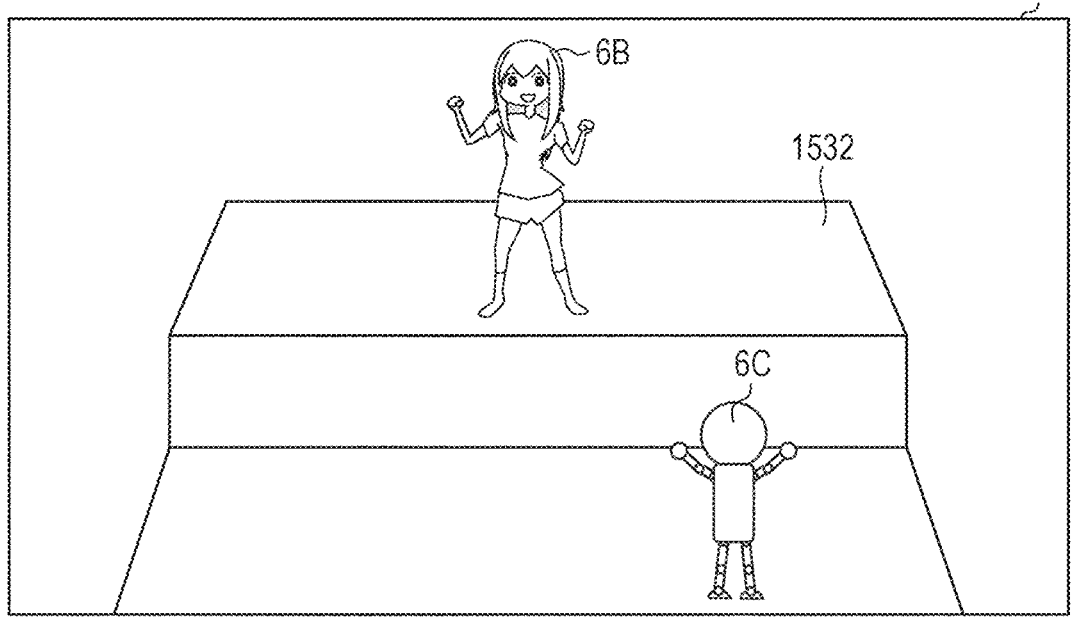

FIG. 114B A diagram of a field-of-view image according to at least one embodiment of this disclosure.

Figure 115A:
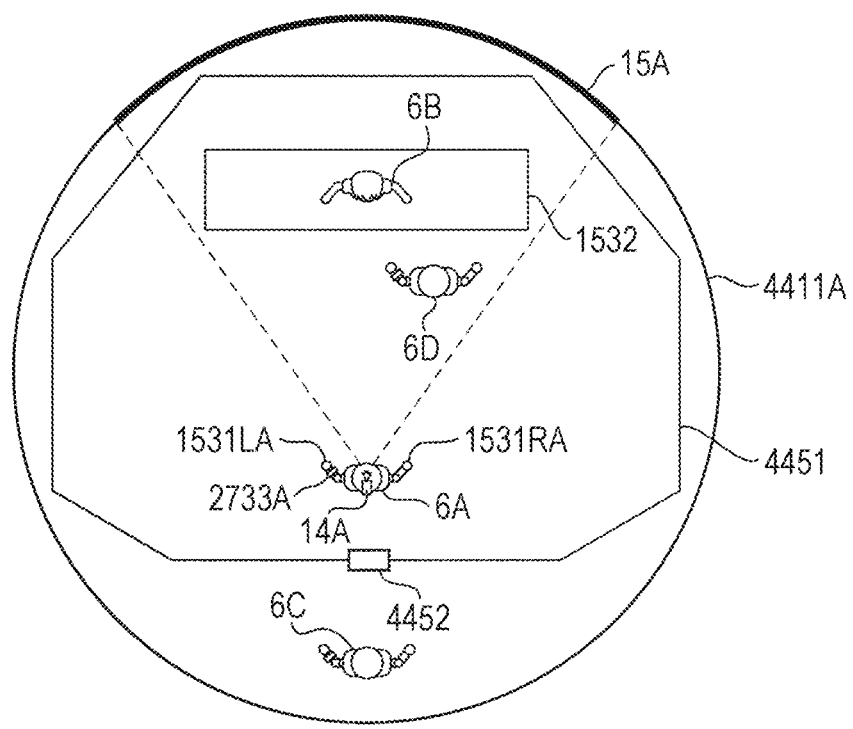

FIG. 115A A diagram of a virtual space according to at least one embodiment of this disclosure.

Figure 115B:
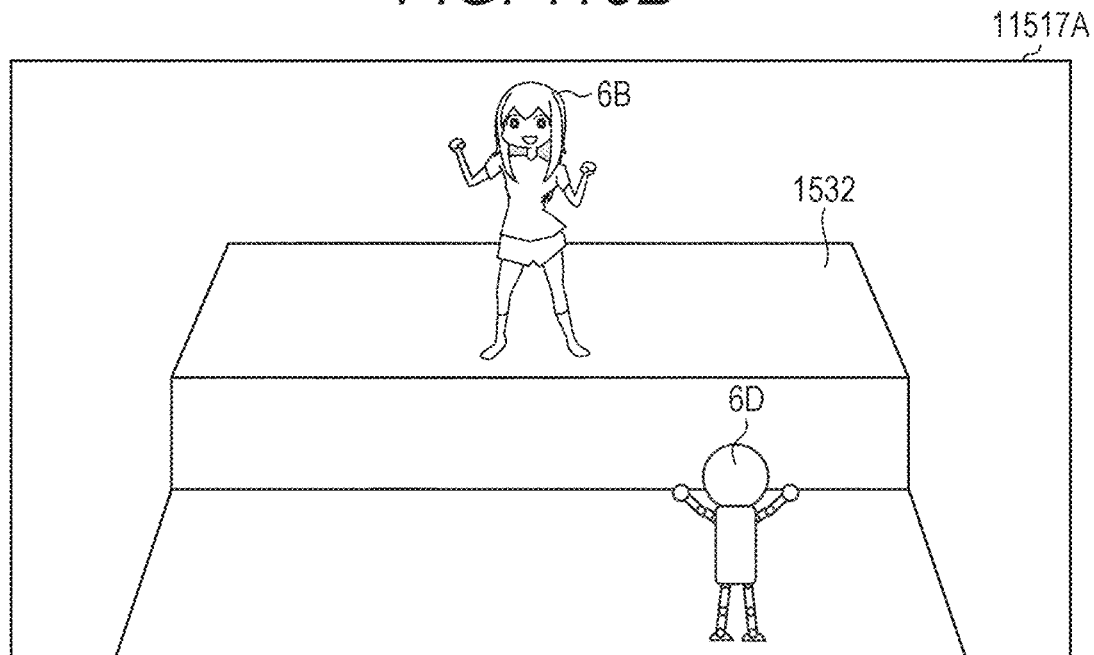

FIG. 115B A diagram of a field-of-view image according to at least one embodiment of this disclosure.

DETAILED DESCRIPTION

Embodiment 1

Now, with reference to the drawings, embodiments of this technical idea are described in detail. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as a part of the embodiments described in this disclosure.

[Configuration of HMD System]

Figure 1:
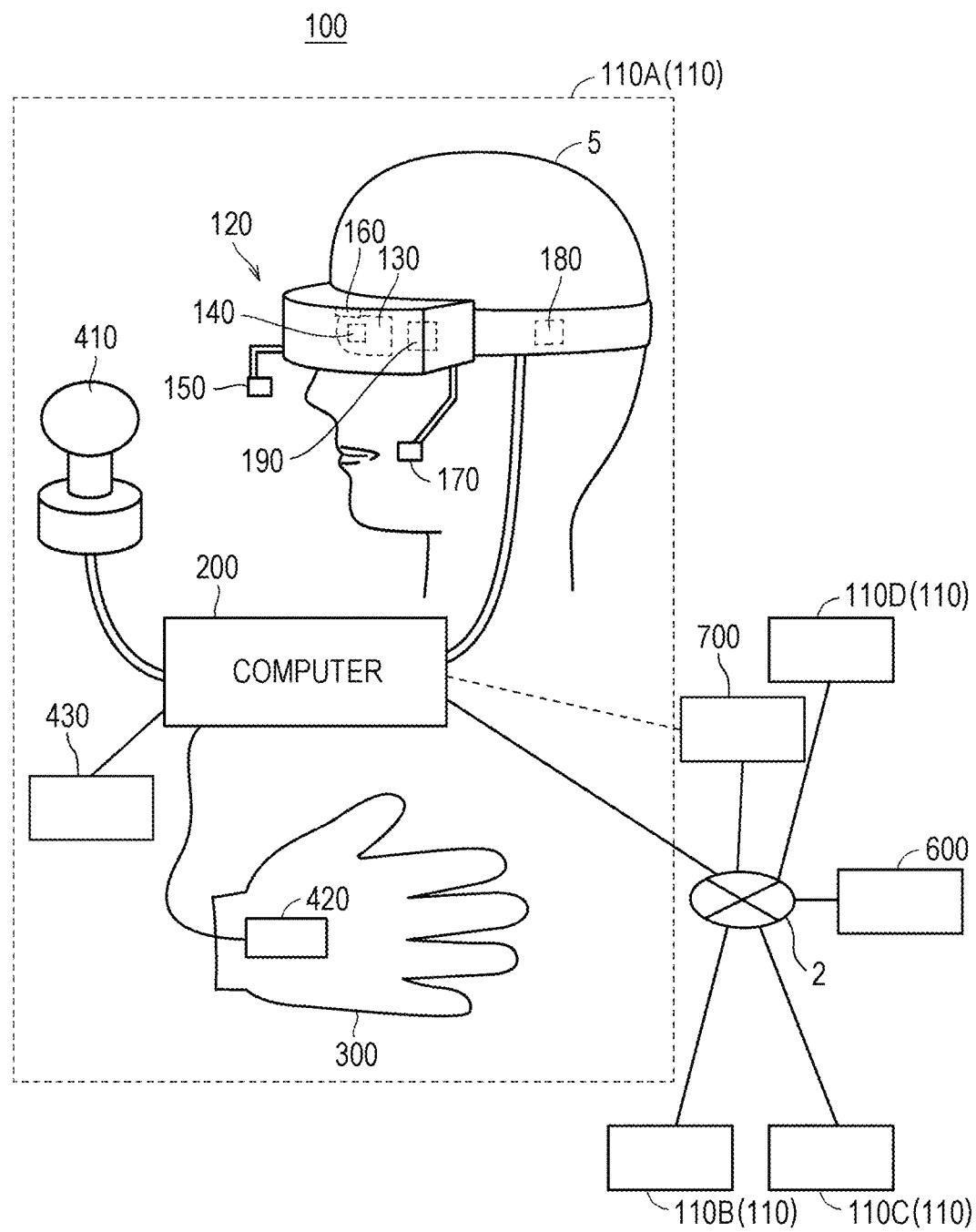
FIG. 1 A diagram of a system including a head-mounted device (HMD) according to at least one embodiment of this disclosure.

With reference to FIG. 1, a configuration of a head-mounted device (HMD) system 100 is described. FIG. 1 is a diagram of a system 100 including a head-mounted display (HMD) according to at least one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In at least one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in at least one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's the eyes. In at least one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In at least one embodiment, the transmissive monitor 130 is configured as a temporarily non-transmissive display device through adjustment of a transmittance thereof. In at least one embodiment, the monitor 130 is configured to display a real space and a part of an image constructing the virtual space simultaneously. For example, in at least one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in at least one embodiment, when the sensor 190 is an angular velocity sensor, a geomagnetic sensor, or an acceleration sensor, the HMD 120 uses any or all of those sensors instead of (or in addition to) the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In at least one embodiment, the eye gaze sensor 140 is, for example, a sensor configured to irradiate the right eye and the left eye of the user 5 with an infrared ray, and to receive reflection light from the cornea and the iris with respect to the irradiation light, to thereby detect a rotational angle of each of the user's 5 eyeballs. In at least one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120. Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one embodiment, the speaker 180 converts other signals into audio information provided to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least any one of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth (trademark) or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In at least one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer 200 via the network 2, or is a device capable of directly communicating to/from the computer 200 by near field communication or wired communication. Peripheral devices such as a smart device, a personal computer (PC), or the computer 200 are usable as the external device 700, in at least one embodiment, but the external device 700 is not limited thereto.

[Hardware Configuration of Computer]

Figure 2:
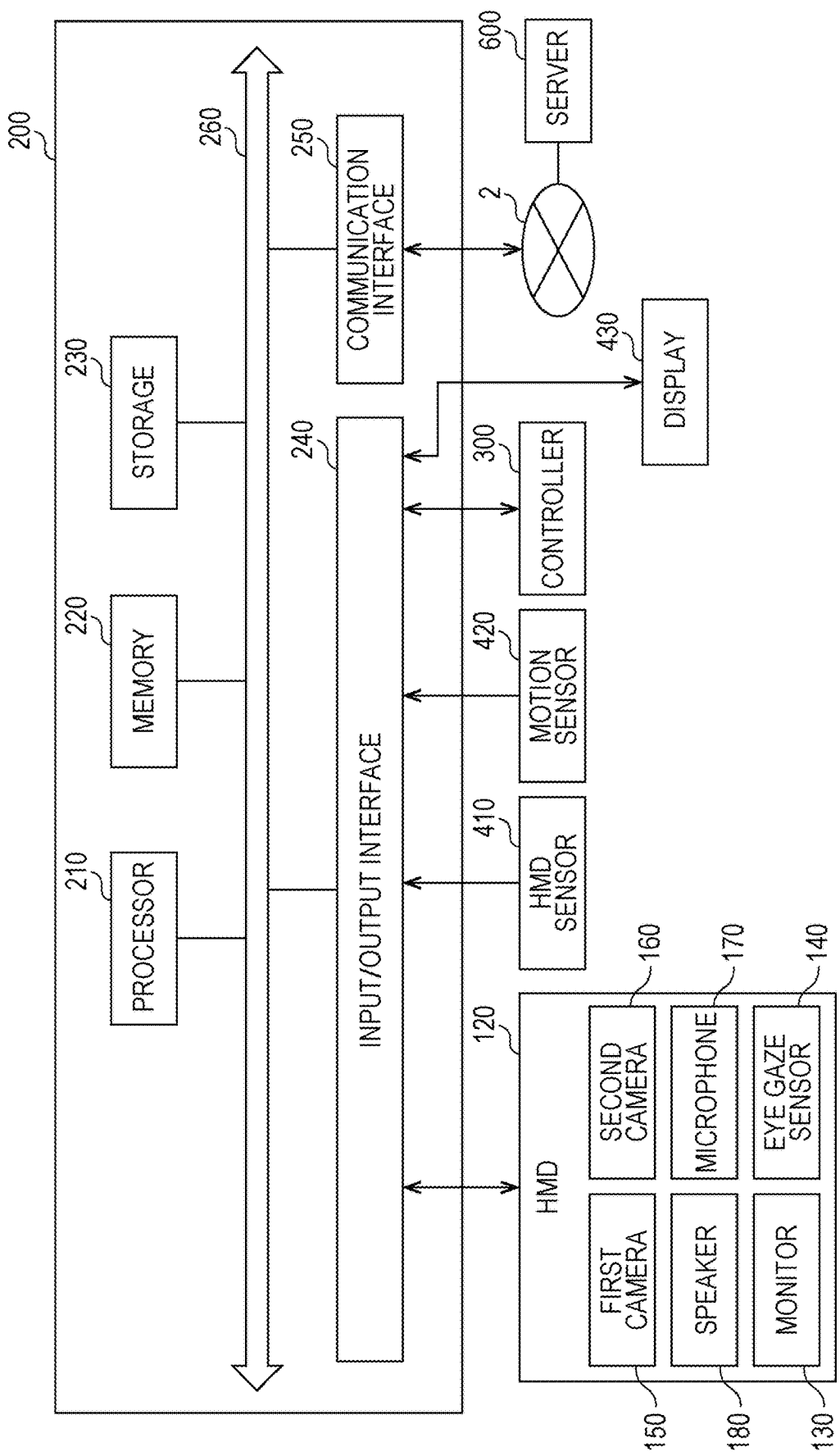
FIG. 2 A block diagram of a hardware configuration of a computer according to at least one embodiment of this disclosure.

With reference to FIG. 2, the computer 200 in at least one embodiment is described. FIG. 2 is a block diagram of a hardware configuration of the computer 200 according to at least one embodiment. The computer 200 includes, a processor 210, a memory 220, a storage 230, an input/output interface 240, and a communication interface 250. Each component is connected to a bus 260. In at least one embodiment, at least one of the processor 210, the memory 220, the storage 230, the input/output interface 240 or the communication interface 250 is part of a separate structure and communicates with other components of computer 200 through a communication path other than the bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230. The data includes data input to the computer 200 and data generated by the processor 210. In at least one aspect, the memory 220 is implemented as a random access memory (RAM) or other volatile memories.

The storage 230 permanently stores programs and data. In at least one embodiment, the storage 230 stores programs and data for a period of time longer than the memory 220, but not permanently. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes any one of vibration, sound output, and light emission in accordance with the command.

The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth®, near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In at least one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in at least one embodiment.

In at least one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to at least one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

[Uvw Visual-Field Coordinate System]

Figure 3:
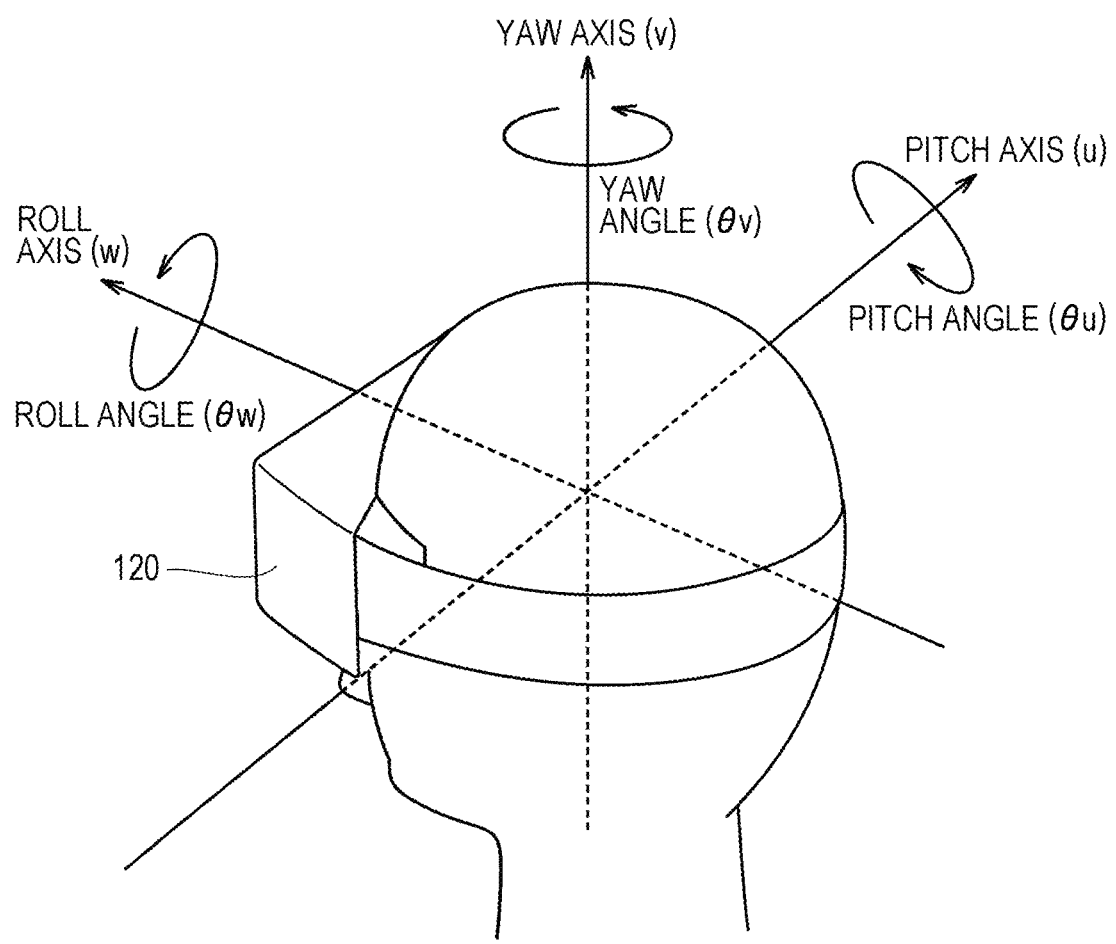
FIG. 3 A diagram of a uvw visual-field coordinate system to be set for an HMD according to at least one embodiment of this disclosure.

With reference to FIG. 3, the uvw visual-field coordinate system is described. FIG. 3 is a diagram of a uvw visual-field coordinate system to be set for the HMD 120 according to at least one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle (θu), a yaw angle (θv), and a roll angle (θw) of the HMD 120 in the uvw visual-field coordinate system. The pitch angle (θu) represents an inclination angle of the HMD 120 about the pitch axis in the uvw visual-field coordinate system. The yaw angle (θv) represents an inclination angle of the HMD 120 about the yaw axis in the uvw visual-field coordinate system. The roll angle (θw) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

[Virtual Space]

Figure 4:
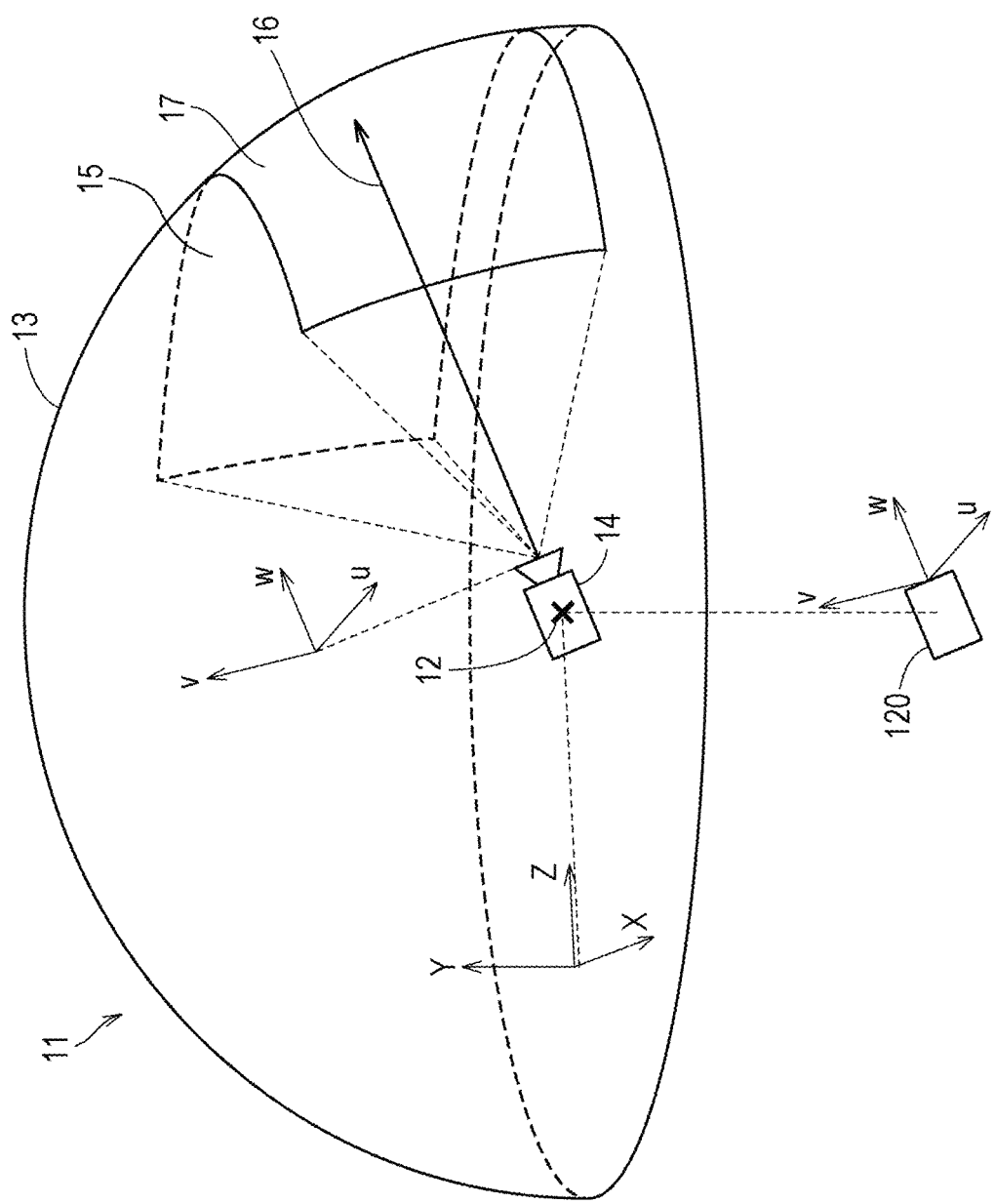
FIG. 4 A diagram of a mode of expressing a virtual space according to at least one embodiment of this disclosure.

With reference to FIG. 4, the virtual space is further described. FIG. 4 is a diagram of a mode of expressing a virtual space 11 according to at least one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to the y axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one embodiment, the virtual camera 14 is offset from the center 12 in the initial state. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

[User's Line of Sight]

Figure 5:
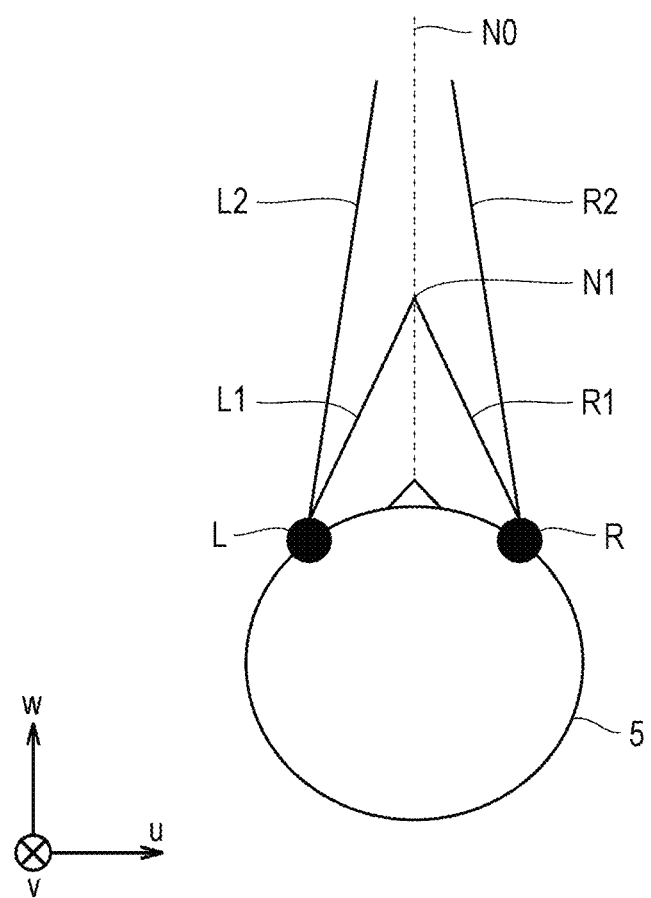
FIG. 5 A diagram of a plan view of a head of a user wearing the HMD according to at least one embodiment of this disclosure.

With reference to FIG. 5, determination of the line of sight of the user 5 is described. FIG. 5 is a plan view diagram of the head of the user 5 wearing the HMD 120 according to at least one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight N0 corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

[Field-of-View Region]

Figure 6:
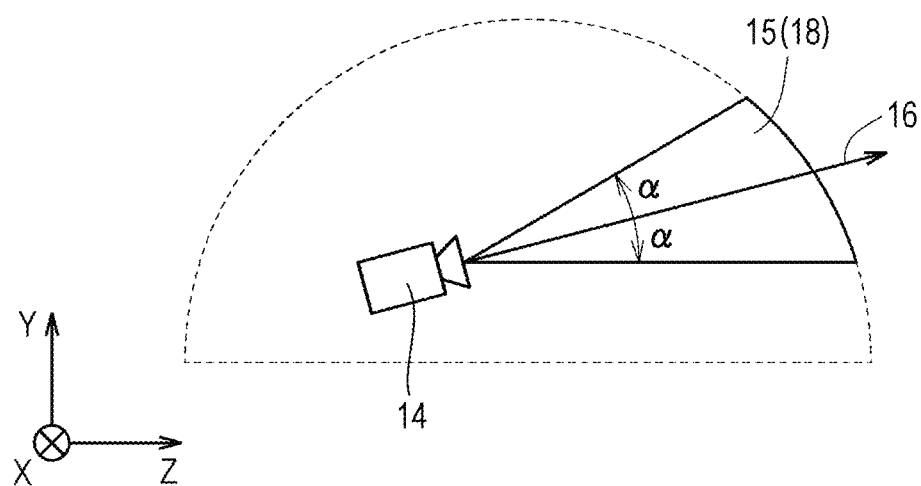
FIG. 6 A diagram of a YZ cross section obtained by viewing a field-of-view region from an X direction in the virtual space according to at least one embodiment of this disclosure.
Figure 7:
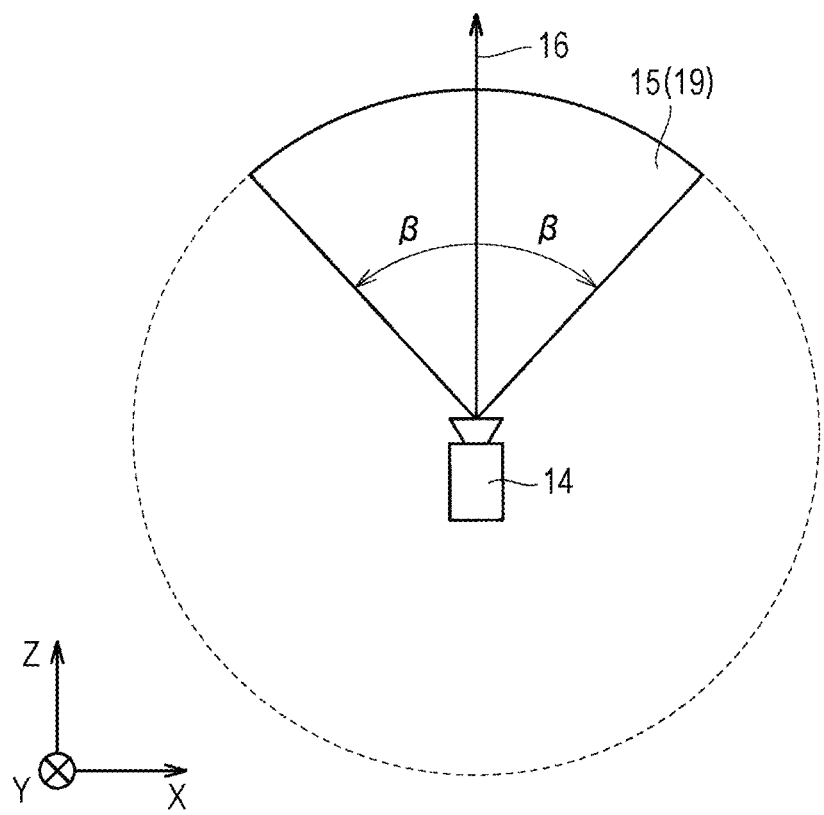
FIG. 7 A diagram of an XZ cross section obtained by viewing the field-of-view region from a Y direction in the virtual space according to at least one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle α from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth 13 from the reference line of sight 16 serving as the center in the virtual space 11 as the region 19. The polar angle α and β are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to a part of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In at least one embodiment, the virtual camera 14 is assumed to include two virtual cameras, and the roll axes of the two virtual cameras are synthesized so that the generated roll axis (w) is adapted to the roll axis (w) of the HMD 120.

[Controller]

Figure 8A:
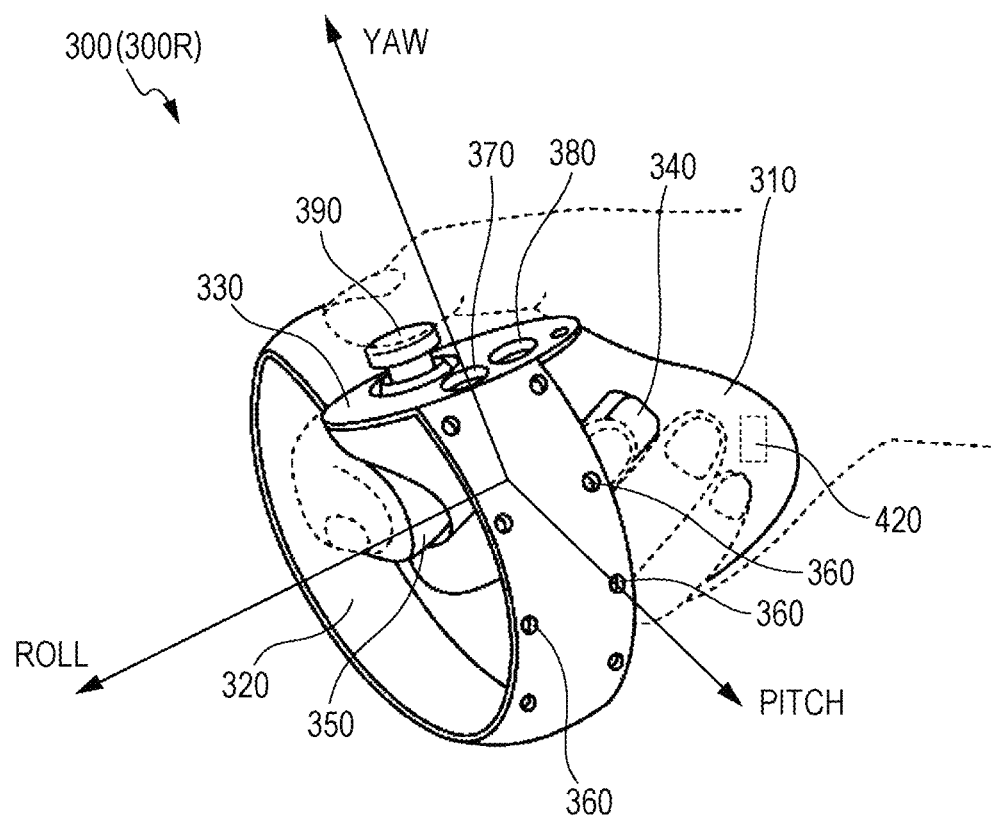
FIG. 8A A diagram of a schematic configuration of a controller according to at least one embodiment of this disclosure.
Figure 8B:
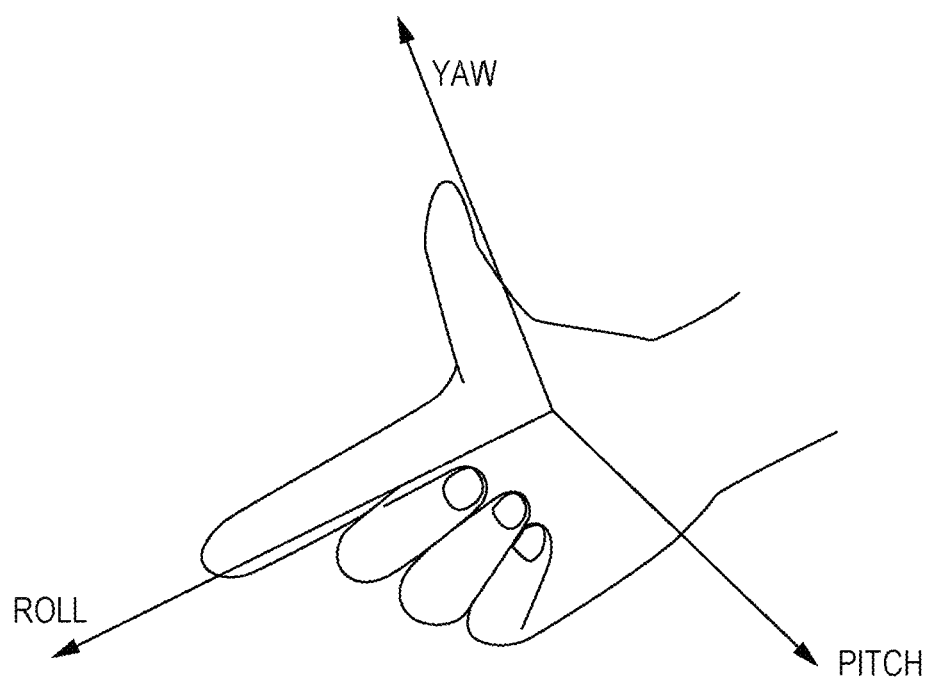
FIG. 8B A diagram of a coordinate system to be set for a hand of a user holding the controller according to at least one embodiment of this disclosure.

An example of the controller 300 is described with reference to FIG. 8A and FIG. 8B. FIG. 8A is a diagram of a schematic configuration of a controller according to at least one embodiment of this disclosure. FIG. 8B is a diagram of a coordinate system to be set for a hand of a user holding the controller according to at least one embodiment of this disclosure.

In at least one aspect, the controller 300 includes a right controller 300R and a left controller (not shown). In FIG. 8A only right controller 300R is shown for the sake of clarity. The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor 420 is built into the casing of the grip 310. When a motion of the user 5 can be detected from the surroundings of the user 5 by a camera or other device. In at least one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 300R and the left controller. In FIG. 8A, the infrared LEDs 360 are shown as being arranged in two rows, but the number of arrangement rows is not limited to that illustrated in FIG. 8. In at least one embodiment, the infrared LEDs 360 are arranged in one row or in three or more rows. In at least one embodiment, the infrared LEDs 360 are arranged in a pattern other than rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In at least one embodiment, the right controller 300R and the left controller do not include a battery.

In FIG. 8A and FIG. 8B, for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane is defined as the pitch direction.

[Hardware Configuration of Server]

With reference to FIG. 9, the server 600 in at least one embodiment is described. FIG. 9 is a block diagram of a hardware configuration of the server 600 according to at least one embodiment of this disclosure. The server 600 includes a processor 610, a memory 620, a storage 630, an input/output interface 640, and a communication interface 650. Each component is connected to a bus 660. In at least one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. In at least one embodiment, the storage 630 stores programs and data for a period of time longer than the memory 620, but not permanently. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces. The communication interface 650 is not limited to the specific examples described above.

In at least one aspect, the processor 610 accesses the storage 630 and loads one or more programs stored in the storage 630 to the memory 620 to execute a series of commands included in the program. In at least one embodiment, the one or more programs include, for example, an operating system of the server 600, an application program for providing a virtual space, and game software that can be executed in the virtual space. In at least one embodiment, the processor 610 transmits a signal for providing a virtual space to the HMD device 110 to the computer 200 via the input/output interface 640.

[Control Device of HMD]

Figure 10:
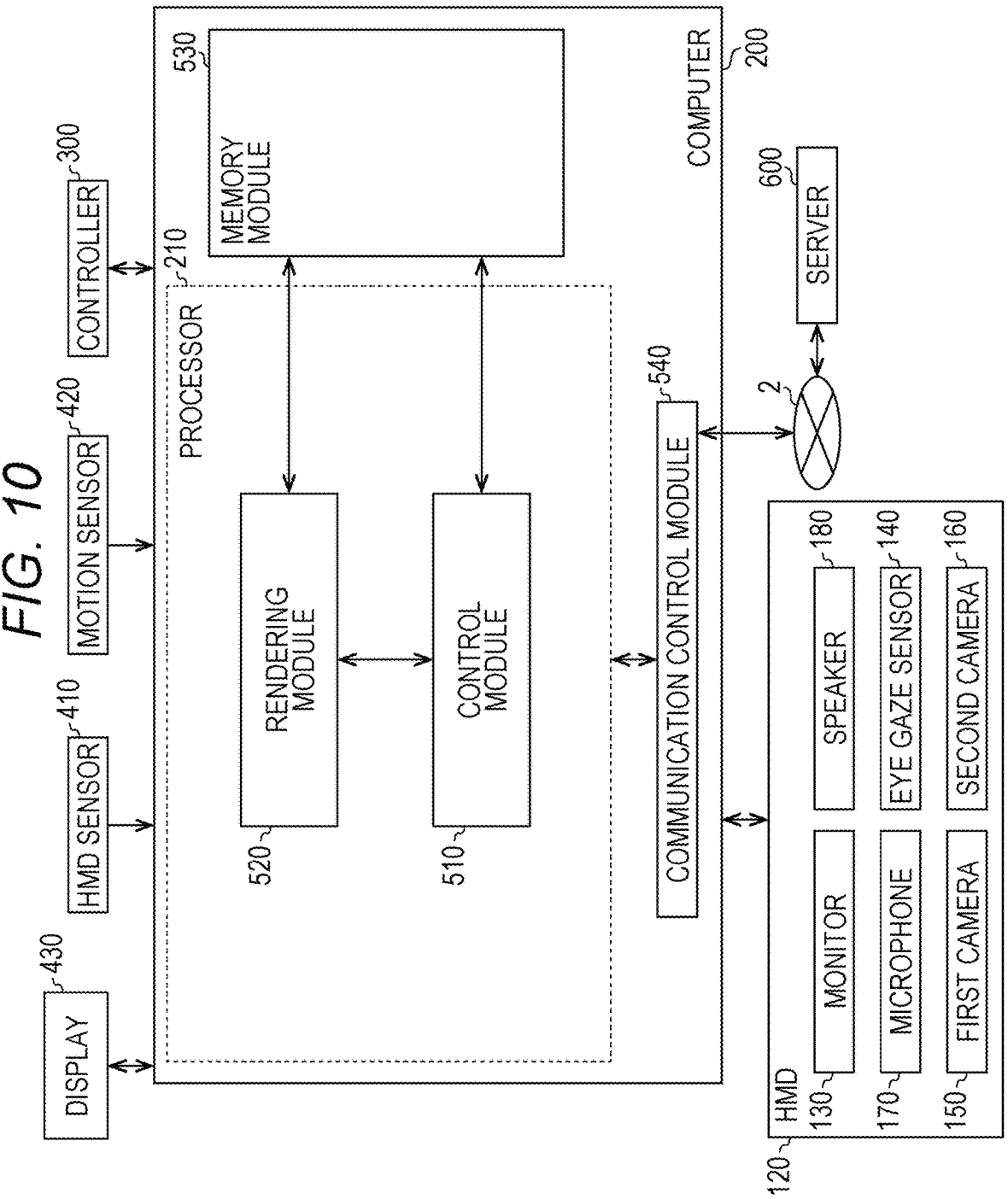
FIG. 10 A block diagram of a computer according to at least one embodiment of this disclosure.

With reference to FIG. 10, the control device of the HMD 120 is described. According to at least one embodiment of this disclosure, the control device is implemented by the computer 200 having a known configuration. FIG. 10 is a block diagram of the computer 200 according to at least one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In at least one embodiment, the control module 510 generates virtual space data. In at least one embodiment, the control module 510 acquires virtual space data from, for example, the server 600.

The control module 510 arranges objects in the virtual space 11 using object data representing objects. The object data is stored in, for example, the memory module 530. In at least one embodiment, the control module 510 generates virtual space data. In at least one embodiment, the control module 510 acquires virtual space data from, for example, the server 600. In at least one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In at least one embodiment, the panorama image 13 contains a still image and/or a moving image. In at least one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In at least one embodiment, the communication control module 540 communicates to/from the server 600 or other information communication devices via the network 2.

In at least one aspect, the control module 510 and the rendering module 520 are implemented with use of, for example, Unity® provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In at least one embodiment, the software is stored in advance on a hard disk or other memory module 530. In at least one embodiment, the software is stored on a CD-ROM or other computer-readable non-volatile data recording media, and distributed as a program product. In at least one embodiment, the software may be provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

[Control Structure of HMD System]

Figure 11:
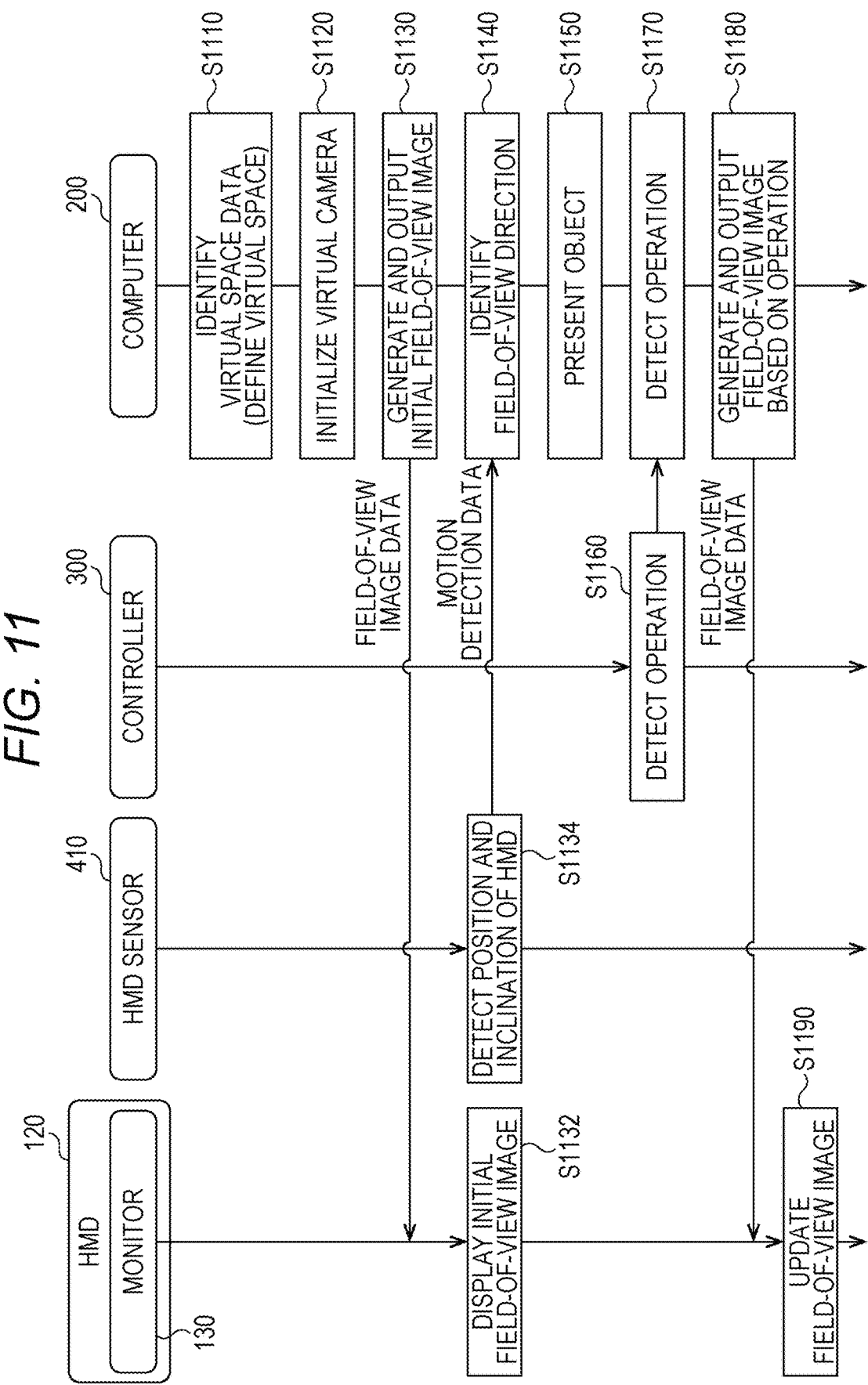
FIG. 11 A sequence chart of processing to be executed by a system including an HMD set according to at least one embodiment of this disclosure.

With reference to FIG. 11, the control structure of the HMD set 110 is described. FIG. 11 is a sequence chart of processing to be executed by the system 100 according to at least one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5. The generated field-of-view image data is output to the HMD 120 by the communication control module 540.

In Step S1190, the HMD 120 updates a field-of-view image based on the received field-of-view image data, and displays the updated field-of-view image on the monitor 130.

[Avatar Object]

Figure 12A:
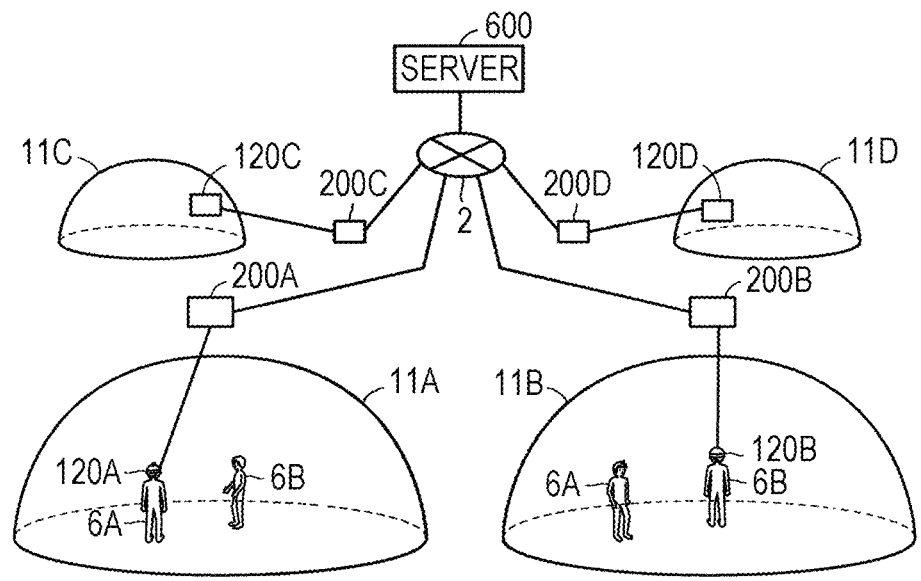
FIG. 12A A schematic diagram of HMD systems of several users sharing the virtual space interact using a network according to at least one embodiment of this disclosure.
Figure 12B:
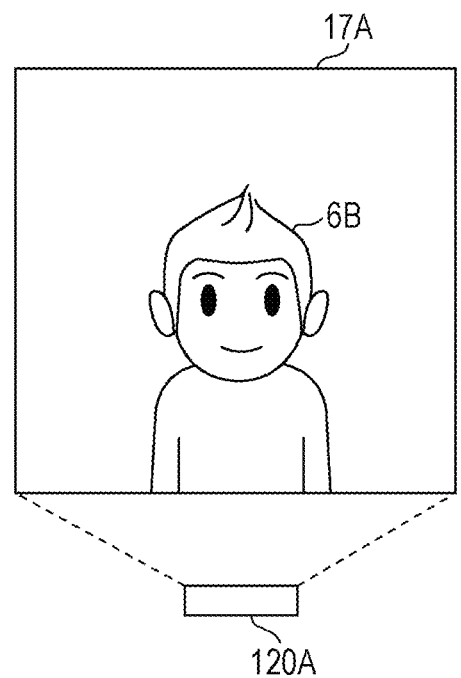
FIG. 12B A diagram of a field of view image of a HMD according to at least one embodiment of this disclosure.

With reference to FIG. 12A and FIG. 12B, an avatar object according to at least one embodiment is described. FIG. 12 and FIG. 12B are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12A is a schematic diagram of HMD systems of several users sharing the virtual space interact using a network according to at least one embodiment of this disclosure. Each HMD 120 provides the user 5 with the virtual space 11. Computers 200A to 200D provide the users 5A to 5D with virtual spaces 11A to 11D via HMDs 120A to 120D, respectively. In FIG. 12A, the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12B is a diagram of a field of view of a HMD according to at least one embodiment of this disclosure. FIG. 12B corresponds to the field-of-view region 17A of the user 5A in FIG. 12A. The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12B, the avatar object 6A of the user 5A is displayed in the field-of-view image of the user 5B.

In the arrangement in FIG. 12B, the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

FIG. 13 is a sequence chart of processing to be executed by the system 100 according to at least one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In at least one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110B acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 110C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD set 110C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similar to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

Figure 14:
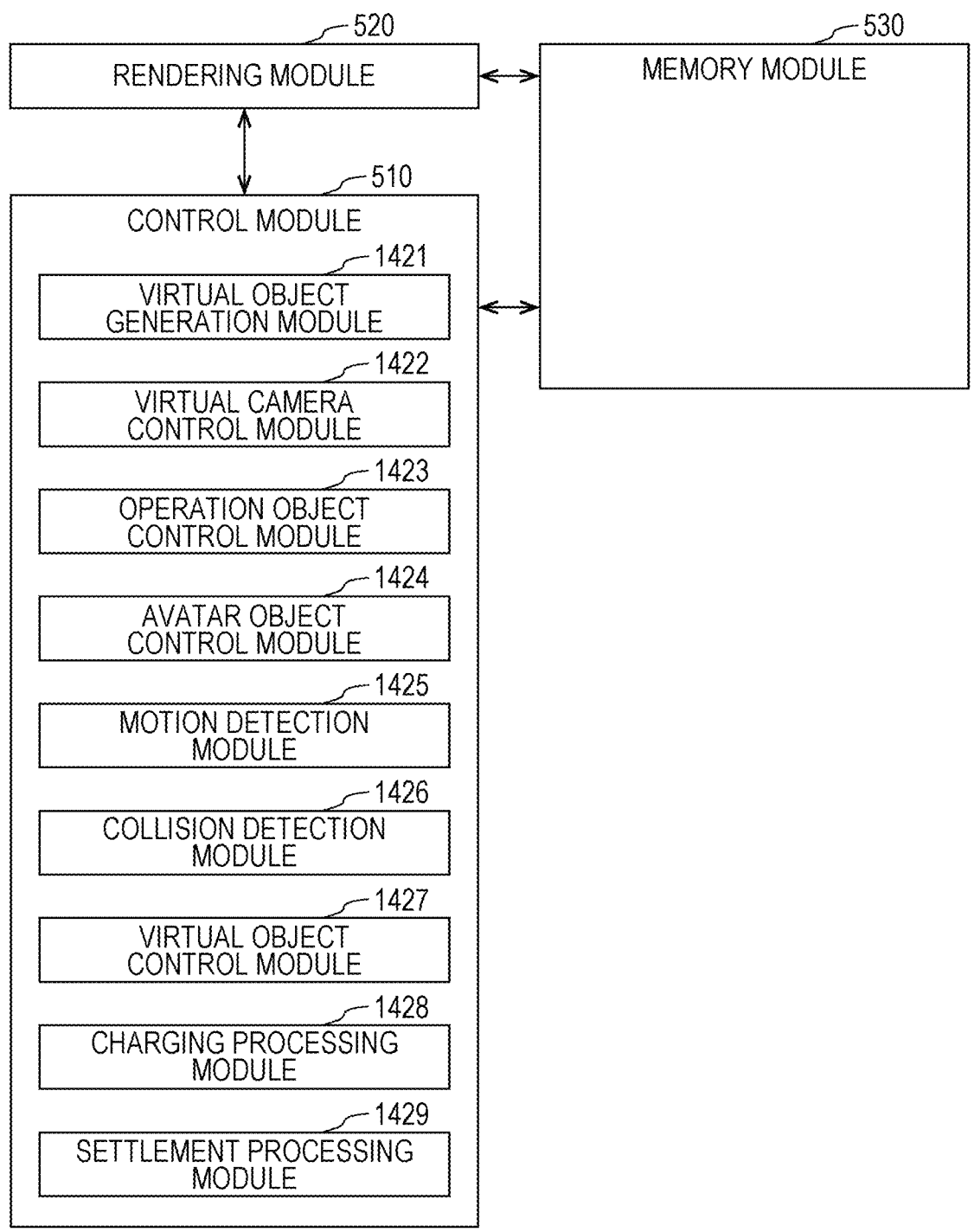
FIG. 14 A block diagram of a configuration of modules in a computer according to at least one embodiment of this disclosure.

With reference to FIG. 14, a configuration of modules in the computer 200 is described. FIG. 14 is a block diagram of a detailed configuration of modules in the computer 200 according to at least one embodiment of this disclosure. In FIG. 14, the control module 510 includes a virtual object generation module 1421, a virtual camera control module 1422, an operation object control module 1423, an avatar object control module 1424, a motion detection module 1425, a collision detection module 1426, a virtual object control module 1427, a charging processing module 1428, and a settlement processing module 1429.

The virtual object generation module 1421 generates various virtual objects in the virtual space 11. In at least one aspect, the virtual objects may include, for example, forests, mountains, other landscapes, and animals to be arranged in accordance with the progression of the story of the game. In at least one aspect, the virtual objects may include avatar objects, operation objects, stage objects, and user interface (UI) objects.

The virtual camera control module 1422 controls the behavior of the virtual camera 14 in the virtual space 11. The virtual camera control module 1422 controls the position at which the virtual camera 14 is arranged in the virtual space 11 and the direction (inclination) of the virtual camera 14, for example.

The operation object control module 1423 controls operation objects for receiving an operation by the user 5 in the virtual space 11. The user 5 operates the operation objects to, for example, operate virtual objects arranged in the virtual space 11. In at least one aspect, examples of the operation objects may include hand objects (virtual hands) corresponding to the hands of the user 5 wearing the HMD 120. In at least one aspect, the operation objects may correspond to hand parts of an avatar object to be described later.

The avatar object control module 1424 translates a motion of the HMD 120, which is detected by the HMD sensor 410, into avatar objects. For example, the avatar object control module 1424 detects inclination of the HMD 120 and generates data for arranging an avatar object in an inclined manner. In at least one aspect, the avatar object control module 1424 translates a motion of the controller 300 into avatar objects. In this case, the controller 300 includes, for example, a motion sensor, an acceleration sensor, or a plurality of light emitting elements (e.g., infrared LEDs) for detecting a motion of the controller 300. The avatar object control module 1424 translates the motion of face parts detected by the motion detection module 1425 in a face of an avatar object arranged in the virtual space 11. In other words, the avatar object control module 1424 translates a motion of the face of the user 5 in an avatar object.

The motion detection module 1425 detects a motion of the user 5. The motion detection module 1425 detects a motion of a hand of the user 5 in accordance with output from the controller 300, for example. The motion detection module 1425 detects a motion of the body of the user 5 in accordance with output from a motion sensor worn on the body of the user 5, for example. The motion detection module 1425 may detect a motion of face parts of the user 5.

When one virtual object arranged in the virtual space 11 collides with another virtual object, the collision detection module 1426 detects the collision. The collision detection module 1426 may detect a timing at which one virtual object is brought into contact with another virtual object, for example. The collision detection module 1426 may detect a timing at which one virtual object in contact with another virtual object started separating from the other virtual object. The collision detection module 1426 may detect a state in which one virtual object and another virtual object are in contact with each other. For example, when one operation object touches another virtual object, the collision detection module 1426 detects the fact that the one operation object has touched the other object. The collision detection module 1426 performs predetermined processing based on these detection results.

The virtual object control module 1427 controls behaviors of virtual objects except for the avatar objects in the virtual space 11. As an example, the virtual object control module 1427 deforms virtual objects. As another example, the virtual object control module 1427 changes positions at which virtual objects are arranged. As another example, the virtual object control module 1427 moves virtual objects.

The charging processing module 1428 performs charging-related processing.

The settlement processing module 1429 performs settlement-related processing.

Figure 15A:
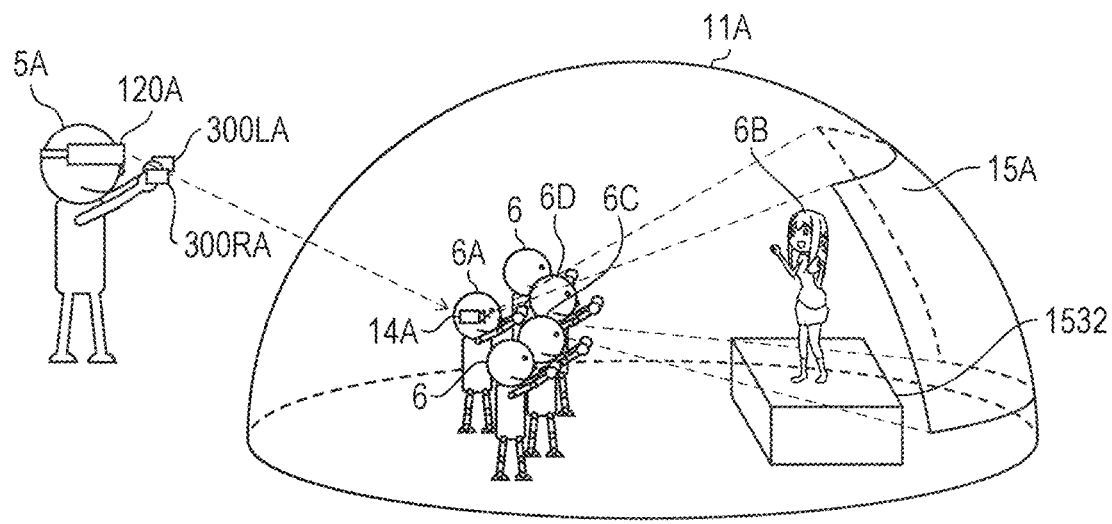
FIG. 15A A diagram of a virtual space according to at least one embodiment of this disclosure.

FIG. 15A is a diagram of a virtual space 11A and a field-of-view image 1517A according to at least one embodiment of this disclosure. In FIG. 15A, at least the avatar objects 6A to 6D, the virtual camera 14A, and a stage object 1532 are arranged in the virtual space 11A for providing the user 5A (first user) with a virtual experience. The user 5A wears the HMD 120A on his or her head. The user 5A holds a right controller 300RA with his/her right hand (first part) constituting a part of the right side of the body of the user 5A and holds a left controller 300LA with his/her left hand (second part) constituting a part of the left side of the body of the user 5A. The avatar object 6A (first avatar) includes a virtual right hand 1531RA and a virtual left hand 1531LA. The virtual right hand 1531RA is a type of the operation objects, and may move in the virtual space 11A in accordance with the motion of the right hand of the user 5A. The virtual left hand 1531LA is a type of the operation objects, and may move in the virtual space 11A in accordance with the motion of the left hand of the user 5A.

The virtual space 11A in FIG. 15A is created by the computer 200A playing live content. In the virtual space 11A, the avatar object 6B serves as a live performer and carries out a performance, and the avatar object 6A and other avatar objects serve as viewers of the live performance and view the performance. In the virtual space 11A, the avatar objects 6A to 6D are respectively associated with the users 5A to 5D.

In the virtual space 11A, the avatar object 6B (second avatar) is arranged on the stage object 1532. The stage object 1532 has an appearance that resembles a stage in a real live venue. The avatar objects 6A, 6C, and 6D are all arranged in front of the stage object 1532. In the virtual space 11A, the avatar object 6B moves in accordance with the motion of the user 5B (second user), thereby performing a live performance. The avatar object 6A views the performance made by the avatar object 6B in the virtual space 11A. In this process, the avatar object 6C views the performance carried out by the avatar object 6B in the virtual space 11C provided to the user 5C. In the same manner, the avatar object 6D views the performance carried out by the avatar object 6B in the virtual space 11D provided to the user 5D. In this sense, the user 5B may be referred to as a performer, while the users 5A, 5C, and 5D may be referred to as viewers.

Figure 15B:
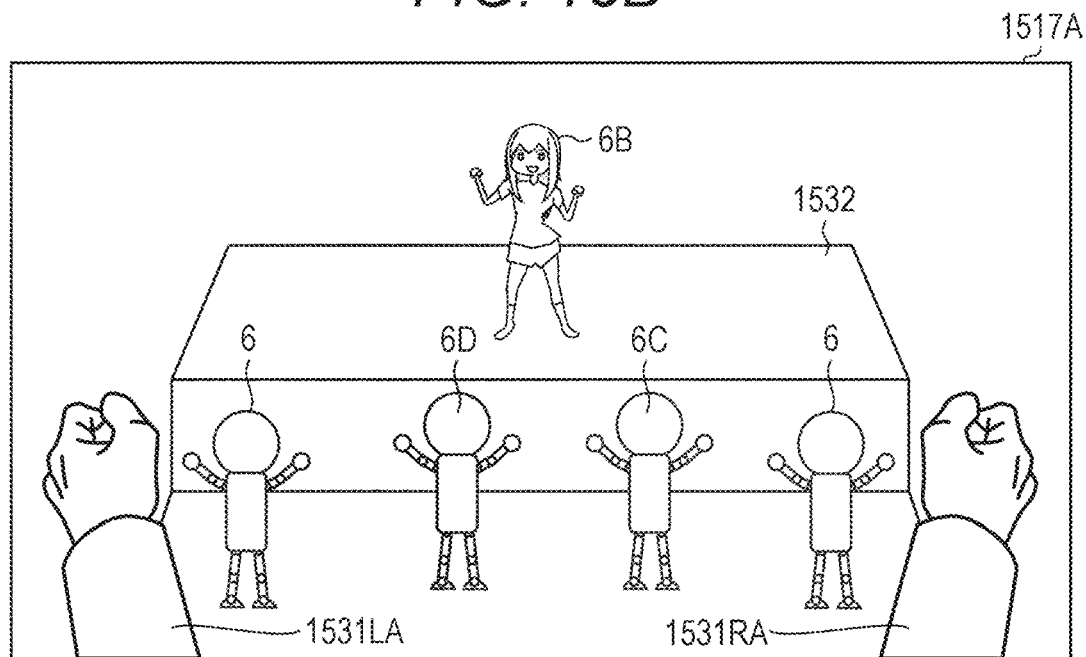
FIG. 15B A diagram of a field-of-view image according to at least one embodiment of this disclosure.

In FIG. 15A, the virtual camera 14A is arranged on the head of the avatar object 6A. The virtual camera 14A defines a field-of-view region 15A in accordance with the position and direction of the virtual camera 14A. The virtual camera 14A generates the field-of-view image 1517A corresponding to the field-of-view region 15A, and causes the HMD 120A to display the image as in FIG. 15B. This enables the user 5A to view a part of the virtual space from the viewpoint of the avatar object 6A, by visually checking the field-of-view image 1517A. As a result, the user 5A may attain such a virtual experience as if the user 5A himself/herself is the avatar object 6A. The field-of-view image 1517A includes the avatar object 6B carrying out the performance. This enables the user 5A to view the performance made by the avatar object 6B from the viewpoint of the avatar object 6A.

Different types of a plurality of avatar objects 6B may be arranged in the virtual space 11A. In at least one aspect, a plurality of avatar objects 6B are associated with respective different users 5. In at least one aspect, a plurality of avatar objects 6B are associated with a single user 5B.

Figure 16A:
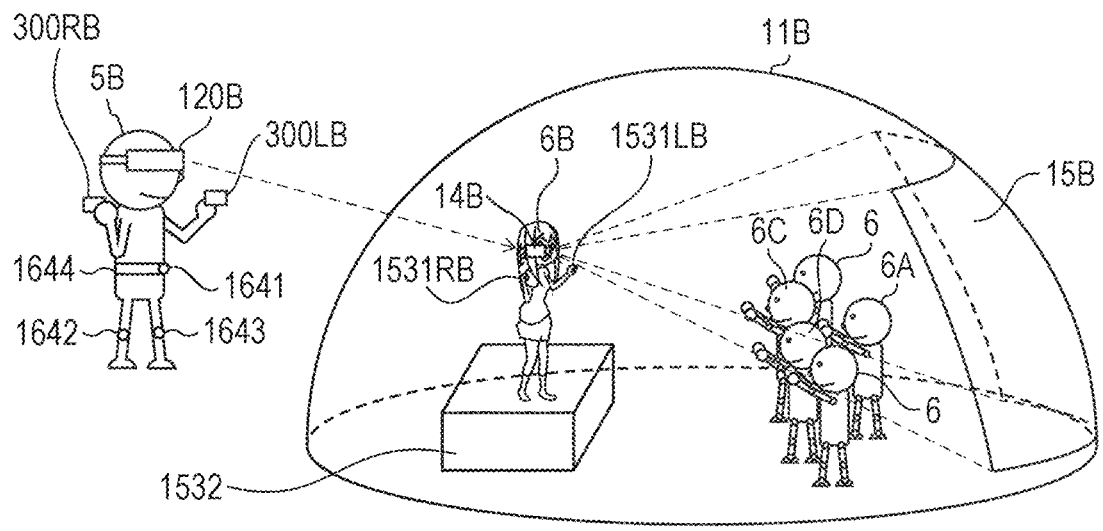
FIG. 16A A diagram of a virtual space according to at least one embodiment of this disclosure.

FIG. 16A is a diagram of a virtual space 11B and a field-of-view image 1617B according to at least one embodiment of this disclosure. In FIG. 16A, at least the avatar objects 6A to 6D, the virtual camera 14B, and the stage object 1532 are arranged in the virtual space 11B for providing the user 5B with a virtual experience. The user 5B wears the HMD 120B on his or her head. The user 5B holds a right controller 300RB with his/her right hand (first part) constituting a part of the right side of the body of the user 5B and holds a left controller 300LB with his/her left hand (second part) constituting a part of the left side of the body of the user 5B.

The HMD 120B includes the sensor 190 serving as a motion sensor. The right controller 300RB and the left controller 300LB include a motion sensor 420. The user 5B also wears motion sensors 1641 to 1643. The motion sensor 1641 is worn on the low back of the user 5B with a belt 1644. The motion sensor 1642 is worn on the top of the right foot of the user 5B. The motion sensor 1643 is worn on the top of the left foot of the user 5B. The motion sensors 1641 to 1643 are connected to the computer 200B through wired or wireless communication.

In at least one aspect, the motion sensors that the user 5B wears detect an arrival time and angle of a signal (for example, infrared laser) emitted from a base station (not illustrated). The processor 210B of the computer 200B (hereinafter simply referred to as the processor 210B) detects the positions of the motion sensors relative to the base station, based on detection results from the motion sensors. The processor 210B may further standardize the positions of the motion sensors relative to the base station with reference to a predetermined point (for example, the position of the sensor 190 worn on the head).

The avatar object 6B includes a virtual right hand 1531RB and a virtual left hand 1531LB. The virtual right hand 1531RB is a type of the operation objects, and may move in the virtual space 11B in accordance with the motion of the right hand of the user 5B. The virtual left hand 1531LA is a type of the operation objects, and may move in the virtual space 11B in accordance with the motion of the left hand of the user 5B.

The virtual space 11B in FIG. 16A is created by the computer 200B playing live content. The virtual spaces 11A and 11B are in synchronization with each other under control of the server 600. The user 5B moves his/her body to cause the avatar object 6B to carry out a performance. The computer 200B detects a motion of the user 5B, based on output from various motion sensors that the user 5B wears. In the virtual space 11B, the avatar object 6B carries out a performance to which the motion of the user 5B in the real space is translated, in accordance with the identified motion of the user 5B. The avatar objects 6A, 6C, and 6D view the performance made by the avatar object 6B in the virtual space 11B. Once the avatar object 6B starts carrying out a performance in the virtual space 11B in accordance with the motion of the user 5B, the avatar object 6B starts carrying out the same performance in the virtual spaces 11A, 11C, and 11D in synchronization with the performance in the virtual space 11B. The user 5B thus plays a role of distributor who distributes a live performance made by the avatar object 6B to each of the users 5A, 5C, and 5D.

Figure 16B:
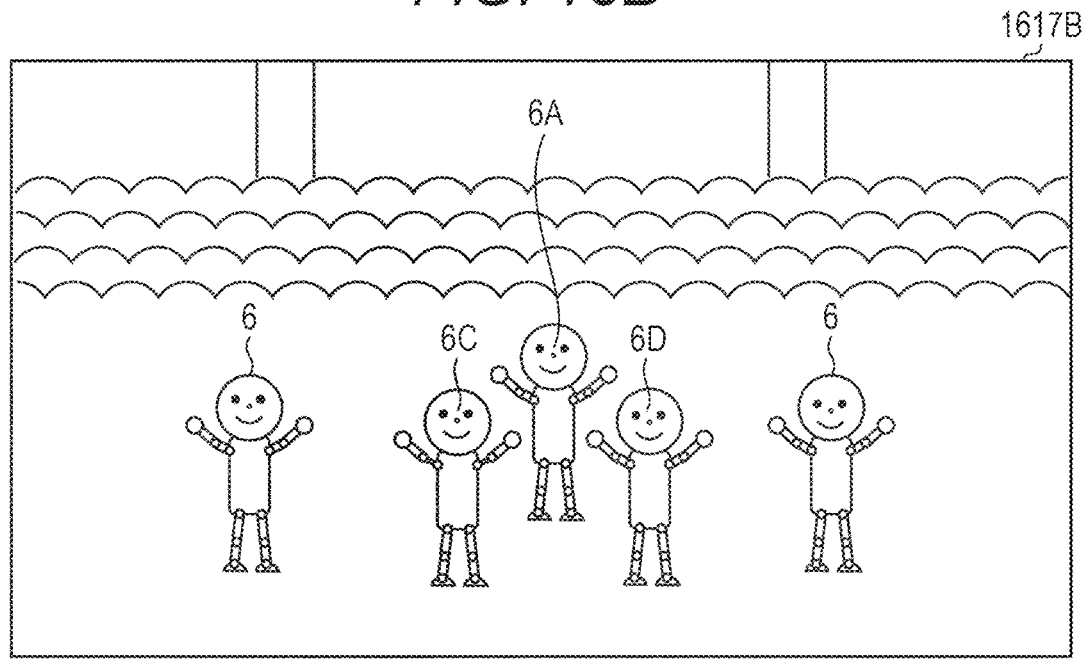
FIG. 16B A diagram of a field-of-view image according to at least one embodiment of this disclosure.

In FIG. 16A, the virtual camera 14B is arranged on the head of the avatar object 6B. The virtual camera 14B defines a field-of-view region 15B in accordance with the position and direction of the virtual camera 14B. The virtual camera 14B generates the field-of-view image 1617B corresponding to the field-of-view region 15B, and causes the HMD 120B to display the image as in FIG. 16B. This enables the user 5B to view a part of the virtual space from the viewpoint of the avatar object 6B, by visually checking the field-of-view image 1617B. As a result, the user 5B may attain such a virtual experience as if the user 5B himself/herself is the avatar object 6B. The field-of-view image 1617B includes the avatar objects 6A, 6C, and 6D viewing the performance. This enables the user 5B to see the picture of the avatar objects 6A, 6C, and 6D viewing the performance made by the avatar object 6B from the viewpoint of the avatar object 6B.

Figure 17:
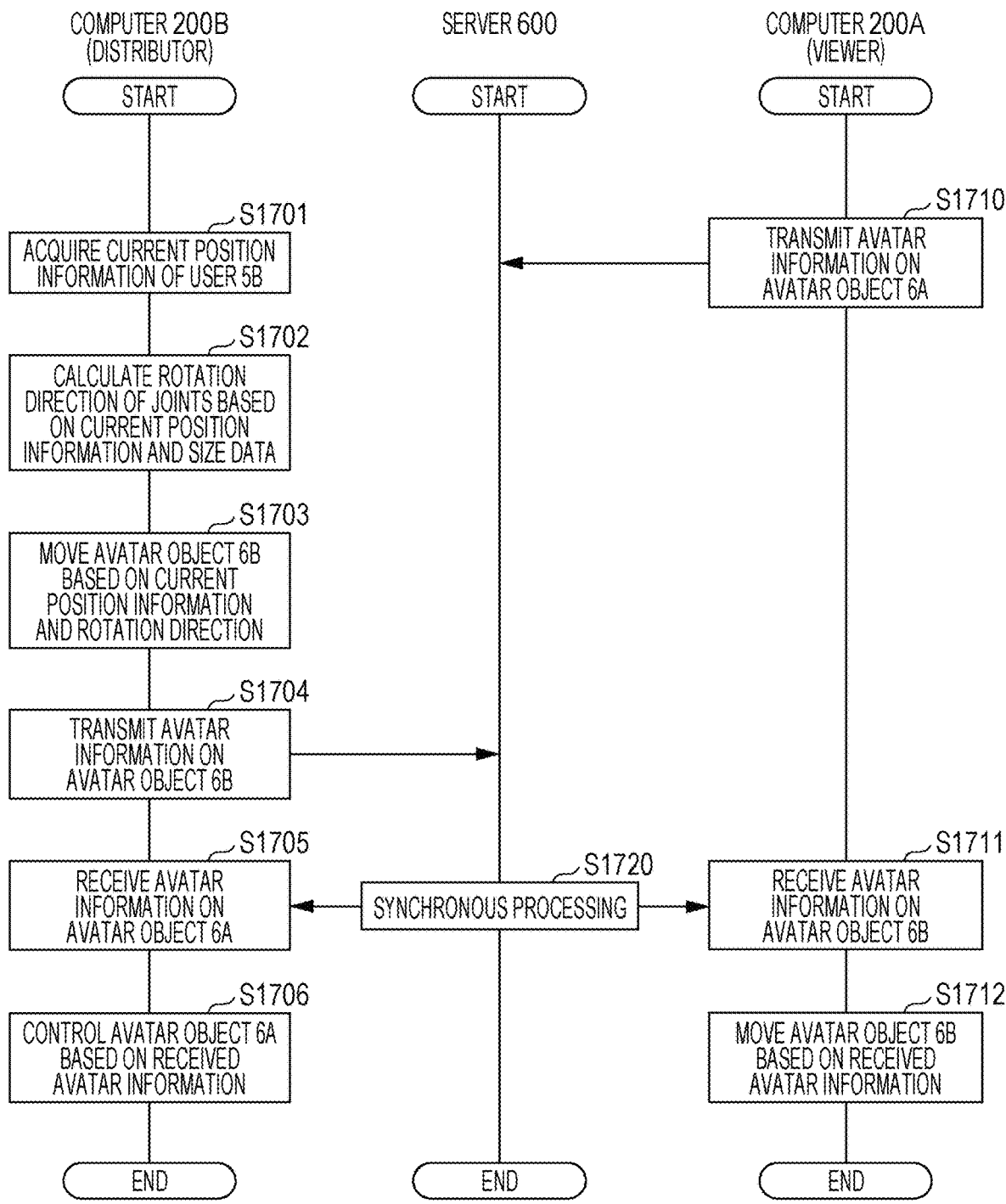
FIG. 17 A sequence chart of processing to be executed by an HMD system according to at least one embodiment of this disclosure.

FIG. 17 is a sequence chart of processing to be executed by the HMD system 100 according to at least one embodiment of this disclosure. The following describes a series of processing for distributing the live performance made by the avatar object 6B in the virtual space 11B from the computer 200B to the computer 200A. The live performance made by the avatar object 6B is also distributed to the computers 200C and 200D through the same series of processing.

In Step S1701, the processor 210B detects the positions of the head, the low back, the hands, and the feet of the user 5B with the motion sensors that the user 5B wears. The positions of the body parts of the user 5B detected with the motion sensors are hereinafter referred to as "position information". In Step S1702, the processor 210B calculates rotation directions of joints of the user 5B, based on the current position information on the user 5B and preliminarily acquired size data on the user 5B. The size data is data indicating the size of the body of the user 5B. The size data and the rotation directions will be described in greater detail later. Detecting the current position information and calculating the rotation directions is synonymous with detecting the motion of the user 5B.

In Step S1703, the processor 210B moves the avatar object 6B arranged in the virtual space 11B, based on the current position information and the rotation directions. The processor 210B moves the right upper arm of the avatar object 6B based on the rotation direction of the right shoulder, for example. The processor 210B further moves the position of the avatar object 6B in the virtual space 11B, based on the current position information (for example, the current position information on the low back). The processor 210B thus translates the motion of the user 5B in the real space to the avatar object 6B in the virtual space. In other words, the processor 210B causes the avatar object 6B to carry out a performance in accordance with the motion of the user 5B.

The processing for translating the motion of the user 5B to the avatar object 6B is not limited to the above-described processing in accordance with the position information and the rotation directions. The processor 210B may move the avatar object 6B in accordance with the motion of the user 5B, without calculating the rotation directions, for example. The processor 210B may control the positions of part objects of the avatar object 6B corresponding to the body parts of the user 5B in such a manner that corresponds to the positions of the body parts constituting the body of the user 5B, for example.

In Step S1704, the processor 210B generates motion information indicating a motion of the avatar object 6B carrying out a performance and transmits the avatar information on the avatar object 6B including the motion information to the server 600.

In Step S1710, the processor 210A of the computer 200A (hereinafter simply referred to as the processor 210A) transmits the avatar information on the avatar object 6A to the server. In Step S1720, the server 600 performs synchronous processing for synchronizing the virtual spaces 11A and 11B with each other. Specifically, the server 600 transmits the avatar information on the avatar object 6B received from the computer 200B to the computer 200A. The server 600 further transmits the avatar information on the avatar object 6A received from the computer 200A to the computer 200B.

In Step S1705, the processor 210B receives the avatar information on the avatar object 6A transmitted from the server 600. In Step S1706, the processor 210B controls the avatar object in the virtual space 11B, based on the received avatar information. In this manner, the behavior of the avatar object 6A in the virtual space 11A is translated to the avatar object 6A in the virtual space 11B. In other words, the behavior of the avatar object 6A is synchronized in the virtual spaces 11A and 11B. For example, when the avatar object 6A is moving in the virtual space 11A, the avatar object 6A is moving in the virtual space 11B in the same manner.

In Step S1711, the processor 210A receives the avatar information on the avatar object 6B transmitted from the server 600. In Step S1712, the processor 210A moves the avatar object 6B based on motion information contained in the received avatar information. The processor 210B thus translates the motion of the user 5B in the real space to the avatar object 6B arranged in the virtual space 11A. In other words, the processor 210A causes the avatar object 6B to carry out a performance in accordance with the motion of the user 5B in the virtual space 11A. In this manner, the behavior of the avatar object 6B in the virtual space 11B is translated to the avatar object 6B in the virtual space 11A. In other words, the behavior of the avatar object 6B is synchronized in the virtual spaces 11A and 11B. For example, when the avatar object 6B is carrying out a first performance in the virtual space 11B, the avatar object 6B is carrying out the first performance in the virtual space 11A in the same manner. In this manner, the live performance made by the avatar object 6B in the virtual space 11B is distributed to the virtual space 11A.

Although not shown for the sake of simplicity, the processor 210B records voice uttered by the user 5B, using a microphone 170B. The processor 210B generates voice data indicating the voice of the user 5B and transmits the data to the server 600. The server 600 transmits the received voice data of the user 5B to the computer 200A through synchronous processing. The processor 210A outputs the voice indicated by the received voice data of the user 5B to the speaker 180A. This series of processing enables the user 5A to listen to the voice uttered by the user 5B during the live performance in a real-time manner.

Figure 18B:
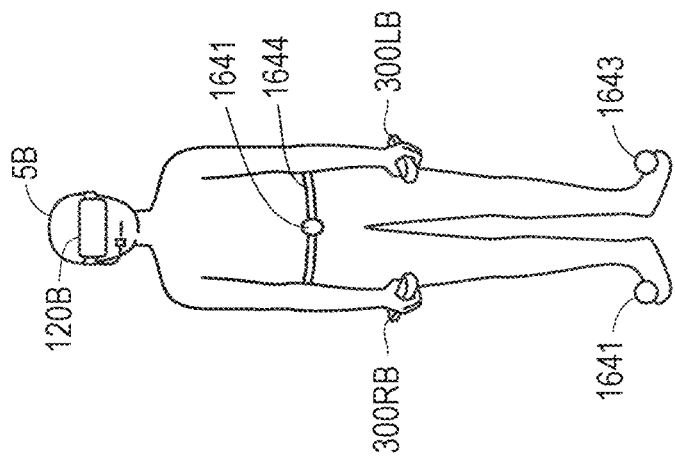
FIGS. 18A and 18B Diagrams of a user during acquiring of size data according to at least one embodiment of this disclosure.
Figure 18A:
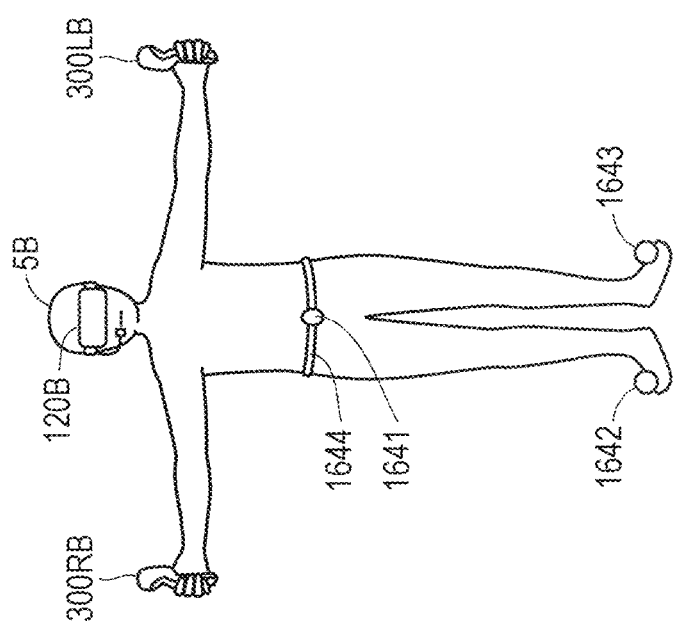

FIGS. 18A and 18B are diagrams of how to acquire the size data according to at least one embodiment of this disclosure. FIG. 18A includes a state in which the user 5B stands facing front with his/her arms spread. The state in FIG. 18A is hereinafter referred to as a first posture. FIG. 18B includes a state in which the user 5B stands facing front with his/her arms down by the sides of his/her thighs. The state in FIG. 18B is hereinafter referred to as a second posture.

In at least one aspect, the processor 210B prompts the user 5B to take the first posture and the second posture. As at least one example, the processor 210B causes a monitor 130B to display a character taking the first posture and the second posture and display a message for prompting the user to take these postures. As at least one example, the processor 210B may output an audio message for prompting the user to take the first posture and the second posture from the speaker 180B.

The processor 210B acquires position information on the head, the low back, the hands, and the feet of the user 5B, based on output from the motion sensors that the user 5B wears for each of the two postures (the first posture and the second posture). The position information may be acquired as positions in the real coordinate system (x, y, z) as in FIG. 19.

The processor 210B calculates the size data on the user 5B from the position information corresponding to the two postures. In at least one embodiment, the processor 210B calculates the body height, the shoulder width, the arm length, the foot length, and the head-to-shoulder height of the user 5B, as in FIG. 20, as the size data. The processor 210B may calculate the width between the hands in the second posture as the shoulder width. The processor 210B may calculate a value obtained by subtracting the shoulder width from the width between the hands in the first posture and then dividing the difference by two as the arm length. The processor 210B may calculate a distance obtained by subtracting the height of the feet from the height of the head as the body height. The processor 210B may calculate a distance obtained by subtracting the height of the feet from the height of the low back as the foot length. The processor 210B may calculate a value obtained by subtracting the height of the hands in the first posture from the height of the head as the head-to-shoulder height.

Figure 21:
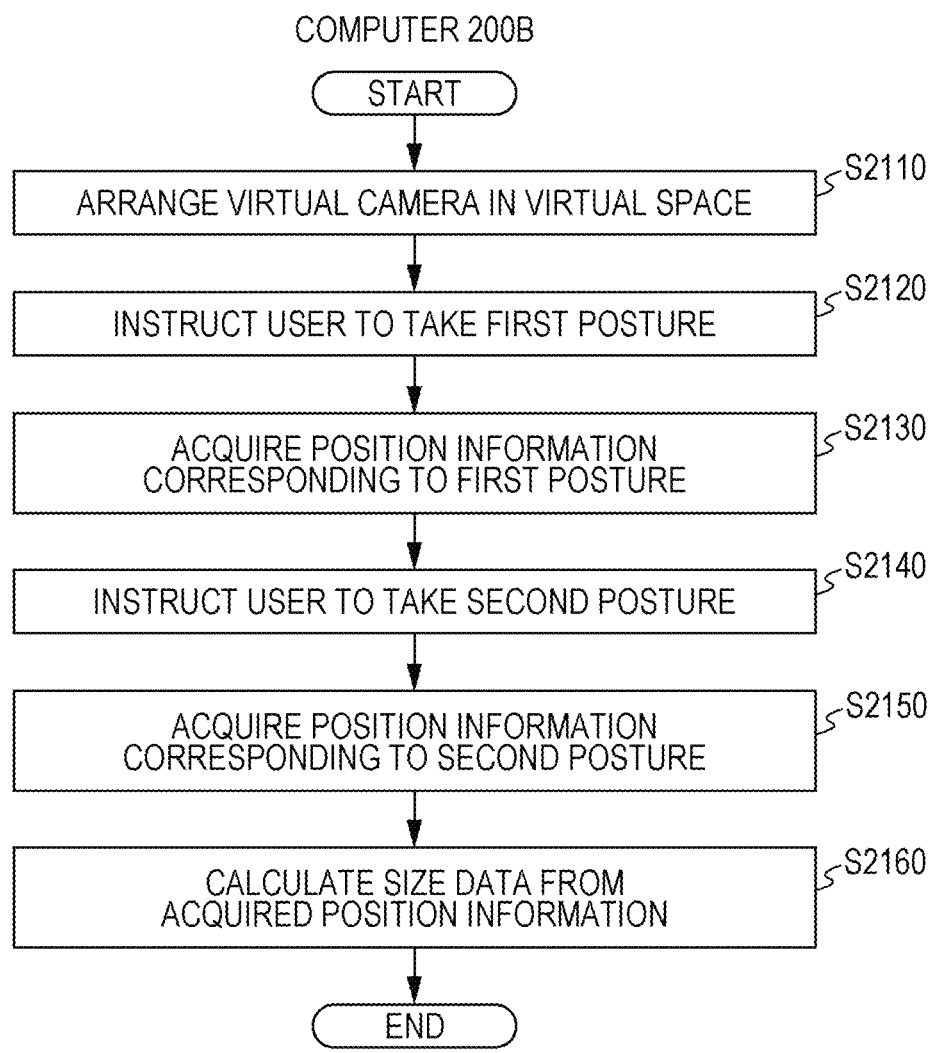
FIG. 21 A flowchart of processing for acquiring size data according to at least one embodiment of this disclosure.

FIG. 21 is a flowchart of processing for acquiring the size data according to at least one embodiment. In Step S2110, the processor 210B arranges the virtual camera 14B in the virtual space 11B. The processor 210B also outputs the field-of-view image 17B corresponding to the range of imaging by the virtual camera 14B to the monitor 130B.

In Step S2120, the processor 210B instructs the user 5B to take the first posture. For example, the processor 210B arranges an object showing this instruction in the virtual space 11B, whereby performing the processing in Step S2120. In Step S2130, the processor 210B acquires position information corresponding to the first posture.

In Step S2140, the processor 210B instructs the user 5B to take the second posture. In Step S2150, the processor 210B acquires position information corresponding to the second posture.

In Step S2160, the processor 210B calculates the size data on the user 5B from the position information corresponding to the first posture and the position information corresponding to the second posture. The processor 210B stores the size data in a storage 230B.

In this manner, the user 5B only needs to take the two postures to easily enter his/her measurements into the computer 200B. In at least one aspect, the user 5B may enter his/her measurements into the computer 200B using a keyboard or other input devices.

In at least one embodiment, the processor 210B estimates rotation directions of joints of the user 5B, based on output (position information) from the six motion sensors that the user 5B wears and on the size data. As at least one example, the processor 210B estimates the positions of the shoulders based on the position information on the head, the shoulder width, and the head-to-shoulder height. The processor 210B estimates the positions of the elbows from the positions of the shoulders and the position information on the hands. In at least one embodiment, this estimation may be performed with a known application employing inverse kinematics.

In at least one embodiment, the processor 210B acquires the inclinations (rotation directions) of the joints of the neck (head), the low back, the wrists, and the ankles of the user 5B from the six motion sensors. In addition, the processor 210B estimates the rotation directions of the joints of the shoulders, the elbows, the hips (groin), and the knees, based on inverse kinematics. In FIG. 22 are coordinates from the processor 210B that acquired or estimated the rotation directions of the joints in the uvw visual-field coordinate system.

In the case of calculating the rotation directions based on the position information and the size data, the processor 210B may fail to accurately estimate the positions of the shoulders and the like of the user 5B not facing front (in other words, when the head and the low back face in different directions). To address this, in at least one embodiment, the computer 200B may further take into account the inclinations of the body parts of the user 5B detected with the motion sensors in estimating the rotation directions of the joints. For example, the computer 200B estimates the positions of the shoulders, based on the position information on the head, the inclination of the head, the inclination of the low back, the shoulder width, and the head-to-shoulder height. This configuration may enable the computer 200B to have enhanced accuracy of the rotation directions of the joints.

Figure 23:
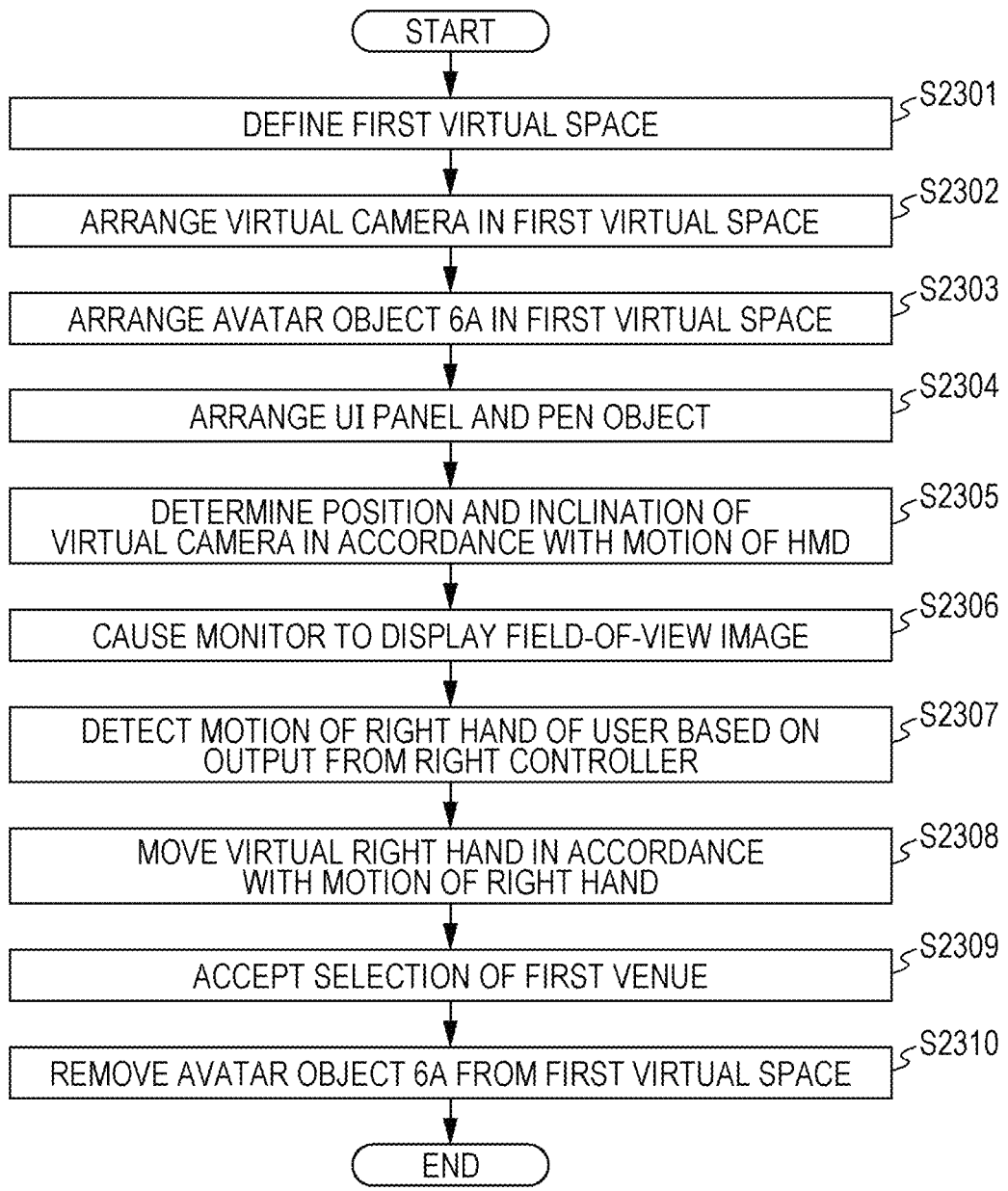
FIG. 23 A flowchart of processing to be executed by a system including an HMD set according to at least one embodiment of this disclosure.
Figure 24A:
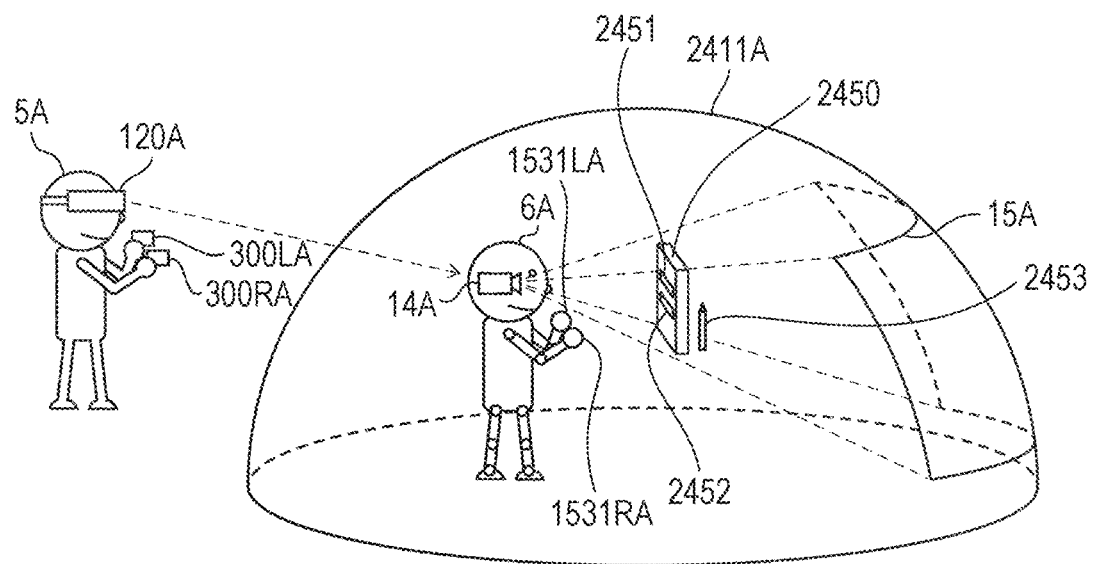
FIG. 24A A diagram of a virtual space according to at least one embodiment of this disclosure.

FIG. 23 is a flowchart of processing to be executed by a system including the HMD set 110A according to at least one embodiment of this disclosure. FIG. 24A is a diagram of a first virtual space 2411A and a field-of-view image 2417A according to at least one embodiment of this disclosure. In at least one embodiment, a series of processing for selecting a virtual venue where the user 5A views a virtual live performance is performed by the HMD set 110A. Instead, this processing may be performed by the other HMD set 110B, 110C, or 110D, or the processing may be partially or entirely performed by the server 600.

In Step S2301, the processor 210A defines the first virtual space 2411A as in FIG. 24A. This processing corresponds to the processing of Step S1110 of FIG. 11. Specifically, the processor 210A identifies virtual space data, thereby defining the first virtual space 2411A represented by the virtual space data. The first virtual space 2411A is a virtual space in which the avatar object 6A is arranged before the live performance made by the avatar object 6B starts. The first virtual space 2411A is also a virtual space for allowing the user 5A to select a venue.

In Step S2302, the processor 210A, serving as the virtual object generation module 1421, generates the virtual camera 14A and arranges the virtual camera in the first virtual space 2411A. In Step S2303, the processor 210A, serving as the virtual object generation module 1421, generates the avatar object 6A including the virtual right hand 1531RA and the virtual left hand 1531LA and arranges the avatar object in the first virtual space 2411A. In Step S2304, the processor 210A, serving as the virtual object generation module 1421, generates a UI panel 2450 and a pen object 2453 and arranges these objects in the first virtual space 2411A.

The UI panel 2450 is a type of UI objects and is used by the user 5A for causing the processor 210A to perform processing for selecting a venue. The UI panel 2450 includes options 2451 and 2452 arranged on the front surface of the UI panel 2450. The options 2451 and 2452 contain information for describing the name of a venue selected when any of these options is selected by the user 5A. The option 2451 is an item for selecting a first venue, and the option 2452 is an item for selecting a second venue different from the first venue. The pen object 2453 is a type of virtual objects and held and used in the virtual right hand 1531RA or the virtual left hand 1531LA for selecting the option 2451 or 2452 on the UI panel 2450.

In Step S2305, the processor 210A, serving as the virtual camera control module 1422, determines the position and the inclination of the virtual camera 14A in the first virtual space 2411A in accordance with the motion of the HMD 120A. More specifically, the processor 210A controls the field-of-view region 15A, which is a field of view from the virtual camera 14A in the first virtual space 2411A, in accordance with the posture of the head of the user 5A and the position of the virtual camera 14A in the first virtual space 2411A. This processing corresponds to a part of the processing of Step S1140 of FIG. 11. Since the virtual camera 14A is arranged at the same position as the avatar object 6A, the position of the virtual camera 14A is synonymous with the position of the avatar object 6A. Furthermore, the field of view from the virtual camera 14A is synonymous with the field of view from the avatar object 6A.

In Step S2306, the processor 210A causes the monitor 130A to display the field-of-view image 17A. Specifically, the processor 210A defines the field-of-view image 17A corresponding to the field-of-view region 15A, based on the motion of the HMD 120A (that is, the position and the inclination of the virtual camera 14A) and the virtual space data defining the first virtual space 2411A. Defining the field-of-view image 17A is synonymous with generating the field-of-view image 17A. The processor 210A further outputs the field-of-view image 17A to the monitor 130A of the HMD 120A, thereby causing the HMD 120A to display the field-of-view image 17A. This processing corresponds to the processing of Steps S1180 and S1190 of FIG. 11.

Figure 24B:
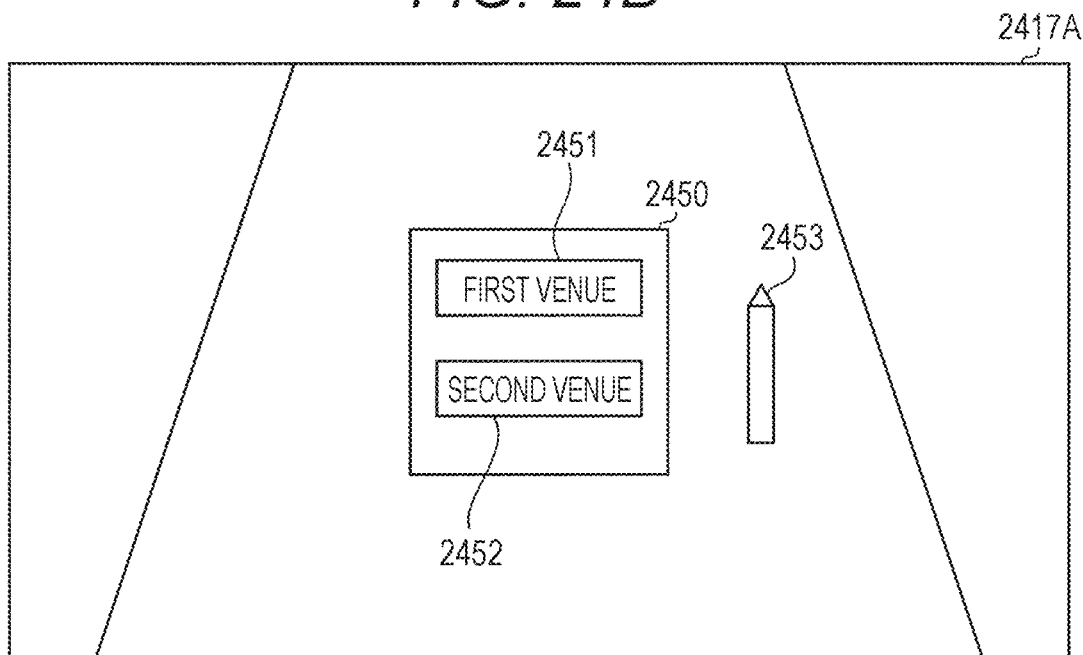
FIG. 24B A diagram of a field-of-view image according to at least one embodiment of this disclosure.

The processor 210A causes the monitor 130A to display the field-of-view image 2417A corresponding to the first virtual space 2411A in FIG. 24A, as in FIG. 24B, for example. This enables the user 5A to recognize that the option 2451 or the option 2452 on the UI panel 2450 is available to be selected, by visually checking the field-of-view image 2417A.

The above-described processing in Step S2305 and S2306 (that is, update of the field-of-view image 17A in accordance with the motion of the HMD 120A) is repeatedly performed during the processing in Step S2307 to S2310, which will be described later.

In Step S2307, the processor 210A, serving as the motion detection module 1425, detects a motion of the right hand of the user 5A, based on output from the right controller 300RA. In Step S2308, the processor 210A, serving as the operation object control module 1423, moves the virtual right hand 1531RA in the first virtual space 2411A in accordance with the detected motion of the right hand of the user 5A. In at least one aspect, the processor 210A moves the virtual right hand 1531RA in the first virtual space 2411A so as to bring the virtual right hand 1531RA close to the pen object 2453, in accordance with the motion of the right hand of the user 5A. After the virtual right hand 1531RA is brought sufficiently close to the pen object 2453, the processor 210A operates the virtual right hand 1531RA to select (grasp) the pen object 2453, based on the motion of the right hand of the user 5A. Examples of the motion of the right hand of the user 5A may include pressing any button on the right controller 300RA. The virtual right hand 1531RA thus holds the pen object 2453. One of ordinary skill in the art would understand that the disclosure also covers a virtual left hand holding the pen object 2453.

Figure 25A:
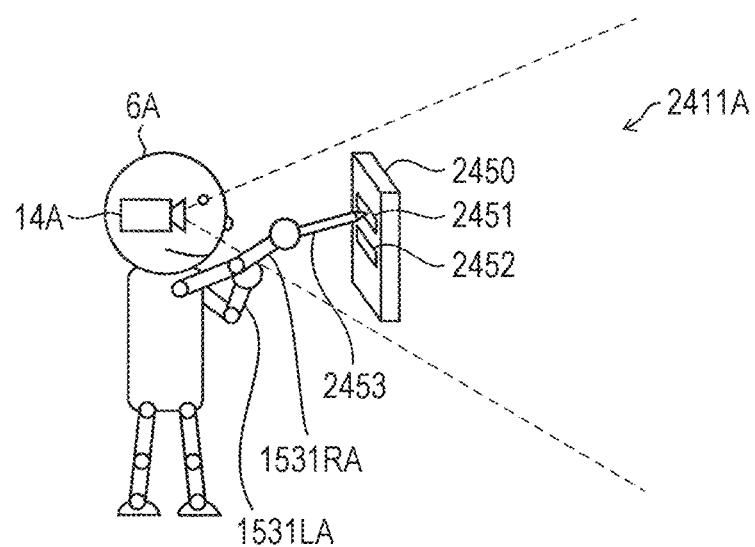
FIG. 25A A diagram of a virtual space and a field-of-view image according to at least one embodiment of this disclosure.

FIG. 25A is a diagram of the first virtual space 2411A and a field-of-view image 2517A according to at least one embodiment of this disclosure. As in FIG. 25A, after the virtual right hand 1531RA has selected the pen object 2453, the processor 210A moves the virtual right hand 1531RA and the pen object 2453 in the first virtual space 2411A so as to bring the tip of the pen object 2453 close to the option 2451, based on the motion of the right hand of the user 5A. The processor 210A, serving as the collision detection module 1426, detects that the tip of the pen object 2453 collides with the option 2451 when the tip of the pen object 2453 and the option 2451 satisfy a first positional relation. The first positional relation refers to, for example, the distance from the tip of the pen object 2453 to the option 2451 being below a first distance. Alternatively, a collision area defined at the tip of the pen object 2453 at least partially collides with a collision area defined for the option 2451. The processor 210A detects that the pen object 2453 has selected the option 2451, based on the fact that the tip of the pen object 2453 satisfies the first positional relationship with the option 2451. In Step S2309, the processor 210A receives selection of the first venue corresponding to the selected option 2451. The first venue is a virtual venue corresponding to a second virtual space 2711A that is an environment where the user 5A views a live performance.

Figure 25B:
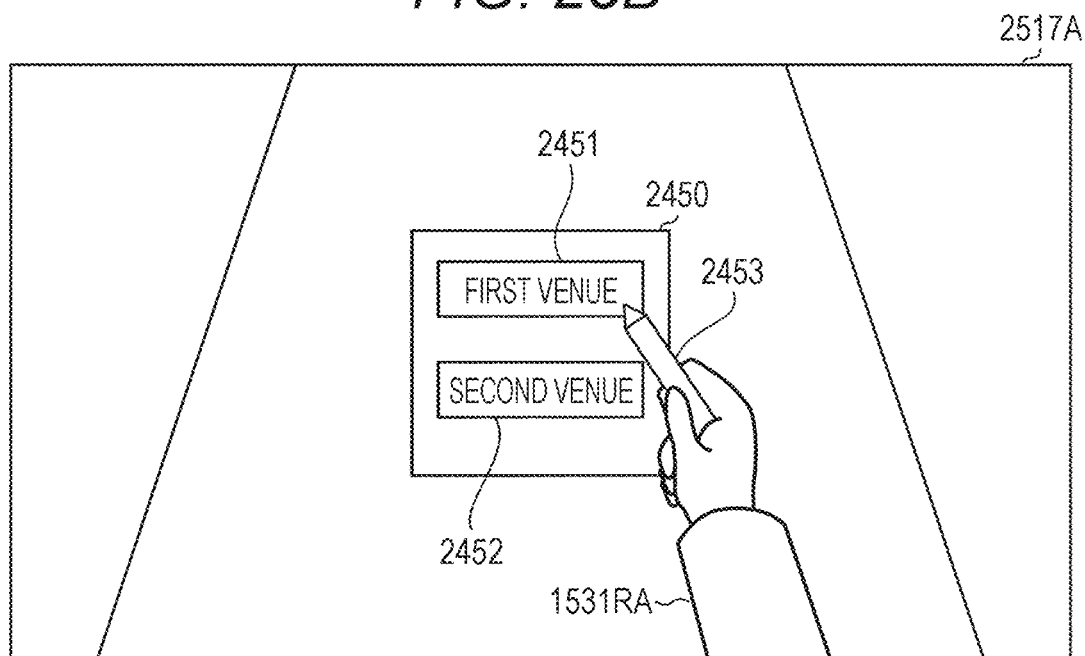
FIG. 25B A diagram of a field-of-view image according to at least one embodiment of this disclosure.

The processor 210A causes the monitor 130A to display the field-of-view image 2517A corresponding to the first virtual space 2411A in FIG. 25A, as in FIG. 25B, for example. This enables the user 5A to recognize that the option 2451 on the UI panel 2450 has been selected (in other words, the first venue has been selected), by visually checking the field-of-view image 2517A.

In Step S2310, the processor 210A, serving as the avatar object control module 1424, removes the avatar object 6A from the first virtual space 2411A. Specifically, the processor 210A terminates the arranging of the avatar object 6A in the first virtual space 2411A. Subsequently, the processor 210A continues defining the first virtual space 2411A. The processor 210A further leaves the other virtual objects in the first virtual space 2411A from which the avatar object 6A has been removed. The processor 210A terminates the provision of the first virtual space 2411A to the user 5A. The processor 210A further performs a series of processing for causing the avatar object 6A to view the performance made by the avatar object 6B, thereby newly providing the second virtual space 2711A corresponding to the first venue to the user 5A.

A process for selecting a venue is not limited to the above-described example. For example, the processor 210A arranges spherical models visualizing details of venues in the first virtual space 2411A. When any of the spherical models is selected with the virtual right hand 1531RA or the virtual left hand 1531LA, the processor 210A may newly provide the second virtual space 2711A corresponding to the venue indicated by the selected spherical model to the user 5A.

Figure 26:
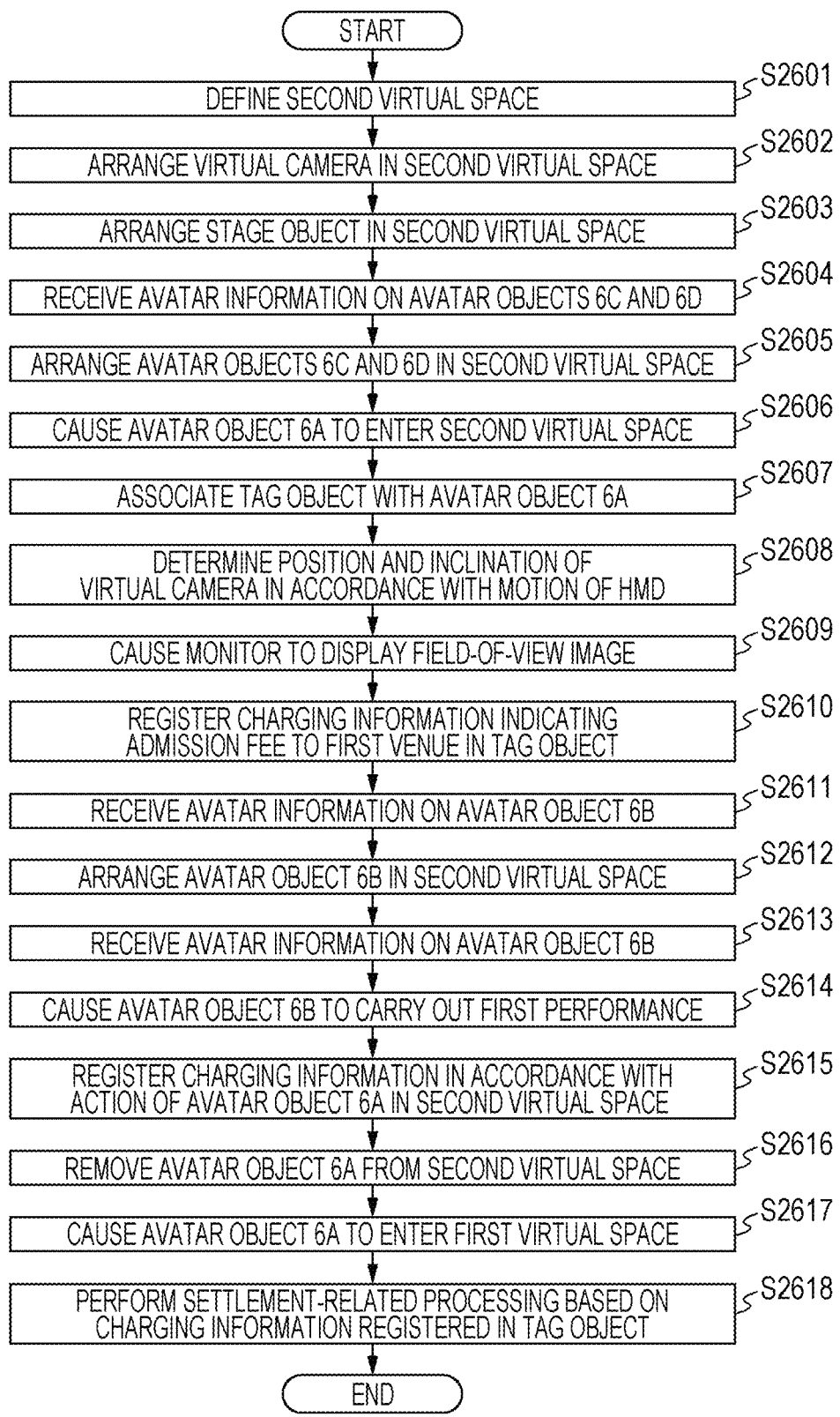
FIG. 26 A flowchart of processing to be executed by a system including an HMD set according to at least one embodiment of this disclosure.
Figure 27A:
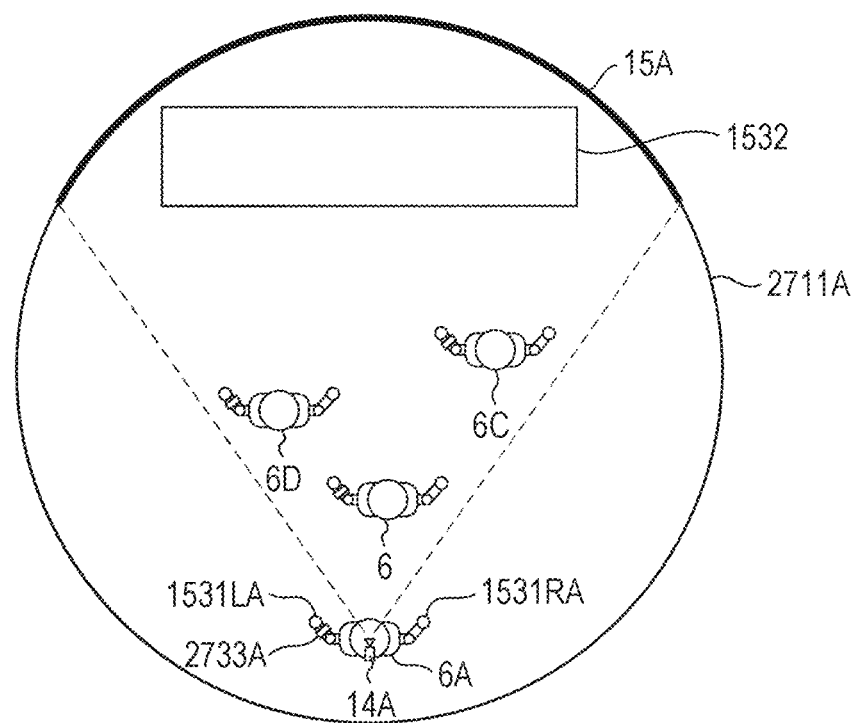
FIG. 27A A diagram of a virtual space according to at least one embodiment of this disclosure.

FIG. 26 is a flowchart of processing to be executed by a system including the HMD set 110A according to at least one embodiment of this disclosure. FIG. 27A is a diagram of the second virtual space 2711A and a field-of-view image 2717A according to at least one embodiment of this disclosure. In at least one embodiment, a series of processing for starting to view a virtual live performance is performed by the HMD set 110A. In at least one embodiment, this processing may be performed by the other HMD set 110B, 110C, or 110D, or the processing may be partially or entirely performed by the server 600.

In Step S2601, the processor 210A defines the second virtual space 2711A as in FIG. 27A. This processing corresponds to the processing of Step S1110 of FIG. 11. Specifically, the processor 210A identifies virtual space data, thereby defining the second virtual space 2711A represented by the virtual space data. The second virtual space 2711A is a virtual space different from the first virtual space 2411A and is a virtual space in which the avatar object 6A views a live performance made by the avatar object 6B. In other words, the second virtual space 2711A is a virtual space in which the avatar object 6B carries out a performance.

In Step S2602, the processor 210A generates the virtual camera 14A and arranges the virtual camera in the second virtual space 2711A. In Step S2603, the processor 210A generates the stage object 1532 and arranges the stage object in the second virtual space 2711A. In Step S2604, the processor 210A receives the avatar information on the avatar object 6C and the avatar information on the avatar object 6D from the server 600. In Step S2605, the processor 210A arranges the avatar object 6C and the avatar object 6D in the second virtual space 2711A, based on the received avatar information. The processor 210A also receives pieces of avatar information on other objects 6 and arranges these objects in the second virtual space 2711A. While a number of other avatar objects 6 are able to be arranged in the second virtual space 2711A, FIG. 27A only includes one avatar for simplicity of description. These other avatar objects 6 will not be mentioned hereinafter.

In Step S2606, the processor 210A, serving as the avatar object control module 1424, causes the avatar object 6A to enter the second virtual space 2711A. Specifically, the processor 210A arranges the avatar object 6A, having been removed from the first virtual space 2411A, in the second virtual space 2711A. In this manner, causing the avatar object 6A to enter the second virtual space 2711A is synonymous with arranging the avatar object 6A in the second virtual space 2711A. Although not shown, the processor 210A generates the avatar information on the avatar object 6A at any desired timing and transmits the avatar information to the server 600.

In Step S2607, the processor 210A, serving as the virtual object generation module 1421, generates a tag object 2733A and associates the tag object with the avatar object 6A. Specifically, the processor 210A arranges the tag object 2733A at the virtual left hand 1531LA of the avatar object 6A. The tag object 2733A is a type of virtual objects. The tag object 2733A is a virtual object for managing charging information indicating a charged amount to be charged to the user 5A viewing a live performance in the second virtual space 2711A.

The processor 210A sets an upper limit for the charged amount chargeable to the user 5A during a live performance (hereinafter referred to as upper-limit charged amount). The processor 210A further registers upper-limit charging information indicating the set upper-limit charged amount with the tag object 2733A. The processor 210A may arrange the tag object 2733A at the virtual left hand 1531LA, receive input of the upper-limit charged amount made by the user 5A, and set the input upper-limit charged amount, for example. When the user 5B registers user information in the HMD system 100, the processor 210A may set the upper-limit charged amount in advance, based on credit card information and the like contained in the user information, for example. The processor 210A may calculate the upper-limit charged amount, based on the past charged amount of the user when the user 5A viewed a live performance in the past, for example. The processor 210A registers the upper-limit charging information indicating the set upper-limit charged amount with the tag object 2733A.

In FIG. 27A, the avatar object 6B is not arranged in the second virtual space 2711A. In other words, a live performance made by the avatar object 6B has not started in the second virtual space 2711A. In Step S2608, the processor 210A, serving as the virtual camera control module 1422, determines the position and the inclination of the virtual camera 14A in the second virtual space 2711A in accordance with the motion of the HMD 120A. This processing is basically the same as the processing in Step S2305, and the detailed description will not be repeated for the sake of brevity. In Step S2609, the processor 210A causes the monitor 130A to display the field-of-view image 17A. This processing is basically the same as the processing in Step S2306, and the detailed description will not be repeated for the sake of brevity.

Figure 27B:
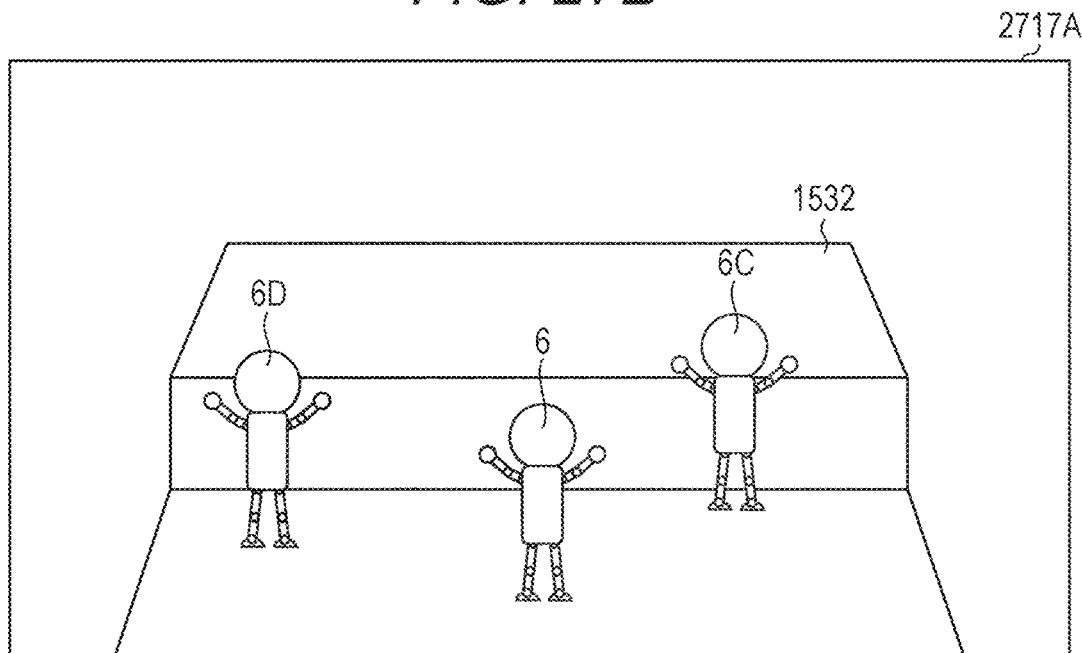
FIG. 27B A diagram of a field-of-view image according to at least one embodiment of this disclosure.

The processor 210A causes the monitor 130A to display the field-of-view image 2717A corresponding to the second virtual space 2711A in FIG. 27A, as in FIG. 27B, for example. This enables the user 5A to recognize that the avatar object 6A has entered the second virtual space 2711A, by visually checking the field-of-view image 2717A. This also enables the user 5A to recognize that the live performance made by the avatar object 6B has not started because the avatar object 6B is not arranged on the stage object 1532.

Figure 28A:
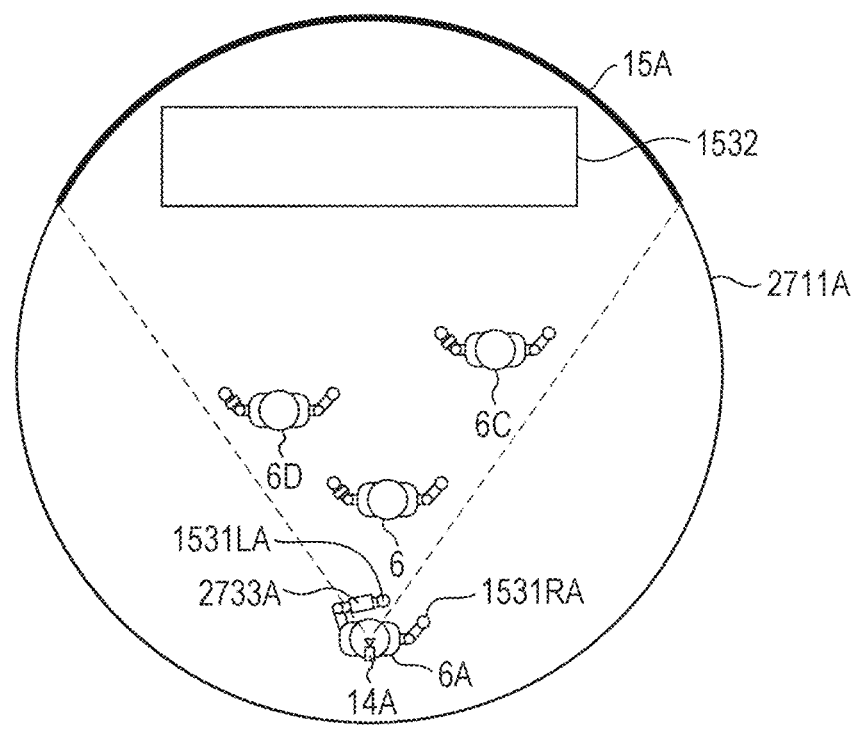
FIG. 28A A diagram of a virtual space according to at least one embodiment of this disclosure.

FIG. 28A is a diagram of the second virtual space 2711A and a field-of-view image 2817A according to at least one embodiment of this disclosure. In Step S2610, the processor 210A, serving as the charging processing module 1428, registers charging information indicating an admission fee to the first venue corresponding to the second virtual space 2711A with the tag object 2733A. The admission fee to the first venue is a charged amount charged to the user 5A for viewing a live performance in the second virtual space 2711A. The registered charging information may be referred to as charging information in accordance with an action of the avatar object 6A entering the second virtual space 2711A. The processor 210A visualizes the charging information, registered with the tag object 2733A, on the tag object 2733A. Specifically, the processor 210A provides a display, on the surface of the tag object 2733A, of a total of charged amounts indicated by pieces of registered charging information (hereinafter referred to as total charged amount). In FIG. 28A, a single piece of charging information is registered with the tag object 2733A. In this case, the processor 210A simply provides a display, on the tag object 2733A, of the charged amount (500 yen) indicated by the registered charging information as the total charged amount. The processor 210A further provides a display, on the tag object 2733A, of the upper-limit charged amount (30,000 yen) indicated by the upper-limit charging information.

Figure 28B:
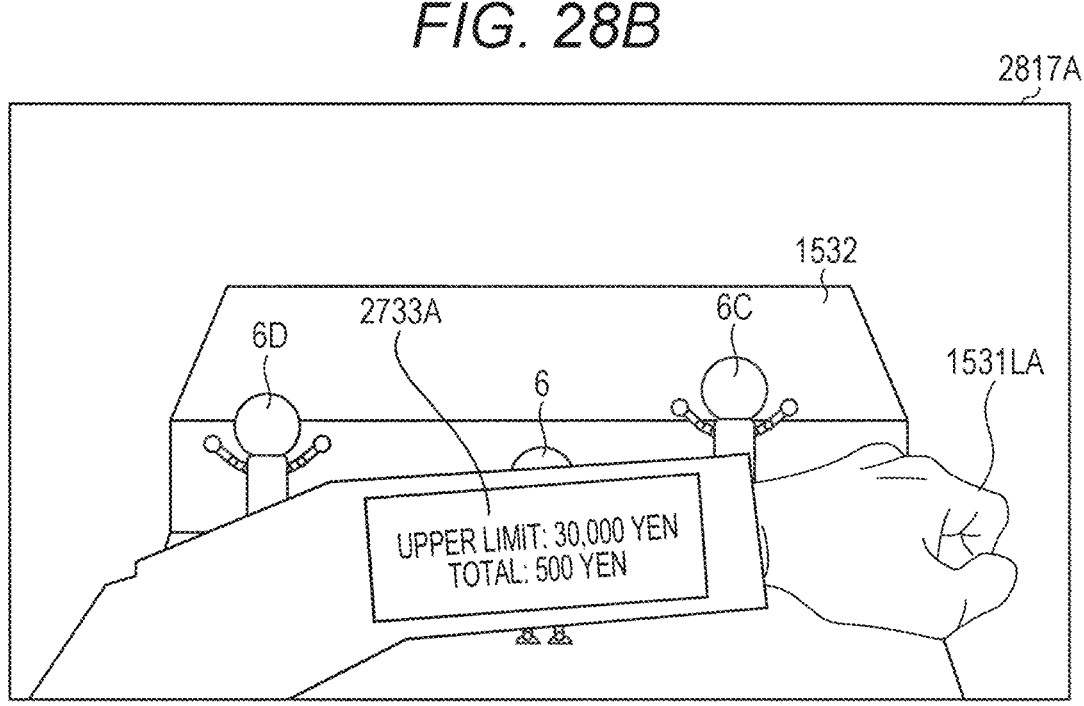
FIG. 28B A diagram of a field-of-view image according to at least one embodiment of this disclosure.

After the charging information is registered, the user 5A moves the left hand to be within his/her field of view as if the user is checking the time on his/her watch. The processor 210A detects the motion of the left hand of the user 5A, based on the output from the left controller 300LA. The processor 210A moves the virtual left hand 1531LA to be within the field-of-view region 15A as in FIG. 28A, in accordance with the motion of the left hand of the user 5A. The processor 210A causes the monitor 130A to display the field-of-view image 2817A corresponding to the second virtual space 2711A in FIG. 28A, as in FIG. 28B, for example. This enables the user 5A to check the upper-limit charged amount and the total charged amount displayed on the tag object 2733A, by visually checking the field-of-view image 2817A. In at least one embodiment of FIG. 28B, the user recognizes that the upper-limit charged amount is 30,000 yen and the current total charged amount is 500 yen. In other words, the user 5A figures out that an admission fee of 500 yen is charged to the user 5A as a result of the avatar object's 6A entrance to the second virtual space 2711A.

Figure 29A:
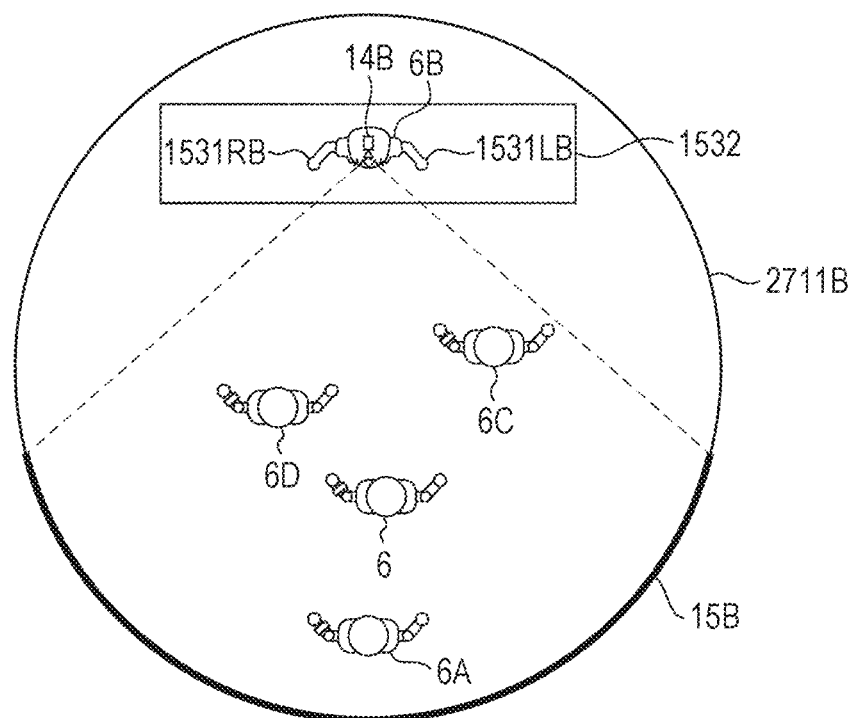
FIG. 29A A diagram of a virtual space according to at least one embodiment of this disclosure.

FIG. 29A is a diagram of a second virtual space 2711B and a field-of-view image 2917B according to at least one embodiment of this disclosure. After the avatar object 6A has entered the second virtual space 2711A, the processor 210B defines the second virtual space 2711B in FIG. 29A. The second virtual space 2711B is a virtual space provided to the user 5B and synchronized with the second virtual space 2711A. The second virtual space 2711B is also a virtual space in which the avatar object 6B carries out a performance. The processor 210B arranges the virtual camera 14B, the avatar object 6B, and the stage object 1532 in the second virtual space 2711B. The processor 210B receives the avatar information on the avatar object 6A, the avatar information on the avatar object 6C, and the avatar information on the avatar object 6D from the server 600 and arranges the avatar objects 6A, 6C, and 6D in the second virtual space 2711B based on the pieces of avatar information.

Figure 29B:
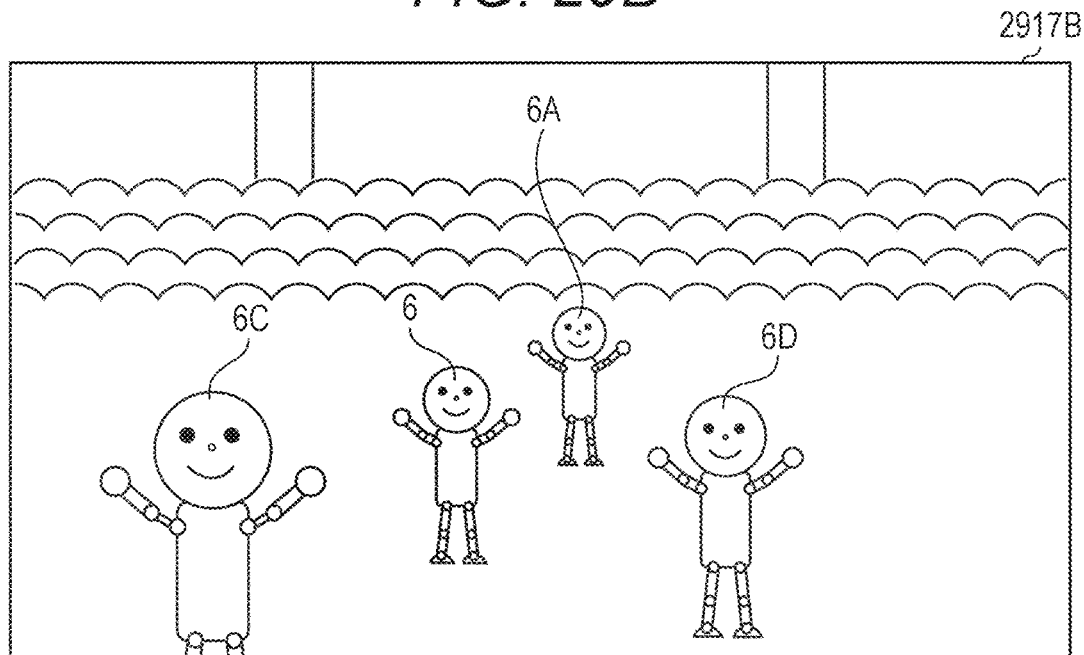
FIG. 29B A diagram of a field-of-view image according to at least one embodiment of this disclosure.

The processor 210B causes the monitor 130B to display the field-of-view image 2917B corresponding to the second virtual space 2711B in FIG. 29A, as in FIG. 29B, for example. This enables the user 5B to recognize that the avatar objects 6A, 6C, and 6D, which are viewers of the live performance, are in front of the stage object 1532, by visually checking the field-of-view image 2917B. After the avatar object 6B is arranged on the stage object 1532, a live performance made by the avatar object 6B starts. Subsequently, the user 5B moves his/her body, makes a sound or voice, or operates the right controller 300RB and the left controller 300LB, thereby advancing the live performance made by the avatar object 6B in the second virtual space 2711B. The processor 210B transmits the avatar information containing the motion information on the avatar object 6B to the server 600 in a real-time manner during the live performance.

Figure 30A:
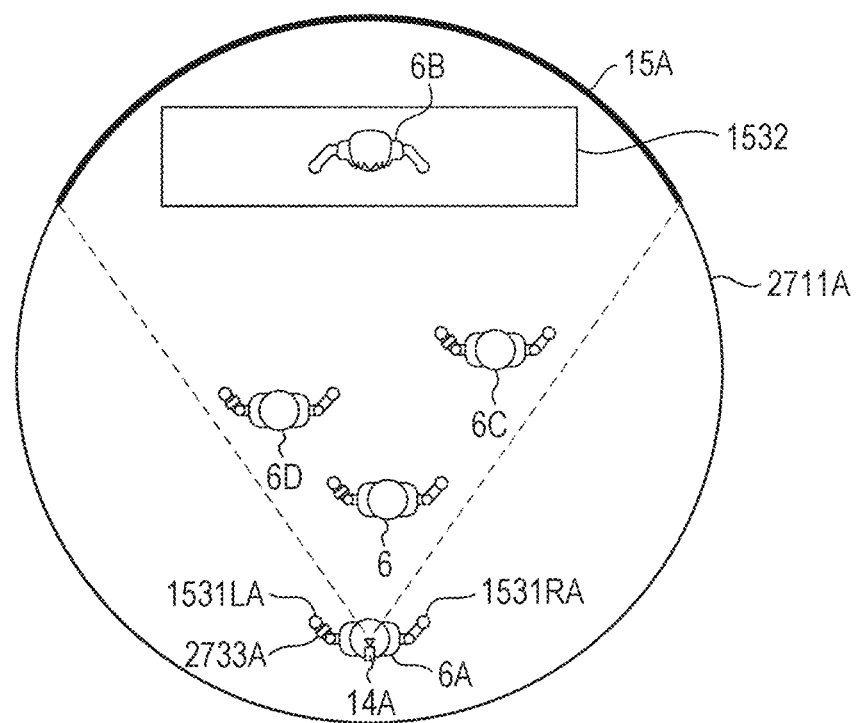
FIG. 30A A diagram of a virtual space according to at least one embodiment of this disclosure.

FIG. 30A is a diagram of the second virtual space 2711A and a field-of-view image 3017A according to at least one embodiment of this disclosure. After the second virtual space 2711B is defined, in Step S2611, the processor 210A receives the avatar information on the avatar object 6B from the server 600 on a real-time basis. In Step S2612, the processor 210A arranges the avatar object 6B in the second virtual space 2711A, as in FIG. 30A, based on the avatar information on the avatar object 6B, which was received first. Specifically, the processor 210A arranges the avatar object 6B on the stage object 1532.

Figure 30B:
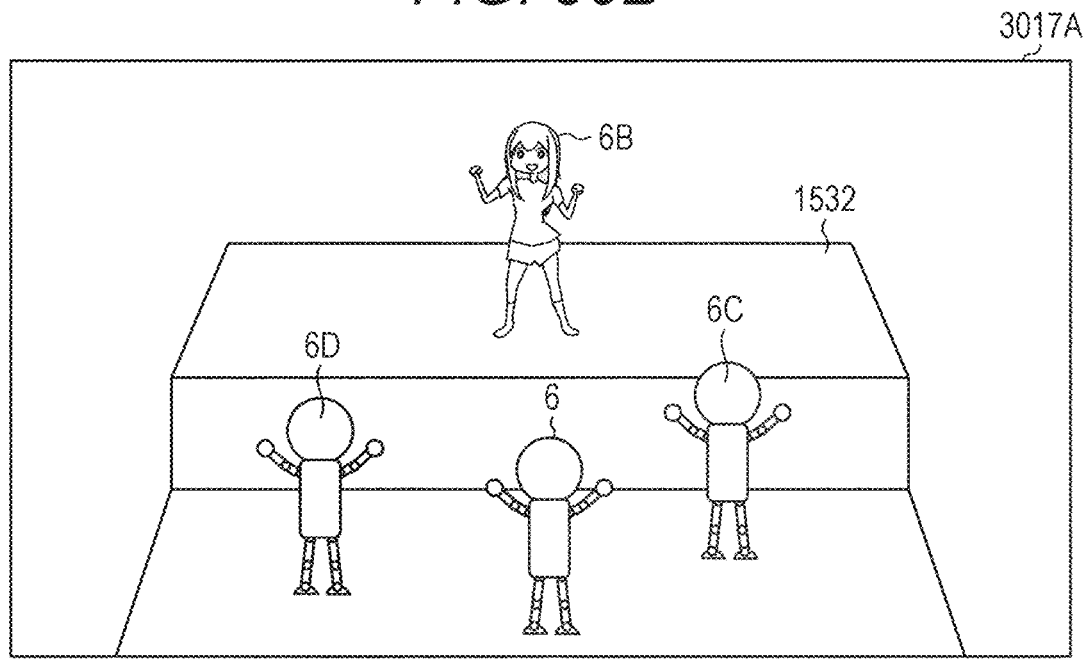
FIG. 30B A diagram of a field-of-view image according to at least one embodiment of this disclosure.

The processor 210A causes the monitor 130A to display the field-of-view image 3017A corresponding to the second virtual space 2711A in FIG. 30A, as in FIG. 30B, for example. This enables the user 5A to recognize that the avatar object 6B, which is a live performer, has appeared on the stage object 1532, by visually checking the field-of-view image 3017A. This also enables the user 5B to recognize that the live performance made by the avatar object 6B is about to start.

Figure 31:
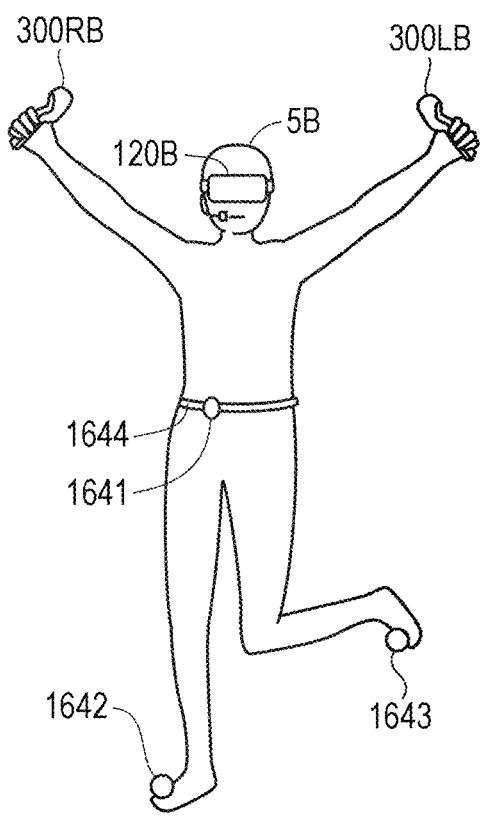
FIG. 31 A diagram of a user's posture according to at least one embodiment of this disclosure.

FIG. 31 is a diagram of the user 5B's posture according to at least one embodiment of this disclosure. After the start of the live performance, the user 5B moves his/her body to take the posture in FIG. 31, for example. The posture in FIG. 31 is a posture corresponding to the first performance. The processor 210B causes the avatar object 6B to carry out the first performance in the second virtual space 2711B in accordance with the motion of the user 5B taking the posture in FIG. 31. The processor 210B transmits the avatar information containing the motion information on the avatar object 6B carrying out the first performance to the server 600 in a real-time manner.

Figure 32A:
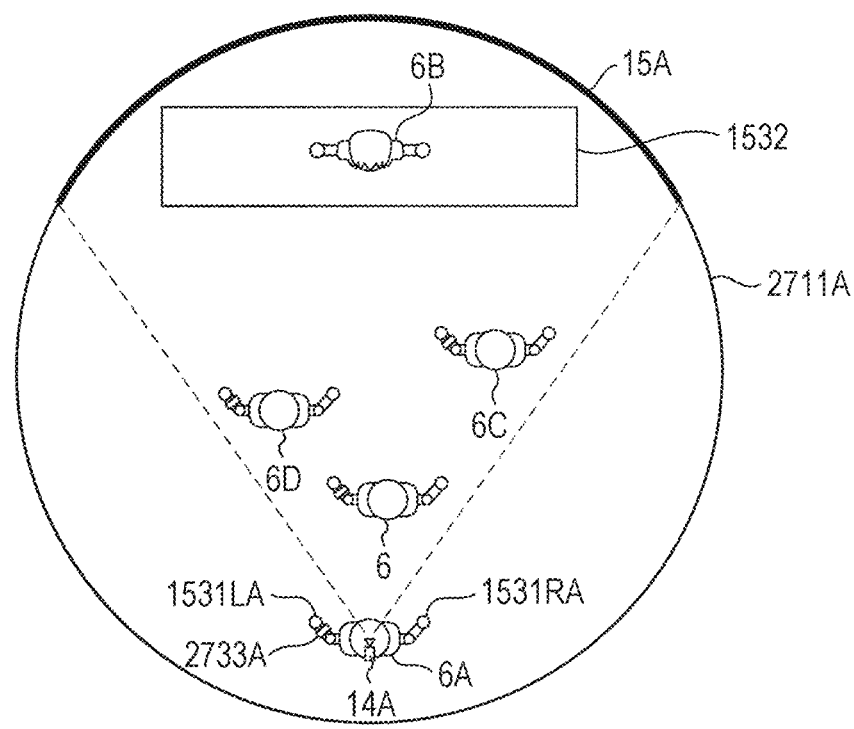
FIG. 32A A diagram of a virtual space according to at least one embodiment of this disclosure.

FIG. 32A is a diagram of the second virtual space 2711A and a field-of-view image 3217A according to at least one embodiment of this disclosure. After the avatar object 6B carried out the first performance in the second virtual space 2711B, in Step S2613, the processor 210A receives the avatar information on the avatar object 6B from the server 600 on a real-time basis. In Step S2614, the processor 210A causes the avatar object 6B to carry out the first performance, based on motion information contained in the received avatar information. This enables the processor 210A to cause the avatar object 6B to carry out the first performance in accordance with the motion of the user 5B in FIG. 31.

In at least one embodiment of FIG. 31, the avatar object 6B is enabled to move to any desired position in the second virtual space 2711A, not limited to the stage object 1532, to carry out the first performance. The avatar object 6A is enabled to view the first performance made by the avatar object 6B at any desired position in the second virtual space 2711A. In this manner, the entire second virtual space 2711A can be regarded as a region (first region) to perform the first performance in the second virtual space 2711A.

Figure 32B:
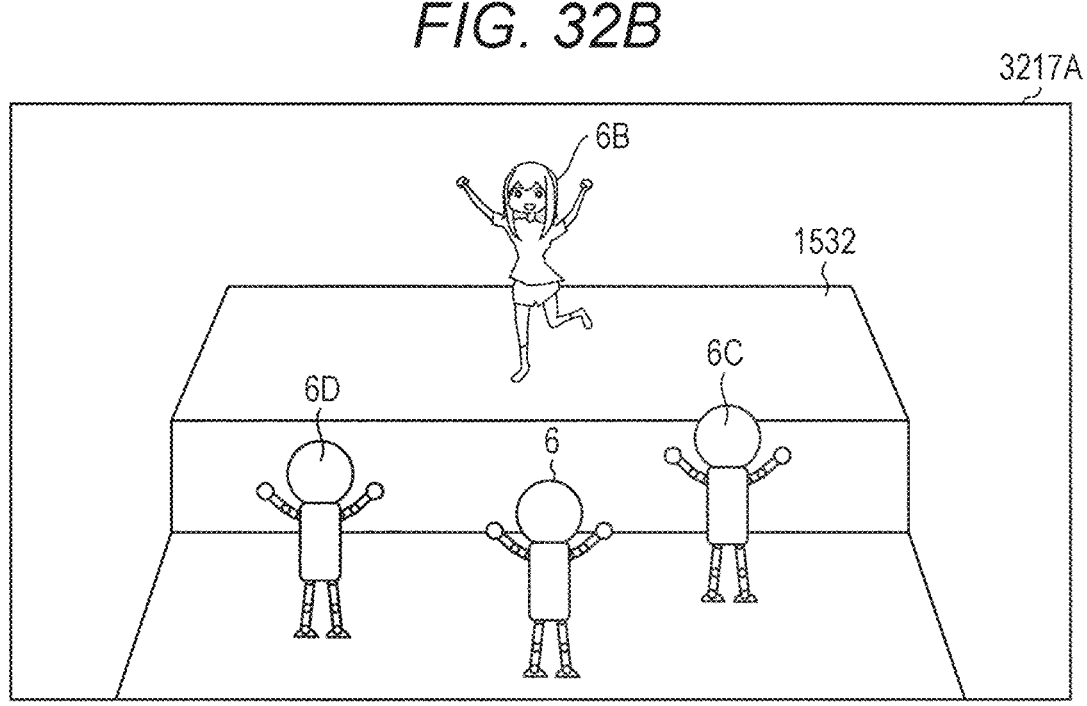
FIG. 32B A diagram of a field-of-view image according to at least one embodiment of this disclosure.

The processor 210A causes the avatar object 6A to view the first performance made by the avatar object 6B in the second virtual space 2711A. The processor 210A causes the monitor 130A to display the field-of-view image 3217A corresponding to the second virtual space 2711A in FIG. 32A, as in FIG. 32B, for example. This enables the user 5A to recognize that the avatar object 6B has carried out the first performance on the stage object 1532, by visually checking the field-of-view image 3217A. This enables the user 5A to enjoy the performance made by the avatar object 6B from the viewpoint of the avatar object 6A.

Figure 33A:
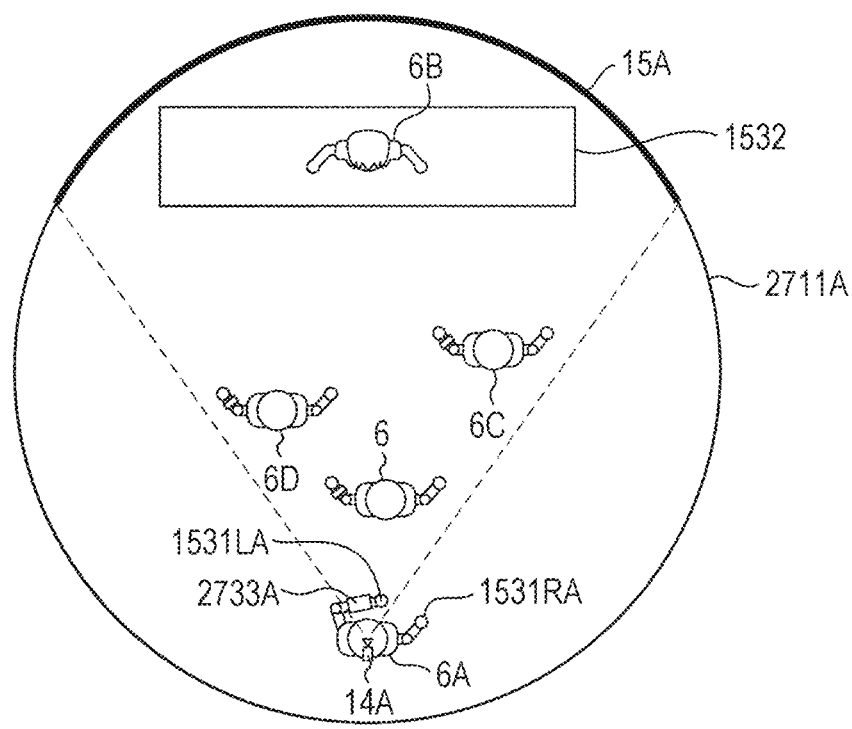
FIG. 33A A diagram of a virtual space according to at least one embodiment of this disclosure.

FIG. 33A is a diagram of the second virtual space 2711A and a field-of-view image 3317A according to at least one embodiment of this disclosure. The processor 210A conveys a message for encouraging the user 5A to purchase a live video recording the live performance made by the avatar object 6B to the user 5A during the live performance. The processor 210A provides a display of the message on the tag object 2733A, for example. The message contains text for encouraging the user 5A to purchase the live video and a charged amount charged to the user 5B to purchase the live video. In at least one embodiment of FIG. 33A, the charged amount for purchasing the live video is 1,000 yen.

A dedicated virtual camera (not illustrated) for shooting a live video purchasable by the user 5A is arranged in the second virtual space 2711A. The processor 210A causes the dedicated virtual camera to shoot a part of the second virtual space 2711A, thereby generating a live video. The processor 210A may move the dedicated virtual camera in the second virtual space 2711A for shooting a live video.

Figure 33B:
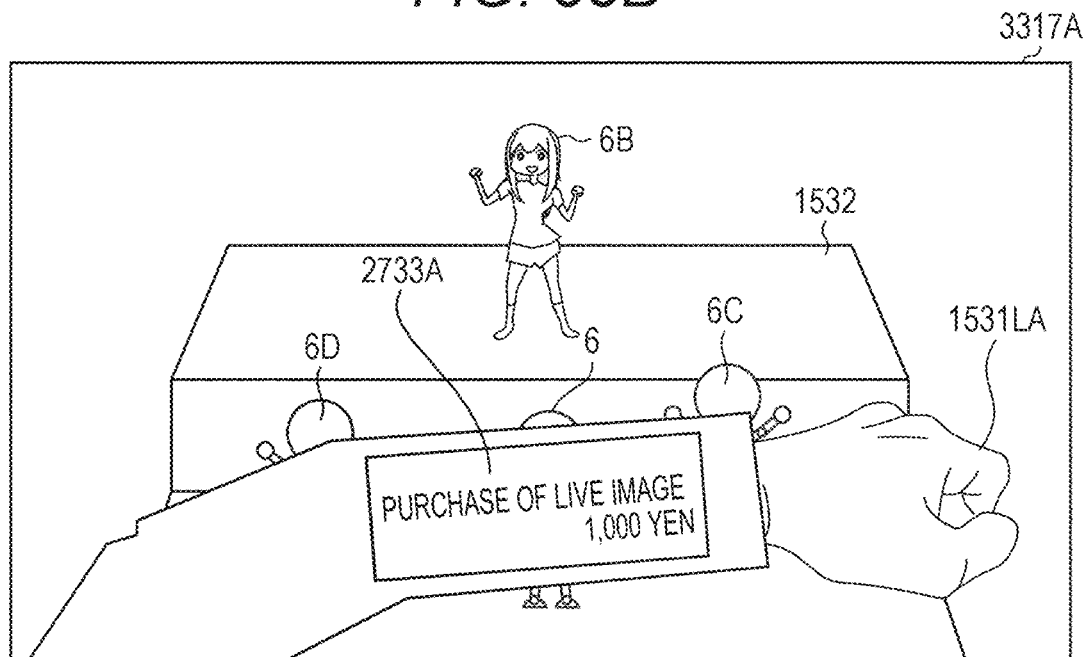
FIG. 33B A diagram of a field-of-view image according to at least one embodiment of this disclosure.

After the message is displayed on the tag object 2733A, the user 5A moves the left hand to be within his/her field of view as if the user is checking the time on his/her watch. The processor 210A moves the virtual left hand 1531LA to be within the field-of-view region 15A as in FIG. 33A, in accordance with the motion of the left hand of the user 5A. The processor 210A causes the monitor 130A to display the field-of-view image 3317A corresponding to the second virtual space 2711A in FIG. 33A, as in FIG. 33B, for example. This enables the user 5A to check the message displayed on the tag object 2733A, by visually checking the field-of-view image 3317A. In this manner, the user 5B recognizes that the live video is purchasable for an additional charged amount of 1,000 yen.

Figure 34A:
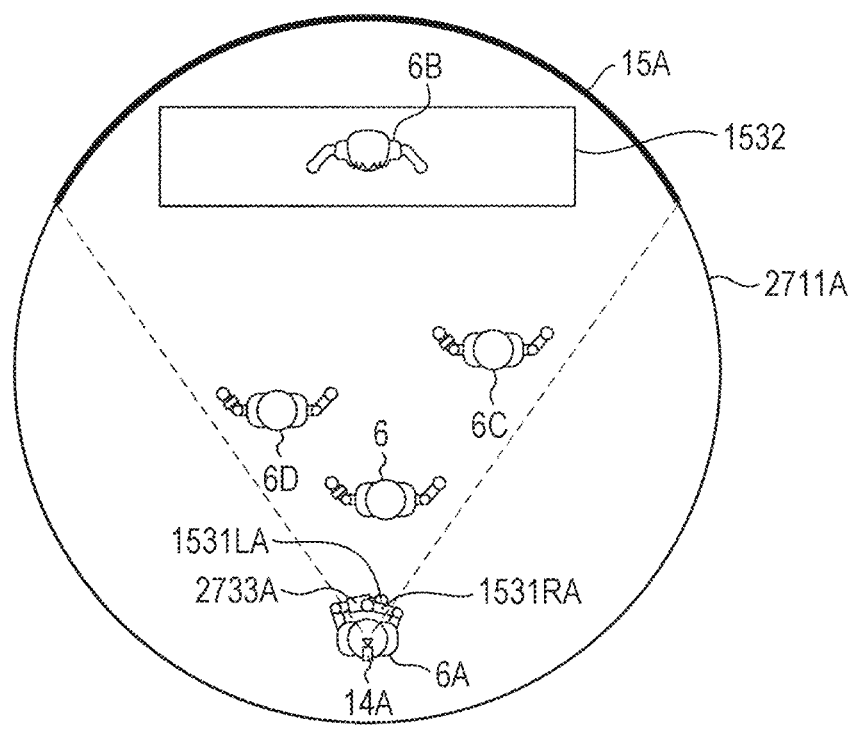
FIG. 34A A diagram of a virtual space according to at least one embodiment of this disclosure.

FIG. 34A is a diagram of the second virtual space 2711A and a field-of-view image 3417A according to at least one embodiment of this disclosure. The user 5A, after checking the message displayed on the tag object 2733A, performs an operation for purchasing the live video. The user 5A moves his/her right hand so as to bring the tip of the virtual right hand 1531RA close to the tag object 2733A. The processor 210A moves the virtual right hand 1531RA in the second virtual space 2711A so as to bring the tip of the virtual right hand 1531RA close to the tag object 2733A, in accordance with the motion of the right hand of the user 5B.

The processor 210A, serving as the collision detection module 1426, detects that the tip of the virtual right hand 1531RA collides with the tag object 2733A when the tip of the virtual right hand 1531RA and the tag object 2733A satisfy a first positional relation. The first positional relation refers to, for example, the distance from the tip of the virtual right hand 1531RA to the tag object 2733A being below a first distance. Alternatively, a collision area defined at the tip of the virtual right hand 1531RA at least partially collides with a collision area defined for the tag object 2733A. The processor 210A detects that the virtual right hand 1531RA has selected the tag object 2733A, based on the fact that the tip of the virtual right hand 1531RA satisfies the first positional relationship with the tag object 2733A. The processor 210A detects an operation made by the user 5A for purchasing the live video, in response to the tag object 2733A, on which the message for encouraging purchase of the live video is displayed, being selected.

Figure 34B:
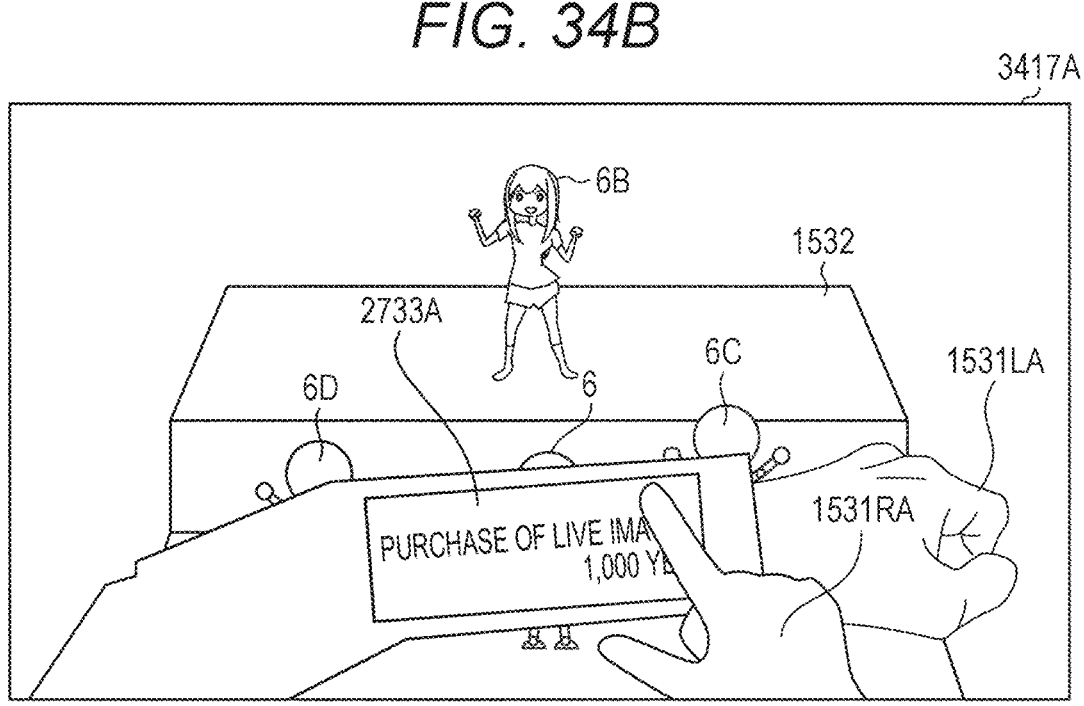
FIG. 34B A diagram of a field-of-view image according to at least one embodiment of this disclosure.

The processor 210A causes the monitor 130A to display the field-of-view image 3417A corresponding to the second virtual space 2711A in FIG. 34A, as in FIG. 34B, for example. This enables the user 5A to recognize that the virtual right hand 1531RA has selected the tag object 2733A displaying the message, by visually checking the field-of-view image 3417A. In at least one embodiment of FIG. 34A, an operation made by the user 5A for purchasing the live video is made on the tag object 2733A, which precludes compromising the user 5A's sense of immersion in the second virtual space 2711A.

Figure 35A:
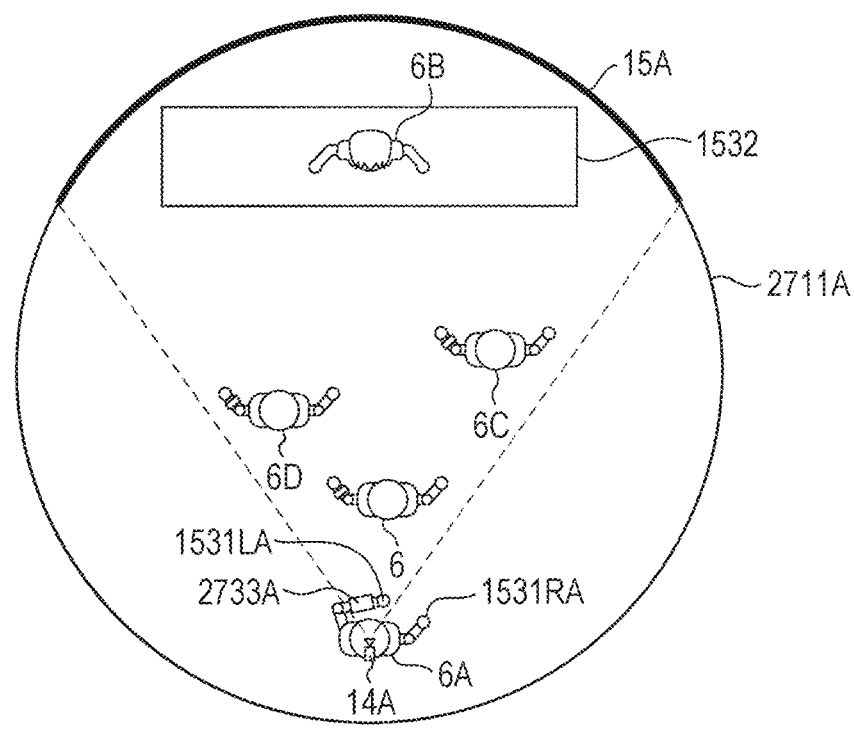
FIG. 35A A diagram of a virtual space according to at least one embodiment of this disclosure.

FIG. 35A is a diagram of the second virtual space 2711A and a field-of-view image 3517A according to at least one embodiment of this disclosure. In Step S2615, the processor 210A, serving as the charging processing module 1428, registers charging information in accordance with an action of the avatar object 6B with the tag object 2733A. The phrase the action of the avatar object 6A herein means an action of the avatar object 6A that involves charging to the user 5B. In at least one embodiment of FIG. 34A, the action that involves charging to the user 5B is selection of the tag object 2733A by the avatar object 6A with the virtual right hand 1531RA. The action that involves charging may be an action that involves charging in additional embodiments, which will be described later. The action that involves charging may be an action of the avatar object 6A leading to purchase of a virtual item (for example, a virtual penlight) that is usable by the user 5A during the live performance. In at least one embodiment of FIG. 34A, the processor 210A additionally registers charging information indicating a charged amount (1,000 yen) required for purchasing the live video with the tag object 2733A.

The processor 210A visualizes the charging information, after being registered, on the tag object 2733A again. Specifically, the processor 210A deletes the display of the message on the tag object 2733A and provides a display of the upper-limit charged amount and the total charged amount on the tag object 2733A. Specifically, the processor 210A calculates the total (1,500 yen) of two charged amounts (500 yen and 1,000 yen) indicated by two pieces of charging information registered with the tag object 2733A and provides a display of the total as a total charged amount on the tag object 2733A. The processor 210A causes the monitor 130A to display the field-of-view image 3517A corresponding to the second virtual space 2711A in FIG.

Figure 35B:
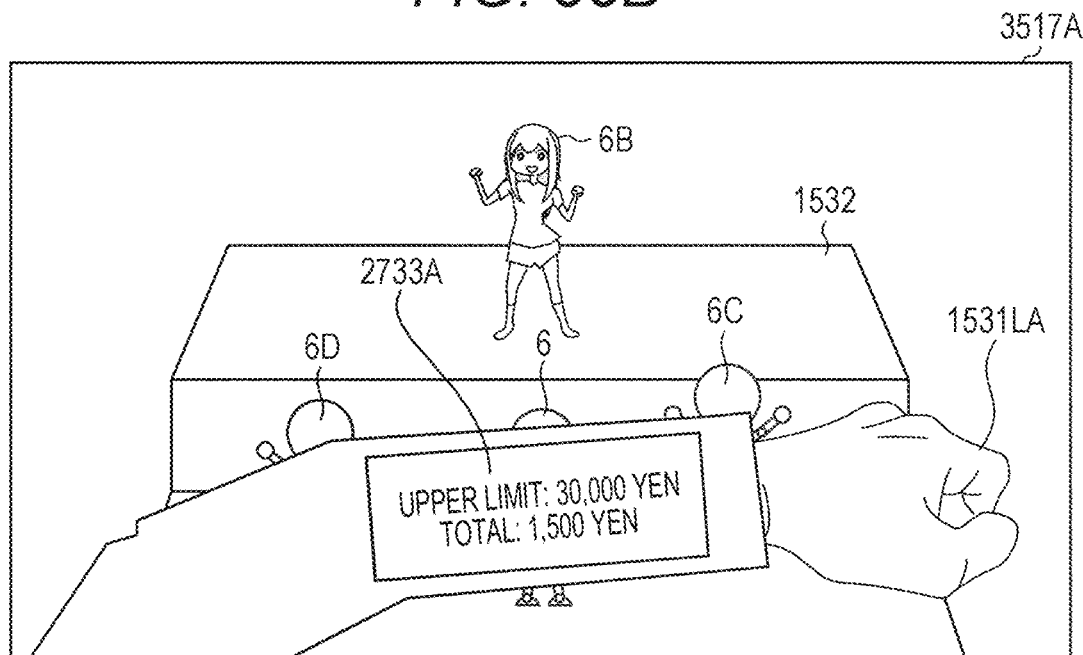
FIG. 35B A diagram of a field-of-view image according to at least one embodiment of this disclosure.

35A, as in FIG. 35B, for example. This enables the user 5A to recognize that the current total charged amount has increased to 1,500 yen as a result of purchase of the live video, by visually checking the field-of-view image 3517A. In this manner, the user 5A may check the total charged amount with a simple operation.

The processor 210A may visualize not only the total charged amount but also a breakdown of the amount on the tag object 2733A. The processor 210A provides a display of charged amounts indicated by a plurality of pieces of charging information registered with the tag object 2733A individually on the tag object 2733A, for example. This enables the user 5A to check the individual charged amounts, by visually checking the tag object 2733A.

The processor 210A may visualize the charging information not only on the tag object 2733A but also directly on the field-of-view image 3517A. The processor 210A may cause the monitor 130A to display a notification UI such as a pop-up superimposed on the field-of-view image 3517A and also provide a display of the total charged amount on this notification UI, for example. The processor 210A may cause the monitor 130A to display a pop-up on the field-of-view image 3517A in association with the tag object 2733A.

After the charging information corresponding to purchase of the live video is registered, every time the avatar object 6A takes an action leading to charging in the second virtual space 2711A, the processor 210A additionally registers charging information corresponding to such an action with the tag object 2733A. Increasing charging information registered with the tag object 2733A increases the total charged amount charged to the user 5A. This enables the user 5B to check the latest total charged amount, by visually checking the tag object 2733A at any desired timing.

Figure 36A:
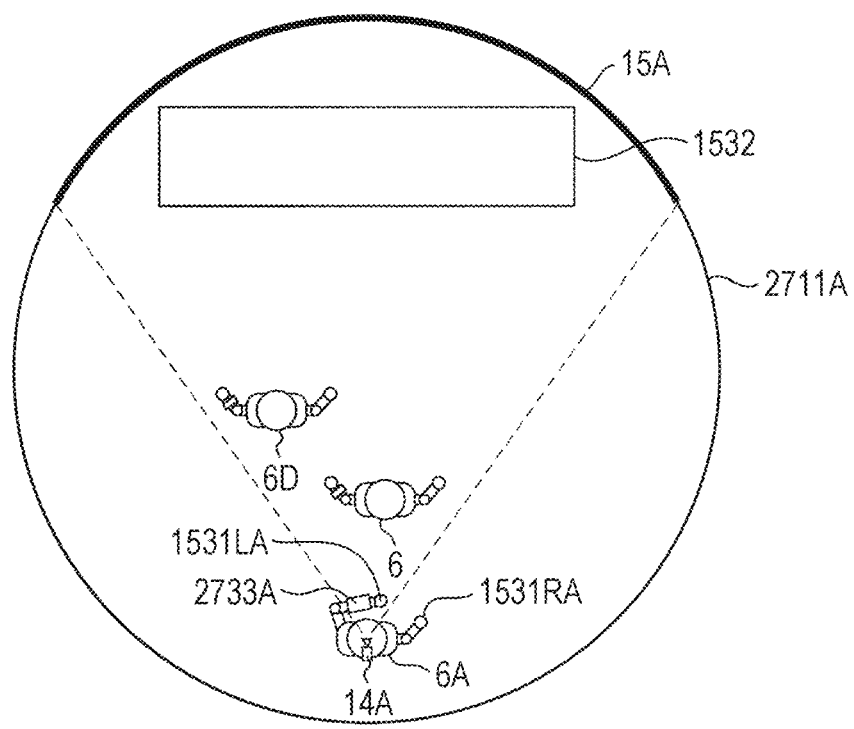
FIG. 36A A diagram of a virtual space according to at least one embodiment of this disclosure.

FIG. 36A is a diagram of the second virtual space 2711A and a field-of-view image 3617A according to at least one embodiment of this disclosure. In FIG. 36A, the live performance in the second virtual space 2711A has finished. Following the end of the live performance, the avatar objects 6B and 6C have been removed from the second virtual space 2711A. The avatar objects 6A and 6D remain in the second virtual space 2711A after the end of the live performance. The total charged amount charged to the user 5B is assumed to be 12,000 yen at the end of the live performance. In other words, the total charged amount indicated by pieces of charging information registered with the tag object 2733A is 12,000 yen.

Figure 36B:
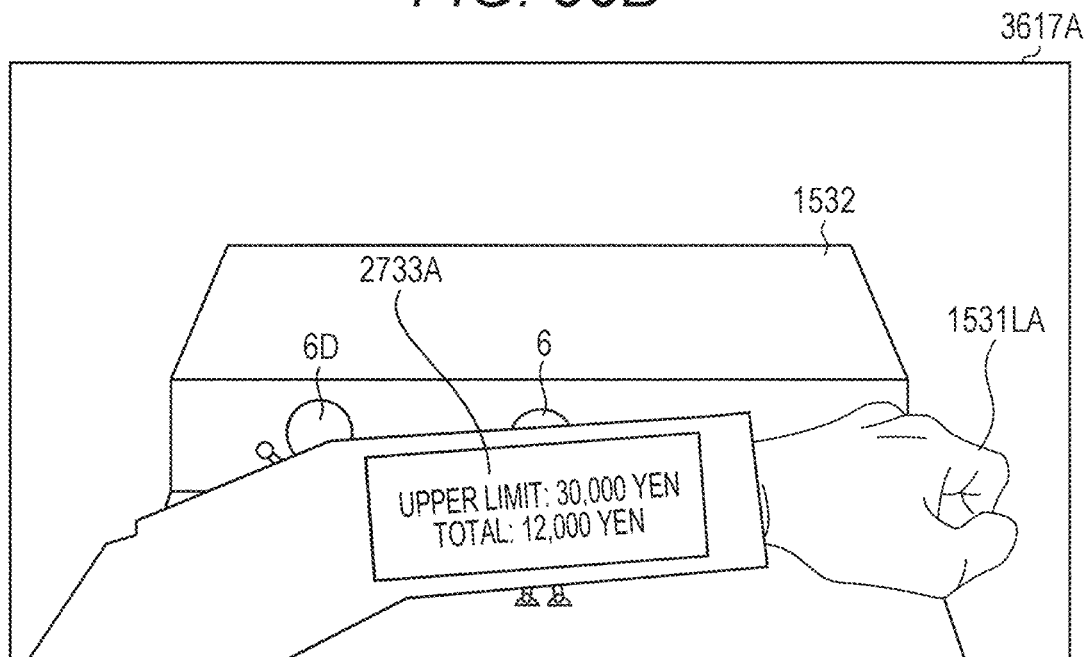
FIG. 36B A diagram of a field-of-view image according to at least one embodiment of this disclosure.

The processor 210A causes the monitor 130A to display the field-of-view image 3617A corresponding to the second virtual space 2711A in FIG. 36A, as in FIG. 36B, for example. This enables the user 5A to recognize that the live performance has finished, by visually checking the field-of-view image 3617A. This also enables the user 5B to recognize that the total charged amount charged to the user 5A is 12,000 yen.

After checking the total charged amount at the end of the live performance, the user 5A performs an operation for removing the avatar object 6A from the second virtual space 2711A. This operation is, for example, pressing any button on the right controller 300RA by the user 5A. In Step S2616, upon detection of such an operation made by the user 5A for removing the avatar object 6A, the processor 210A removes the avatar object 6A from the second virtual space 2711A. The processor 210A thus terminates the provision of the second virtual space 2711A to the user 5A.

Figure 37A:
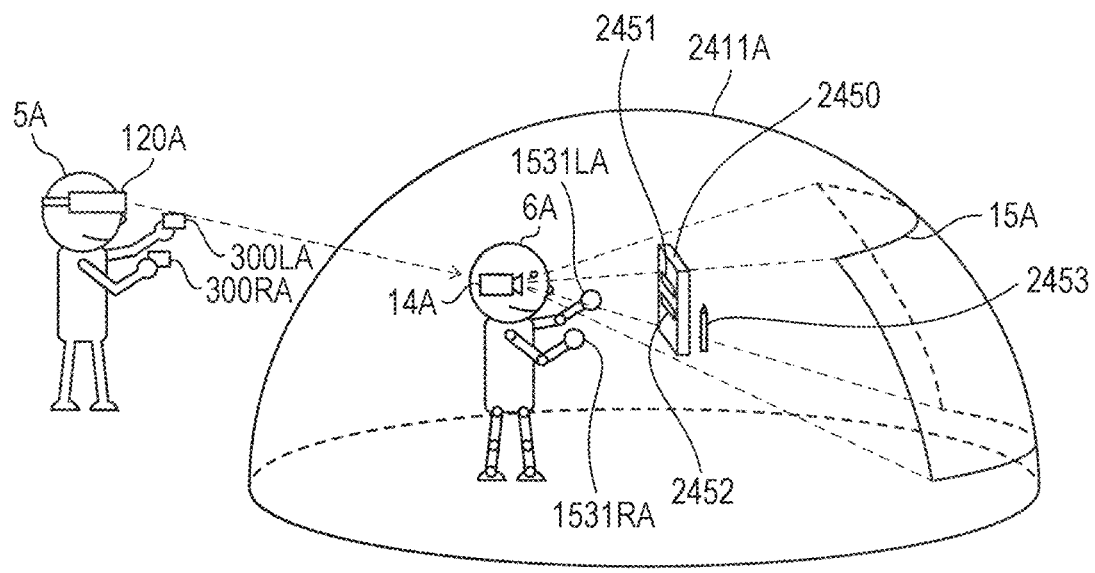
FIG. 37A A diagram of a virtual space according to at least one embodiment of this disclosure.

FIG. 37A is a diagram of the first virtual space 2411A and a field-of-view image 3717A according to at least one embodiment of this disclosure. In Step S2617, the processor 210A causes the avatar object 6A, which has been removed from the second virtual space 2711A, to enter the first virtual space 2411A again as in FIG. 37A. In other words, the processor 210A arranges the avatar object 6A in the first virtual space 2411A again. In this process, the processor 210A cancels association of the tag object 2733A with the avatar object 6A. In other words, the processor 210A does not arrange the tag object 2733A on the virtual left hand 1531LA in the first virtual space 2411A.

In Step S2618, the processor 210A, serving as the settlement processing module 1429, performs settlement-related processing in accordance with the charging information registered with the tag object 2733A. The processor 210A notifies the server 600 of a total of charged amounts indicated by the pieces of registered charging information, for example. The server 600 settles the total charged amount notified thereto. The server 600 performs credit card settlement of the total charged amount in accordance with the credit card information on the user 5A registered in the HMD system 100, for example. The credit card issuer sends an invoice of 12,000 yen, charged to the user 5A, to the user 5A at a later date. A server other than the server 600 may settle the total charged amount charged to the user 5A. The processor 210A may settle the total charged amount charged to the user 5A.

Figure 37B:
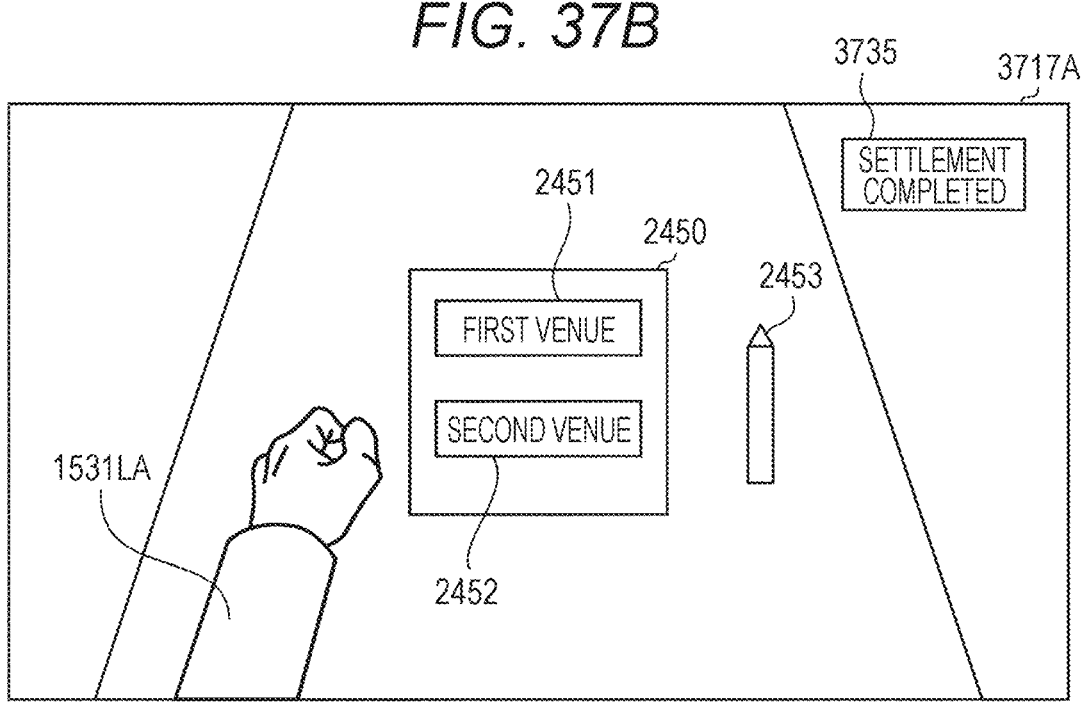
FIG. 37B A diagram of a field-of-view image according to at least one embodiment of this disclosure.

The processor 210A causes the monitor 130A to display the field-of-view image 3717A corresponding to the first virtual space 2411A in FIG. 37A, as in FIG. 37B, for example. The server 600 notifies the computer 200A that the settlement has completed. Upon the notification of the completion of the settlement from the server 600, the processor 210A notifies the user 5A of the completion of the settlement on the field-of-view image 3717A. The processor 210A causes the monitor 130A to display a notification image 3735 containing a message showing the completion of the settlement in a superimposed manner on the field-of-view image 3717A, for example. The processor 210A may arrange a virtual object having the same appearance as the notification image 3735 at any desired position in the field-of-view region 15A in the second virtual space 2711A. Alternatively, the processor 210A may contain the notification image 3735 at any desired position in the field-of-view image 3717A, in generating the field-of-view image 3717A. This enables the user 5B to recognize that the avatar object 6A has been arranged in the first virtual space 2411A again after the end of the live performance, by visually checking the field-of-view image 3717A. This also enables the user 5A to figure out that the settlement of the charged amount charged to the user 5A during the live performance has completed, by visually checking the field-of-view image 3735. This also enables the user 5A to recognize that the charged amount charged to the user 5A in accordance with the action of the avatar object 6A in the first virtual space 2411A will not increase any further because no tag object 2733A is arranged at the virtual left hand 7131LB in the first virtual space 2411A.

After the avatar object 6A has been moved to the first virtual space 2411A, the processor 210A may leave the tag object 2733A on the avatar object 6A. In this case, after completion of the settlement, the processor 210A provides a display of a message notifying the user 5A of the completion of the settlement on the tag object 2733A. The processor 210A further provides a display of an "Approve" button on the tag object 2733A. The processor 210A cancels association of the tag object 2733A with the avatar object 6A if the avatar object 6A presses down the "Approve" button. In response to this, the tag object 2733A is removed from the avatar object 6A. This prevents the user 5A from visually checking the tag object 2733A even if the user moves the virtual left hand 1531LA to be within the field-of-view region 15A.

After the end of the live performance, the processor 210B sums up the total charged amount charged to the users 5, who are viewers, thereby calculating sales of the live performance. The server 600 may calculate the sales and notify the computer 200B of the sales. The processor 210B performs processing for paying a reward in accordance with the sales of the live performance to the user 5B. The processor 210B transmits request information for requesting the server 600 to pay the reward to the server 600 after the end of the live performance, for example. The server 600 pays at least a part of the sales of the live performance to the user 5B, as the reward, in accordance with the received request information after the completion of the settlement with the users 5. This enables the server 600 to pay the reward to the user 5B every time a live performance has finished. Alternatively, the server 600 may pay a reward in accordance with a total of sales of live performances made during a certain period of time (for example, one month) collectively to the user 5B after the certain period of time has elapsed. The processor 210B, instead of the server 600, may pay a reward in accordance with the sales to the user 5B.

As described above, the processor 210A automatically registers charging information corresponding to actions of the avatar object 6A in the second virtual space 2711A in association with the avatar object 6A. The HMD system 100 may thus provide a preferable charging scheme in the second virtual space 2711A to the user 5A. The processor 210A further automatically registers the charging information with the tag object 2733A, without causing the monitor 130A to display a UI for prompting the user 5A to make a charging-related input in a superimposed manner on the field-of-view image 17A. This precludes compromising the user 5A's sense of immersion in the second virtual space 2711A while the charging-related processing is being performed.

The processor 210A further automatically performs settlement-related processing once the avatar object 6A is removed from the second virtual space 2711A. The HMD system 100 may thus provide a preferable settlement scheme in the second virtual space 2711A to the user 5A. The processor 210A further automatically performs the settlement-related processing, without causing the monitor 130A to display a UI for prompting the user 5A to make a settlement-related input in a superimposed manner on the field-of-view image 17A. This precludes compromising the user 5A's sense of immersion in the first virtual space 2411A while the settlement-related processing is being performed.

The processor 210A further automatically performs the settlement-related processing, without causing the user 5A to use a credit card or a virtual object (virtual currency) for settlement that resembles cash. This eliminates a burden on the user 5A while the settlement-related processing is being performed.

Figure 38A:
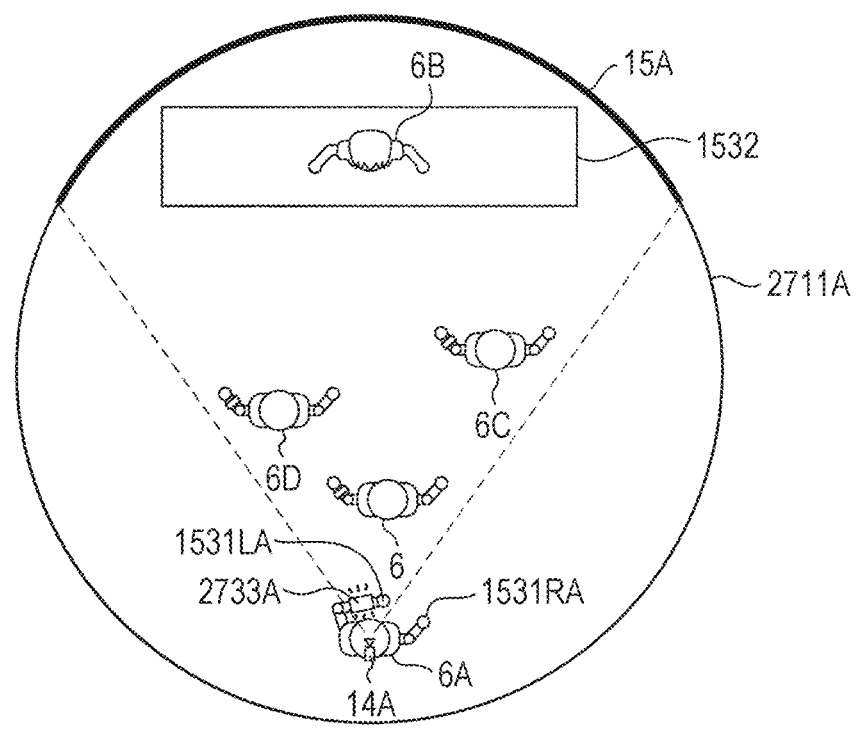
FIG. 38A A diagram of a virtual space according to at least one embodiment of this disclosure.

FIG. 38A is a diagram of the second virtual space 2711A and a field-of-view image 3817A according to at least one embodiment of this disclosure. In at least one embodiment of FIG. 38A, the total charged amount is 25,000 yen and exceeds a certain percentage of the upper-limit charged amount. The certain percentage is 70% of the upper-limit charged amount (i.e., 21,000 yen), for example. The processor 210A gives the user 5B a warning indicating that the total charged amount exceeds the certain percentage of the upper-limit charged amount. The processor 210A gives the user 5B a warning by emitting light from the tag object 2733A as in FIG. 38A, for example.

Figure 38B:
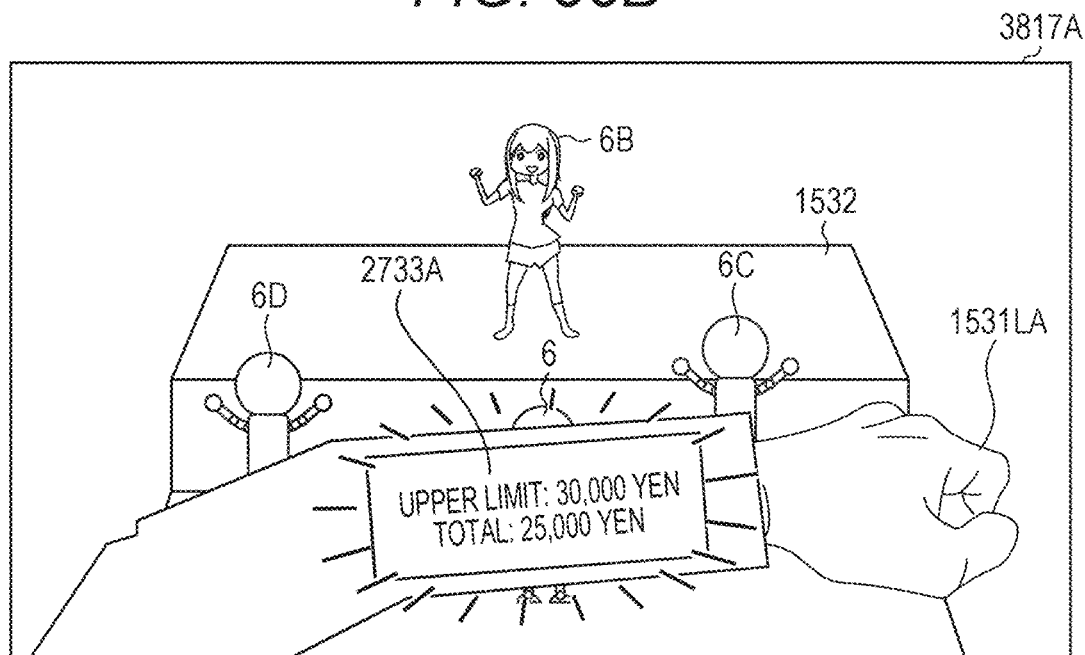
FIG. 38B A diagram of a field-of-view image according to at least one embodiment of this disclosure.

The processor 210A causes the monitor 130A to display the field-of-view image 3817A corresponding to the second virtual space 2711A in FIG. 38A, as in FIG. 38B, for example. This enables the user 5A to recognize that the current total charged amount is 25,000 yen, by visually checking the field-of-view image 3817A. This also enables the user 5A to recognize that the warning is given indicating that the total charged amount is close to the upper-limit charged amount, by visually checking the light emitted from the tag object 2733A. This may prevent the user 5A from accumulating the total charged amount in excess of the upper-limit charged amount inadvertently.

After giving the user 5A the warning, the processor 210A may increase the upper-limit charged amount in accordance with an operation made by the user 5A. The user 5A operates the virtual right hand 1531RA, thereby entering a new upper-limit charged amount in the tag object 2733A, for example. The processor 210A detects the new upper-limit charged amount thus entered. The processor 210A updates the upper-limit charged amount indicated by the upper-limit charging information registered with the tag object 2733A to reflect the new upper-limit charged amount thus detected.

Figure 39A:
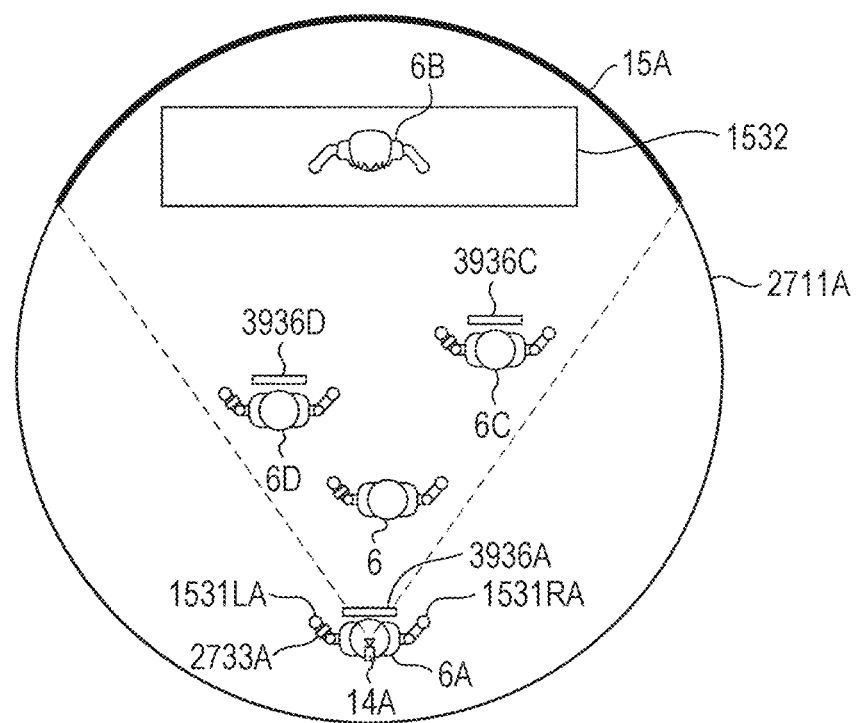
FIG. 39A A diagram of a virtual space according to at least one embodiment of this disclosure.

FIG. 39A is a diagram of the second virtual space 2711A and a field-of-view image 3917A according to at least one embodiment of this disclosure. In at least one embodiment of FIG. 39A, the processor 210A controls the appearance of the second virtual space 2711A in accordance with the total charged amount. Specifically, the processor 210A arranges a monitor object 3936A for notifying the user 5A of the total charged amount in the second virtual space 2711A in association with the avatar object 6A. The processor 210A further generates total charging information indicating the total charged amount and transmits the information to the server 600 periodically. The total charging information is hereinafter referred to as total charging information on the avatar object 6A.

A tag object 2733C is arranged at a virtual left hand 1531LC of the avatar object 6C in a second virtual space 2711C (not illustrated). Pieces of charging information indicating respective charged amounts charged to the user 5C are registered with the tag object 2733C. The processor 210C calculates a total of charged amounts indicated by the pieces of charging information registered with the tag object 2733C. The processor 210C further generates total charging information indicating the total charged amount and transmits the information to the server 600 periodically. The total charging information is hereinafter referred to as total charging information on the avatar object 6C.

A tag object 2733D is arranged at a virtual left hand 1531LD of the avatar object 6D in a second virtual space 2711D (not illustrated). Pieces of charging information indicating respective charged amounts charged to the user 5D are registered with the tag object 2733D. The processor 210D calculates the total charged amount indicated by the pieces of charging information registered with the tag object 2733D. The processor 210D further generates total charging information indicating the total charged amount and transmits the information to the server 600 periodically. The total charging information is hereinafter referred to as total charging information on the avatar object 6D.

The processor 210A receives the total charging information on the avatar object 6C and the total charging information on the avatar object 6D from the server 600. The processor 210A controls the appearance of the avatar object 6C in the second virtual space 2711A in accordance with the total charged amount indicated by the total charging information on the avatar object 6C. Specifically, the processor 210A arranges a monitor object 3936C visualizing the total charged amount of the user 5C in the second virtual space 2711A in association with the avatar object 6C.

The processor 210A controls the appearance of the avatar object 6D in the second virtual space 2711A in accordance with the total charged amount indicated by the charging information. The processor 210A controls the appearance of the avatar object 6D in the second virtual space 2711A in accordance with the total charged amount indicated by the total charging information on the avatar object 6D. Specifically, the processor 210A arranges a monitor object 3936D visualizing the total charged amount of the user 5D in the second virtual space 2711A in association with the avatar object 6D.

The monitor objects 3936A to 3936C are respectively placed above the avatar objects 6A to 6C. The processor 210A visualizes the charging information on the avatar object 6A on the monitor object 3936A, thereby controlling the appearance of the avatar object 6A. Specifically, the processor 210A provides a display of the total charged amount of the user 5A on the monitor object 3936A. The processor 210A visualizes the charging information on the avatar object 6C on the monitor object 3936C, thereby controlling the appearance of the avatar object 6C. Specifically, the processor 210A provides a display of the total charged amount of the user 5C on the monitor object 3936C. The processor 210A visualizes the charging information on the avatar object 6D on the monitor object 3936D, thereby controlling the appearance of the avatar object 6D. Specifically, the processor 210D provides a display of the total charged amount of the user 5D on the monitor object 3936D.

Figure 39B:
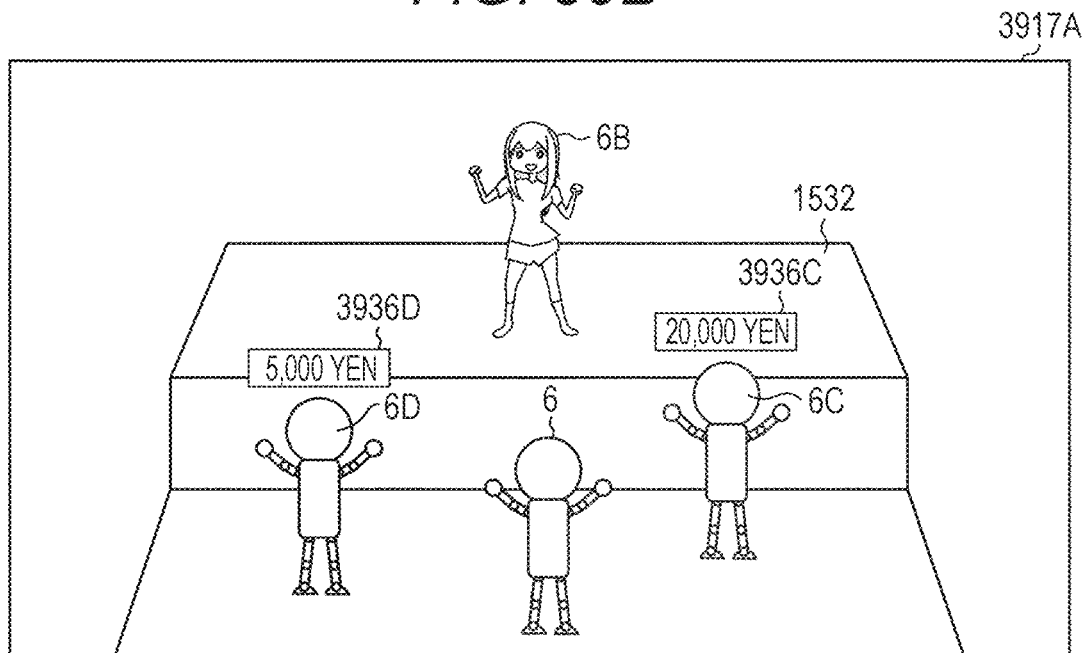
FIG. 39B A diagram of a field-of-view image according to at least one embodiment of this disclosure.

The processor 210A causes the monitor 130A to display the field-of-view image 3917A corresponding to the second virtual space 2711A in FIG. 39A, as in FIG. 39B, for example. This enables the user 5A to recognize that the current total charged amount of the user 5C is 20,000 yen and the current total charged amount of the user 5D is 5,000 yen, by visually checking the field-of-view image 3917A. Since the monitor object 3936A is not arranged in the field-of-view region 15A, the user 5A does not visually recognizes the total charged amount of the user 5A displayed on the monitor object 3936A.

The monitor object 3936A provides a display of the total charged amount of the user 5A, and a larger total charged amount results in a larger amount of money displayed on the monitor object 3936A. A small amount of money displayed on the monitor object 3936A does not attract much attention from the users 5B to 5D. The avatar object 6A associated with the monitor object 3936A thus does not stand out from the other users 5B to 5D very much. A larger amount of money displayed on the monitor object 3936A attracts more attention from the users 5B to 5D. The avatar object 6A associated with the monitor object 3936A thus stands out from the other users 5B to 5D. In this manner, the processor 210A may provide a display of the total charged amount of the user 5A on the monitor object 3936A, thereby making the appearance of the avatar object 6A with a larger total charged amount further stand out.

In the field-of-view image 3917A, the total charged amount of the user 5C (20,000 yen) displayed in association with the avatar object 6C is larger than the total charged amount of the user 5D (5,000 yen) displayed in association with the avatar object 6D. This enables the user 5A to recognize that the appearance of the avatar object 6C stands out from the appearance of the avatar object 6D, by visually checking the field-of-view image 3917A.

Figure 40A:
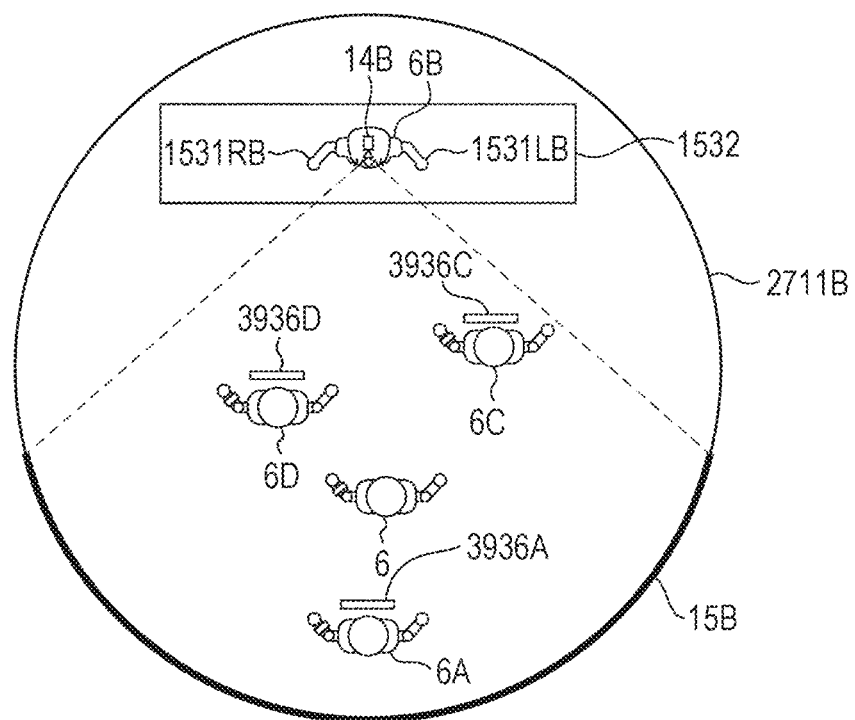
FIG. 40A A diagram of a virtual space according to at least one embodiment of this disclosure.

FIG. 40A is a diagram of the second virtual space 2711B and a field-of-view image 4017B according to at least one embodiment of this disclosure. The server 600 transmits the pieces of received total charging information on the avatar objects 6A, 6C, and 6D to the computer 200B through synchronous processing. The processor 210B receives the pieces of total charging information on the avatar objects 6A, 6C, and 6D transmitted from the server 600. The processor 210B controls the appearances of the avatar objects 6A, 6C, and 6D in accordance with the pieces of received total charging information on the avatar objects 6A, 6C, and 6D. The control on the appearances in this context is the same as the control on the appearances of the avatar objects 6A, 6C, and 6D in the second virtual space 2711A in FIG. 39A, detailed description thereof is not repeated for the sake of brevity.

Figure 40B:
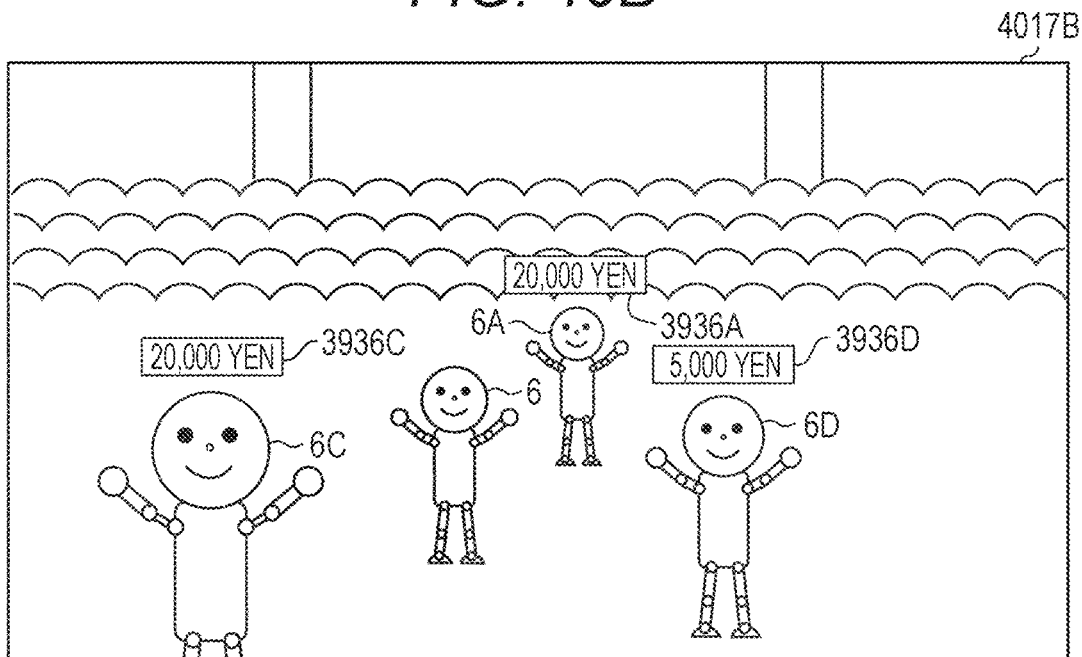
FIG. 40B A diagram of a field-of-view image according to at least one embodiment of this disclosure.

The processor 210B causes the monitor 130B to display the field-of-view image 4017B corresponding to the second virtual space 2711B in FIG. 40A, as in FIG. 40B, for example. This enables the user 5B to recognize that the current total charged amount of the user 5A is 7,000 yen, the current total charged amount of the user 5C is 20,000 yen, and the current total charged amount of the user 5D is 5,000 yen, by visually checking the field-of-view image 4017B. From the viewpoint of the user 5B, the appearance of the avatar object 6C corresponding to a larger total charged amount stands out from the appearances of the avatar object 6A corresponding to a smaller total charged amount and of the avatar object 6D associated with the user 5D. In this manner, the user 5C may call the user's 5B attention to the fact that the total charged amount of the user 5C is larger than those of the users 5B and 5D through a change in the appearance of the avatar object 6C.

Figure 41A:
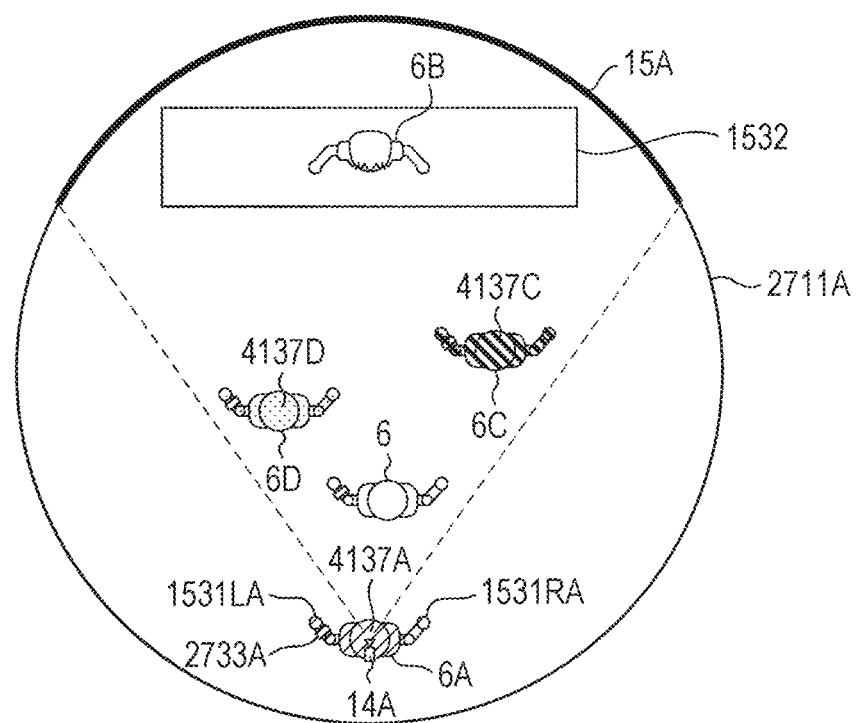
FIG. 41A A diagram of a virtual space according to at least one embodiment of this disclosure.

FIG. 41A is a diagram of the second virtual space 2711A and a field-of-view image 4117A according to at least one embodiment of this disclosure. In the example illustrated in FIG. 41, the processor 210A controls the appearance colors of the avatar objects 6A, 6C, and 6D in accordance with the pieces of charging information on the avatar objects 6A, 6C, and 6D. Specifically, the processor 210A applies textures 4137A, 4137C, and 4137D corresponding to the respective pieces of charging information to the avatar objects 6A, 6C, and 6D, thereby changing the appearance colors of the avatar objects 6A, 6C, and 6D.

The texture 4137D is a texture colored in a first color and corresponding to the fact that the total charged amount exceeds a first threshold. The texture 4137A is a texture colored in a second color and corresponding to the fact that the total charged amount exceeds a second threshold. The texture 4137C is a texture colored in a third color and corresponding to the fact that the total charged amount exceeds a third threshold. The second color stands out from the first color. The third color stands out from the second color. The first color is bronze, the second color is silver, and the third color is gold, for example.

Figure 41B:
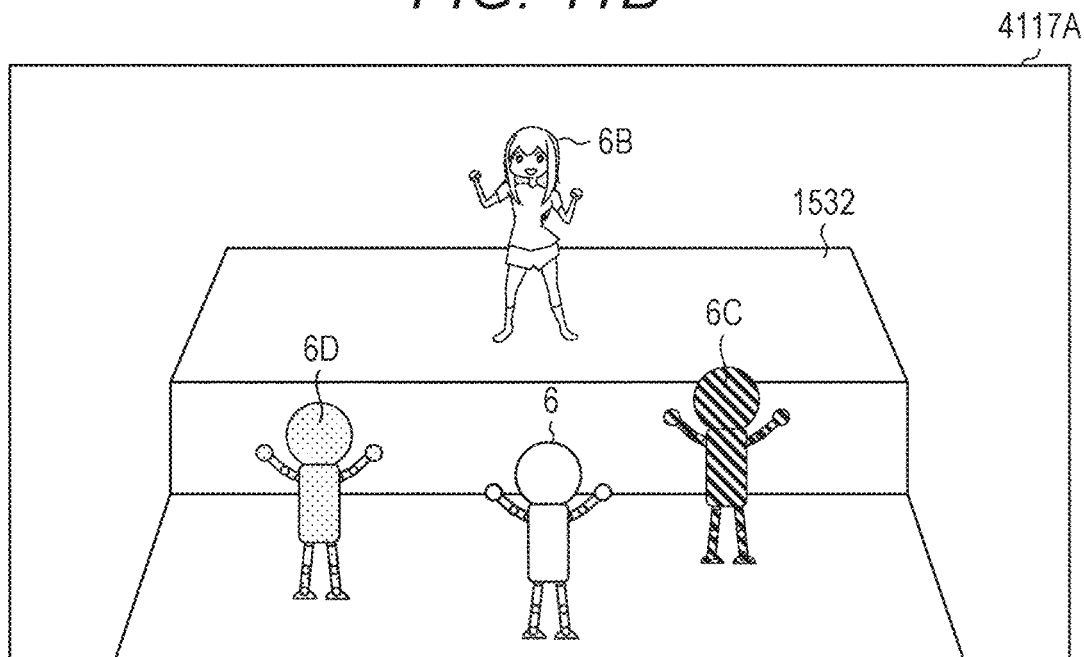
FIG. 41B A diagram of a field-of-view image according to at least one embodiment of this disclosure.

The processor 210A causes the monitor 130A to display the field-of-view image 4117A corresponding to the second virtual space 2711A in FIG. 41A, as in FIG. 41B, for example. This enables the user 5A to recognize that the appearance color of the avatar object 6C has been changed to the third color and the appearance color of the avatar object 6D has been changed to the first color, by visually checking the field-of-view image 4117A. This also enables the user 5A to recognize that the appearance of the avatar object 6C stands out from the appearance of the avatar object 6D, by visually checking the field-of-view image 3917A.

The processor 210A may change the appearance of the avatar object 6A with a larger total charged amount such that the avatar object 6A looks more like a rich person. The processor 210A may arrange a bulletin board object (not illustrated) in the second virtual space 2711A and provide a display of the ranking of total charged amounts on the bulletin board object. The processor 210A provides a display of the names of five users 5 with the five largest total charged amounts on the bulletin board object, for example. This enables the avatar objects 6 associated with the users 5 with larger total charged amounts to stand out in the second virtual space 2711A.

The processor 210A may change not only the entire appearance of the avatar object 6A but also a part of the appearance thereof. The processor 210A may cause the avatar object 6A to wear an accessory with which the appearance of the avatar object 6A will look more like a rich person. Examples of such accessories may include a gilded watch or necklace.

Figure 42A:
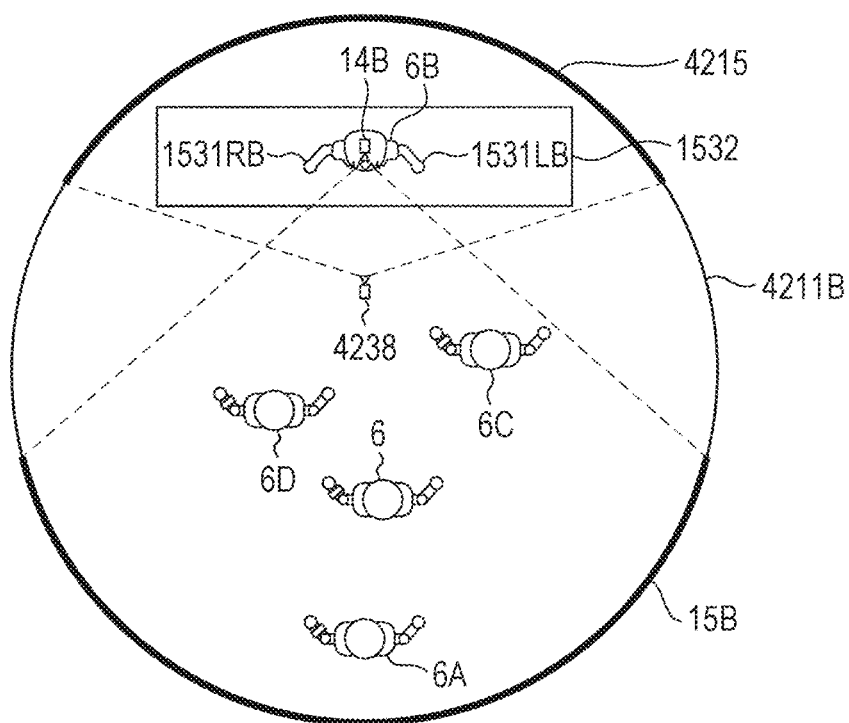
FIG. 42A A diagram of a virtual space according to at least one embodiment of this disclosure.

FIG. 42A is a diagram of a second virtual space 4211B and a live image 4239 according to at least one embodiment of this disclosure. The processor 210B arranges the avatar objects 6A to 6D, the stage object 1532, and the virtual camera 14B in the second virtual space 4211B like in the second virtual space 2711B. The processor 210B also arranges a virtual camera 4238 in the second virtual space 4211B. The virtual camera 4238 is a virtual object that generates a live video recording the live performance made by the avatar object 6B. The processor 210B arranges the virtual camera 4238 at a position in front of the avatar object 6B with a certain distance therebetween, for example. The processor 210B further controls the direction of the virtual camera 4238 such that the stage object 1532 and the avatar object 6B are within a field-of-view region 4215 of the virtual camera 4238.

Figure 42B:
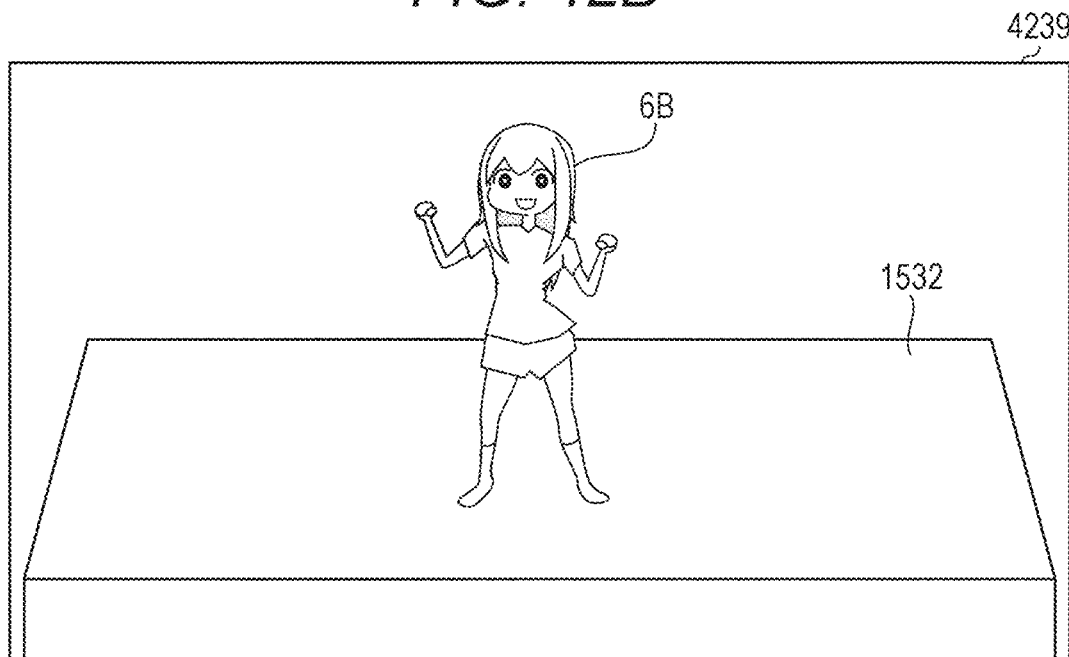
FIG. 42B A diagram of a field-of-view image according to at least one embodiment of this disclosure.

The processor 210B controls the virtual camera 4238, thereby shooting a portion contained in the field-of-view region 4215 in the second virtual space 4211B with the virtual camera 4238, for example. The processor 210B thus generates the live video 4239 corresponding to the field-of-view region 4215 as in FIG. 42B. The live video 4239 is a type of field-of-view image. The live video 4239 shows the avatar object 6B carrying out a performance on the stage object 1532. The processor 210B distributes the generated live video 4239 to the computer 200A and other computers 200 via the server 600.

Figure 43A:
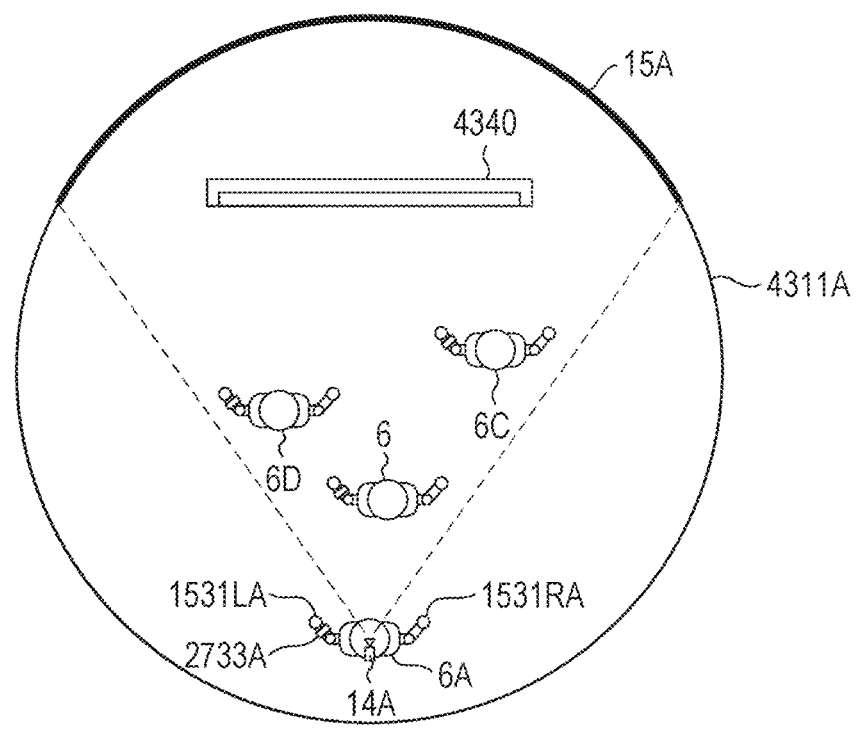
FIG. 43A A diagram of a virtual space according to at least one embodiment of this disclosure.

FIG. 43A is a diagram of a second virtual space 4311A and a field-of-view image 4317A according to at least one embodiment of this disclosure. The processor 210A arranges the avatar objects 6A, 6C, and 6D in the second virtual space 4311A, like in the second virtual space 2711A. Unlike in the second virtual space 2711A, however, the processor 210A does not arrange the stage object 1532 and the avatar object 6B in the second virtual space 4311A. Instead, the processor 210A arranges a screen object 4340 in the second virtual space 4311A.

Figure 43B:
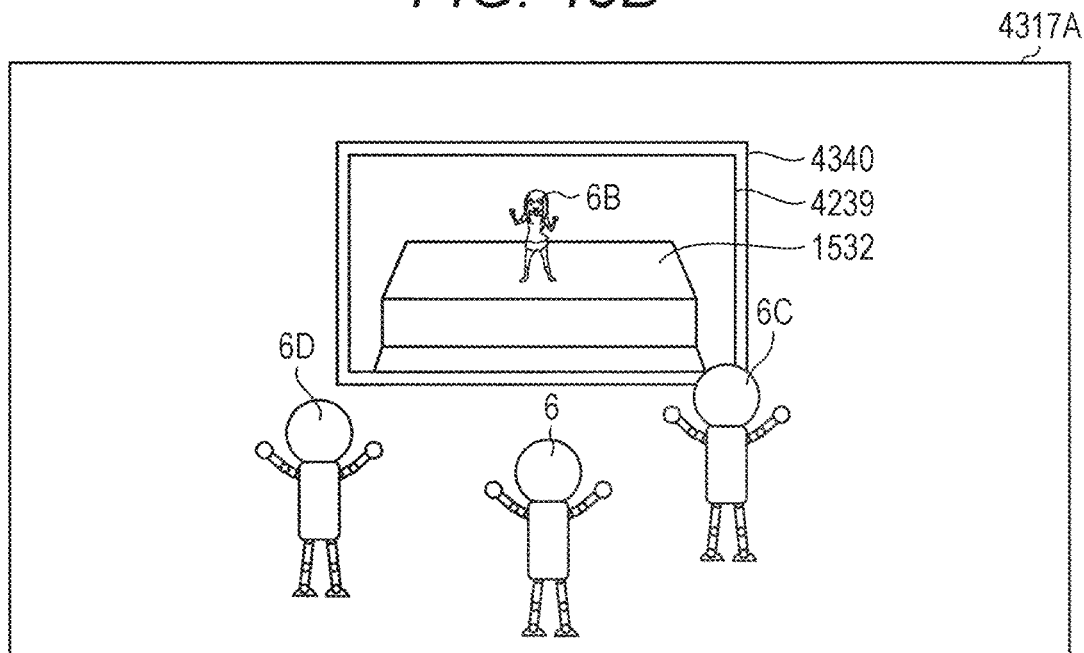
FIG. 43B A diagram of a field-of-view image according to at least one embodiment of this disclosure.

The processor 210A receives the live video 4239 distributed from the computer 200B via the server 600. The processor 210A provides a display of the received live video 4239 at the screen object 4340. The processor 210A thus causes the avatar object 6A to view the performance made by the avatar object 6B shown in the live video 4239. The processor 210A causes the monitor 130A to display the field-of-view image 4317A corresponding to the second virtual space 4311A in FIG. 43A, as in FIG. 43B, for example. This enables the user 5A to view the live video 4239 displayed on the screen object 4340, by visually checking the field-of-view image 4317A. The live video 4239 shows the avatar object 6B carrying out a performance on the stage object 1532. This enables the user 5A to attain such a virtual experience as if the user 5A himself/herself is viewing the live broadcast performance made by the avatar object 6B in the second virtual space 4311A, by visually checking the live video 4239.

Distribution of a live broadcast performance is not limited to the above-described example. For example, an alternative scheme to distribute a live video may involve shooting a live video of the avatar object 6B in a virtual space for shooting a live video in which only the avatar object 6B, the stage object 1532, and the virtual camera 4238 are arranged and displaying the live video on the screen object 4340 arranged in the second virtual space 4311A.

The processor 210A may register charging information in accordance with actions of the avatar object 6A in the second virtual space 4311A, with the tag object 2733A. If the avatar object 6A takes an action leading to purchase of the live video 4239 by the user 5A, the processor 210A registers charging information in accordance with the action with the tag object 2733A, for example.

Figure 44A:
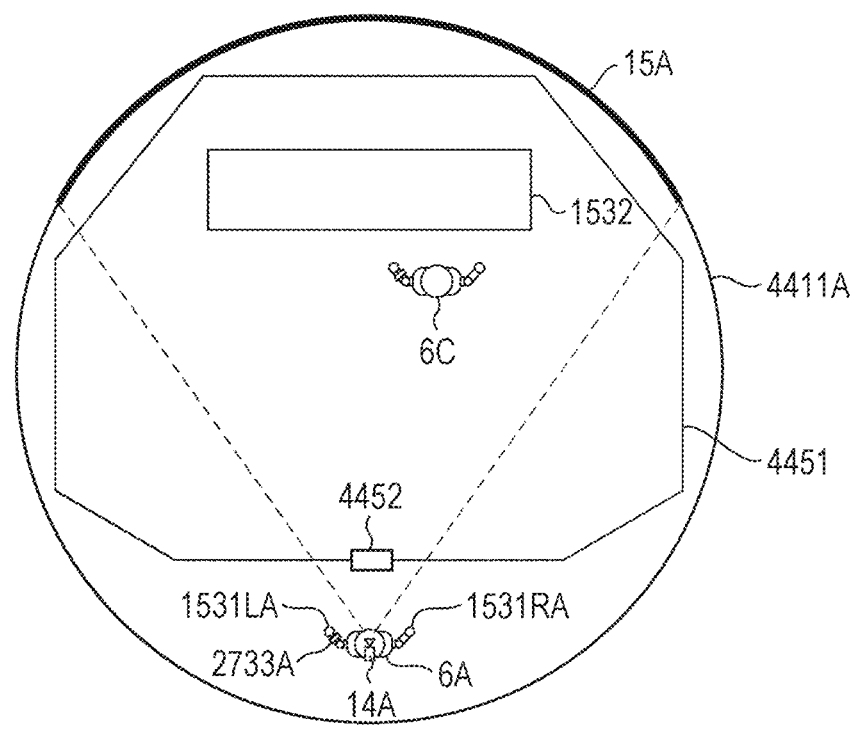
FIG. 44A A diagram of a virtual space according to at least one embodiment of this disclosure.
Figure 44B:
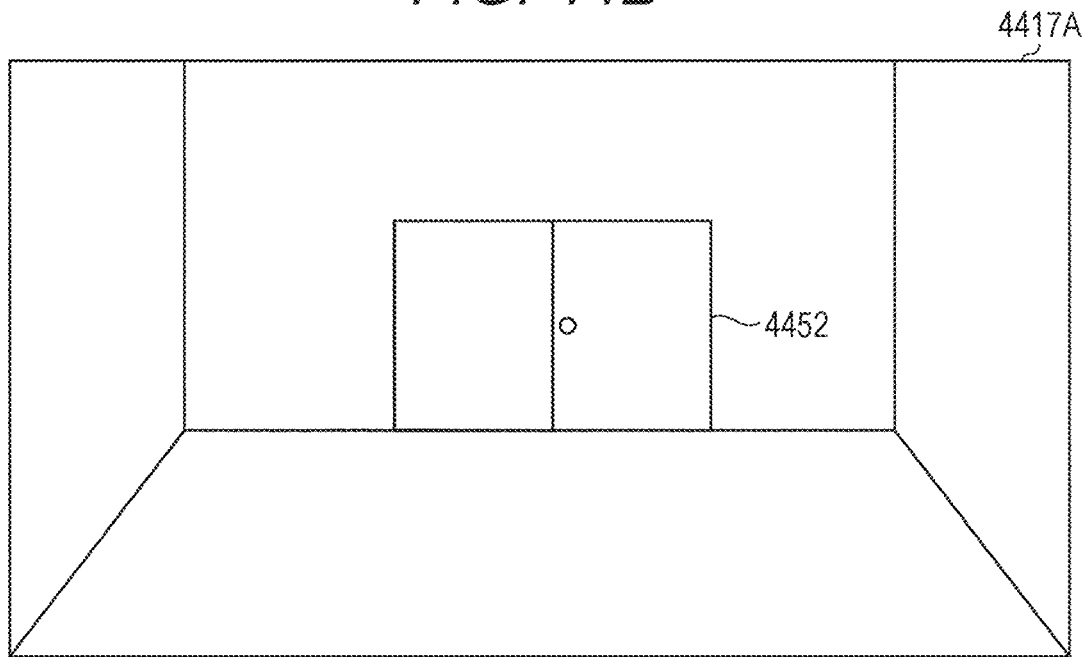
FIG. 44B A diagram of a field-of-view image according to at least one embodiment of this disclosure.

FIG. 44A is a diagram of a second virtual space 4411A and a field-of-view image 4417A according to at least one embodiment of this disclosure. The processor 210A arranges the avatar objects 6A and 6C and the stage object 1532 in the second virtual space 4411A, like in the second virtual space 2711A. The second virtual space 4411A includes a first region 4451. The first region 4451 corresponds to a part of the second virtual space 4411A. The processor 210A arranges a gate object 4452 at a place on an outer edge of the first region 4451.

In FIG. 44A, the avatar object 6C and the stage object 1532 are arranged in the first region 4451. The avatar object 6A is arranged outside the first region 4451. The first region 4451 is surrounded by an opaque wall object (not illustrated). The first region 4451 is a place where a live performance made by the avatar object 6B takes place. When the avatar object 6A is in the first region 4451, the avatar object 6A is enabled to view the performance made by the avatar object 6B. When the avatar object 6A is outside the first region 4451, the avatar object 6A is not enabled to view the performance made by the avatar object 6B. The avatar object 6A may pass through the gate object 4452, thereby entering the first region 4451 or exiting from the first region 4451.

After defining the second virtual space 4411A, the processor 210A arranges the avatar object 6A outside the first region 4451 in the second virtual space 4411A. While the avatar object 6A is outside the first region 4451, the processor 210A does not arrange the tag object 2733A at the virtual left hand 1531LA. The processor 210A moves the avatar object 6A from outside the first region 4451 into the first region 4451 through the gate object 4452, in accordance with an operation made by the user 5A. The processor 210A thus causes the avatar object 6A to enter the first region 4451.

If the avatar object 6A enters the first region 4451, the processor 210A arranges the tag object 2733A at the virtual left hand 1531LA. The processor 210A registers charging information in accordance with actions of the avatar object 6A in the first region 4451, with the tag object 2733A. The processor 210A moves the avatar object 6A from inside the first region 4451 to outside the first region 4451 through the gate object 4452, in accordance with an operation made by the user 5A. The processor 210A thus causes the avatar object 6A to exit from the first region 4451.

If the avatar object 6A exits from the first region 4451, the processor 210A performs settlement-related processing in accordance with the charging information registered with the tag object 2733A. The processor 210A further deletes the tag object 2733A from the virtual left hand 1531LA.

The processor 210A may associate the tag object 2733A with a desired part of the avatar object 6A, not limited to the virtual left hand 1531LA. The processor 210A associates the tag object 2733A with the virtual right hand 1531RA, for example. The processor 210A associates the tag object 2733A with the torso or one of the feet of the avatar object 6A, for example. In at least one embodiment, the processor 210A arranges the tag object 2733A at the virtual right hand 1531RA or the virtual left hand 1531LA. This facilitates the user 5A to check the total charged amount displayed on the tag object 2733A.

If the avatar object 6A enters the second virtual space 2711A, the processor 210A does not necessarily associate the tag object 2733A with the avatar object 6A. The processor 210A may register charging information with the avatar object 6A in association therewith. If the avatar object 6A exits from the second virtual space 2711A, the avatar object 6A may perform settlement-related processing in accordance with the charging information registered with the avatar object 6A.

The user 5A may purchase points usable for settling the total charged amount in advance. If the user 5A has purchased points in advance, the server 600 may consume points, out of all the points the user 5A owns, corresponding to the total charged amount, thereby settling the total charged amount.

The processor 210A may store charging information in a storage 230A in registering the charging information with the tag object 2733A. If the avatar object 6A improperly separates from the second virtual space 2711A, the processor 210A performs settlement-related processing using the charging information stored in the storage 230A. The improper separation of the avatar object 6A from the second virtual space 2711A can take place, for example, when the user 5A forcibly turns off the computer 200A before the avatar object 6A is removed from the second virtual space 2711A. After the computer 200A is turned off, the processor 210A transmits the charging information stored in the storage 230A to the server 600. The processor 610 settles the total charged amount indicated by the received charging information.

If the user 5A forcibly turns off the computer 200A before the avatar object 6A is removed from the second virtual space 2711A, the processor 210A detects that an improper separation of the avatar object 6A has occurred after the computer 200A is turned on next time. Upon detecting occurrence of an improper separation, the processor 210A notifies the server 600 of the occurrence. When notified of an improper separation from the computer 200A, the processor 610 settles the charged amount in accordance with the charging information on the user 5A at the time of occurrence of the improper separation. This enables the HMD system 100 to prevent the user 5A from avoiding settlement of the charged amount. The processor 610 may delete the account of the user 5A if the improper separation of the avatar object 6A frequently occurs or the settlement after an improper separation fails to be completed properly.

If the avatar object 6A enters the second virtual space 2711A, the processor 210A may register charging information corresponding to an admission fee with the tag object 2733A and immediately perform settlement-related processing corresponding to the admission fee. In other words, the processor 210A may perform settlement-related processing, after charging information is registered with the tag object 2733A, and before the avatar object 6A is removed from the second virtual space 2711A. Furthermore, charging information in accordance with actions of the avatar object 6A are registered with the tag object 2733A, the processor 210A may perform settlement-related processing corresponding to the registered charging information before the avatar object 6A is removed.

The processor 210A may cause the avatar object 6A to enter the second virtual space 2711A before the avatar object 6B starts carrying out a live performance in the second virtual space 2711A. If the avatar object 6A enters the second virtual space 2711A before the live performance starts, the processor 210A may cause the avatar object 6A to purchase a ticket for the live performance from the avatar object 6B in the second virtual space 2711A.

The user 5A may cause the avatar object 6A to purchase a ticket for the live performance before the live performance starts. In at least one aspect, the processor 210B detects a motion of the user 5B for selling tickets for the live performance in advance before the live performance starts. The processor 210B causes the avatar object 6B to perform a first operation for selling tickets in accordance with the detected motion. The processor 210B transmits the avatar information on the avatar object 6B containing motion information corresponding to the first operation to the server 600.

If the avatar object 6A enters the second virtual space 2711A before the live performance starts, the processor 210A requests the avatar information on the avatar object 6B transmitted from the computer 200B to the server 600 in advance, from the server 600. The server 600 transmits the avatar information on the avatar object 6B to the computer 200A in accordance with such a request. The processor 210A arranges the avatar object 6B in the second virtual space 2711A, based on the received avatar information. The processor 210A causes the avatar object 6B to perform a first operation for selling tickets, based on motion information contained in the avatar information. The processor 210A causes the avatar object 6B to hand-deliver a ticket to the avatar object 6A, for example. The processor 210A further causes the avatar object 6B to wave the virtual left hand 1531LB.

In at least one aspect, the processor 210A, when causing the avatar object 6A to enter the second virtual space 2711A at certain times of a day, transmits the avatar information on the avatar object 6A to the server 600. As a result of the synchronous processing by the server 600, the processor 210B receives the avatar information on the avatar object 6A from the server 600. The processor 210B arranges the avatar object 6A in the second virtual space 2711B, in accordance with the received avatar information. After the avatar object 6A is arranged, the processor 210B detects the motion of the user 5B for selling tickets for the live performance. The processor 210B causes the avatar object 6B to perform a second operation for selling a ticket to the avatar object 6A in the second virtual space 2711B, in accordance with the detected motion of the user 5B. The processor 210B transmits the avatar information on the avatar object 6B containing motion information corresponding to the second operation to the server 600.

As a result of the synchronous processing by the server 600, the processor 210A receives the avatar information on the avatar object 6B from the server 600. The processor 210A causes the avatar object 6B to perform the second operation for selling tickets, based on the motion information contained in the avatar information, in accordance with the motion information contained in the received avatar information. In other words, this enables the processor 210A to cause the avatar object 6B to perform an operation for selling tickets in accordance with a real-time motion of the user 5B. This brings the user 5A into contact with the user 5B in a real-time manner, which may enhance the satisfaction of the user 5A.

In at least one embodiment, the processor 210A performs charging- and settlement-related processing on the user 5A under a scheme using the tag object 2733A in the manner described above. This is however not construed in a limiting sense, and the processor 210A may perform charging- and settlement-related processing on the user 5A under any desired scheme different from the above description.

Figure 45:
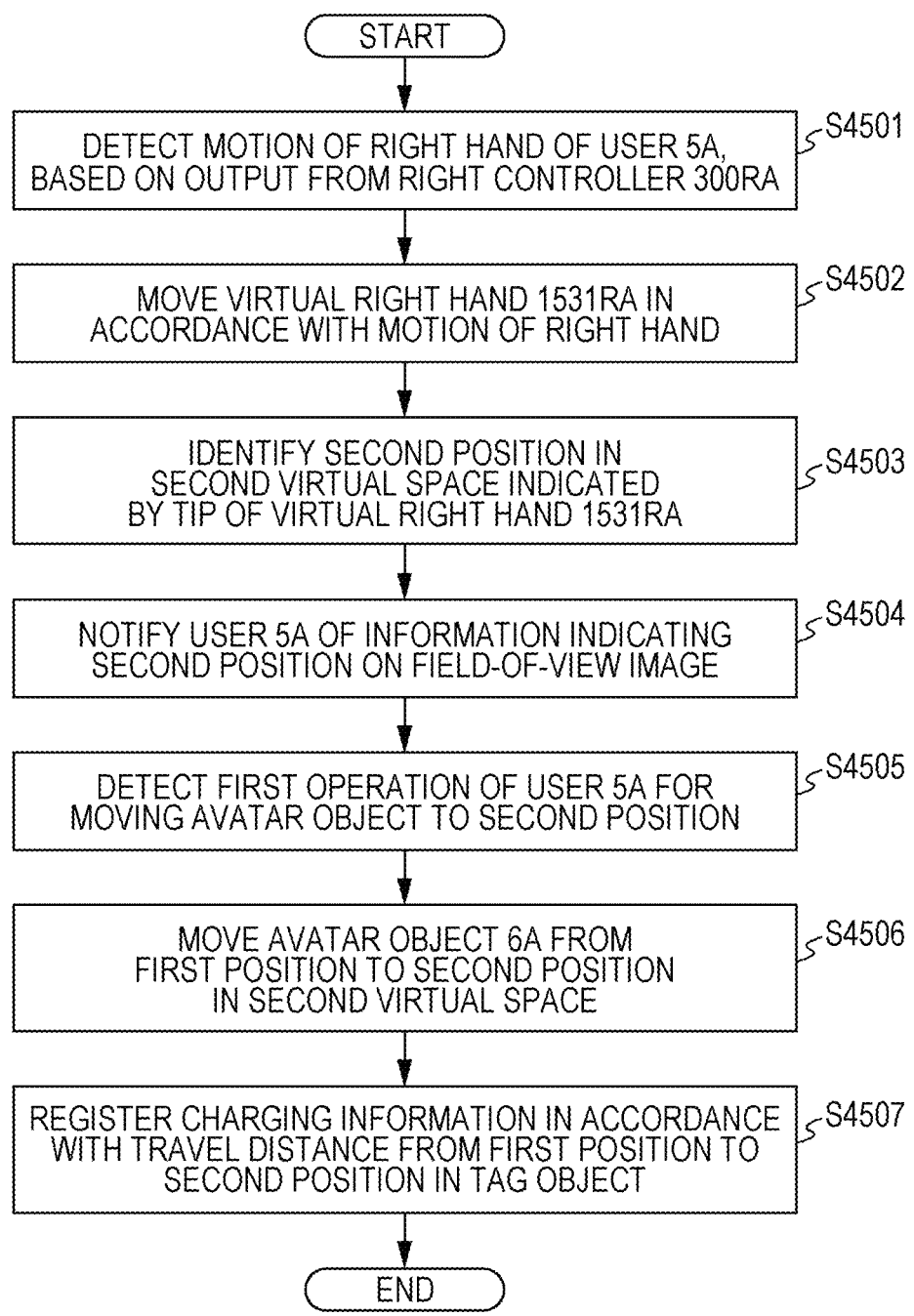
FIG. 45 A flowchart of processing to be executed by a system including an HMD set according to at least one embodiment of this disclosure.
Figure 46A:
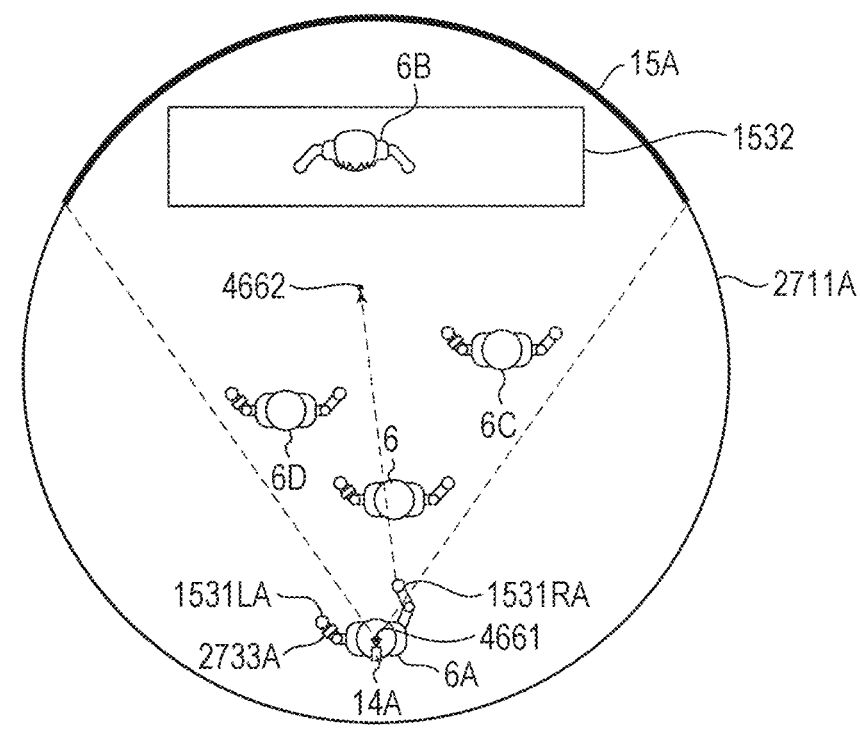
FIG. 46A A diagram of a virtual space according to at least one embodiment of this disclosure.

FIG. 45 is a flowchart of processing to be executed by a system including the HMD set 110A according to at least one embodiment of this disclosure. FIG. 46A is a diagram of the second virtual space 2711A and a field-of-view image 4617A according to at least one embodiment of this disclosure. In FIG. 46A, a performance by the avatar object 6B (second avatar) associated with the user 5B (second user) is being carried out in the second virtual space 2711A. Charging information corresponding to an admission fee (500 yen) alone is registered with the tag object 2733A. The avatar object 6A (first avatar) associated with the user 5A (first user) is arranged at a first position 4661 far away from the stage object 1532 in the second virtual space 2711A. The user 5A is viewing the performance made by the avatar object 6B at a position far away from the avatar object 6A.

The user 5A may want to move the avatar object 6A to a second position 4662 closer to the stage object 1532, thereby viewing the performance at the position closer to the avatar object 6B. To satisfy this hope, the user 5A moves his/her right hand such that the tip of the virtual right hand 1531RA indicates the second position 4662. In Step S4501, the processor 210A detects a motion of the right hand of the user 5A, based on the output from the right controller 300RA. In Step S4502, the processor 210A moves the virtual right hand 1531RA in accordance with the motion of the right hand of the user 5A. As illustrated in FIG. 46A, after the virtual right hand 1531RA is moved, the tip of the virtual right hand 1531RA indicates the second position 4662 in the second virtual space 2711A. In Step S4503, the processor 210A identifies the second position 4662 in the second virtual space 2711A indicated by the tip of the virtual right hand 1531RA.

Figure 46B:
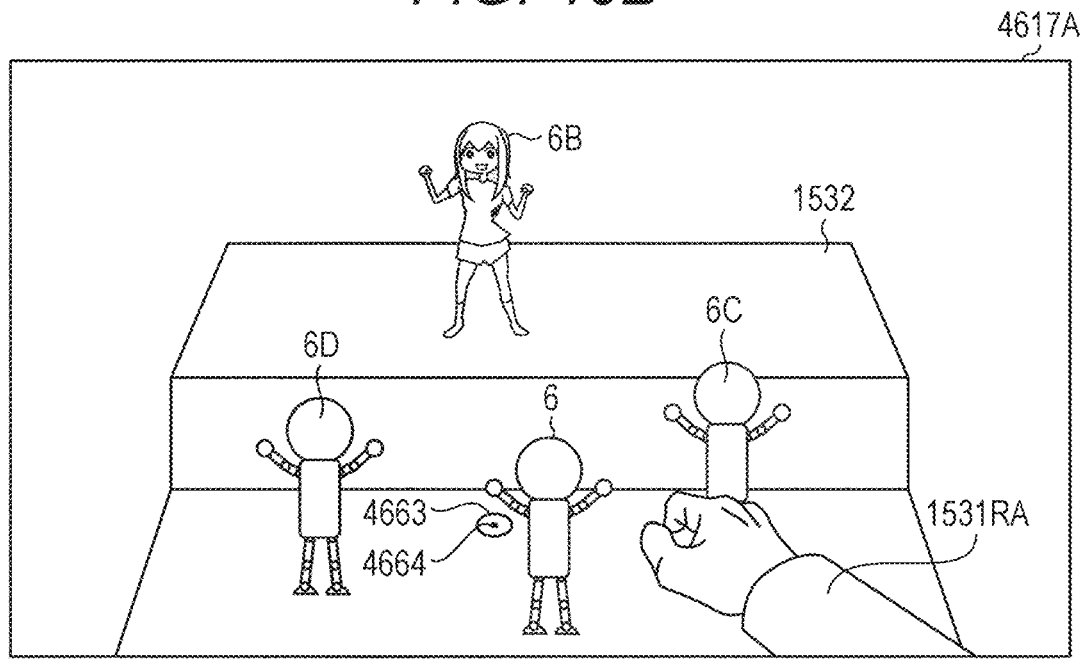
FIG. 46B A diagram of a field-of-view image according to at least one embodiment of this disclosure.

The processor 210A causes the monitor 130A to display the field-of-view image 4617A corresponding to the second virtual space 2711A in FIG. 46A, as in FIG. 46B, for example. In Step S4504, the processor 210A notifies the user 5A of a mark 4663 indicating the second position 4662 in the second virtual space 2711A on the field-of-view image 4617A. Specifically, the processor 210A causes the monitor 130A to display the mark 4663 in a superimposed manner on a position 4664 in the field-of-view image 4617A corresponding to the second position 4662. The processor 210A may arrange the mark 4663 at the second position 4662 in the second virtual space 2711A as a virtual object. Alternatively, the processor 210A may contain the mark 4663 at the position 4664 corresponding to the second position 4662, in generating the field-of-view image 4617A. This enables the user 5A to check the mark 4663, indicating the second position 4662 in the second virtual space 2711A, displayed on the monitor 130A, by visually checking the field-of-view image 4617A. This also enables the user 5A to figure out that the second position 4662 is specified as the position to which the avatar object 6A moves, by checking the mark 4663.

After checking the mark 4663, the user 5A performs a first operation for moving the avatar object 6A to the second position 4662. The first operation is, for example, pressing any button on the right controller 300RA by the user. In Step S4505, the processor 210A detects the first operation made by the user 5A for moving the avatar object 6A.

Figure 47A:
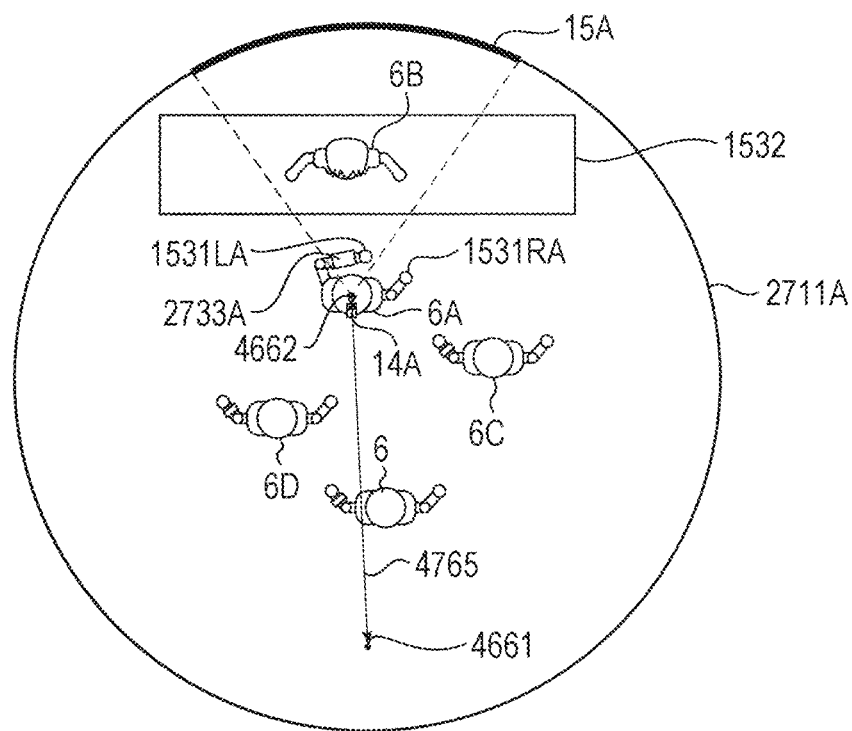
FIG. 47A A diagram of a virtual space according to at least one embodiment of this disclosure.

FIG. 47A is a diagram of the second virtual space 2711A and a field-of-view image 4717A according to at least one embodiment of this disclosure. In Step S4506, upon detecting the first operation made by the user 5A, the processor 210A, serving as the avatar object control module 1424, discretely moves the avatar object 6A from the first position 4661 to the second position 4662 in the second virtual space 2711A as in FIG. 47A. Specifically, the processor 210A instantaneously moves the avatar object 6A from the first position 4661 to the second position 4662 (like warp travel), without going through the positions from the first position 4661 to the second position 4662. The processor 210A further discretely moves the virtual camera 14A in synchronization with the movement of the avatar object 6A.

In Step S4507, the processor 210A registers charging information in accordance with a movement distance 4775 of the avatar object 6A from the first position 4661 to the second position 4662 with the tag object 2733A. Specifically, the processor 210A multiplies the movement distance 4775 by a charging unit price for a certain distance, thereby calculating the charged amount in accordance with the movement distance 4775. The charging unit price is predetermined by the operator of the HMD system 100, for example. The processor 210A sets the charging unit price indicated by unit price information contained in the virtual space data for the computer 200A, in defining the second virtual space 2711A, for example. In FIG. 47A, the charged amount is calculated to be 500 yen. The processor 210A additionally registers charging information indicating the calculated charged amount with the tag object 2733A. The processor 210A provides a display, on the surface of the tag object 2733A, of a total of charged amounts (1,000 yen) indicated by two pieces of registered charging information.

Figure 47B:
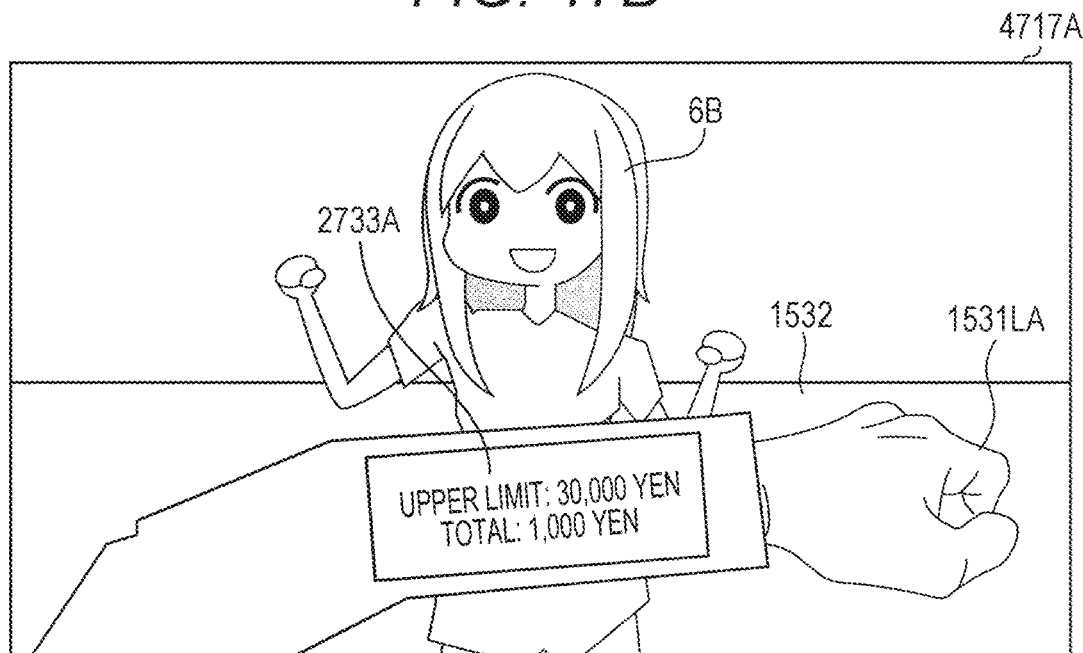
FIG. 47B A diagram of a field-of-view image according to at least one embodiment of this disclosure.

After the charging information is registered, the processor 210A moves the virtual left hand 1531LA to be within the field-of-view region 15A as in FIG. 47A, in accordance with the motion of the left hand of the user 5A. The processor 210A causes the monitor 130A to display the field-of-view image 4717A corresponding to the second virtual space 2711A in FIG. 47A, as in FIG. 47B, for example. This enables the user 5A to recognize that the avatar object 6A has been moved to the second position 4662, which is close to the stage object 1532, by visually checking the field-of-view image 4717A. This also enables the user 5A to recognize that the avatar object 6B is present in front of the avatar object 6A. This further enables the user 5A to view the performance at the position close to the avatar object 6B, thereby enjoying the live performance more. This also enables the user 5A to recognize that the current total charged amount is 1,000 yen, by visually checking the tag object 2733A. In other words, the user 5A figures out that a movement fee of 500 yen is additionally charged to the user 5A as a result of the avatar object's 6A moving onto the second position 4662.

Figure 48A:
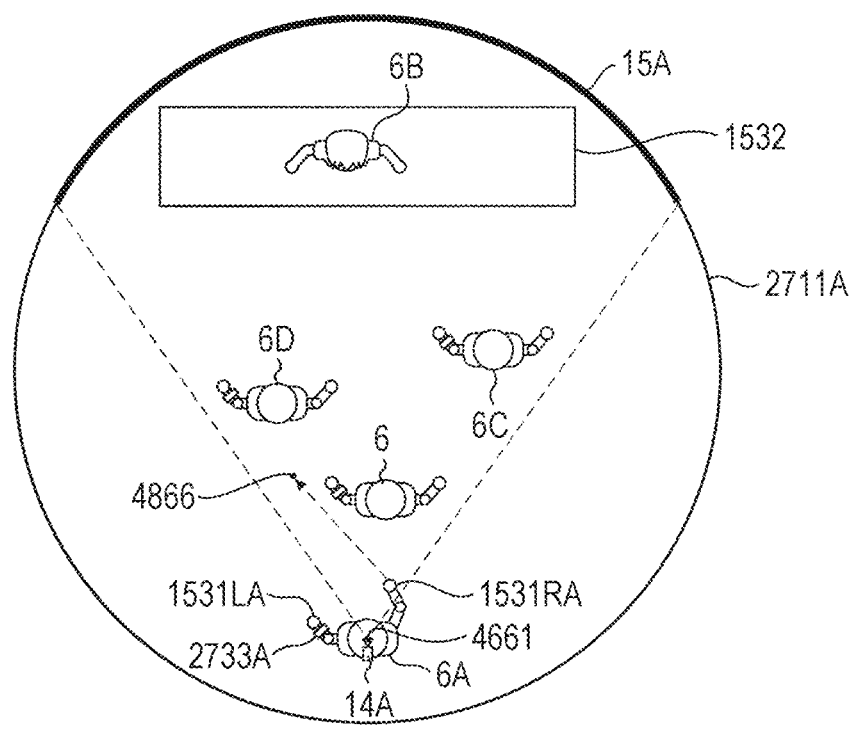
FIG. 48A A diagram of a virtual space according to at least one embodiment of this disclosure.

FIG. 48A is a diagram of the second virtual space 2711A and a field-of-view image 4817A according to at least one embodiment of this disclosure. The second virtual space 2711A is FIG. 48A is the same as the one in FIG. 46A. The avatar object 6A is arranged at the first position 4661. Only charging information corresponding to an admission fee (500 yen) is registered with the tag object 2733A. The user 5A moves his/her right hand such that the tip of the virtual right hand 1531RA indicates a third position 4866 farther away from the stage object 1532 than the second position 4662 is. The processor 210A identifies the third position 4866 in the second virtual space 2711A indicated by the tip of the virtual right hand 1531RA.

Figure 48B:
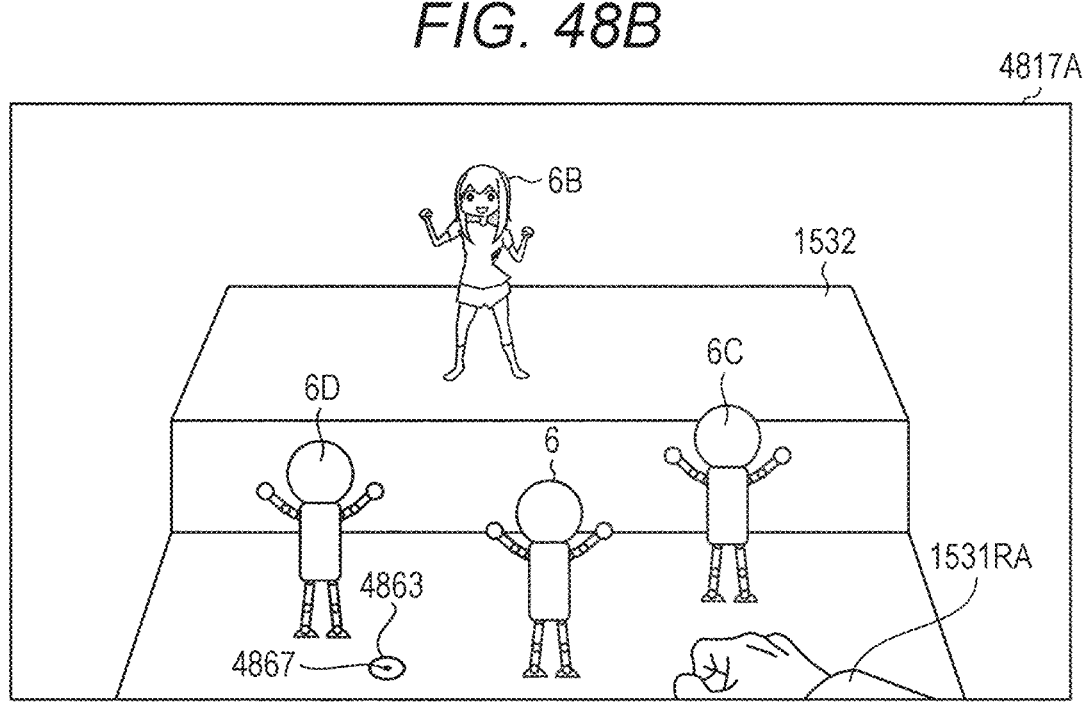
FIG. 48B A diagram of a field-of-view image according to at least one embodiment of this disclosure.

The processor 210A causes the monitor 130A to display the field-of-view image 4817A corresponding to the second virtual space 2711A in FIG. 48A, as in FIG. 48B, for example. The processor 210A notifies the user 5A of a mark 4663 indicating the third position 4866 in the second virtual space 2711A on the field-of-view image 4817A. Specifically, the processor 210A causes the monitor 130A to display the mark 4663 in a superimposed manner on a position 4867 in the field-of-view image 4817A corresponding to the third position 4866 in the second virtual space 2711A. The processor 210A may arrange the mark 4663 at the third position 4866 in the second virtual space 2711A as a virtual object. Alternatively, the processor 210A may contain the mark 4663 at the position 4867 corresponding to the third position 4886, in generating the field-of-view image 4817A. This enables the user 5A to check the mark 4663, indicating the third position 4866 in the second virtual space 2711A, displayed on the monitor 130A, by visually checking the field-of-view image 4817A. This also enables the user 5A to figure out that the third position 4866 is specified as the position to which the avatar object 6A moves, by checking the mark 4663.

Figure 49A:
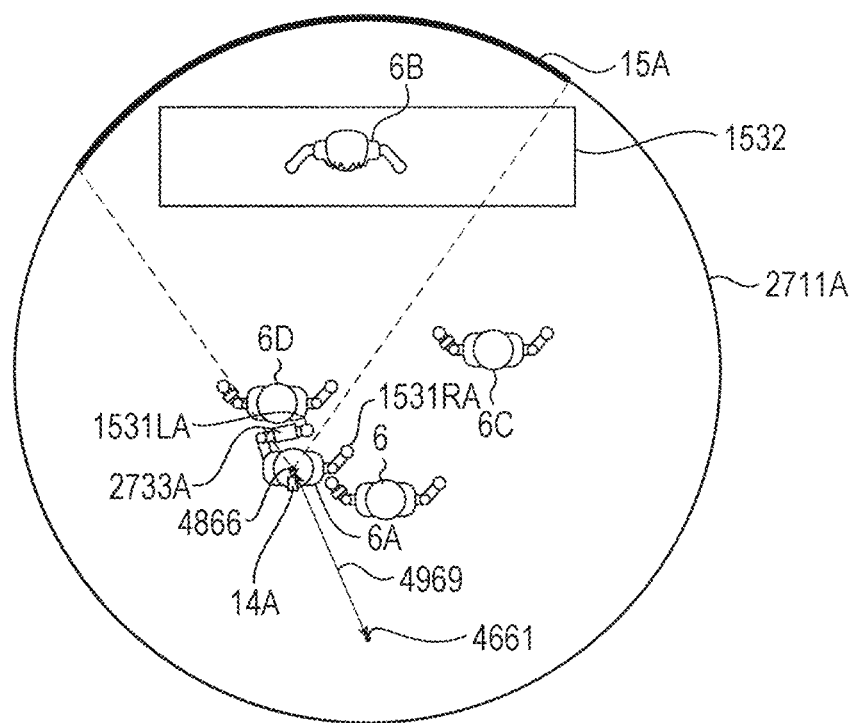
FIG. 49A A diagram of a virtual space according to at least one embodiment of this disclosure.

FIG. 49A is a diagram of the second virtual space 2711A and a field-of-view image 4917A according to at least one embodiment of this disclosure. The processor 210A detects a first operation made by the user 5A for moving the avatar object 6A to the third position 4866. Upon detecting the first operation made by the user 5A, the processor 210A discretely moves the avatar object 6A and the virtual camera 14A from the first position 4661 to the third position 4866 in the second virtual space 2711A as illustrated in FIG. 49A. The processor 210A registers charging information in accordance with a movement distance 4969 of the avatar object 6A from the first position 4661 to the third position 4866 with the tag object 2733A. Specifically, the processor 210A multiplies the movement distance 4969 by a charging unit price, thereby calculating the charged amount in accordance with the movement distance 4969. The charged amount is calculated to be 250 yen in FIG. 49A, which is less expensive than 500 yen, since the movement distance 4969 is shorter than the movement distance 4775. The processor 210A additionally registers charging information indicating the calculated charged amount with the tag object 2733A.

Figure 49B:
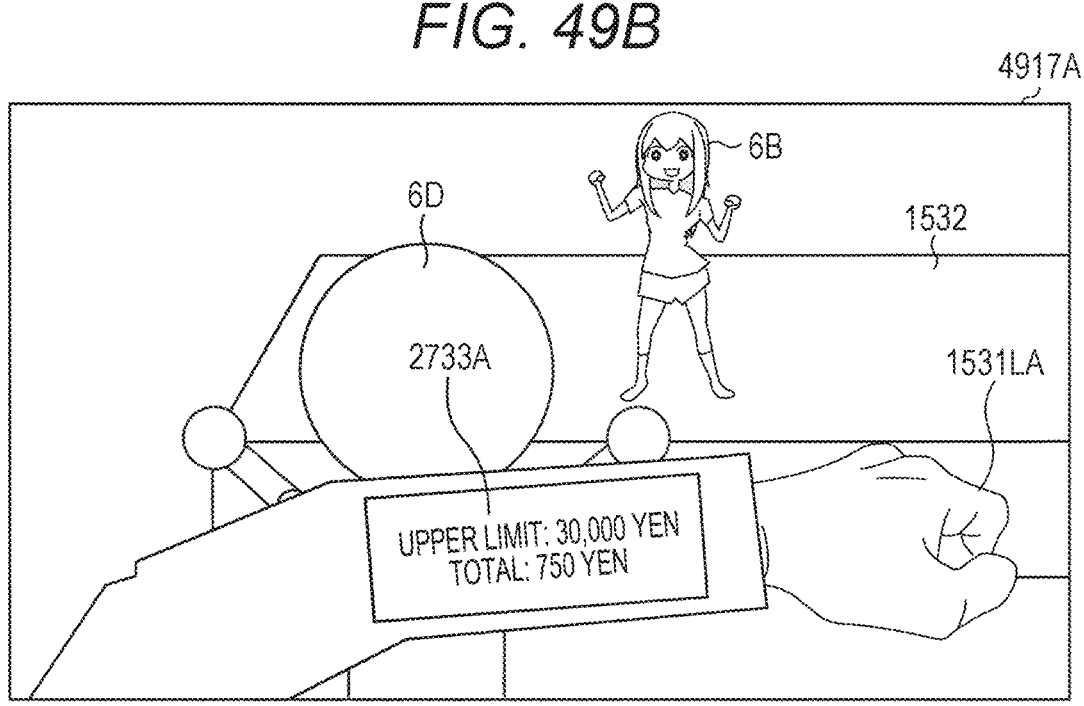
FIG. 49B A diagram of a field-of-view image according to at least one embodiment of this disclosure.

The processor 210A provides a display, on the surface of the tag object 2733A, of a total of charged amounts (750 yen) indicated by two pieces of registered charging information. The processor 210A causes the monitor 130A to display the field-of-view image 4917A corresponding to the second virtual space 2711A in FIG. 49A, as in FIG. 49B, for example. This enables the user 5A to recognize that the avatar object 6A has been moved to the third position 4866, which is at a short distance away from the stage object 1532, by visually checking the field-of-view image 4917A. This also enables the user 5A to recognize that the current total charged amount is 750 yen. In other words, the user 5A figures out that a movement fee of 250 yen is additionally charged to the user 5A as a result of the avatar object's 6A moving onto the third position 4866. In FIG. 47A and FIG. 49A, the processor 210A registers charging information indicating a higher charged amount for a longer movement distance with the tag object 2733A.

The processor 210A registers charging information in accordance with the movement distance of the avatar object 6A with the tag object 2733A. The HMD system 100 may thus provide a preferable charging scheme in the second virtual space 2711A to the user 5A.

The user 5A moves the avatar object 6A to a desired position in the second virtual space 2711A during the live performance, thereby viewing the live performance at any position the user desires. The user 5A moves the avatar object 6A to a position close to the avatar object 6B when a performance the user likes is taking place, for example. The user 5A may view a live performance made by the avatar object 6B with the avatar object 6A moved to a position the user likes depending on the content of the performance if a desired position to view the performance varies depending on the content of the performance. If a performance the user likes consists of two parts, the user 5A may view the performance with the avatar object 6A moved to a position in front of the avatar object 6B in the first part and with the avatar object 6A moved to the left side of the stage object 1532 in the second part so that the user watches the avatar object 6B in an oblique direction, for example. If a plurality of avatar objects 6B are carrying out a performance in the second virtual space 2711A with the positions of the avatar objects 6B on the stage object 1532 changed, the user 5A may view the live performance with the avatar object 6A moved to follow the position of the user's favorite avatar object 6B. As a consequence, the HMD system 100 enables the user 5A to enjoy the live performance more in accordance with the user's preference.

While an example has been described in which the avatar object 6A can move at any desired timing, movement of the avatar object 6A is not limited to this example. The following describes in detail at least one example in which the avatar object 6A can move at a particular time specified by the avatar object 6B.

Figure 50A:
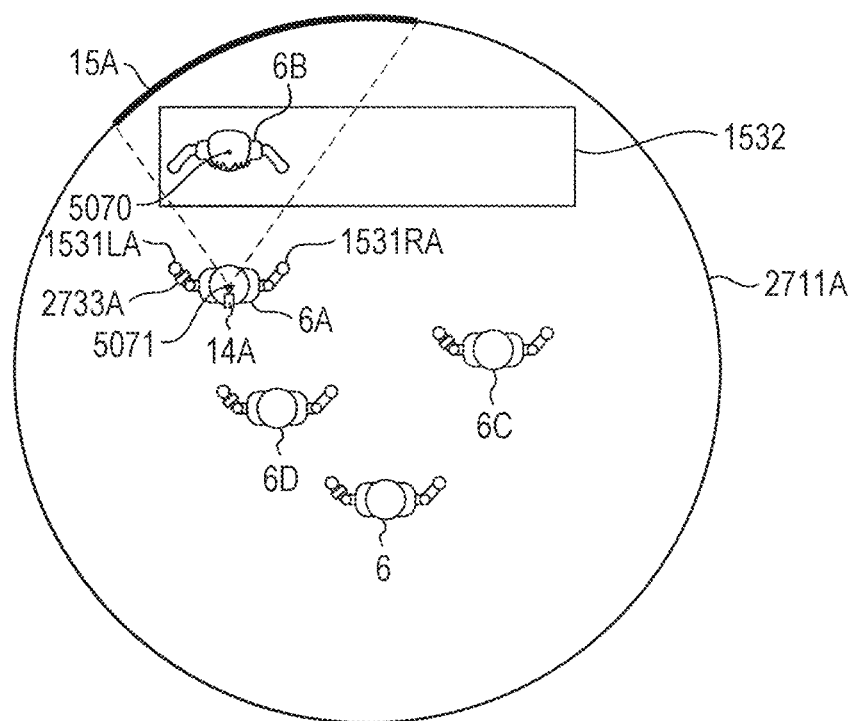
FIG. 50A A diagram of a virtual space according to at least one embodiment of this disclosure.

FIG. 50A is a diagram of the second virtual space 2711A and a field-of-view image 5017A according to at least one embodiment of this disclosure. In FIG. 50A, a performance made by the avatar object 6B is being carried out in the second virtual space 2711A. Only charging information corresponding to an admission fee (500 yen) is registered with the tag object 2733A. The avatar object 6B is arranged at a first position 5070 near the right end on the stage object 1532. The avatar object 6A is arranged at a second position 5071 facing the first position 5070 near the stage object 1532 in the second virtual space 2711A. In this manner, the avatar object 6A is viewing the performance made by the avatar object 6B at the position close to the avatar object 6B such that the avatar object 6A faces the avatar object 6B.

Figure 50B:
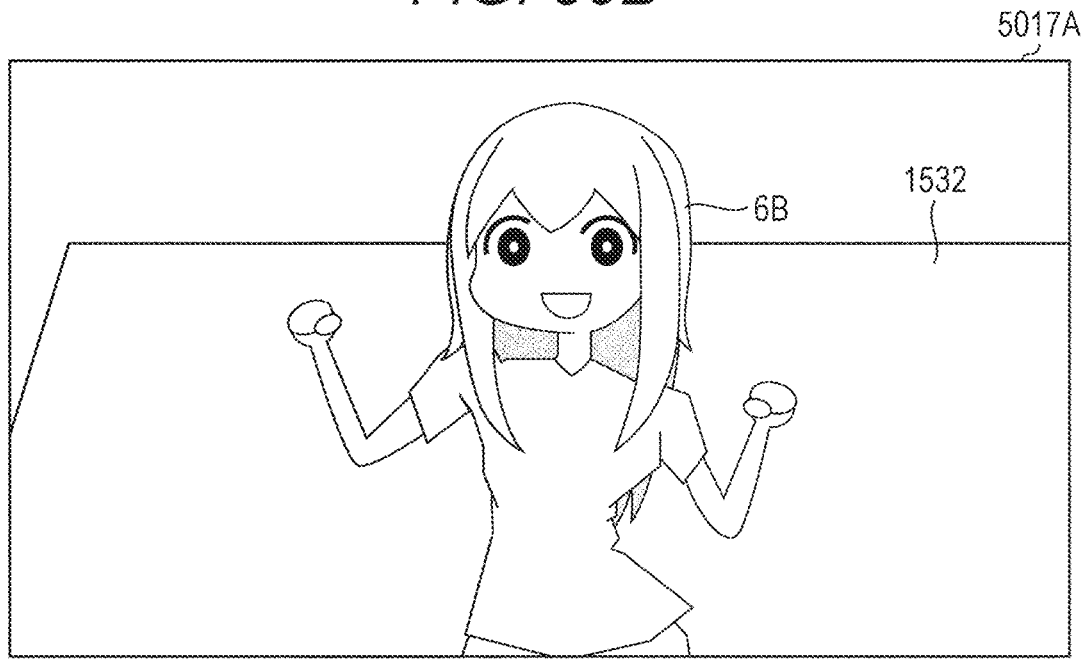
FIG. 50B A diagram of a field-of-view image according to at least one embodiment of this disclosure.

The processor 210A causes the monitor 130A to display the field-of-view image 5017A corresponding to the second virtual space 2711A in FIG. 50A, as in FIG. 50B, for example. This enables the user 5A to enjoy the performance made by the avatar object 6B located close to the avatar object 6A, by visually checking the field-of-view image 5017A.

Figure 51A:
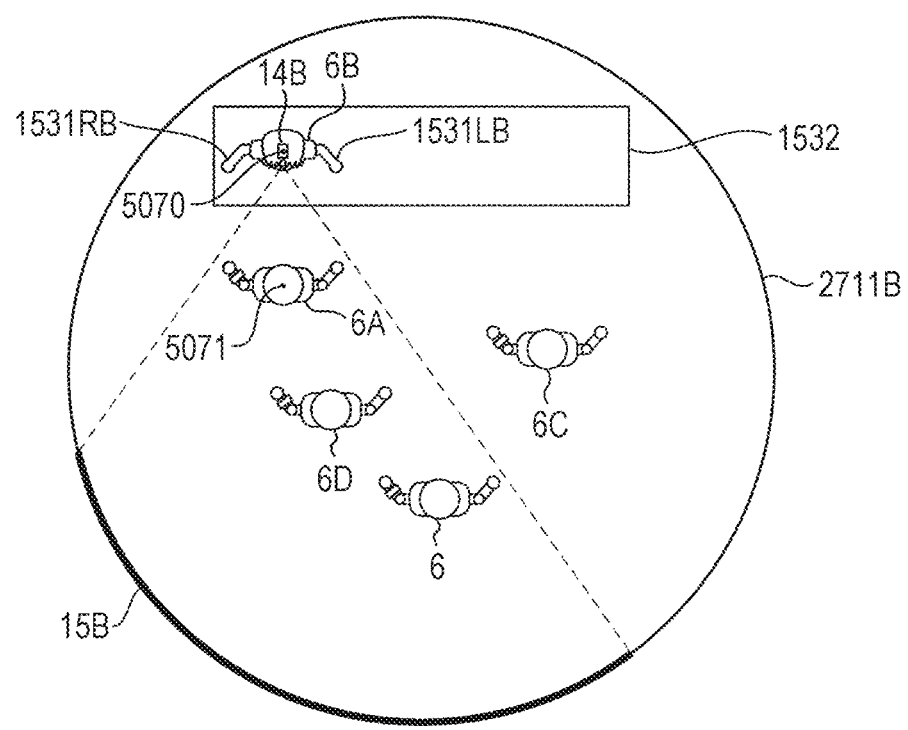
FIG. 51A A diagram of a virtual space according to at least one embodiment of this disclosure.

FIG. 51A is a diagram of the second virtual space 2711B and a field-of-view image 5117B according to at least one embodiment of this disclosure. The second virtual space 2711B in FIG. 51A is synchronized with the second virtual space 2711A in FIG. 50A. The processor 210B causes the monitor 130B to display the field-of-view image 5117B corresponding to the second virtual space 2711B in FIG.

Figure 51B:
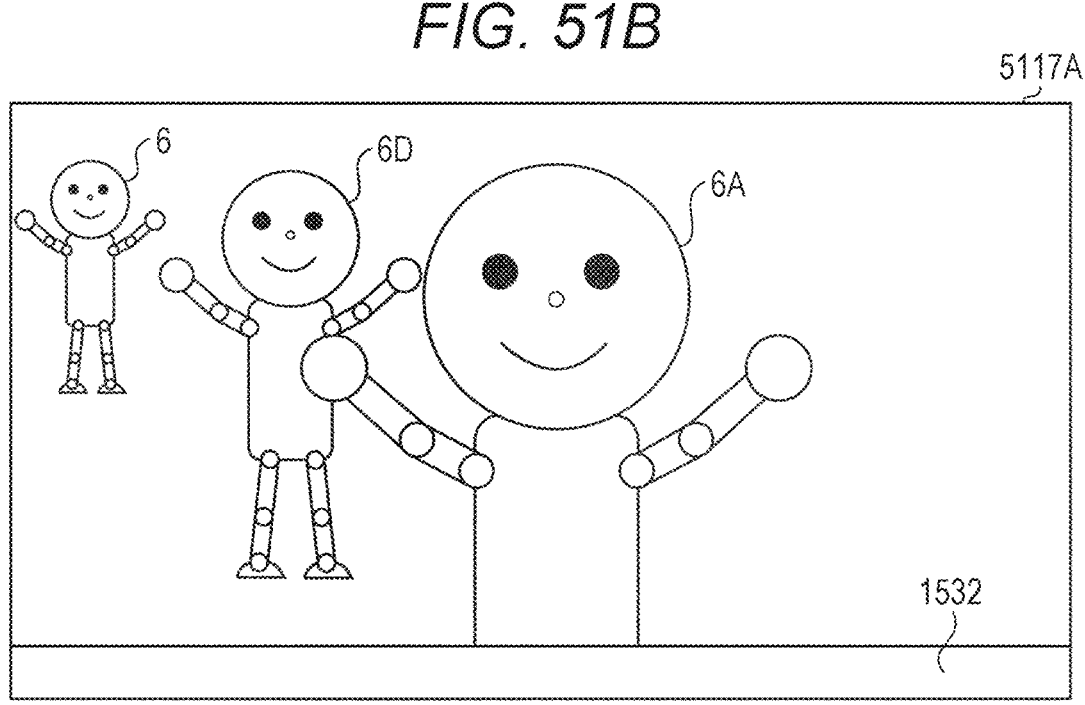
FIG. 51B A diagram of a field-of-view image according to at least one embodiment of this disclosure.

51A, as in FIG. 51B, for example. This enables the user 5B to recognize that the avatar object 6A is viewing the performance at a position close to the avatar object 6B, by visually checking the field-of-view image 5117B.

Figure 52A:
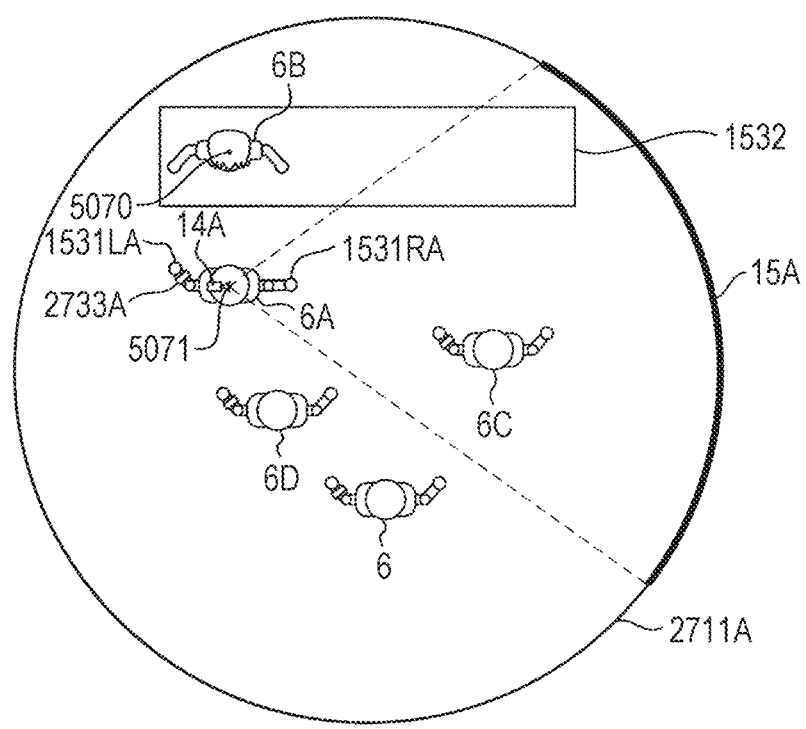
FIG. 52A A diagram of a virtual space according to at least one embodiment of this disclosure.

FIG. 52A is a diagram of the second virtual space 2711A and a field-of-view image 5217A according to at least one embodiment of this disclosure. If conditions for allowing the avatar object 6A to move in the second virtual space 2711A are not satisfied, the processor 210A does not allow the avatar object 6A to move in the second virtual space 2711A. In FIG. 52A, the processor 210A moves the virtual right hand 1531RA such that the tip of the virtual right hand 1531RA indicates a desired position in the second virtual space 2711A, in accordance with the motion of the right hand of the user 5A. In response to the fact that the avatar object 6A is not allowed to move, however, the processor 210A does not identify the position indicated by the tip of the virtual right hand 1531RA.

Figure 52B:
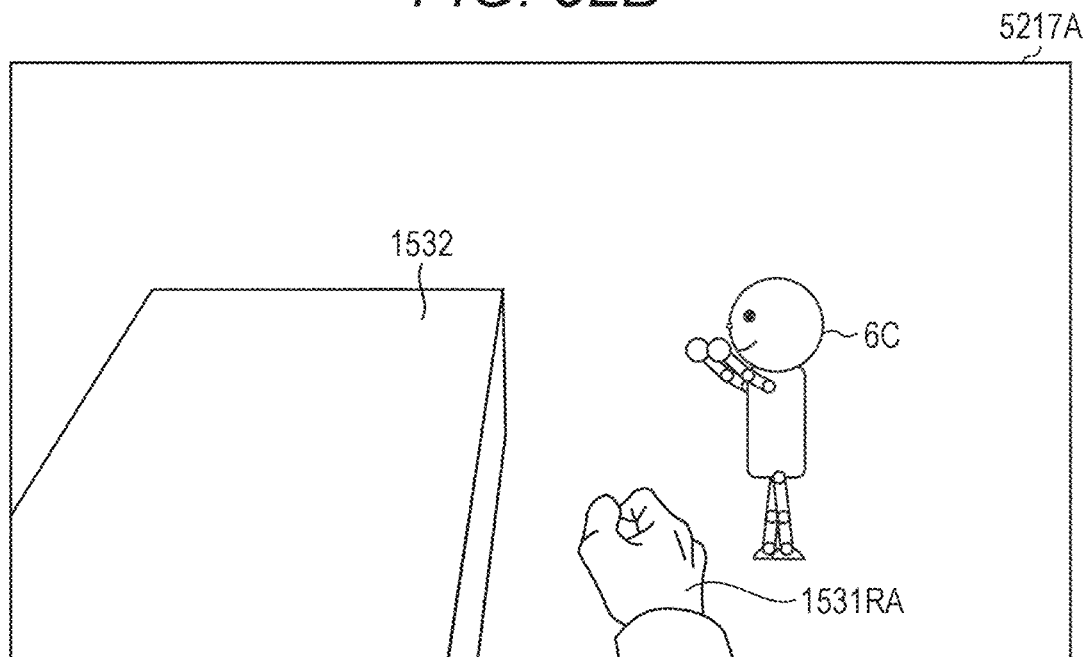
FIG. 52B A diagram of a field-of-view image according to at least one embodiment of this disclosure.

The processor 210A causes the monitor 130A to display the field-of-view image 5217A corresponding to the second virtual space 2711A in FIG. 52A, as in FIG. 52B, for example. If the position indicated by the tip of the virtual right hand 1531RA is not identified, the processor 210A does not notify the user 5A of the mark 4663 indicating this position on the field-of-view image 5217A. This enables the user 5A to check no mark 4663 indicating the position displayed on the monitor 130A despite the fact that the tip of the virtual right hand 1531RA has indicated a desired position in the second virtual space 2711A, by visually checking the field-of-view image 5217A. This also enables the user 5A to figure out that the user is not allowed to move the avatar object 6A since no mark 4663 is displayed.

Figure 53A:
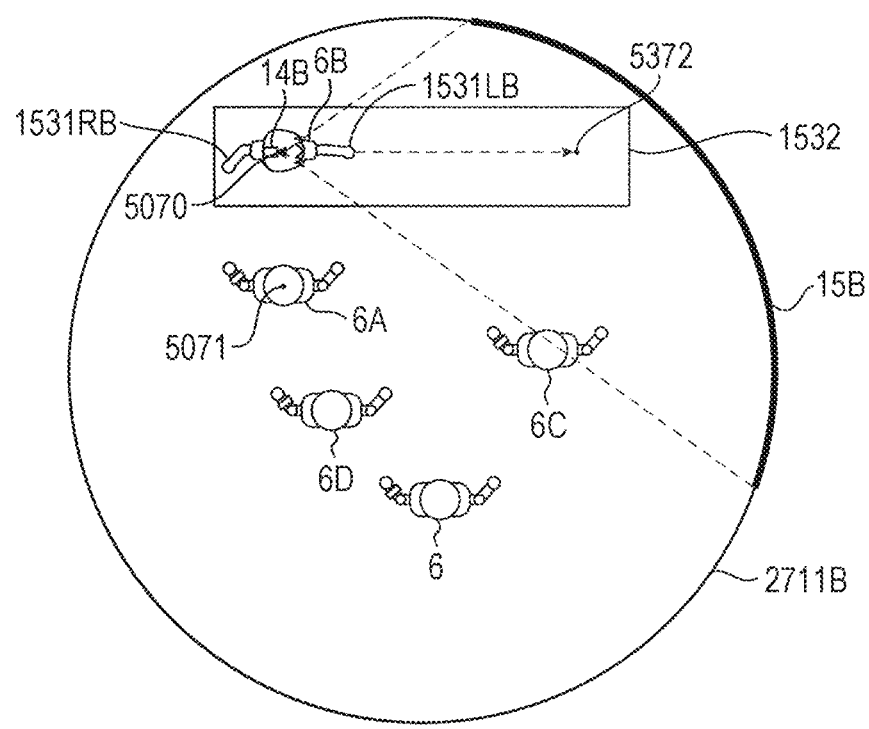
FIG. 53A A diagram of a virtual space according to at least one embodiment of this disclosure.

FIG. 53A is a diagram of the second virtual space 2711B and a field-of-view image 5317B according to at least one embodiment of this disclosure. The user 5B may want to change the position of the avatar object 6B carrying out a performance on the stage object 1532 to a third position 5372 close to the left end of the stage object 1532. To satisfy this hope, the user 5B moves his/her left hand such that the tip of the virtual left hand 1531LB indicates the third position 5372. The processor 210B moves the virtual left hand 1531LB in the second virtual space 2711B in accordance with the motion of the left hand of the user 5B. The processor 210B identifies the third position 5372 in the second virtual space 2711B indicated by the tip of the virtual left hand 1531LB.

Figure 53B:
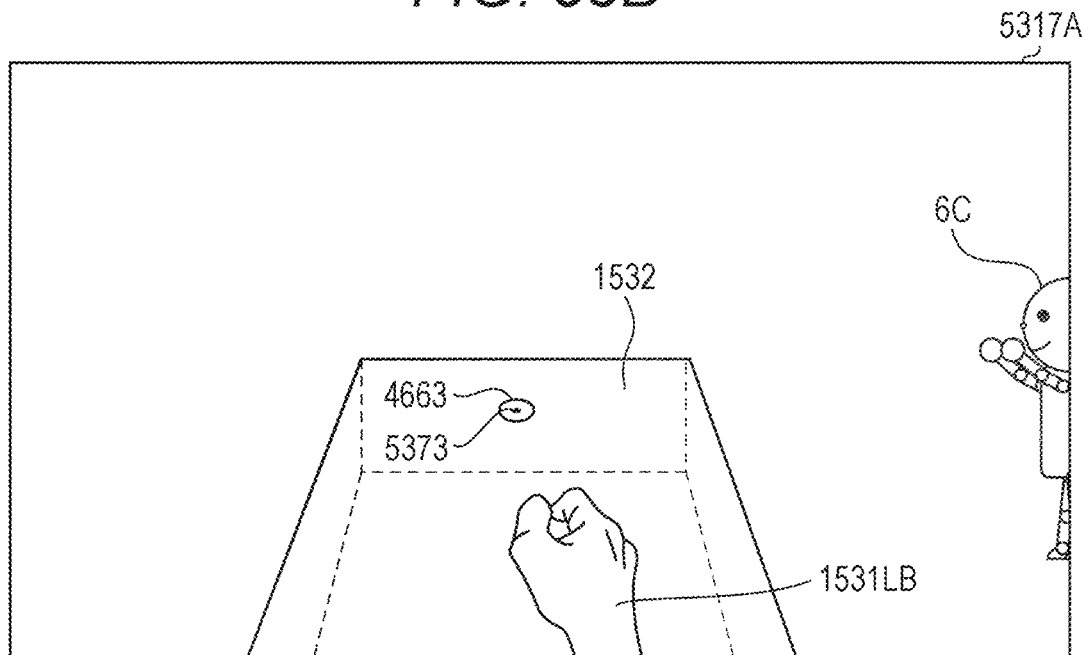
FIG. 53B A diagram of a field-of-view image according to at least one embodiment of this disclosure.

The processor 210B causes the monitor 130B to display the field-of-view image 5317B corresponding to the second virtual space 2711B in FIG. 53A, as in FIG. 53B, for example. The processor 210B notifies the user 5B of a mark 4663 indicating the third position 5372 in the second virtual space 2711B on the field-of-view image 5317B. Specifically, the processor 210B causes the monitor 130B to display the mark 4663 in a superimposed manner on a position 5373 in the field-of-view image 5317B corresponding to the third position 5372 in the second virtual space 2711B. The processor 210B may arrange the mark 4663 at the third position 5372 in the second virtual space 2711B as a virtual object. Alternatively, the processor 210B may contain the mark 4663 at the position 5373 corresponding to the third position 5372, in generating the field-of-view image 5317B. This enables the user 5B to check the mark 4663, indicating the third position 5372, displayed on the monitor 130B, by visually checking the field-of-view image 5317B. This also enables the user 5B to figure out that the third position 5372 is specified as the position to which the avatar object 6B moves, by checking the mark 4663.

After checking the mark 4663, the user 5B performs a second operation for moving the avatar object 6B to the third position 5372. The second operation is, for example, pressing any button on the right controller 300RA by the user 5B. The processor 210B detects the second operation made by the user 5B for moving the avatar object 6B.

Figure 54A:
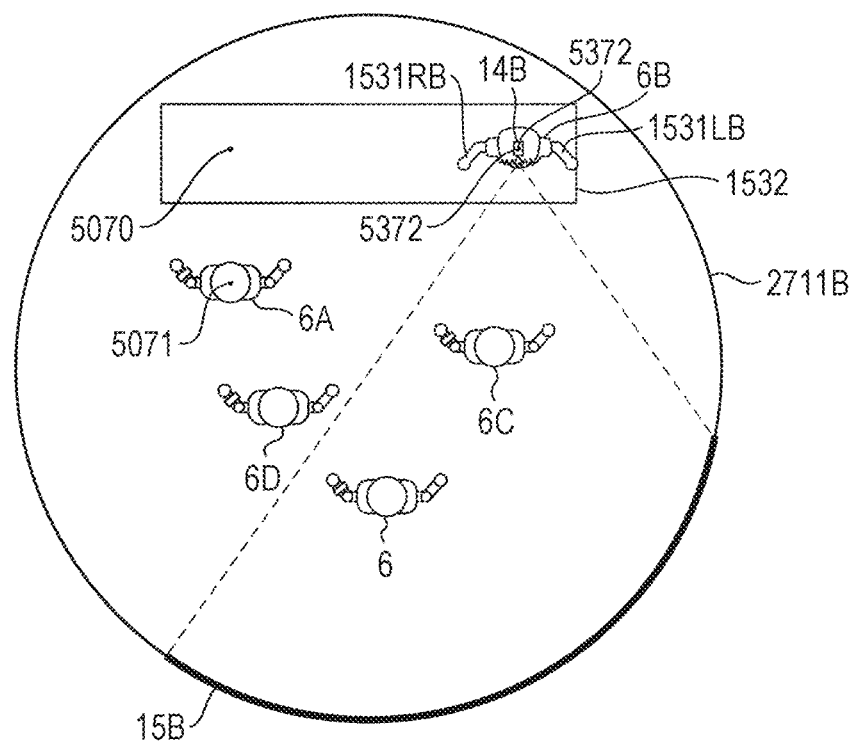
FIG. 54A A diagram of a virtual space according to at least one embodiment of this disclosure.
Figure 54B:
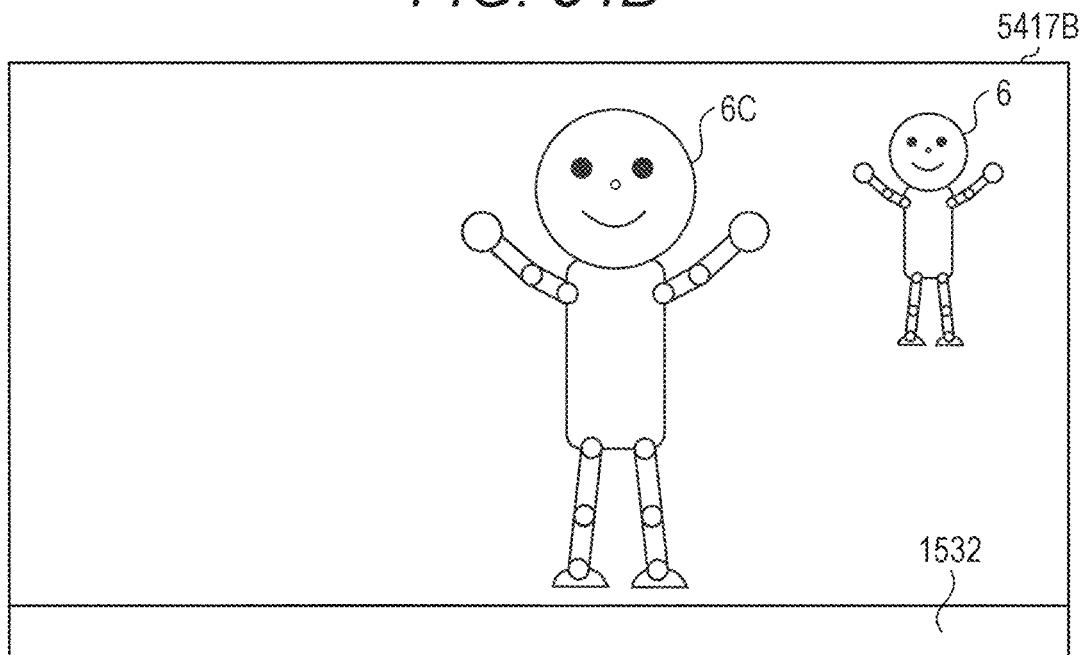
FIG. 54B A diagram of a field-of-view image according to at least one embodiment of this disclosure.

FIG. 54A is a diagram of the second virtual space 2711B and a field-of-view image 5417B according to at least one embodiment of this disclosure. Upon detecting the second operation made by the user 5B, the processor 210B discretely moves the avatar object 6B and the virtual camera 14B from the first position 5070 to the third position 5372 in the second virtual space 2711B as in FIG. 54A. The processor 210B causes the monitor 130B to display the field-of-view image 5417B corresponding to the second virtual space 2711B in FIG. 54A, as in FIG. 54B, for example. This enables the user 5B to recognize that the avatar object 6B has moved to the third position 5372, by visually checking the field-of-view image 5417B. This also enables the user 5B to recognize that the avatar object 6B has moved and consequently the avatar object 6A has got out of the field of view of the avatar object 6B.

Figure 55A:
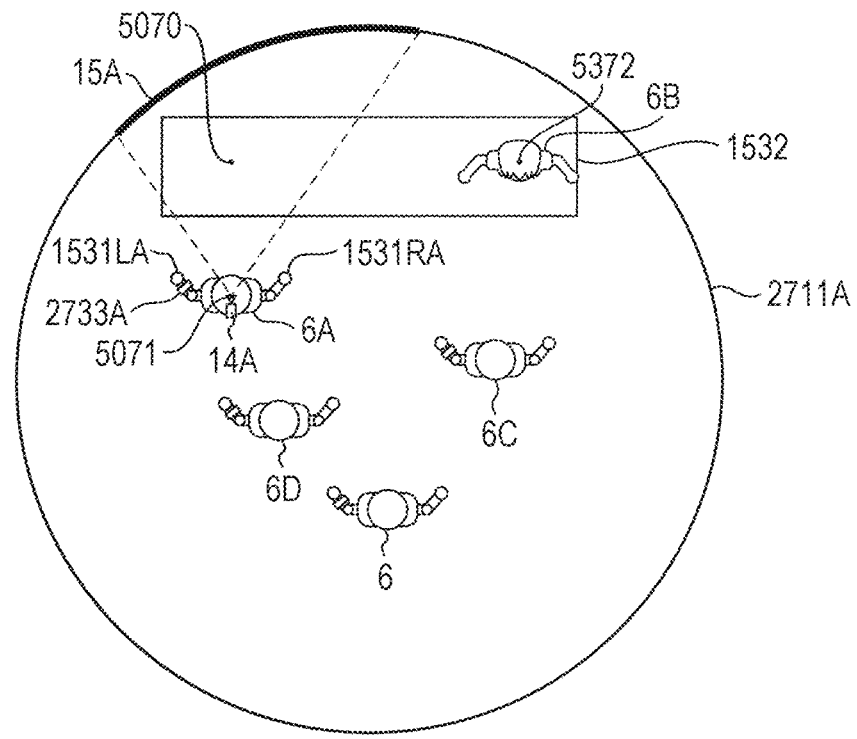
FIG. 55A A diagram of a virtual space according to at least one embodiment of this disclosure.
Figure 55B:
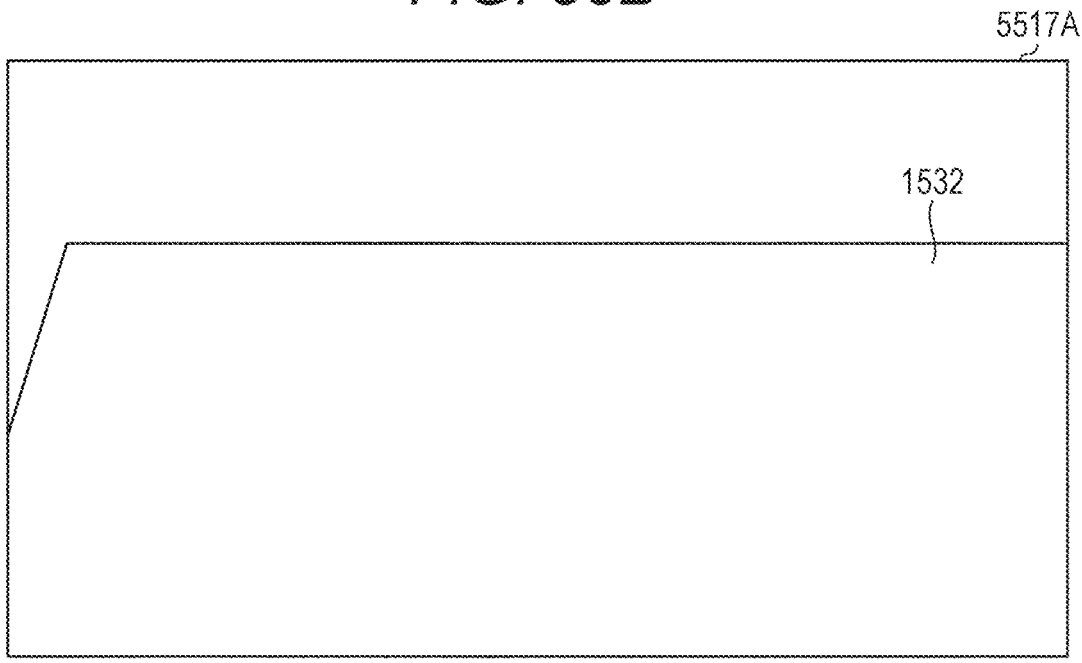
FIG. 55B A diagram of a field-of-view image according to at least one embodiment of this disclosure.

FIG. 55A is a diagram of the second virtual space 2711A and a field-of-view image 5517A according to at least one embodiment of this disclosure. After the avatar object 6B moved in the second virtual space 2711B, the processor 210A receives the latest avatar information on the avatar object 6B from the server 600. The processor 210A discretely moves the avatar object 6B from the first position 5070 to the third position 5372 in the second virtual space 2711A, based on motion information contained in the received avatar information. The avatar object 6B is thus arranged outside the field-of-view region 15A. The processor 210A causes the monitor 130A to display the field-of-view image 5517A corresponding to the second virtual space 2711A in FIG. 55A, as in FIG. 55B, for example. This enables the user 5A to recognize that the avatar object 6B has moved on the stage object 1532 and got out of the field of view of the avatar object 6A, by visually checking the field-of-view image 5517A.

The processor 210A allows the avatar object 6A to move in the second virtual space 2711A if the avatar object 6B has moved in the second virtual space 2711A. Conditions for allowing the avatar object 6A to move in the second virtual space 2711A are however not limited to this. The processor 210A notifies the user 5A of the fact that the avatar object 6A is allowed to move by voice, for example. The processor 210A may notify the user 5A of the fact that the avatar object 6A is allowed to move by changing illumination in the second virtual space 2711A.

Figure 56A:
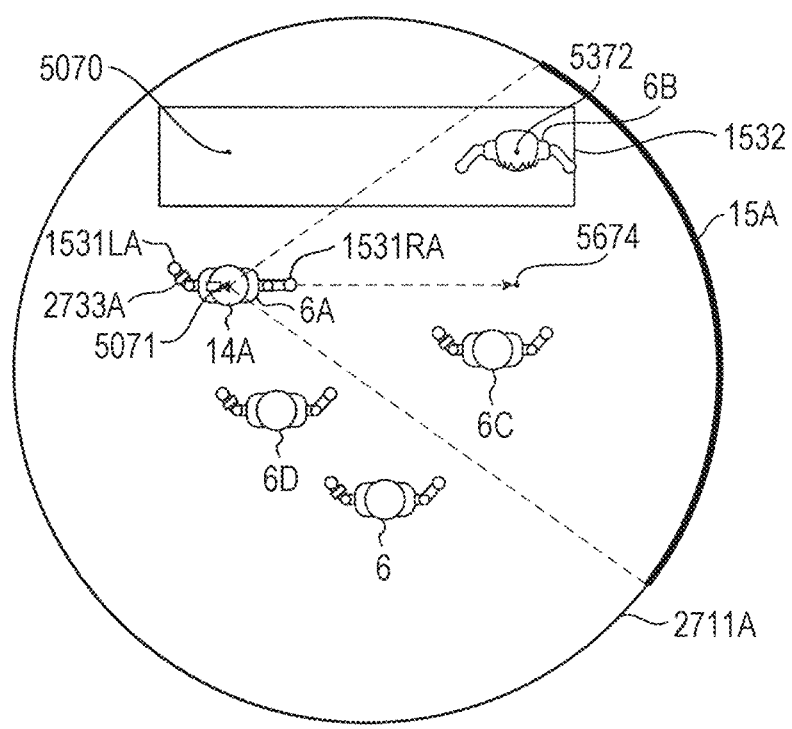
FIG. 56A A diagram of a virtual space according to at least one embodiment of this disclosure.

FIG. 56A is a diagram of the second virtual space 2711A and a field-of-view image 5617A according to at least one embodiment of this disclosure. In FIG. 56A, in response to the movement of the avatar object 6B, the processor 210A allows the avatar object 6A to move in the second virtual space 2711A. The user 5A recognizes that the avatar object 6B has moved close to the right end of the stage object 1532, by facing to the right. The user 5A may want to move the avatar object 6A to a fourth position 5674 in the second virtual space 2711A close to the avatar object 6B that has moved, thereby continuing to view the live performance at a position close to the avatar object 6B.

To satisfy this hope, the user 5A moves his/her right hand such that the tip of the virtual right hand 1531RA indicates the fourth position 5674. The processor 210A moves the virtual right hand 1531RA in accordance with the motion of the right hand of the user 5A. In response to the fact that the avatar object 6A is allowed to move, the processor 210A identifies the fourth position 5674 indicated by the tip of the virtual right hand 1531RA that has been moved.

Figure 56B:
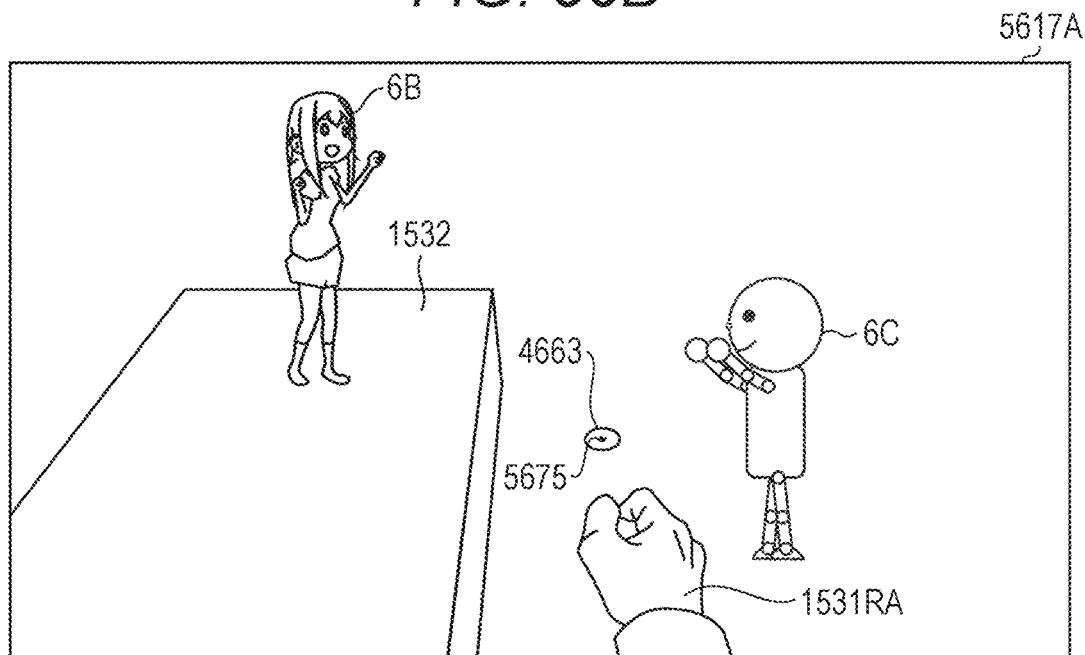
FIG. 56B A diagram of a field-of-view image according to at least one embodiment of this disclosure.

The processor 210A causes the monitor 130A to display the field-of-view image 5617A corresponding to the second virtual space 2711A in FIG. 56A, as in FIG. 56B, for example. The processor 210A causes the monitor 130A to display a mark 4663 indicating the fourth position 5674 in the second virtual space 2711A in a superimposed manner on a position 5675 in the field-of-view image 4817A corresponding to the fourth position 5674 in the second virtual space 2711A. The processor 210A may arrange the mark 4663 at the fourth position 5674 in the second virtual space 2711A as a virtual object. Alternatively, the processor 210A may contain the mark 4663 at the position 5675 corresponding to the fourth position 5674, in generating the field-of-view image 5617A. This enables the user 5A to recognize that the avatar object 6B has moved close to the right end of the stage object 1532, by visually checking the field-of-view image 5617A. This also enables the user 5A to recognize that the fourth position 5674 is specified as the position to which the avatar object 6A moves, by checking the mark 4663 included in the field-of-view image 5617A.

Figure 57A:
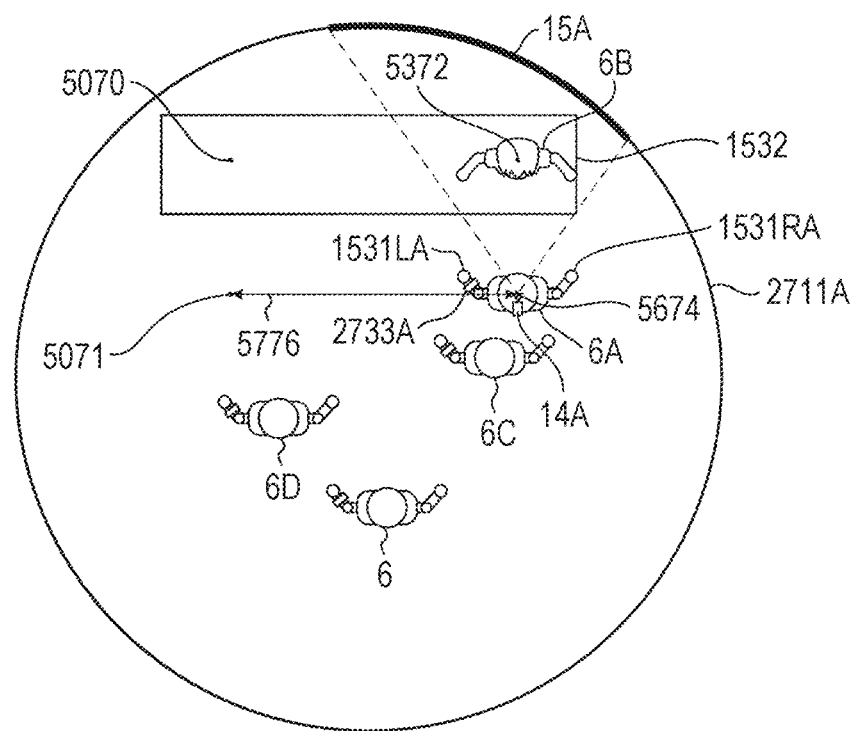
FIG. 57A A diagram of a virtual space according to at least one embodiment of this disclosure.

FIG. 57A is a diagram of the second virtual space 2711A and a field-of-view image 5717A according to at least one embodiment of this disclosure. The processor 210A detects a first operation made by the user 5A for moving the avatar object 6A to the fourth position 5674. Upon detecting the first operation made by the user 5A, the processor 210A discretely moves the avatar object 6A and the virtual camera 14A from the second position 5071 to the fourth position 5674 in the second virtual space 2711A as in FIG. 57A. The processor 210A registers charging information in accordance with a movement distance 5776 of the avatar object 6A from the second position 5071 to the fourth position 5674 with the tag object 2733A.

Figure 57B:
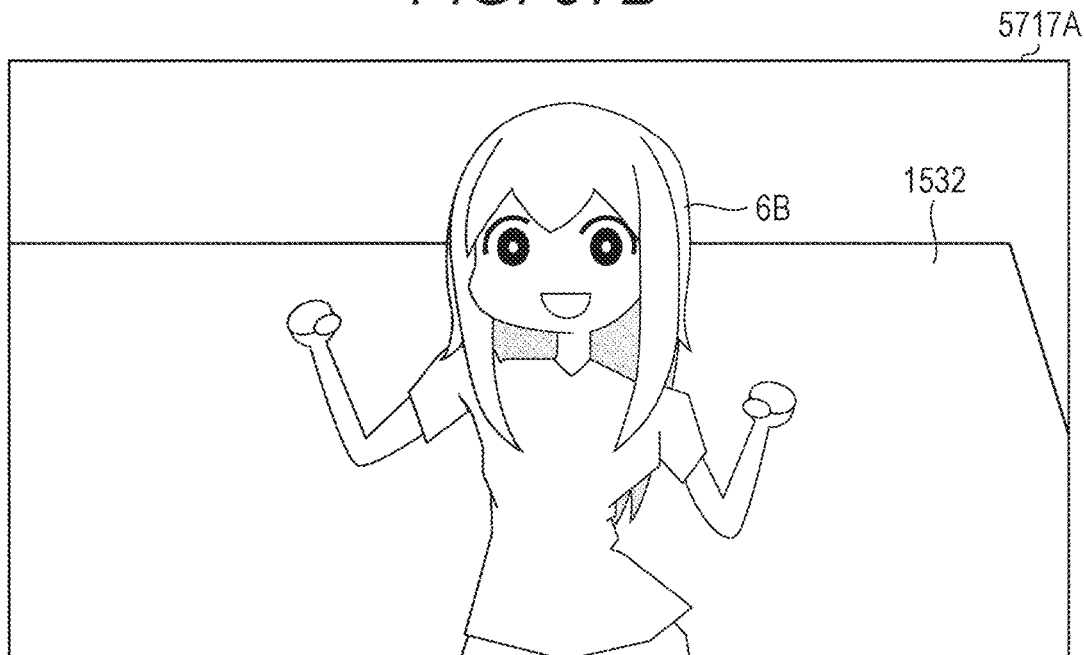
FIG. 57B A diagram of a field-of-view image according to at least one embodiment of this disclosure.

The processor 210A causes the monitor 130A to display the field-of-view image 5717A corresponding to the second virtual space 2711A in FIG. 57A, as in FIG. 57B, for example. This enables the user 5A to recognize that the avatar object 6A has been moved to the fourth position 5674, which is close to the avatar object 6B, by visually checking the field-of-view image 5717A. This also enables the user 5A to recognize that the avatar object 6B is present in front of the avatar object 6A. This further enables the user 5A to continue to enjoy the live performance at the position close to the avatar object 6B.

In at least one embodiment of FIG. 50A to FIG. 57B, as a result of the moving of the avatar object 6B in the second virtual space 2711A, the user 5A is highly motivated to move the avatar object 6A close to the avatar object 6B. In this manner, the user 5B may move the avatar object 6A, thereby strongly encouraging the user 5A to move the avatar object 6A. The user 5A is thus expected to willingly move the avatar object 6A in the second virtual space 2711A, which may further enhance the possibility of charging the charged amount in accordance with the movement distance to the user 5A. As a result, sales of the live performance made by the avatar object 6B may increase.

The processor 210A does not necessarily register charging information in accordance with the movement distance with the tag object 2733A. The processor 210A may register charging information in accordance with the movement distance with the avatar object 6A in association therewith, for example. The processor 210A may perform any charging-related processing in accordance with the movement distance, instead of registering charging information in accordance with the movement distance with the tag object 2733A. The charging-related processing is, for example, transmitting charging information to the server 600 without registering it with the tag object 2733A.

The processor 210A may perform charging-related processing in accordance with how many times the avatar object 6A moved (the number of times of movement). The processor 210A registers charging information in accordance with the number of times of movement with the tag object 2733A, for example. The processor 210A calculates a higher charged amount for a larger number of times of movement and registers charging information indicating the calculated charged amount with the tag object 2733A, for example. In this case, the processor 210A may register optimum charging information in accordance with how many times the avatar object 6A moved with the tag object 2733A. The processor 210A may further prevent the avatar object 6A from moving in the second virtual space 2711A with no restriction and hampering the live performance made by the avatar object 6B.

The processor 210A may perform charging processing in accordance with at least one of the movement distance and the number of times of movement. The processor 210A may perform any processing from: first charging-related processing in accordance with the movement distance alone, second charging-related processing in accordance with the number of times of movement alone, or third charging-related processing in accordance with both the movement distance and the number of times of movement.

The processor 210A may perform charging-related processing in accordance with the movement distance and the movement direction of the avatar object 6A. The processor 210A sets a higher charging unit price for the movement direction of the avatar object 6A that approaches the avatar object 6B, for example. The processor 210A sets a lower charging unit price for the movement direction of the avatar object 6A that gets away from the avatar object 6B, for example.

The processor 210A may continuously move the avatar object 6A in the second virtual space 2711A. The processor 210A moves the avatar object 6A from the first position 4661 to the second position 4662 so as to go through the positions from the first position 4661 to the second position 4662, in accordance with the first operation made by the user 5A, for example. In this case as well, the processor 210A registers charging information indicating the charged amount in accordance with the movement distance 4775 with the tag object 2733A.

The processor 210A may automatically move the avatar object 6A in the second virtual space 2711A, without detecting the first operation made by the user 5B. Also in such a case that the processor automatically moves the avatar object 6A, the processor 210A registers charging information indicating the charged amount in accordance with the movement distance with the tag object 2733A.

While at least one embodiment assumes that the position to which the processor 210A allows the avatar object 6A to move is limited to the one at which no other avatar objects 6 than the avatar object 6A are arranged in the second virtual space 2711A, this is not construed in a limiting sense. In other words, while the user 5A is not allowed to specify a position at which any of the other avatar objects 6 than the avatar object 6A is arranged as a position to which the avatar object 6A is moved, this is not construed in a limiting sense.

In at least one embodiment, the position to which the processor 210A allows the avatar object 6A to move is limited to the one within a specific range in the second virtual space 2711A. The processor 210A does not allow the avatar object 6A to move onto the stage object 1532 in principle, for example. The processor 210A may move the avatar object 6A onto the stage object 1532 only if the user 5B permits this. This is not construed in a limiting sense.

The user 5B may make a second operation for allowing the avatar object 6A to move. Upon detecting the second operation made by the user 5B, the processor 210B transmits detection information indicating detection of the second operation to the computer 200A via the server 600. The processor 210A receives the detection information transmitted from the computer 200B. The processor 210A detects the second operation made by the user 5B, based on the received detection information. Upon detecting the second operation, the processor 210A allows the avatar object 6A to move in the second virtual space 2711A. The processor 210A allows the movement within a certain period of time from the detection of the second operation, for example. The second operation may be, instead of an operation made by the user 5B itself, an action of the user 5B such as the utterance content of the user 5B or information specifying a period for allowing the movement. This enables the processor 210A to prevent the avatar object 6A from moving during the live performance arbitrarily without the user 5B's permission. In other words, the user 5B may willfully specify the timing at which the avatar object 6A is allowed to move. This also enables the user 5B to control the staging of the live performance in a manner more preferable for the user 5B.

The processor 210A may detect a first event in the second virtual space 2711A. The first event is, for example, making any action by the avatar object 6B. Examples of the action of the avatar object 6B include the moving of the avatar object 6B to another position on the stage object 1532 as in FIG. 55A. The first event may be a specific performance carried out by the avatar object 6B on the stage object 1532 for a certain period of time or more. Upon detecting the first event, the processor 210A allows the avatar object 6A to move in the second virtual space 2711A. This may prevent the avatar object 6A from moving haphazardly during the live performance.

In the HMD system 100, the charging unit price for a certain distance may vary depending on the size of the second virtual space 2711A. For example, a lower charging unit price is set for the second virtual space 2711A with a larger size. If the defined size of the second virtual space 2711A is a first size, the processor 210A sets a first charging unit price (for example, 50 yen) as the charging unit price, for the computer 200A. If the defined size of the second virtual space 2711A is a second size that is larger than the first size, the processor 210A sets a second charging unit price (for example, 20 yen) that is lower than the first charging unit price as the charging unit price, for the computer 200A. The processor 210A may multiply the movement distance of the avatar object 6A by the charging unit price set for the computer 200A, thereby calculating an optimum charged amount in accordance with both the size of the second virtual space 2711A and the movement distance.

The processor 210A may perform charging-related processing in accordance with at least one of the movement distance and the number of times of movement even if the avatar object 6A has been moved in the second virtual space 4311A where the live video 4239 in FIG. 43A is being played. In addition, the processor 210A may perform charging-related processing in accordance with at least one of the movement distance and the number of times of movement even if the avatar object 6A has been moved in a virtual space where no performance made by the avatar object 6B is taking place and no live video 4239 is being played.

In at least one embodiment, the processor 210A performs charging- and settlement-related processing on the user 5A under a scheme using the tag object 2733A as described above. This is however not construed in a limiting sense, and the processor 210A may perform charging- and settlement-related processing on the user 5A under any desired scheme different from the above description.

In at least one embodiment, the processor 210C performs charging- and settlement-related processing on the user 5C under the same scheme as the one using the tag object 2733A as described above. This is however not construed in a limiting sense, and the processor 210C may perform charging- and settlement-related processing on the user 5C under any desired scheme different from the above description.

Figure 58:
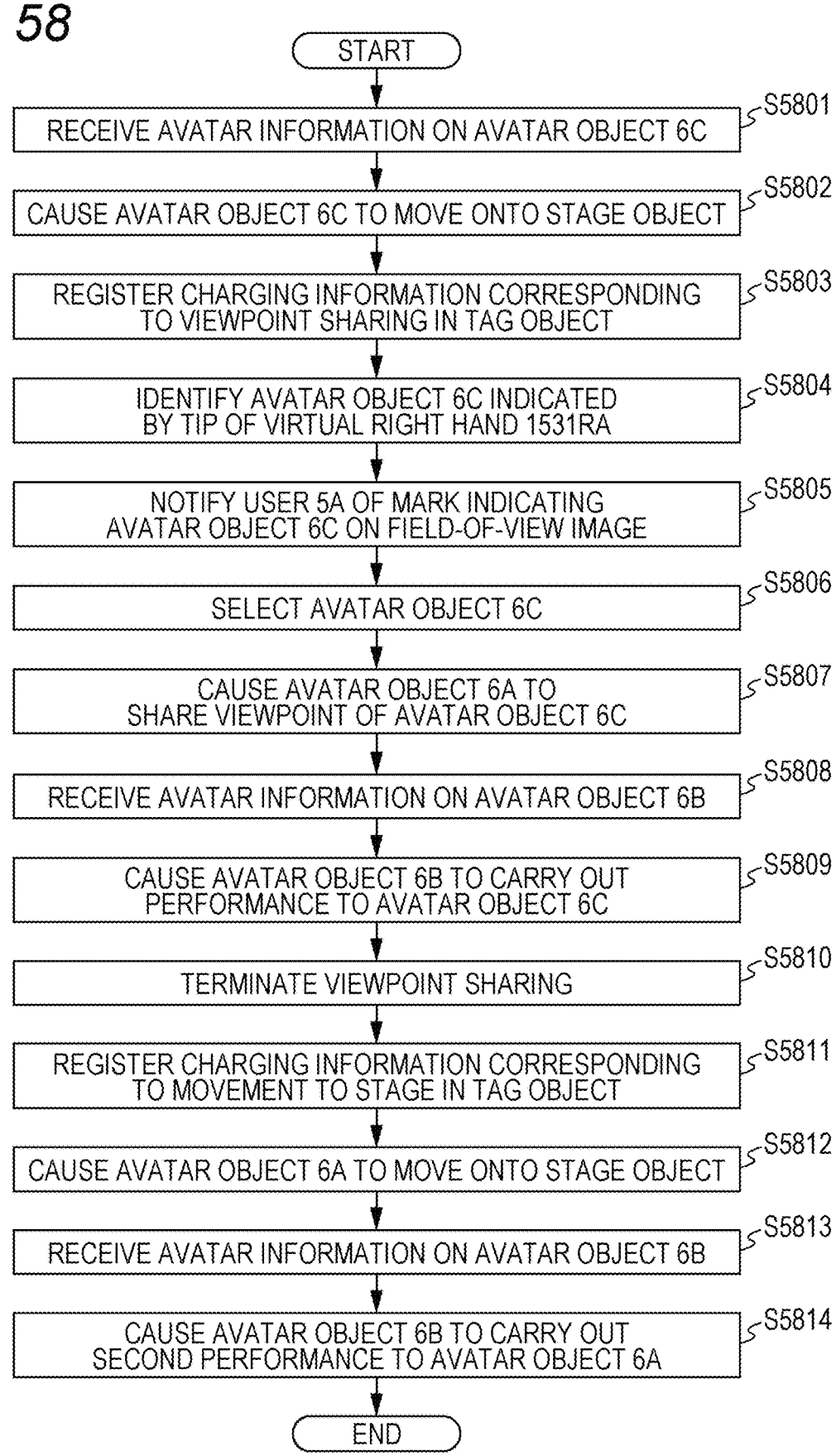
FIG. 58 A flowchart of processing to be executed by a system including an HMD set according to at least one embodiment of this disclosure.
Figure 59A:
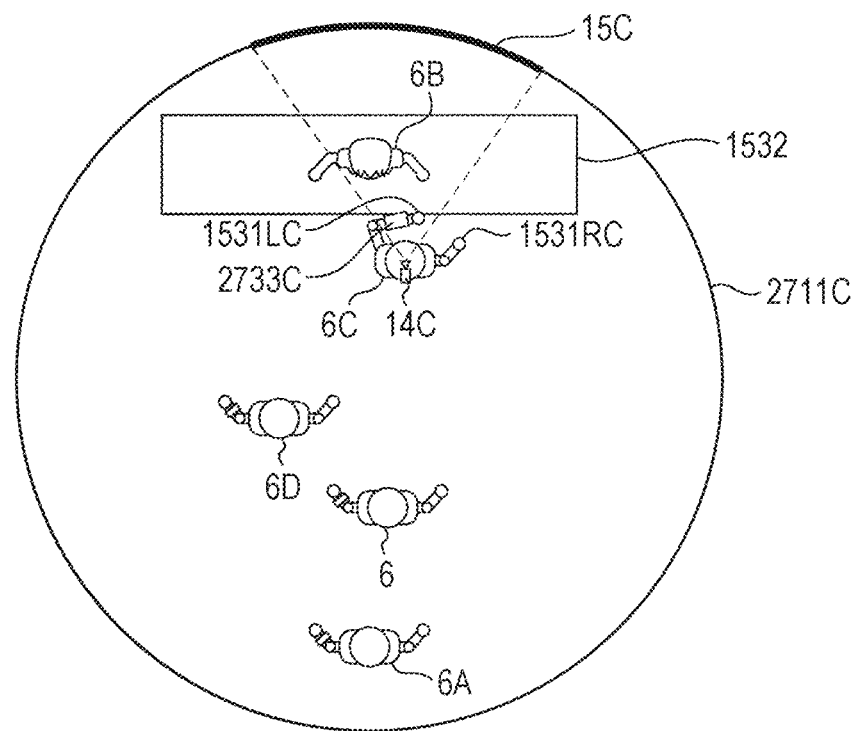
FIG. 59A A diagram of a virtual space according to at least one embodiment of this disclosure.

FIG. 58 is a flowchart of processing to be executed by a system including the HMD set 110A according to at least one embodiment of this disclosure. FIG. 59A is a diagram of the second virtual space 2711C and a field-of-view image 5917C according to at least one embodiment of this disclosure. In FIG. 59A, the processor 210C causes the avatar object 6B (third avatar) associated with the user 5B (third user) to carry out a performance (first performance) in the second virtual space 2711C provided to the user 5C (second user), in accordance with the motion of the user 5B. The processor 210C causes the avatar object 6C (second avatar) associated with the user 5C to view the performance at a position close to the avatar object 6B. The processor 210C causes the avatar object 6A (first avatar) associated with the user 5A (first user) to view the performance at a position away from the avatar object 6B.

In the second virtual space 2711A in synchronization with the second virtual space 2711C, the processor 210A causes the avatar object 6B to carry out the performance in accordance with the motion of the user 5B. The processor 210A causes the avatar objects 6A and 6C to view the performance made by the avatar object 6B in the second virtual space 2711A.

The processor 210C conveys a message for encouraging the avatar object 6C to move onto the stage object 1532 to the user 5C during the live performance. The processor 210C provides a display of the message on the tag object 2733C as in FIG. 59A, for example. The message contains text for encouraging the user 5C to move onto the stage object 1532 and a charged amount to be charged to the user 5C for moving the avatar object 6C. In the example in FIG. 59A, the charged amount for moving the avatar object 6C onto the stage object 1532 is 1,000 yen.

Figure 59B:
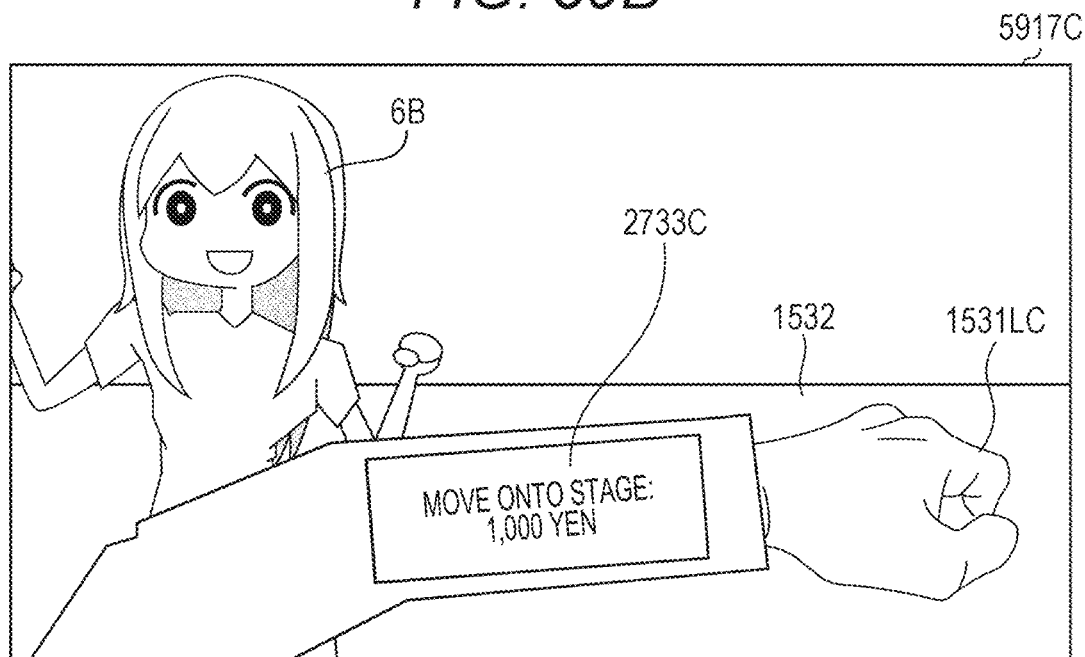
FIG. 59B A diagram of a field-of-view image according to at least one embodiment of this disclosure.

After the message is displayed on the tag object 2733C, the processor 210C moves the virtual left hand 1531LC to be within a field-of-view region 15C as in FIG. 59A, in accordance with the motion of the left hand of the user 5C. The processor 210C causes the monitor 130C to display the field-of-view image 5917C corresponding to the second virtual space 2711C in FIG. 59A, as in FIG. 59B, for example. This enables the user 5C to check the message displayed on the tag object 2733C, by visually checking the field-of-view image 5917C. In this manner, the user 5C recognizes that the avatar object 6C is movable onto the stage object 1532 for an additional charged amount of 1,000 yen.

Figure 60A:
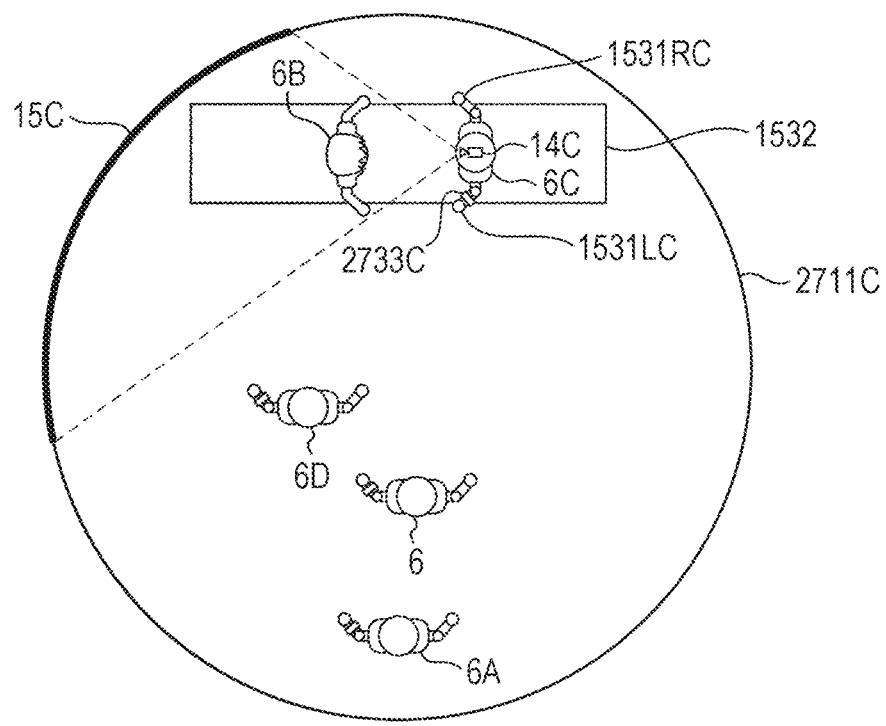
FIG. 60A A diagram of a virtual space according to at least one embodiment of this disclosure.

FIG. 60A is a diagram of the second virtual space 2711C and a field-of-view image 6017C according to at least one embodiment of this disclosure. The user 5C checks the message displayed on the tag object 2733C, by visually checking the field-of-view image 6017C. The user 5C may want to move the avatar object 6C onto the stage object 1532, as a result of checking the message. To satisfy this hope, the user 5C performs an operation for selecting the tag object 2733C. Upon detection of the operation made by the user 5C, the processor 210C registers charging information corresponding to the moving onto the stage with the tag object 2733C. Specifically, the processor 210C registers charging information indicating a charged amount for moving the avatar object 6C onto the stage object 1532 with the tag object 2733C. After the registration of the charging information, the processor 210C moves the avatar object 6C onto the stage object 1532 as in FIG. 60A. The processor 210C arranges the avatar object 6C that has been moved, at a position right in front of the avatar object 6B on the stage object 1532. After the avatar object 6C has been moved, the processor 210C transmits avatar information on the avatar object 6C to the server 600.

Figure 60B:
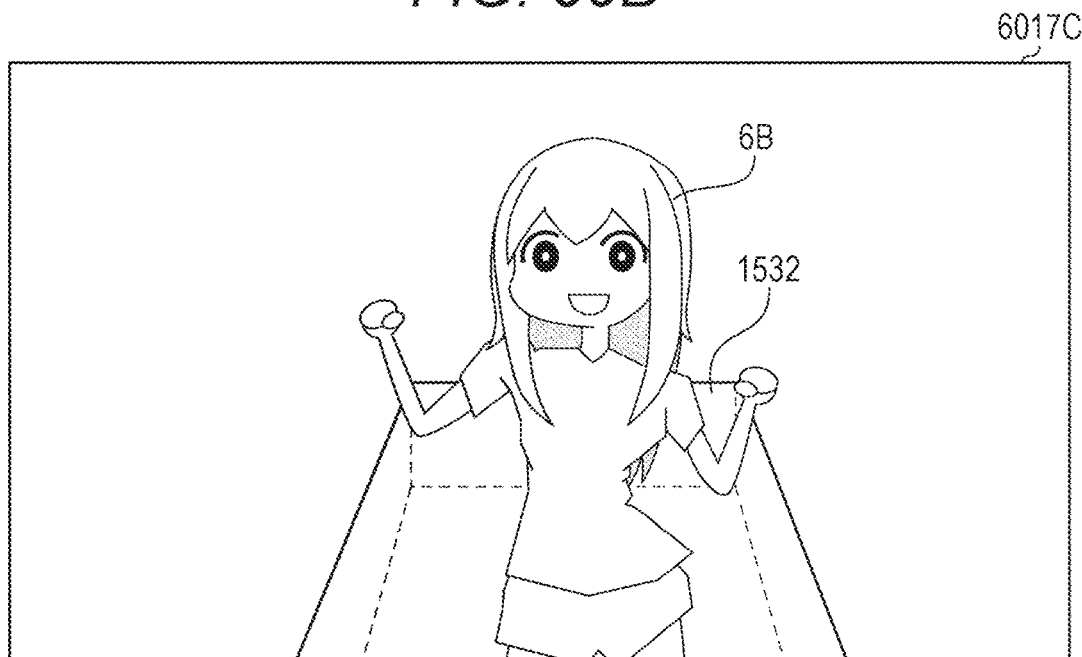
FIG. 60B A diagram of a field-of-view image according to at least one embodiment of this disclosure.

The processor 210C causes the monitor 130C to display the field-of-view image 6017C corresponding to the second virtual space 2711C in FIG. 60A, as in FIG. 60B, for example. This enables the user 5C to recognize that the avatar object 6C has been moved onto the stage object 1532, by visually checking the field-of-view image 6017C. This also enhances the user 5C to enjoy the performance right in front of the avatar object 6B and enjoy coming into contact with the avatar object 6B (in other words, with the user 5B).

Figure 61A:
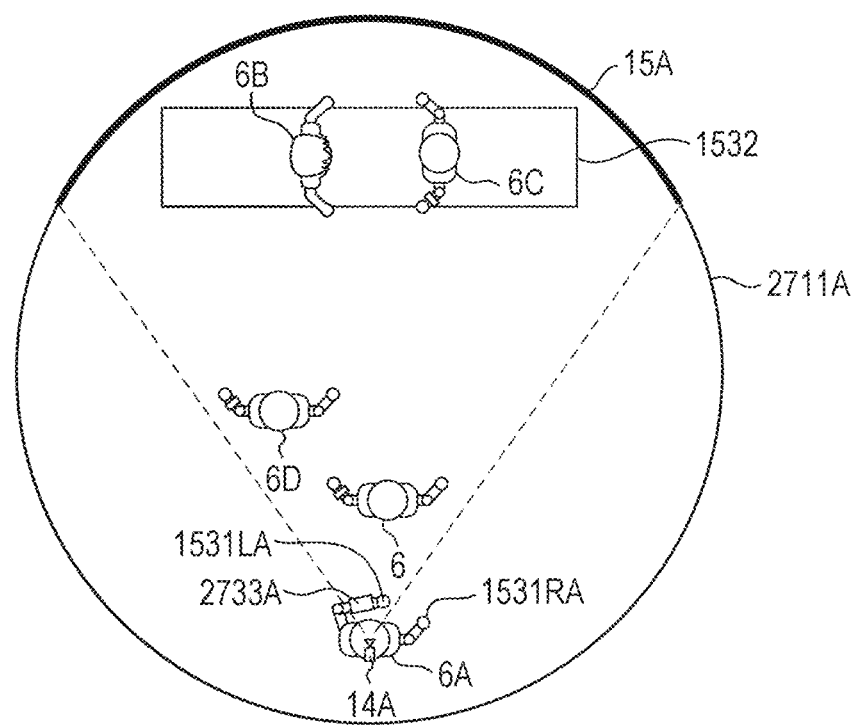
FIG. 61A A diagram of a virtual space according to at least one embodiment of this disclosure.

FIG. 61A is a diagram of the second virtual space 2711A and a field-of-view image 6117A according to at least one embodiment of this disclosure. In Step S5801, after the avatar object 6C has been moved onto the stage object 1532 in the second virtual space 2711C, the processor 210A receives the avatar information on the avatar object 6C from the server 600. In Step S5802, the processor 210A moves the avatar object 6C onto the stage object 1532 in the second virtual space 2711A as in FIG. 61A, based on the received avatar information. In other words, the processor 210A synchronizes the second virtual space 2711A with the second virtual space 2711C in FIG. 60A. The processor 210A arranges the avatar object 6C at a position right in front of the avatar object 6B on the stage object 1532.

After the avatar object 6C has been moved onto the stage object 1532, the processor 210A receives the avatar information on the avatar object 6B from the server 600. The processor 210A causes the avatar object 6B to carry out a performance (second performance) for the avatar object 6C, in accordance with motion information contained in the received avatar information. In this manner, upon the registration of the charging information corresponding to the moving onto the stage with the tag object 2733C, the avatar object 6C views the performance made by the avatar object 6B to the avatar object 6C in the second virtual space 2711A.

After the avatar object 6C has been moved onto the stage object 1532, the processor 210A conveys a message for encouraging the user 5A to cause the avatar object 6A to have the viewpoint of another avatar object 6 other than the avatar object 6A (viewpoint sharing) to the user 5A during the live performance. The processor 210A provides a display of the message on the tag object 2733A, for example. The message contains text for encouraging the user 5A to have viewpoint sharing and a charged amount to be charged to the user 5A for viewpoint sharing. In at least one embodiment of FIG. 61A, the charged amount charged to the user 5A for viewpoint sharing is 200 yen. After the message is displayed on the tag object 2733A, the processor 210A moves the virtual left hand 1531LA to be within the field-of-view region 15A as in FIG. 61A, in accordance with the motion of the left hand of the user 5A.

Figure 61B:
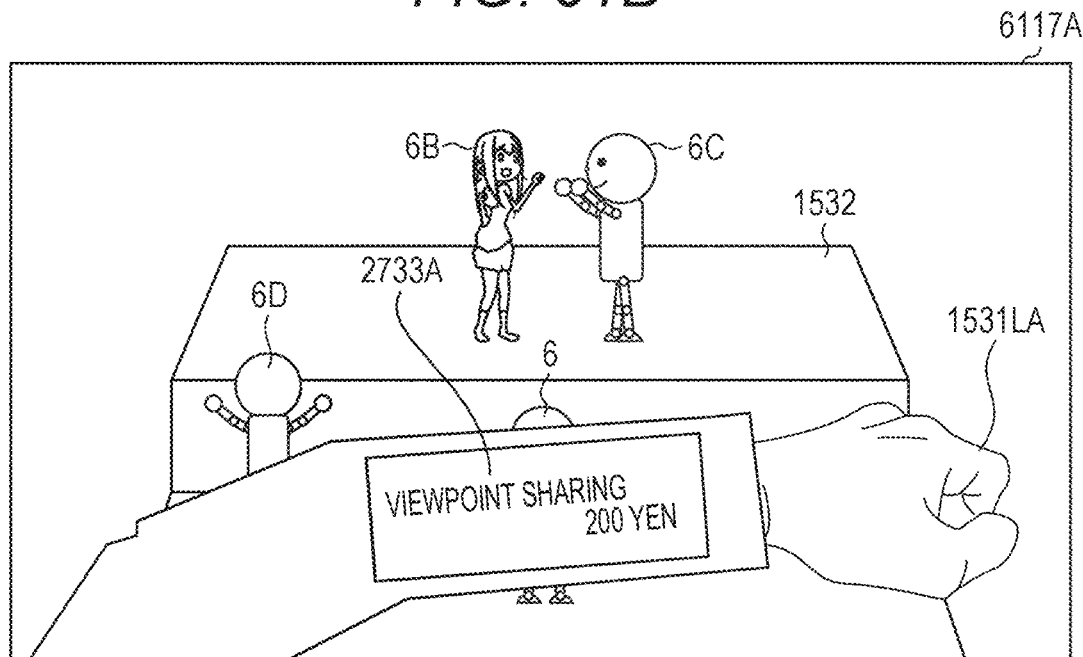
FIG. 61B A diagram of a field-of-view image according to at least one embodiment of this disclosure.

The processor 210A causes the monitor 130A to display the field-of-view image 6117A corresponding to the second virtual space 2711A in FIG. 61A, as in FIG. 61B, for example. This enables the user 5A to recognize that the avatar object 6C has been moved onto the stage object 1532, by visually checking the field-of-view image 6117A. This also enables the user 5A to recognize that the avatar object 6C is viewing the performance at a position close to the avatar object 6B on the stage object 1532. This further enables the user 5A to recognize that the viewpoint of any of the other avatar objects 6 is sharable with the avatar object 6A for an additional charged amount of 200 yen, by checking the message displayed on the tag object 2733C.

Figure 62A:
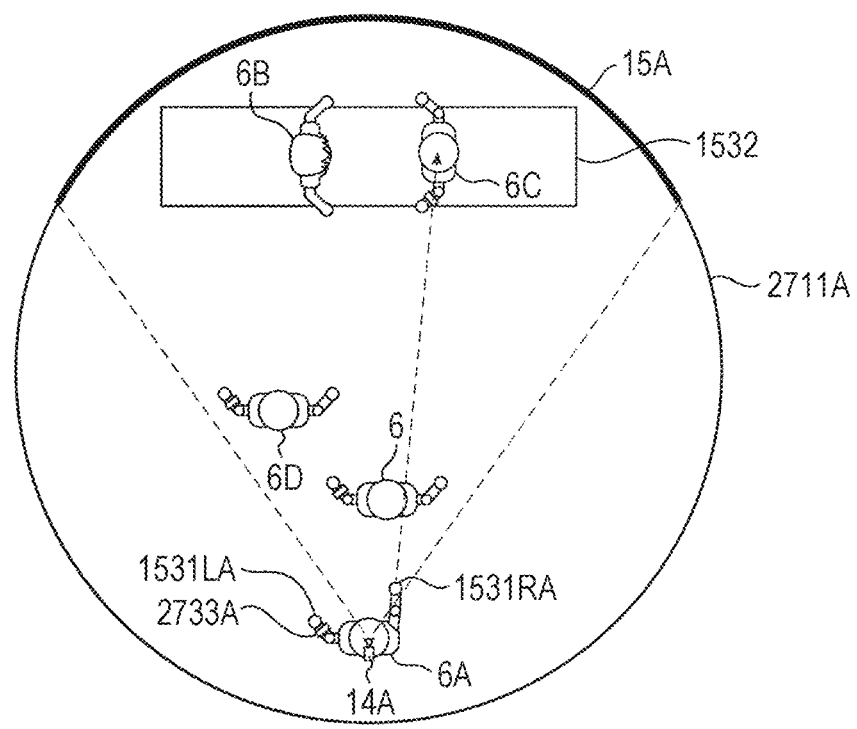
FIG. 62A A diagram of a virtual space according to at least one embodiment of this disclosure.

FIG. 62A is a diagram of the second virtual space 2711A and a field-of-view image 3417A according to at least one embodiment of this disclosure. The user 5A may want to cause the avatar object 6A to have the viewpoint of the avatar object 6C, after checking the message displayed on the tag object 2733A. To satisfy this hope, the user 5A performs an operation for selecting the tag object 2733A. In Step S5803, upon detection of the operation made by the user 5A, the processor 210A registers charging information corresponding to viewpoint sharing with the tag object 2733A. Specifically, the processor 210A additionally registers charging information indicating a charged amount (200 yen) required for viewpoint sharing with the tag object 2733A. Upon the registration of the charging information, the processor 210A enables the avatar object 6A to have the viewpoint of another avatar object 6 in the second virtual space 2711A. The processor 210A notifies the user 5A of the fact that viewpoint sharing becomes available by voice, for example. The processor 210A may notify the user 5A of the fact that viewpoint sharing becomes available by changing illumination in the second virtual space 2711A.

The processor 210A moves the virtual right hand 1531RA such that the tip of the virtual right hand 1531RA indicates the avatar object 6C as in FIG. 62A, in accordance with the motion of the right hand with the tag object 2733A selected. In Step S5804, the processor 210A identifies the avatar object 6C indicated by the tip of the virtual right hand 1531RA.

Figure 62B:
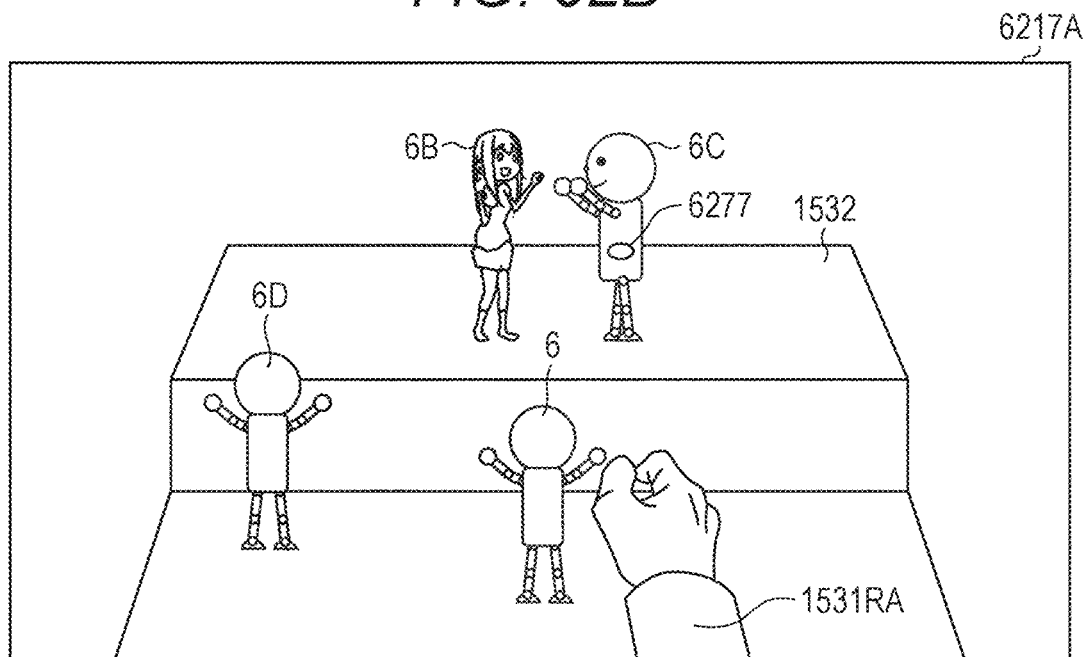
FIG. 62B A diagram of a field-of-view image according to at least one embodiment of this disclosure.

The processor 210A causes the monitor 130A to display the field-of-view image 6217A corresponding to the second virtual space 2711A in FIG. 62A, as in FIG. 62B, for example. In Step S5805, the processor 210A causes the monitor 130A to display a mark 6277 indicating the avatar object 6C in a superimposed manner on the avatar object 6C in the field-of-view image 6217A. The processor 210A may arrange the mark 6277 as a virtual object in contact with or close to the avatar object 6C in the second virtual space 2711A. The processor 210A may contain the mark 6277 at the position of the avatar object 6C in the field-of-view image 4617A, in generating the field-of-view image 6217A. This enables the user 5A to recognize that the avatar object 6C is specified, by visually checking the mark 6277 in the field-of-view image 6217A. After checking the mark 6277, the user 5A performs a first operation for causing the avatar object 6A to have the viewpoint of the avatar object 6C. The first operation is, for example, pressing any button on the right controller 300RA by the user 5A.

Figure 63A:
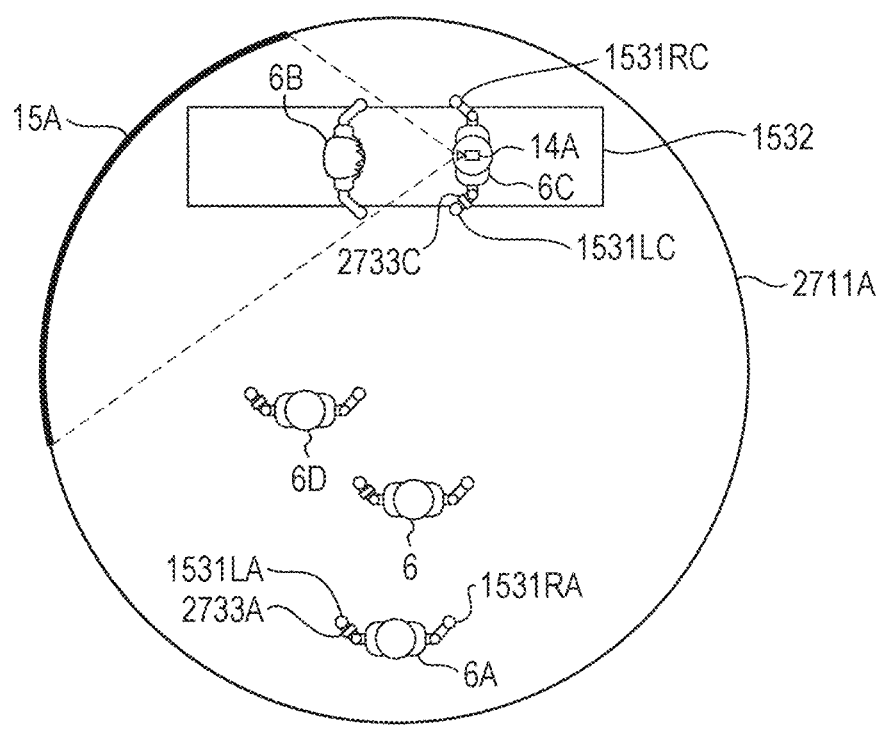
FIG. 63A A diagram of a virtual space according to at least one embodiment of this disclosure.

FIG. 63A is a diagram of the second virtual space 2711A and a field-of-view image 6317A according to at least one embodiment of this disclosure. In Step S5806, upon detection of the first operation, the processor 210A selects the avatar object 6C. In Step S5807, in response to the avatar object 6C being selected, the processor 210A causes the avatar object 6A to have the viewpoint of the avatar object 6C viewing the performance for the avatar object 6C. Specifically, the processor 210A moves the virtual camera 14A from the position of the avatar object 6A to the position of the avatar object 6C. In this process, the processor 210A does not move the avatar object 6A. Thus, the avatar object 6A and the virtual camera 14A are arranged at different positions in the second virtual space 2711A after the virtual camera 14A has been moved. The processor 210A controls the direction of the virtual camera 14A after having been moved, in accordance with the direction of the head of the avatar object 6C. This enables the avatar object 6A to have the viewpoint of the avatar object 6C.

If charging information corresponding to viewpoint sharing is registered with the tag object 2733A, the processor 210A may provide a display, on the tag object 2733A, of a UI for selecting the avatar object 6C. In this case, the user 5A selects the avatar object 6C through an entry in the UI displayed on the tag object 2733A. The processor 210A causes the avatar object 6A to have the viewpoint of the avatar object 6C, selected through the UI. If charging information corresponding to viewpoint sharing is registered with the tag object 2733A, the processor 210A may automatically cause the avatar object 6A to have the viewpoint of the avatar object 6C, without the need for the user 5A to select the avatar object 6C.

After viewpoint sharing, in Step S5808, the processor 210A receives the avatar information on the avatar object 6B from the server 600. In Step S5809, the processor 210A causes the avatar object 6B to carry out a performance (second performance) for the avatar object 6C, based on motion information contained in the received avatar information. In this manner, upon the registration of the charging information corresponding to the moving onto the stage with the tag object 2733C, the avatar object 6C views the performance made by the avatar object 6B to the avatar object 6C in the second virtual space 2711A.

Figure 63B:
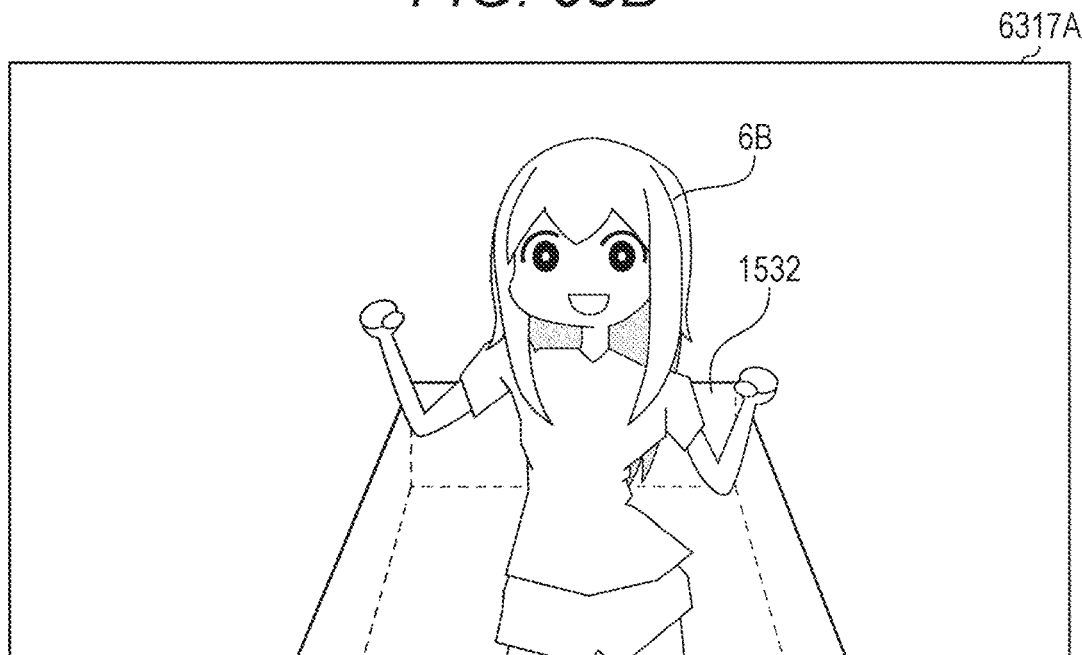
FIG. 63B A diagram of a field-of-view image according to at least one embodiment of this disclosure.

The processor 210A causes the monitor 130A to display the field-of-view image 6317A (first field-of-view image) corresponding to the second virtual space 2711A in FIG. 63A, as in FIG. 63B, for example. This enables the user 5A to recognize that the viewpoint of the avatar object 6C has been shared with the avatar object 6A, by visually checking the field-of-view image 6317A. In other words, this enables the user 5A to view the performance for the avatar object 6C right in front of the avatar object 6B, as the user 5C does.

In FIG. 63A, while the viewpoint of the avatar object 6C is shared with the avatar object 6A, the avatar object 6A itself is at a position far away from the avatar object 6B. Thus, the user 5A is not allowed to cause the avatar object 6A to come into direct contact with the avatar object 6B. For example, the user 5A is not allowed to reach out or wave the virtual right hand 1531RA to the avatar object 6B. The processor 210A may keep voice uttered by the user 5B from coming from the speaker 180A. Thus, the user 5A cannot listen to the voice of the user 5B directed to the avatar object 6C. In this manner, the user 5A is only allowed to view the user 5C coming into contact with the avatar object 6B (the user 5B) from the viewpoint of the avatar object 6C. Since the charged amount (200 yen) for viewpoint sharing is smaller than the charged amount (1,000 yen) for moving onto the stage object 1532, the user 5A is satisfied with the fact that the user is not allowed to cause the avatar object 6A to come into contact with the avatar object 6B after the viewpoint sharing. The pricing may further motivate the user 5A to try out viewpoint sharing.

Figure 64A:
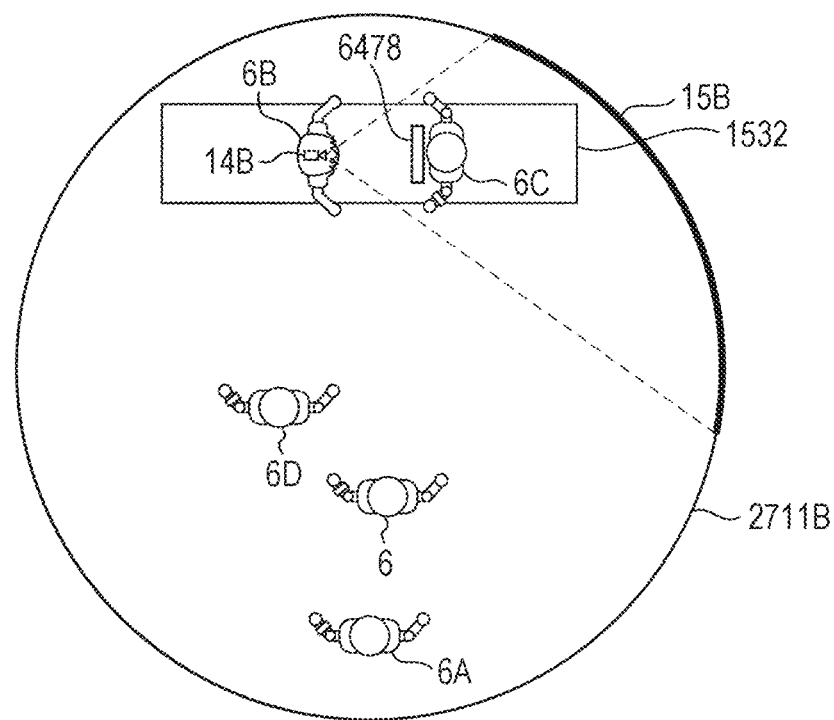
FIG. 64A A diagram of a virtual space according to at least one embodiment of this disclosure.

FIG. 64A is a diagram of the second virtual space 2711B and a field-of-view image 6417B according to at least one embodiment of this disclosure. In FIG. 64A, the avatar object 6B and the avatar object 6C are arranged on the stage object 1532. Three avatar objects 6 including the avatar object 6A have the viewpoint of the avatar object 6C. The processor 210B arranges a monitor object 6478 for notifying the user 5B of the number of the avatar objects 6 having the viewpoint of the avatar object 6C in the second virtual space 2711B in association with the avatar object 6C. The monitor object 6478 is placed above the avatar object 6C. The processor 210B provides a display, on the monitor object 6478, of the number of the avatar objects 6 having the viewpoint of the avatar object 6C.

Figure 64B:
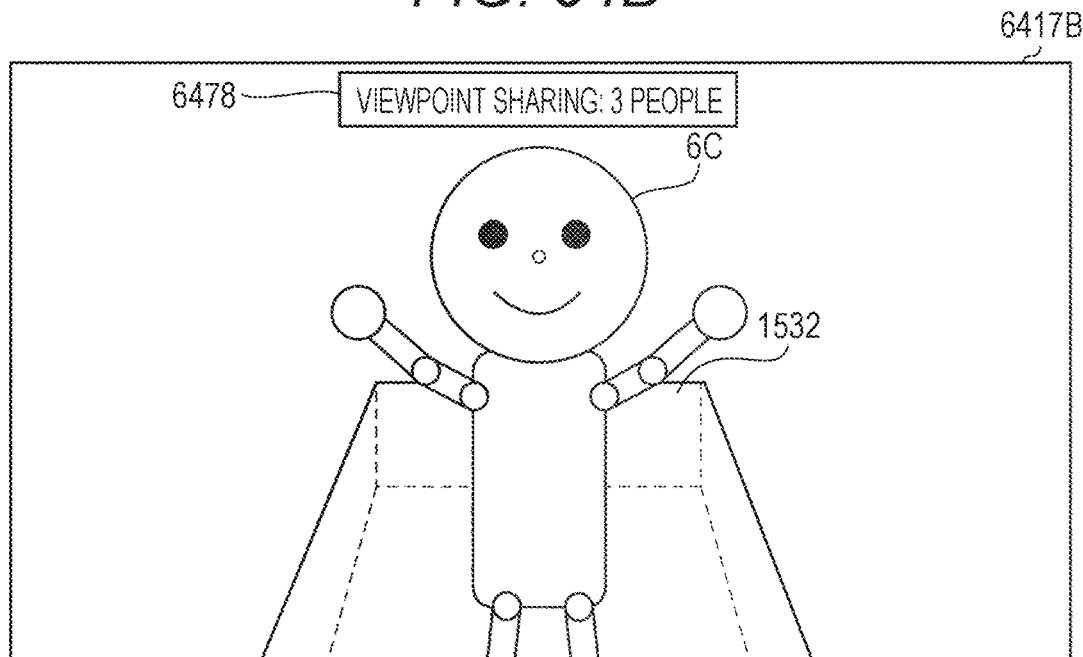
FIG. 64B A diagram of a field-of-view image according to at least one embodiment of this disclosure.

The processor 210B causes the monitor 130B to display the field-of-view image 6417B corresponding to the second virtual space 2711B in FIG. 64A, as in FIG. 64B, for example. This enables the user 5B to recognize that the avatar object 6C is viewing the performance right in front of the avatar object 6B, by visually checking the field-of-view image 6417B. This also enables the user 5B to recognize that the viewpoint of the avatar object 6C has been shared with the three other avatar objects 6, by checking the number displayed on the monitor object 6478. In other words, this enables the user 5B to figure out how many other users 5 appreciate the performance for the avatar object 6C.

Figure 65A:
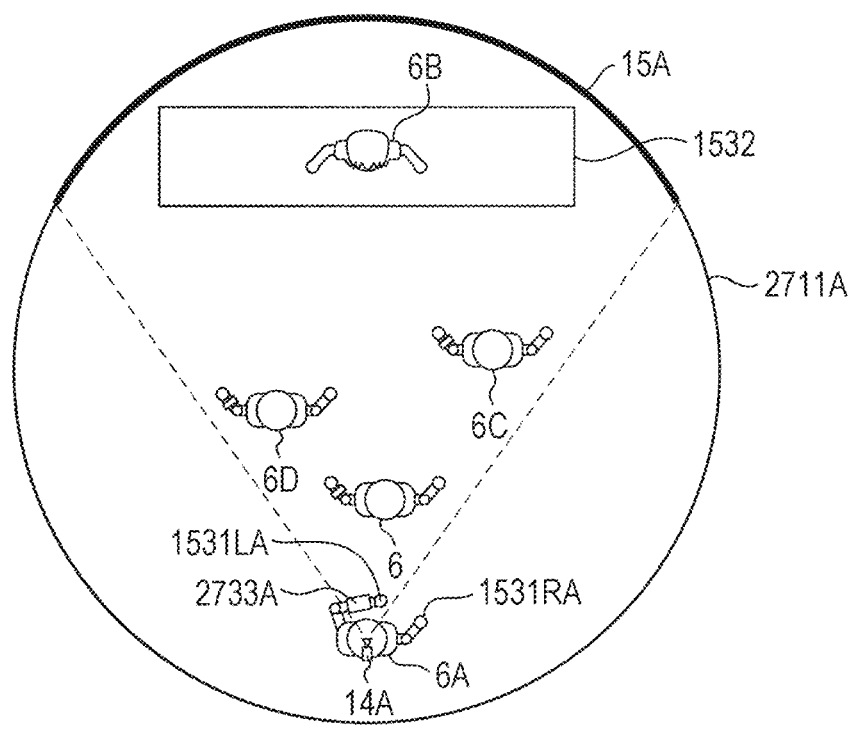
FIG. 65A A diagram of a virtual space according to at least one embodiment of this disclosure.

FIG. 65A is a diagram of the second virtual space 2711A and a field-of-view image 6517A according to at least one embodiment of this disclosure. As in FIG. 65A, if a specific condition (for example, after the elapse of a certain period of time) is satisfied after the avatar object 6C has been moved onto the stage object 1532, the processor 210A puts the avatar object 6C back to the original position in the second virtual space 2711A. In Step S5810, the processor 210A terminates the viewpoint sharing upon putting the avatar object 6C back to the original position. Specifically, the processor 210A moves the virtual camera 14A to the position of the avatar object 6A.

Figure 65B:
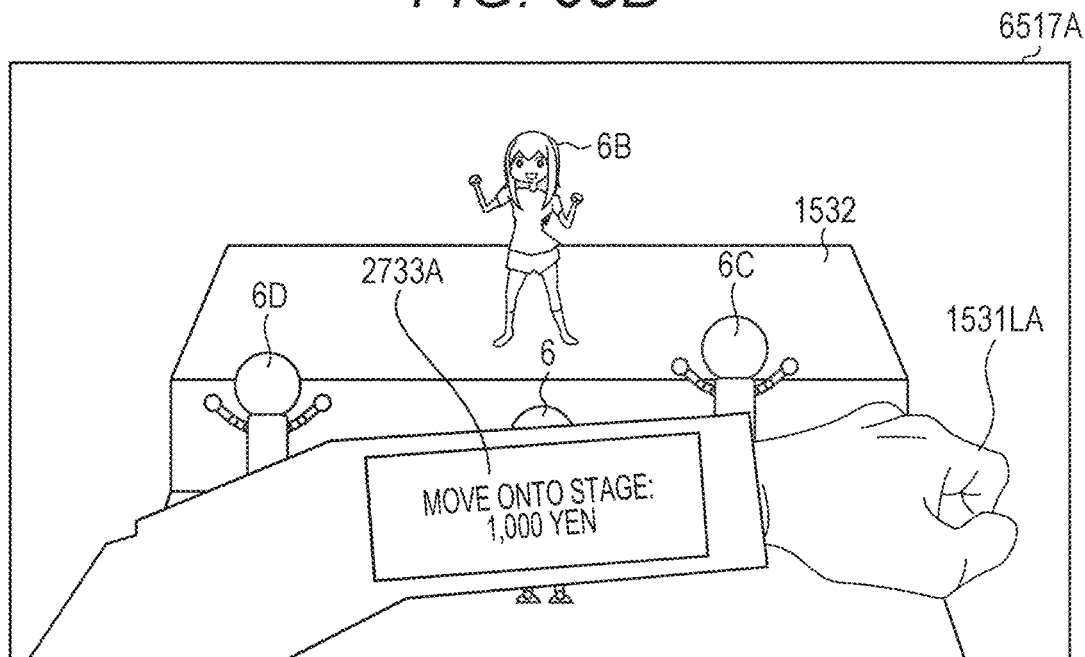
FIG. 65B A diagram of a field-of-view image according to at least one embodiment of this disclosure.

After the termination of the viewpoint sharing, the processor 210A conveys a message for encouraging the avatar object 6A to move onto the stage object 1532 to the user 5A during the live performance. The processor 210A provides a display of the message on the tag object 2733A, for example. The message contains text for encouraging the user 5A to move onto the stage object 1532 and a charged amount to be charged to the user 5A for moving the avatar object 6A onto the stage object 1532. In the example illustrated in FIG. 65, the charged amount for moving the avatar object 6A onto the stage object 1532 is 1,000 yen.

After the message is displayed, the processor 210A moves the virtual left hand 1531LA to be within the field-of-view region 15A as in FIG. 65A, in accordance with the motion of the left hand of the user 5A. The processor 210A causes the monitor 130A to display the field-of-view image 6517A corresponding to the second virtual space 2711A in FIG. 65A, as in FIG. 65B, for example. This enables the user 5A to recognize that the viewpoint sharing has been terminated, by visually checking the field-of-view image 6517A. This also enables the user 5A to recognize that the avatar object 6A is movable onto the stage object 1532 for an additional charged amount of 1,000 yen, by checking the message displayed on the tag object 2733A.

Figure 66A:
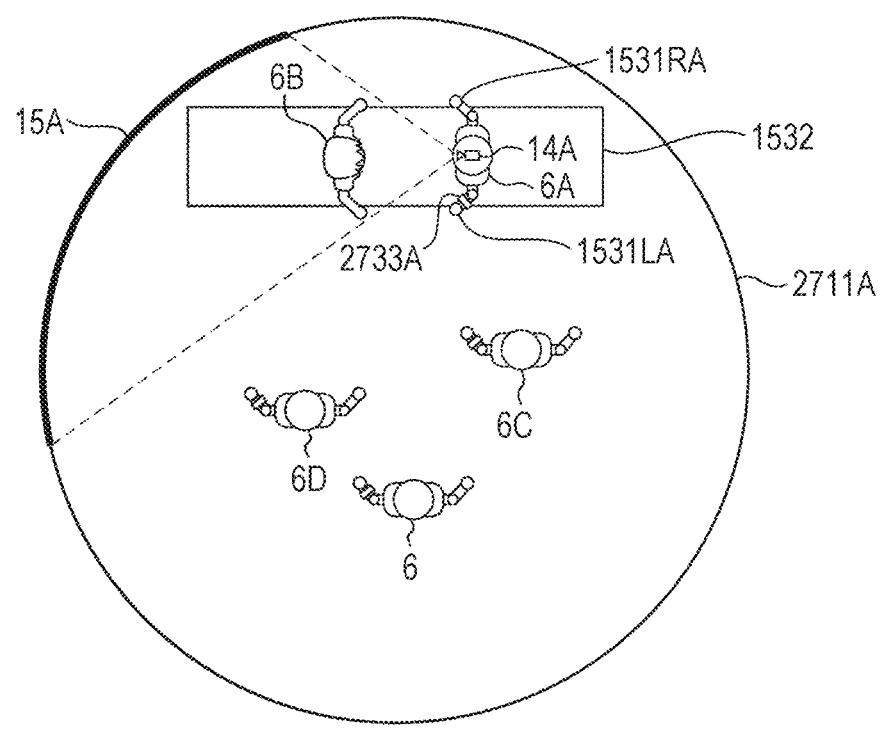
FIG. 66A A diagram of a virtual space according to at least one embodiment of this disclosure.

FIG. 66A is a diagram of the second virtual space 2711A and a field-of-view image 6617A according to at least one embodiment of this disclosure. The user 5A, who has enjoyed his/her experience of causing the avatar object 6A to have the viewpoint of the avatar object 6C, may want to move the avatar object 6A onto the stage object 1532 so as to come into direct contact with the avatar object 6B. To satisfy this hope, the user 5A performs an operation for selecting the tag object 2733A after checking the message displayed on the tag object 2733A. In Step S5811, upon detection of the operation made by the user 5A for selecting the tag object 2733A, the processor 210A registers charging information corresponding to the moving onto the stage with the tag object 2733A. Specifically, the processor 210A additionally registers charging information indicating a charged amount (1,000 yen) corresponding to the moving onto the stage with the tag object 2733A, after the termination of the viewpoint sharing.

In Step S5812, the processor 210A moves the avatar object 6A onto the stage object 1532 as in FIG. 66A, when the charging information corresponding to the moving onto the stage is registered with the tag object 2733A. The processor 210A arranges the avatar object 6A that has been moved, at a position right in front of the avatar object 6B on the stage object 1532. In Step S5813, the processor 210A receives the avatar information on the avatar object 6B from the server 600. In Step S5814, the avatar object control module 1424 causes the avatar object 6B to carry out a performance (second performance) for the avatar object 6A, in accordance with motion information contained in the received avatar information.

Figure 66B:
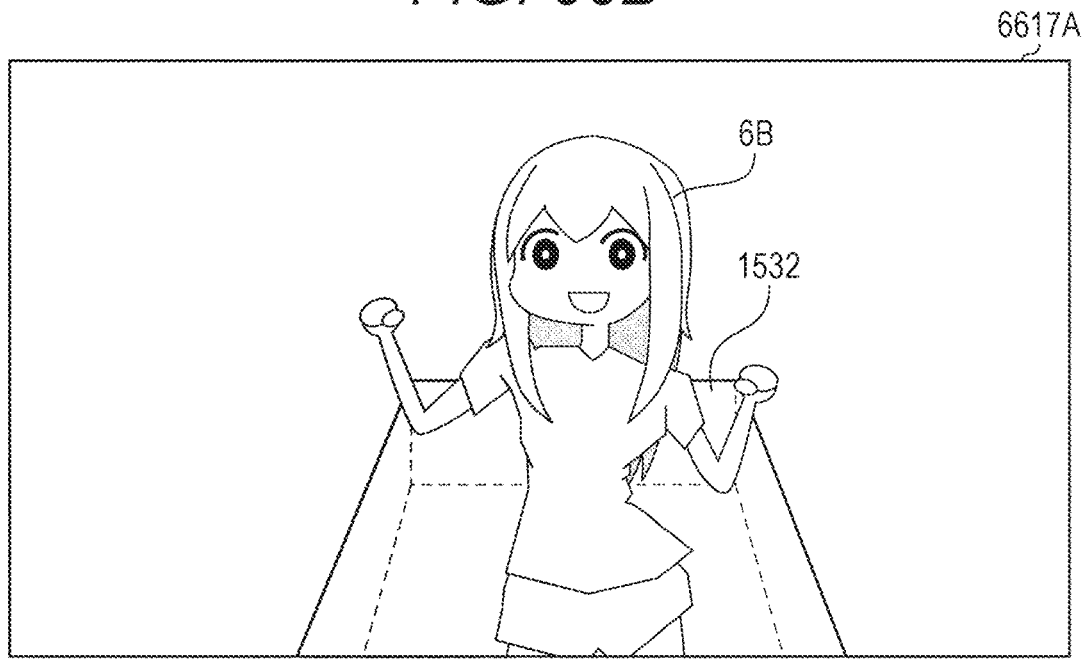
FIG. 66B A diagram of a field-of-view image according to at least one embodiment of this disclosure.

The processor 210A causes the monitor 130A to display the field-of-view image 6617A corresponding to the second virtual space 2711A in FIG. 66A, as in FIG. 66B, for example. This enables the user 5A to recognize that the avatar object 6A has been moved onto the stage object 1532, by visually checking the field-of-view image 6617A. This also enhances the user 5A to enjoy the performance right in front of the avatar object 6B and enjoy coming into contact with the avatar object 6B (in other words, with the user 5B).

In FIG. 66A, unlike viewpoint sharing, the avatar object 6A is right in front of the avatar object 6B in the second virtual space 2711A. Thus, the user 5A is allowed to reach out or wave the virtual right hand 1531RA to the avatar object 6B. The processor 210A outputs voice uttered by the user 5B to the speaker 180A. Thus, the user 5A can listen to the voice of the user 5B directed to the avatar object 6A. Thus, unlike viewpoint sharing, the user 5A is allowed to cause the avatar object 6A to come into direct contact with the avatar object 6B, thereby gaining higher satisfaction than with viewpoint sharing.

The processor 210A may cause the avatar object 6A to have the viewpoint of another avatar object 6 other than the avatar object 6A in the second virtual space 2711A. This enables the user 5A to enjoy the performance made by the avatar object 6B not only from the viewpoint of the avatar object 6A, but also from the viewpoint of the other avatar object 6 at a different position from the avatar object 6A. This enables the user 5A to view the performance made by the avatar object 6B from the viewpoint of the avatar object 6C through viewpoint sharing even if the user fails to move the avatar object 6A to a position already occupied by the avatar object 6C, for example. The HMD system 100 may thus improve attractiveness for the user 5A in the second virtual space 2711A.

In at least one embodiment, the avatar object 6C views the performance for the avatar object 6C made by the avatar object 6B, as a result of the charging amount for moving onto the stage being charged to the user 5C. The avatar object 6A views the performance for the avatar object 6C made as a result of charging, from the viewpoint of the avatar object 6C if the charging amount for viewpoint sharing is charged to the user 5A. This enables the user 5A to experience a performance for the avatar object 6C although in a limited fashion. The user 5B who is satisfied with the performance made by the avatar object 6B during the viewpoint sharing may want to cause the avatar object 6B to carry out a performance for the avatar object 6A. The user 5A thus allows charging of the charged amount for moving onto the stage to the user 5A.

In this manner, after charging the charged amount corresponding to the moving onto the stage to the user 5C, the HMD system 100 may charge the charged amount corresponding to viewpoint sharing to the user 5A and may further charge the charged amount corresponding to the moving onto the stage to the user 5A, which is triggered by the charging for the viewpoint sharing. The HMD system 100 may thus achieve a charging cycle involving multiple times of charging to the user 5A, thereby charging a larger charged amount to the user 5A. This enables the user 5B to further increase sales of the live performance.

The charging to the user 5A for viewpoint sharing is not necessarily required. The processor 210A may allow viewpoint sharing for the user 5A, without registering charging information corresponding to the viewpoint sharing with the tag object 2733A. In other words, the processor 210A may cause the avatar object 6A to have the viewpoint of another avatar object 6, in accordance with an operation made by the user 5A at a certain time during the live performance. The processor 210A may enable the avatar object 6A to automatically have the viewpoint of another avatar object 6, without detecting any operation made by the user 5A.

The processor 210A may cause the avatar object 6A to have the viewpoint of another avatar object 6 that is not arranged on the stage object 1532. The processor 210A causes the avatar object 6A to have the viewpoint of the avatar object 6D if the avatar object 6D is selected by the user 5A, for example.

The processor 210B may notify the user 5B of the number of other avatar objects 6 that have the viewpoint for each of the different avatar objects 6. This enables the user 5B to figure out which of the avatar objects 6 in the second virtual space 2711B has a viewpoint attracting attention from more users 5.

The processor 210C does not necessarily register charging information corresponding to the moving onto the stage with the tag object 2733C. The processor 210C may register charging information corresponding to the moving onto the stage with the avatar object 6C in association therewith, for example. The processor 210C may perform any other charging-related processing (second charging) corresponding to the moving onto the stage, instead of registering charging information corresponding to the moving onto the stage with tag object 2733C. The other charging-related processing mentioned above is, for example, transmitting charging information corresponding to the moving onto the stage to the server 600 without registering it with the tag object 2733C.

The processor 210A does not necessarily register charging information corresponding to viewpoint sharing with the tag object 2733A. The processor 210A may register charging information corresponding to viewpoint sharing with the avatar object 6A in association therewith, for example. The processor 210A may perform any other charging-related processing (first charging) corresponding to viewpoint sharing, instead of registering charging information corresponding to the viewpoint sharing with tag object 2733A. The other charging-related processing mentioned above is, for example, transmitting charging information corresponding to the viewpoint sharing to the server 600 without registering it with the tag object 2733A.

The processor 210A does not necessarily register charging information corresponding to the moving onto the stage with the tag object 2733A. The processor 210A may register charging information corresponding to the moving onto the stage with the avatar object 6A in association therewith, for example. The processor 210A may perform any other charging-related processing (third charging) corresponding to the moving onto the stage, instead of registering charging information corresponding to the moving onto the stage with tag object 2733A. The other charging-related processing mentioned above is, for example, transmitting charging information to the server 600 without registering the charging information with the tag object 2733A.

The user 5B may make a first operation for allowing viewpoint sharing. Upon detecting the first operation made by the user 5B, the processor 210B transmits detection information indicating detection of the first operation to the computer 200A via the server 600. The processor 210A receives the detection information transmitted from the computer 200B. The processor 210A detects the first operation made by the user 5B, based on the received detection information. Upon detecting the first operation, the processor 210A causes the avatar object 6A to have the viewpoint of any of the other avatar objects 6, which differ from the avatar object 6A. The processor 210A may cause the avatar object 6A to have the viewpoint of any of the other avatar objects 6, which differ from the avatar object 6A, for a certain period of time after the first operation was detected, for example. The first operation may be, instead of an operation made by the user 5B, an action of the user 5B such as the utterance content of the user 5B or information specifying a period for allowing the viewpoint sharing. This may prevent the avatar object 6A from having the viewpoint of another avatar object 6 arbitrarily without the user 5B's permission. In other words, the user 5B may willfully specify the timing at which the avatar object 6A is allowed to have the viewpoint of another avatar object 6. This also enables the user 5B to control the staging of the live performance in a manner more preferable to the user 5B.

The processor 210A may cause the avatar object 6A to have the viewpoint of the avatar object 6C without moving the virtual camera 14A to the position of the avatar object 6C. Upon detecting an operation made by the user 5A for causing the avatar object 6A to have the viewpoint of the avatar object 6C, the processor 210A transmits request information for requesting viewpoint sharing to the computer 200C via the server 600, for example. Upon receiving the request information, the processor 210C transmits the field-of-view image 6017C (second field-of-view image) corresponding to the field-of-view region 15C from the avatar object 6C generated by a virtual camera 14C, to the computer 200A via the server 600. Upon receiving the field-of-view image 6017C, the processor 210A temporarily stops control on the virtual camera 14A. The processor 210A outputs the received field-of-view image 6017C to the monitor 130A. This enables the user 5A to view the performance made by the avatar object 6B from the viewpoint of the avatar object 6C, by visually checking the field-of-view image 6017C.

The processor 210A may detect a first event in the second virtual space 2711A. The first event is, for example, making any action by the avatar object 6B. Examples of the action of the avatar object 6B include the moving of the avatar object 6B to another position on the stage object 1532. The first event may be a specific performance carried out by the avatar object 6B on the stage object 1532 for a certain period of time or more. Another example of the first event may be the moving of the avatar object 6C onto the stage object 1532. Upon detecting the first event, the processor 210A enables the avatar object 6A to have the viewpoint of another avatar object 6. This may help to prevent the avatar object 6A from having the viewpoint of another avatar object 6 arbitrarily.

The processor 210A may control the virtual camera 14A in synchronization with control on the virtual camera 14C during the viewpoint sharing. The processor 210A moves the virtual camera 14A to the position of the avatar object 6C, and thereafter receives control information showing how the position and the direction of the virtual camera 14C are controlled from the computer 200C via the server 600, for example. The processor 210A controls the virtual camera 14A in synchronization with control on the virtual camera 14C, in accordance with the received control information. This enables the user 5A to feel more strongly that the avatar object 6A has the viewpoint of the avatar object 6C.

In at least one embodiment, the processor 210B performs charging- and settlement-related processing on the user 5B under the same scheme as the one using the tag object 2733A as described above. This is however not construed in a limiting sense, and the processor 210B may perform charging- and settlement-related processing on the user 5B under any desired scheme different from the above description.

Figure 67:
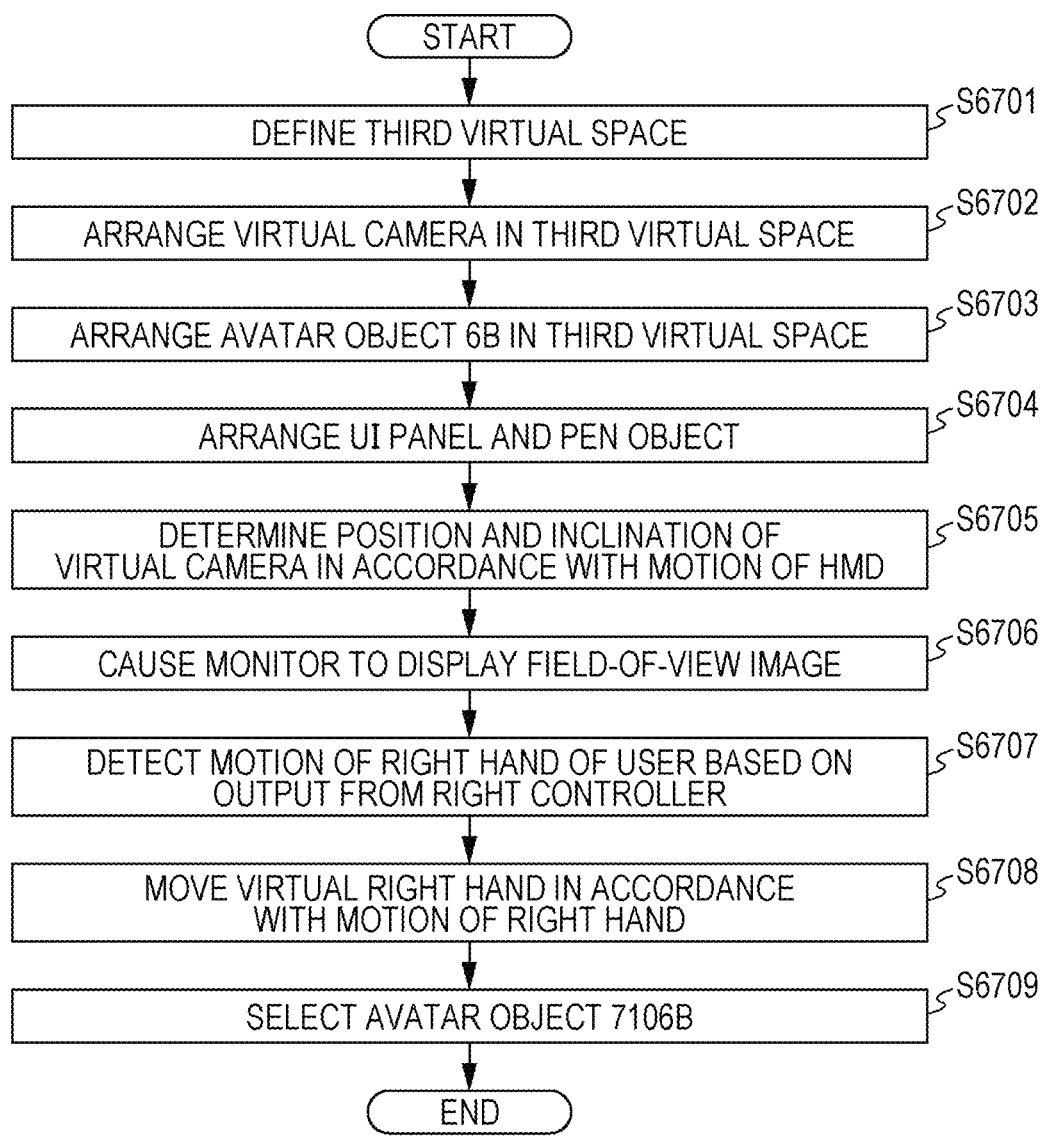
FIG. 67 A flowchart of processing to be executed by a system including an HMD set according to at least one embodiment of this disclosure.
Figure 68A:
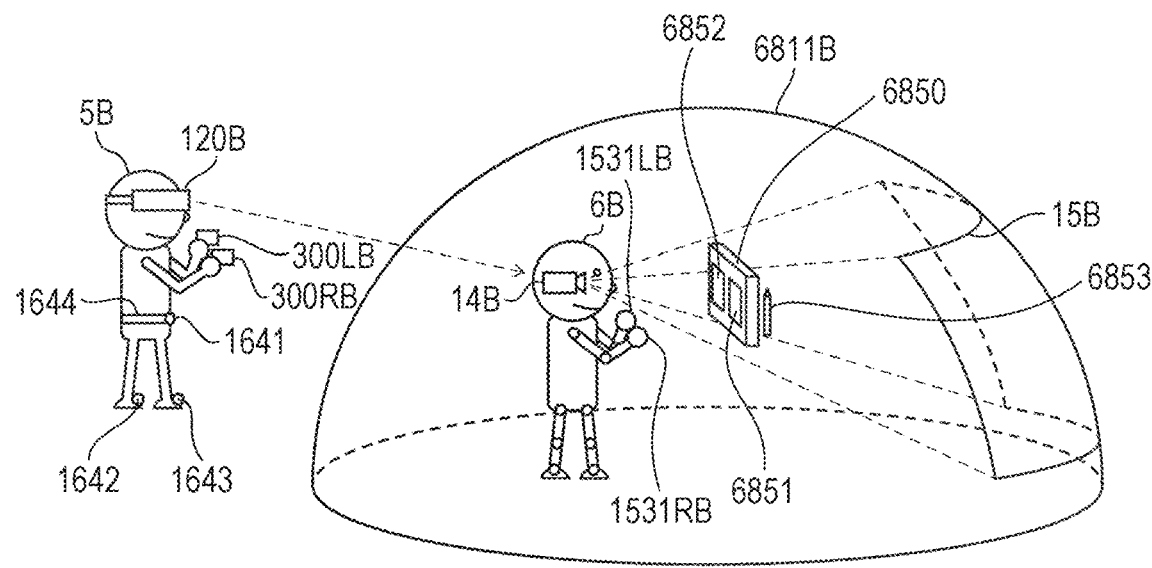
FIG. 68A A diagram of a virtual space according to at least one embodiment of this disclosure.

FIG. 67 is a flowchart of processing to be executed by a system including the HMD set 110B according to at least one embodiment of this disclosure. FIG. 68A is a diagram of a third virtual space 6811B and a field-of-view image 6817B according to at least one embodiment of this disclosure. In Step S6701, the processor 210B of the computer 200B (hereinafter simply referred to as the "processor 210B") defines the third virtual space 6811B as in FIG. 68A. This processing corresponds to the processing of Step S1110 of FIG. 11. Specifically, the processor 210B identifies virtual space data, thereby defining the third virtual space 6811B represented by the virtual space data. The third virtual space 6811B is a virtual space in which the avatar object 6B is arranged before the live performance in the second virtual space 2711B starts. The third virtual space 6811B is also a virtual space for allowing the user 5B to select an avatar object to be used by the user 5B during the live performance.

In Step S6702, the processor 210B generates the virtual camera 14B and arranges the virtual camera in the third virtual space 6811B. In Step S6703, the processor 210B generates the avatar object 6B including the virtual right hand 1531RB and the virtual left hand 1531LB and arranges the avatar object in the third virtual space 6811B. The avatar object 6B is used by the user 5B for selecting, in the third virtual space 6811B, an avatar to be used by the user 5B during the live performance. In at least one embodiment, the avatar object 6B is not used in the second virtual space 2711B. In Step S6704, the processor 210B generates a UI panel 6850 and a pen object 6853 and arranges these objects in the third virtual space 6811B.

In at least one embodiment, a plurality of different avatar objects are prepared in the HMD system 100 in advance. The user 5B may select one avatar object, out of the avatar objects, to be used in the second virtual space 2711B for the live performance.

The UI panel 6850 is a type of UI objects and is used by the user 5B for causing the processor 210B to perform processing for selecting one avatar object out of the avatar objects. The UI panel 6850 includes options 6851 and 6852 arranged on the front surface of the UI panel 6850. The options 6851 and 6852 each include an image of the appearance of the avatar object selected when the corresponding option is selected by the user 5B. The option 6851 is an item for selecting a first avatar object out of the avatar objects, and the option 6852 is an item for selecting a second avatar object out of the avatar objects. The pen object 6853 is a type of virtual objects and held and used in the virtual right hand 1531RB or the virtual left hand 1531LB for selecting the option 6851 or 6852 on the UI panel 6850.

In Step S6705, the processor 210B determines the position and the inclination of the virtual camera 14B in the third virtual space 6811B, in accordance with the motion of the HMD 120B. This processing corresponds to a part of the processing of Step S1140 of FIG. 11. In Step S6706, the processor 210B causes the monitor 130A to display the field-of-view image 17B. This processing corresponds to the processing of Steps S1180 and S1190 of FIG. 11.

Figure 68B:
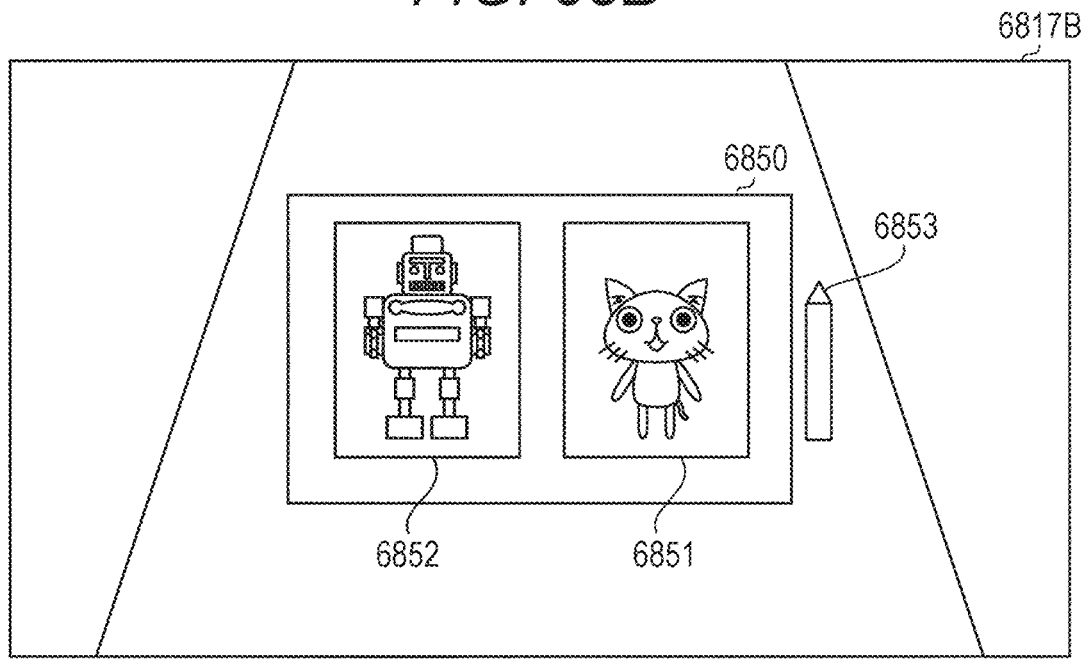
FIG. 68B A diagram of a field-of-view image according to at least one embodiment of this disclosure.

The processor 210B causes the monitor 130B to display the field-of-view image 6817B corresponding to the third virtual space 6811B in FIG. 68A, as in FIG. 68B, for example. This enables the user 5B to recognize that the option 6851 or the option 6852 on the UI panel 6850 is needed to be selected, by visually checking the field-of-view image 6817B.

The above-described processing in Step S6705 and S6706 (that is, update of the field-of-view image 17B in accordance with the motion of the HMD 120B) is repeatedly performed during the processing in Step S6707 to S6709, which will be described later.

In Step S6707, the processor 210B detects a motion of the right hand of the user 5B, based on the output from the right controller 300RB. In Step S6708, the processor 210B moves the virtual right hand 1531RB in the third virtual space 6811B in accordance with the detected motion of the right hand of the user 5B. In at least one aspect, the processor 210B moves the virtual right hand 1531RB in the third virtual space 6811B so as to bring the virtual right hand 1531RB close to the pen object 6853, in accordance with the motion of the right hand of the user 5B. After the virtual right hand 1531RB is brought sufficiently close to the pen object 6853, the processor 210B operates the virtual right hand 1531RB to select (grasp) the pen object 6853, based on the motion of the right hand of the user 5B.

Figure 69A:
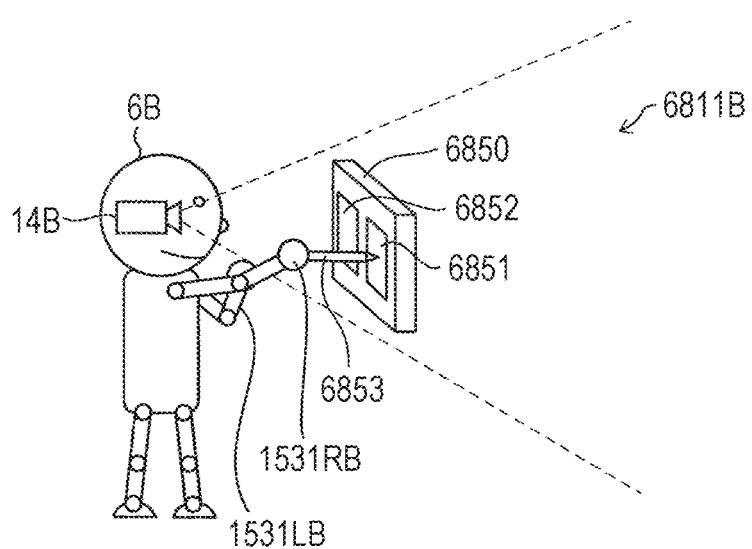
FIG. 69A A diagram of a virtual space according to at least one embodiment of this disclosure.

FIG. 69A is a diagram of the third virtual space 6811B and a field-of-view image 6917B according to at least one embodiment of this disclosure. As in FIG. 69A, after the virtual right hand 1531RB has selected the pen object 6853, the processor 210B moves the virtual right hand 1531RB and the pen object 6853 in the third virtual space 6811B so as to bring the tip of the pen object 6853 close to the option 6851, based on the motion of the right hand of the user 5B. The processor 210B detects that the option 6851 is selected with the pen object 6853, based on the fact that the tip of the pen object 6853 collides with the option 6851. In Step S6709, the processor 210B selects an avatar object 7106B corresponding to the selected option 6851 out of the avatar objects. The appearance and the size of the avatar object 7106B differ from the appearance and the size of the avatar object 6B.

Figure 69B:
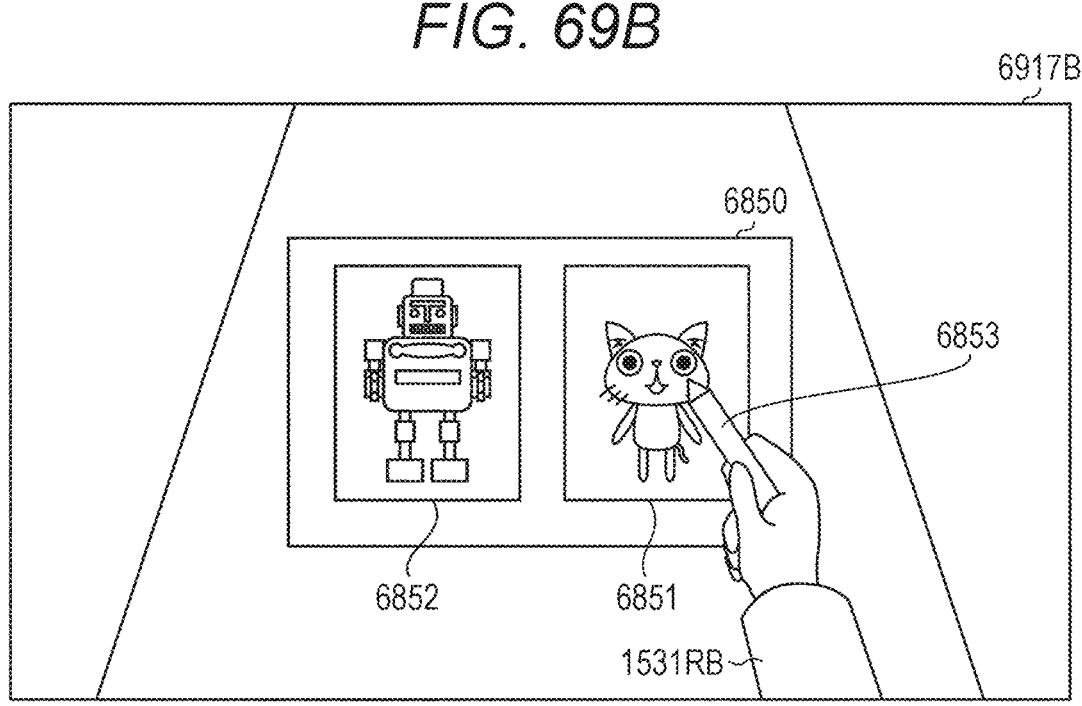
FIG. 69B A diagram of a field-of-view image according to at least one embodiment of this disclosure.

The processor 210B causes the monitor 130A to display the field-of-view image 6917B corresponding to the third virtual space 6811B in FIG. 69A, as in FIG. 69B, for example. This enables the user 5B to recognize that the avatar object 7106B has been selected through selection of the option 6851 on the UI panel 6850, by visually checking the field-of-view image 6917B.

After selecting the avatar object 7106B, the processor 210B terminates the arranging of the avatar object 6B in the third virtual space 6811B. Subsequently, the processor 210B continues to define the third virtual space 6811B. Furthermore, after the avatar object 6B is no longer arranged, the processor 210B causes the other virtual objects remain in the third virtual space 6811B. The processor 210B terminates the provision of the third virtual space 6811B to the user 5B. The processor 210B further performs a series of processing for causing the avatar object 7106B to carry out a performance, thereby newly providing the second virtual space 2711B to the user 5B.

A process for selecting an avatar object by the user 5B is not limited to the above-described example. For example, the processor 210B may arrange the first avatar object indicated by the option 6851 and the second avatar object indicated by the option 6852 in the third virtual space 6811B. The user 5B brings the virtual right hand 1531RB into contact with the first avatar object or the second avatar object arranged in the third virtual space 6811B, for example. The processor 210B selects the avatar object that is brought into contact with the virtual right hand 1531RB.

Figure 71A:
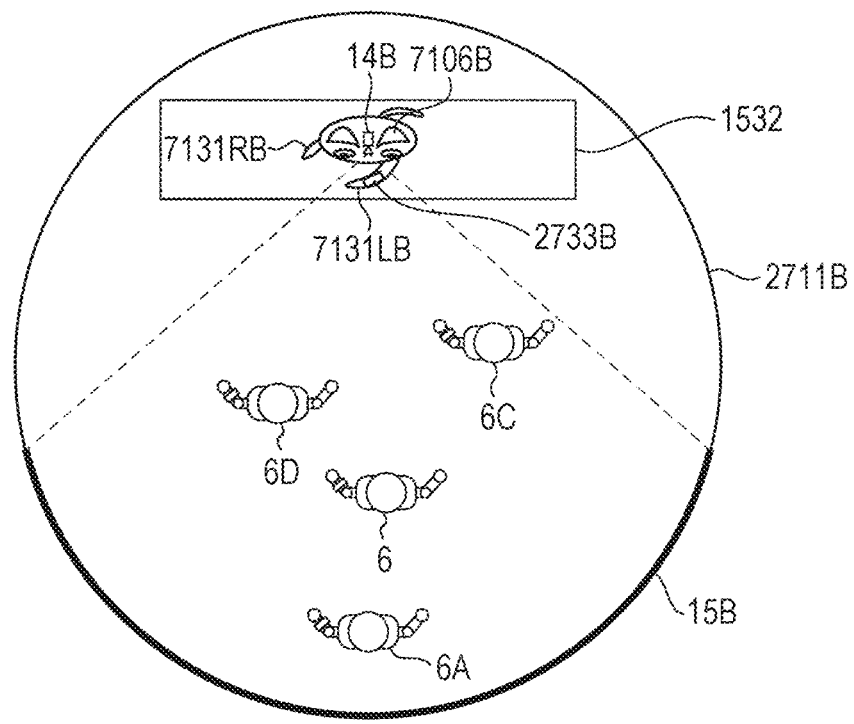
FIG. 71A A diagram of a virtual space according to at least one embodiment of this disclosure.

FIG. 70 is a flowchart of processing to be executed by a system including the HMD set 110B according to at least one embodiment of this disclosure. FIG. 71A is a diagram of the second virtual space 2711B and a field-of-view image 7117A according to at least one embodiment of this disclosure. In Step S7001, the processor 210B defines the second virtual space 2711B as in FIG. 71A. In Step S7002, the processor 210B generates the virtual camera 14B and arranges the virtual camera in the second virtual space 2711B. In Step S7003, the processor 210B generates the stage object 1532 and arranges the stage object in the second virtual space 2711B. In Step S7004, the processor 210B receives the avatar information on the avatar object 6A, the avatar information on the avatar object 6C, and the avatar information on the avatar object 6D from the server 600. In Step S7005, the processor 210B arranges the avatar objects 6A, 6C, and 6D in the second virtual space 2711B, based on the pieces of received avatar information.

In Step S7006, the processor 210B arranges the avatar object 7106B (first avatar) including the virtual right hand 7131RB and the virtual left hand 7131LB in the second virtual space 2711B in association with the user 5B (first user). Specifically, the processor 210B arranges the avatar object 7106B on the stage object 1532. Although not illustrated, the processor 210B generates the avatar information on the avatar object 6B at any desired timing, and transmits the avatar information to the server 600.

In Step S7007, the processor 210B generates a tag object 2733B and associates it with the avatar object 7106B. Specifically, the processor 210B arranges the tag object 2733B at the virtual left hand 7131LB of the avatar object 7106B. The processor 210B registers upper-limit charging information indicating an upper limit for the charged amount chargeable to the user 5B during the live performance with the tag object 2733B.

After the avatar object 7106B is arranged on the stage object 1532, a live performance made by the avatar object 7106B starts in the second virtual space 2711B. FIG. 71A includes the second virtual space 2711B at the start of the live performance. The processor 210B registers no charging information with the tag object 2733B at the start of the live performance. In Step S7008, the processor 210B determines the position and the inclination of the virtual camera 14B in the second virtual space 2711B, in accordance with the motion of the HMD 120B. This processing is basically the same as the processing in Step S2305, and the detailed description will not be repeated. In Step S7009, the processor 210B causes the monitor 130B to display the field-of-view image 17B. This processing is basically the same as the processing in Step S2306, and the detailed description will not be repeated.

Figure 71B:
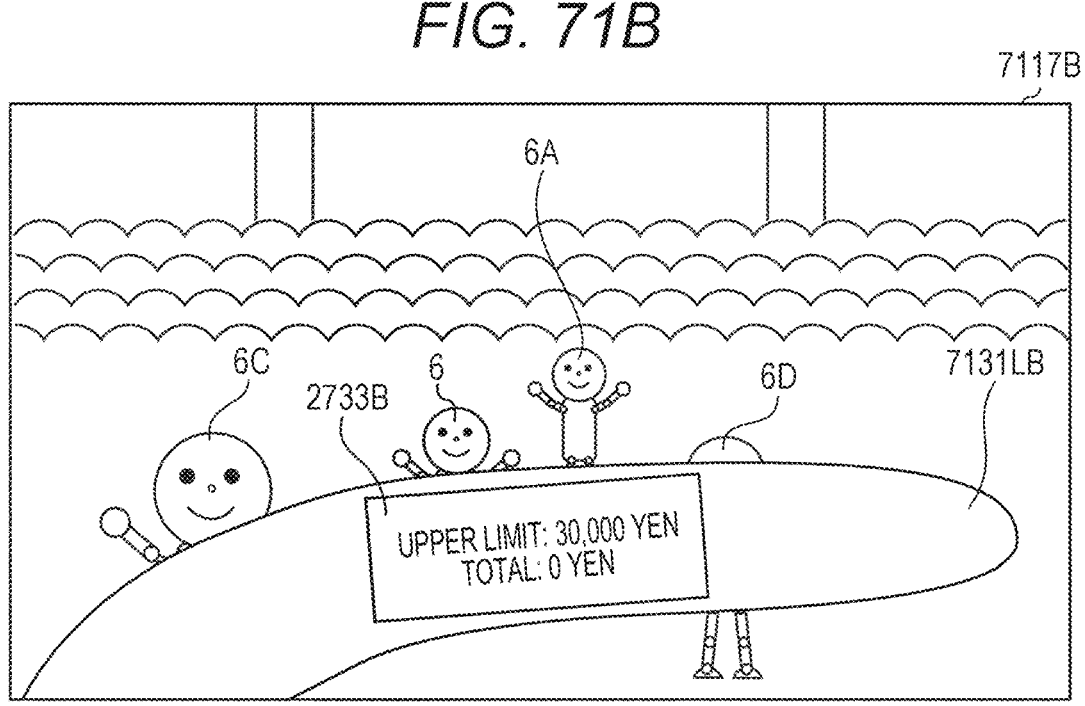
FIG. 71B A diagram of a field-of-view image according to at least one embodiment of this disclosure.

The processor 210B causes the monitor 130B to display the field-of-view image 7117B corresponding to the second virtual space 2711B in FIG. 71A, as in FIG. 71B, for example. The processor 210B provides a display, on the tag object 2733B, of the upper-limit charged amount indicated by the upper-limit charging information. The processor 210B further provides a display, on the tag object 2733A, of a total charged amount of 0 yen, in accordance with the fact that no charging information is registered with the tag object 2733A. This enables the user 5B to recognize that the avatar objects 6A, 6C, and 6D, which are viewers of the live performance, are in front of the stage object 1532, by visually checking the field-of-view image 7117B. The user 5B further recognizes that no usage fee for the avatar object 7106B is charged to the user 5B at the start of the live performance.

Figure 72A:
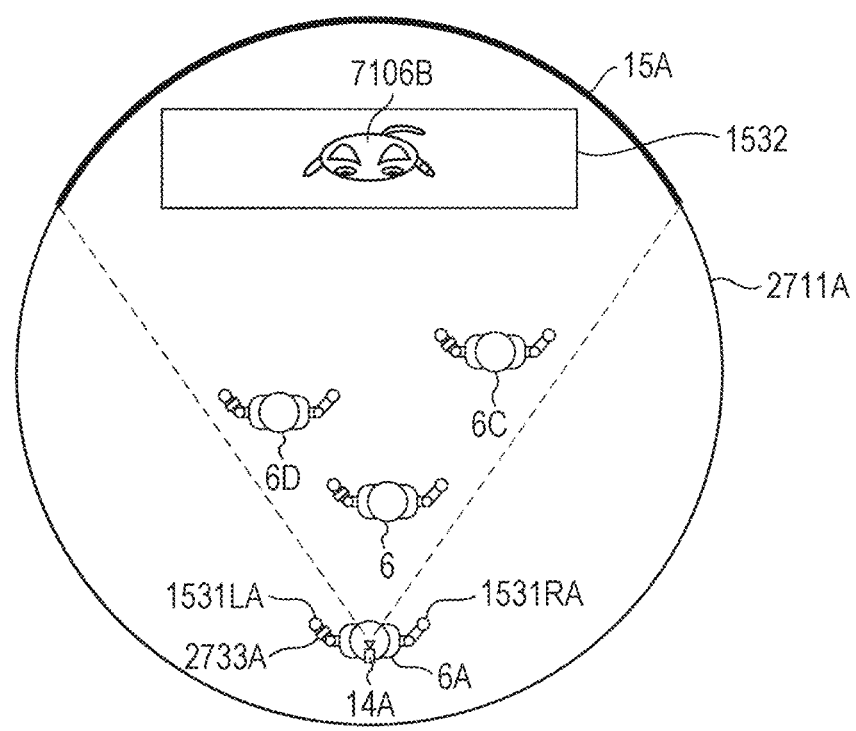
FIG. 72A A diagram of a virtual space according to at least one embodiment of this disclosure.

FIG. 72A is a diagram of the second virtual space 2711A and a field-of-view image 7217A according to at least one embodiment of this disclosure. After the second virtual space 2711B is defined, the processor 210A receives the avatar information on the avatar object 6B from the server 600 on a real-time basis. The processor 210A arranges the avatar object 7106B in the second virtual space 2711A as in FIG. 72A, based on the avatar information on the avatar object 6B, which was received first. Specifically, the processor 210A arranges the avatar object 7106B on the stage object 1532.

Figure 72B:
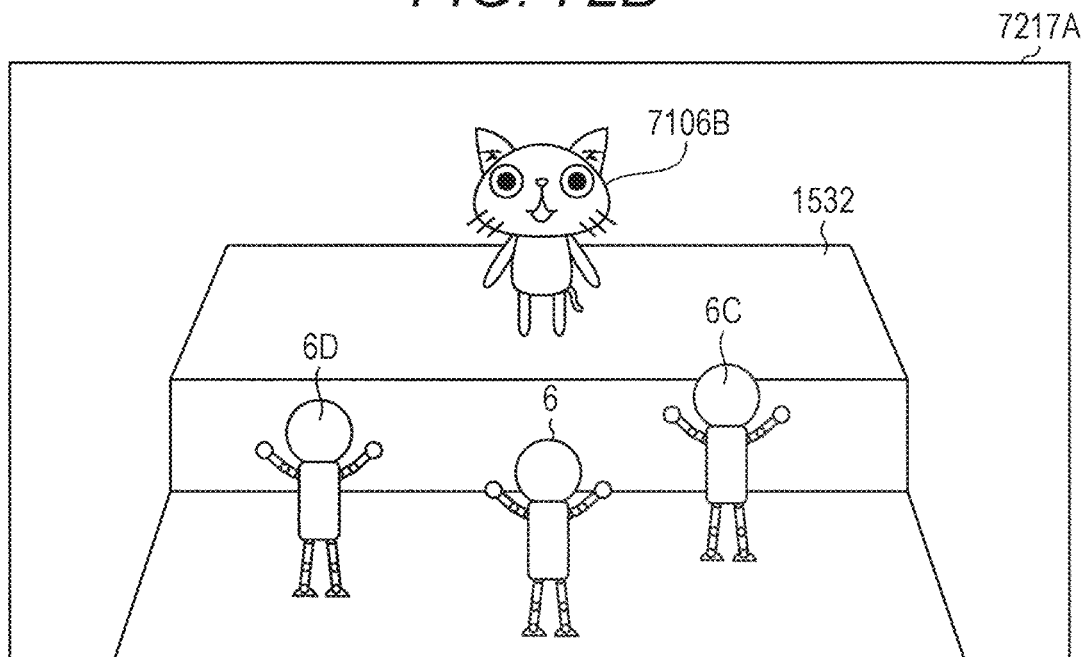
FIG. 72B A diagram of a field-of-view image according to at least one embodiment of this disclosure.

The processor 210A causes the monitor 130A to display the field-of-view image 7217A corresponding to the second virtual space 2711A in FIG. 72A, as in FIG. 72B, for example. This enables the user 5A to recognize that the avatar object 7106B, which is a live performer, has appeared on the stage object 1532, by visually checking the field-of-view image 7217A. This also enables the user 5 to recognize that a live performance made by the avatar object 7106B is about to start.

FIG. 73 is a diagram of the user 5B's posture according to at least one embodiment of this disclosure. After the start of the live performance, the user 5B moves his/her body to take the posture in FIG. 73, for example. In Step S7010, the processor 210B detects the motion of the user 5B taking the posture in FIG. 73, based on output from the motion sensors.

FIG. 74A is a diagram of the second virtual space 2711B and a field-of-view image 7417B according to at least one embodiment of this disclosure. In Step S7011, the processor 210B causes the avatar object 7106B to carry out a performance in the second virtual space 2711B as in FIG. 74A, in accordance with the motion of the user 5B. Specifically, the processor 210B translates the motion of the body of the user 5B in FIG. 73 to the avatar object 7106B. The processor 210B transmits the avatar information containing motion information on the avatar object 7106B carrying out the performance to the server 600 on a real-time basis.

The processor 210B causes the monitor 130B to display the field-of-view image 7417B corresponding to the second virtual space 2711B in FIG. 74A, as in FIG. 74B, for example. This enables the user 5B to confirm responses from the avatar objects 6A, 6C, and 6D to the performance, by visually checking the field-of-view image 7417B.

FIG. 75A is a diagram of the second virtual space 2711A and a field-of-view image 7517A according to at least one embodiment of this disclosure. After the avatar object 7106B carried out the performance in the second virtual space 2711B, the processor 210A receives the avatar information on the avatar object 7106B from the server 600 on a real-time basis. The processor 210A causes the avatar object 7106B to carry out the performance, based on motion information contained in the received avatar information. This enables the processor 210A to cause the avatar object 7106B to carry out a performance in accordance with the motion of the user 5B as in FIG. 73. The processor 210A causes the avatar object 6A to view the performance made by the avatar object 7106B in the second virtual space 2711A. The processor 210A causes the monitor 130A to display the field-of-view image 7517A corresponding to the second virtual space 2711A in FIG. 75A, as in FIG. 75B, for example. This enables the user 5A to recognize that the avatar object 7106B has carried out a first performance on the stage object 1532, by visually checking the field-of-view image 7517A. This enables the user 5A to enjoy the performance made by the avatar object 7106B from the viewpoint of the avatar object 6A.

FIG. 76A is a diagram of the second virtual space 2711B and a field-of-view image 7617B according to at least one embodiment of this disclosure. In the second virtual space 2711B in FIG. 76A, the live performance made by the avatar object 7106B has already finished. In Step S7012, the processor 210B registers charging information in accordance with the performance made by the avatar object 7106B in the second virtual space 2711B with the tag object 2733B. The processor 210B registers charging information indicating the charged amount in accordance with the time for which the avatar object 7106B was used in the second virtual space 2711B with the tag object 2733B after the end of the live performance, for example. The processor 210B multiplies the elapsed time from the start to the end of the live performance by a charging unit price for a certain period of time set for the avatar object 7106B, thereby calculating the charged amount, which is a usage fee for the avatar object 7106B. In FIG. 76A, the charged amount is calculated to be 1,000 yen. The processor 210B registers charging information indicating the calculated charged amount with the tag object 2733B. The processor 210B visualizes the registered charging information on the tag object 2733B.

The processor 210B causes the monitor 130B to display the field-of-view image 7617B corresponding to the second virtual space 2711B in FIG. 76A, as in FIG. 76B, for example. This enables the user 5B to figure out that 1,000 yen is charged to the user 5B as a usage fee for the avatar object 7106B, by visually checking the field-of-view image 7617B.

After checking the total charged amount at the end of the live performance, the user 5B performs an operation for removing the avatar object 7106B from the second virtual space 2711B. This operation is, for example, pressing any button on the right controller 300RB by the user 5B. In Step S7013, upon detection of such an operation made by the user 5B for removing the avatar object 7106B, the processor 210B removes the avatar object 7106B from the second virtual space 2711B. The processor 210B thus terminates the provision of the second virtual space 2711B to the user 5B.

FIG. 77A is a diagram of the third virtual space 6811B and a field-of-view image 7717B according to at least one embodiment of this disclosure. In Step S7014, the processor 210B arranges the avatar object 6B again in the third virtual space 6811B as in FIG. 77A. In this process, the processor 210B arranges no tag object 2733B at the virtual left hand 1531LB. In Step S7015, the processor 210B performs settlement-related processing in accordance with the charging information registered with the tag object 2733B. This processing is basically the same as the processing in Step S2618, and the detailed description is not repeated for the sake of brevity.

The processor 210B causes the monitor 130B to display the field-of-view image 7717B corresponding to the third virtual space 6811B in FIG. 77A, as in FIG. 77B, for example. The server 600 notifies the computer 200B that the settlement has completed. Upon the notification of the completion of the settlement from the server 600, the processor 210B notifies the user 5B of the completion of the settlement on the field-of-view image 7717B. The processor 210B causes the monitor 130B to display the notification image 3735 containing a message showing the completion of the settlement in a superimposed manner on the field-of-view image 7717B, for example. The processor 210B may arrange a virtual object having the same appearance as the notification image 3735 at any desired position in the field-of-view region 15B in the second virtual space 2711B. Alternatively, the processor 210B may contain the notification image 3735 at any desired position in the field-of-view image 7717B, in generating the field-of-view image 7717B. This enables the user 5B to recognize that the avatar object 6B has been arranged in the third virtual space 6811B again after the end of the live performance, by visually checking the field-of-view image 7717B. This also enables the user 5B to figure out that the settlement of the charged amount corresponding to the usage fee for the avatar object 7106B has completed, by visually checking the notification image 3735. This further enables the user 5B to recognize that the usage fee for the avatar object 7106B will not increase any further because no tag object 2733B is arranged at the virtual left hand 7131LB in the third virtual space 6811B.

In Step S7016, the processor 210B determines a reward to the creator of the avatar object 7106B. Specifically, the processor 210B determines the reward in accordance with the charging information registered with the tag object 2733B. Since the charging information is registered in accordance with the performance made by the avatar object 7106B, determining the reward in accordance with the charging information is synonymous with determining the reward in accordance with the performance made by the avatar object 7106B. In at least one embodiment of FIG. 76A, the charging information indicating the charged amount in accordance with the time for which the avatar object 7106B is used in the second virtual space 2711B. The processor 210B thus determines the reward in accordance with the time for which the avatar object 7106B is used in the second virtual space 2711B.

In Step S7017, the processor 210B performs processing for paying the determined reward to the creator of the avatar object 7106B. The processor 210B notifies the server 600 of the determined reward, for example. The server 600 pays the reward to the creator of the avatar object 7106B after completion of the settlement. This enables the server 600 to pay the reward to the user of the avatar object 7106B every time a live performance using the avatar object 7106B has finished. Alternatively, the server 600 may pay a reward in accordance with a total of the usage fee for the avatar object 7106B during a certain period of time (for example, one month) collectively to the creator of the avatar object 7106B after the certain period of time has elapsed. The processor 210B, instead of the server 600, may pay a reward in accordance with the charging information to the creator of the avatar object 7106B.

As described above, the processor 210B registers the charging information in accordance with the performance made by the avatar object 7106B in the second virtual space 2711B with the tag object 2733B. The HMD system 100 may thus provide a preferable charging scheme in the second virtual space 2711B to the user 5B.

The processor 210B causes an avatar object selected by the user 5B to carry out a performance, in accordance with the position information on the user 5B and the rotation direction of joints. This enables accurate reflection of the motion of the user 5B to avatar objects having shapes largely different from that of the user 5B. In this manner, the HMD system 100 does not require the shapes of avatar objects selectable by the user 5B to any particular shape. Thus, various avatar objects having different shapes may be prepared for use in the HMD system 100. As a result, the number of options for avatar objects selectable by the user 5B may be further increased, thereby enhancing diversity in the live performance made by the performer.

When avatar objects created by the creator are used by a performer, the creator of the avatar objects may receive a reward in accordance with the performance made by the avatar objects. The HMD system 100 may thus motivate many creators to create new avatar objects usable in the HMD system 100. As a result, the number of types of avatar objects prepared for the HMD system 100 may be further increased. This may further increase the number of options for avatar objects selectable by a performer, thereby enhancing diversity in the live performance made by the performer.

The processor 210B does not necessarily require registration of charging information corresponding to the use of an avatar with the tag object 2733B. The processor 210B may register charging information corresponding to the use of an avatar with the avatar object 7106B in association with the avatar object 7106B, for example. The processor 210B may perform any other charging-related processing corresponding to the use of an avatar, instead of registering charging information corresponding to the use of an avatar with the tag object 2733B. The other processing is, for example, transmitting charging information corresponding to the use of an avatar to the server 600, without registering the information with the tag object 2733B.

The processor 210B may perform charging-related processing corresponding to the charged amount in accordance with sales of the live performance in the second virtual space 2711B. The processor 210B may further determine the reward in accordance with sales of the live performance in the second virtual space 2711B. The processor 210B calculates a part of the sales as the charged amount in accordance with the sales of the live performance, for example. The processor 210B registers charging information indicating the charged amount in accordance with the sales with the tag object 2733B. In this manner, higher sales of the live performance lead to a larger charged amount charged to the user 5B as a usage fee for the avatar object 7106B. In addition, higher sales of the live performance lead to a larger reward paid to the creator of the avatar object 7106B. The HMD system 100 may thus motivate the creator to create popular avatar objects 7106B that lead to higher sales of the live performance.

The processor 210B may perform charging-related processing corresponding to the charged amount in accordance with details of the second virtual space 2711B in which the avatar object 7106B is used. The processor 210B may further determine a reward in accordance with details of the second virtual space 2711B. The processor 210B calculates a higher charged amount as a usage fee for the avatar object 7106B for the second virtual space 2711B with a larger size in which the avatar object 7106B is used, for example. The processor 210B registers charging information indicating the calculated charged amount with the tag object 2733B. The second virtual space 2711B with a larger size in which the avatar object 7106B is used involves a larger reward paid to the creator of the avatar object 7106B. The HMD system 100 may thus motivate the creator to create popular avatar objects 7106B to be used in a larger second virtual space 2711B.

The processor 210B may generate usage history of the avatar object 7106B in the second virtual space 2711B. The processor 210B generates a history of usage time of the avatar object 7106B in the second virtual space 2711B as the usage history, for example. The processor 210A generates a history of sales of the live performance in which the avatar object 7106B was used in the second virtual space 2711B as the usage history, for example. The processor 210B generates a history of the second virtual space 2711A in which the avatar object 7106B was used, for example. The processor 210B notifies the creator of the avatar object 7106B of the generated usage history. This enables the creator to figure out details of a situation in which the avatar object 7106B was used in the past in the second virtual space 2711B, by viewing the usage history of the avatar object 7106B described above. This enables the creator to create better avatar objects, by referring to the usage situation described above.

The user 5B may rent the avatar object 7106B from the creator. In this case, the processor 210B charges a charged amount in accordance with the rental period of the avatar object 7106B to the user 5B. The processor 210B also determines a reward in accordance with the rental period of the avatar object 7106B.

In at least one embodiment, the processor 210A performs charging- and settlement-related processing on the user 5A under a scheme using the tag object 2733A as described above. This is however not construed in a limiting sense, and the processor 210A may perform charging- and settlement-related processing on the user 5A under any desired scheme different from the above description.

FIG. 78 is a sequence chart of processing to be executed by the HMD system 100. The following describes a series of processing of the user 5B (second user), in response to a request, made by the user 5A (first user), for a second performance, for causing the avatar object 6B (second avatar) to perform the second performance in the virtual space 11B. The sequence chart in FIG. 78 includes processing subsequent to Step S2614 in FIG. 26. The request for the second performance may be made by either the user 5C or the user 5D.

FIG. 79A is a diagram of the second virtual space 2711A and a field-of-view image 7917A according to at least one embodiment of this disclosure. The processor 210A conveys a message for letting the user 5A know the request for the second performance directed to the avatar object 6B, to the user 5A during the live performance. The processor 210A provides a display of the message on the tag object 2733A, for example. The message contains a text for letting the user 5A know the content of the second performance and a charged amount required of the user 5A to request the second performance. In at least one embodiment of FIG. 79A, the content of the second performance is a pointing pose, and the charged amount required to request the pointing pose is 500 yen. The pointing pose is, for example, a performance of pointing the avatar object 6A (first avatar) with a finger, made by the avatar object 6B. In this manner, the second performance may be a performance directed to the avatar object 6 associated with the user 5 who has requested the second performance.

After the message is displayed on the tag object 2733A, the processor 210A moves the virtual left hand 1531LA to be within the field-of-view region 15A as in FIG. 79A, in accordance with the motion of the left hand of the user 5A. The processor 210A causes the monitor 130A to display the field-of-view image 7917A corresponding to the second virtual space 2711A in FIG. 79A, as in FIG. 79B, for example. This enables the user 5A to check the message displayed on the tag object 2733A, by visually checking the field-of-view image 7917A. In this manner, the user 5A recognizes that the pointing pose is requestable from the avatar object 6B for an additional charged amount of 500 yen.

The user 5A, after checking the message displayed on the tag object 2733A, performs an operation for requesting the pointing pose. This operation is described above with reference to FIG. 34, and the repeated description is omitted for the sake of brevity. The processor 210A detects an operation made by the user 5A for requesting the second performance, in response to the tag object 2733A, on which the message for encouraging request for the second performance is displayed, being selected.

FIG. 80A is a diagram of the second virtual space 2711A and a field-of-view image 8017A according to at least one embodiment of this disclosure. In Step S7801, the processor 210A registers charging information corresponding to request for the second performance with the tag object 2733A. In at least one embodiment of FIG. 79A, the processor 210A additionally registers charging information indicating the charged amount (500 yen) required for requesting the pointing pose with the tag object 2733A, when the avatar object 6A has selected the tag object 2733A with the virtual right hand 1531RA. Settlement of the charged amount indicated by the registered charging information is performed by the method described above.

The processor 210A visualizes the charging information, after being registered, on the tag object 2733A again. The details of the processing have already been described with reference to FIG. 35, and the repeated description is omitted. The processor 210A causes the monitor 130A to display the field-of-view image 8017A corresponding to the second virtual space 2711A in FIG. 80A, as in FIG. 80B, for example. This enables the user 5A to recognize that the current total charged amount has increased to 2000 yen as a result of request for the pointing pose, by visually checking the field-of-view image 8017A.

In Step S7802, the processor 210A transmits a request for the second performance to the computer 200B. Specifically, the processor 210A transmits such a request to the server 600. The server 600 transmits information related to the received second performance to the computer 200B through synchronous processing. Communicating information between the computer 200A and the computer 200B via the server 600 has already been described above with reference to FIG. 17. The processing performed by the server 600 is thus omitted from FIG. 78.

FIG. 81A is a diagram of the second virtual space 2711B and a field-of-view image 8117B according to at least one embodiment of this disclosure. In at least one embodiment of FIG. 81A, the avatar object 6B faces in the direction toward the avatar object 6C (third avatar), while the avatar object 6A is arranged at a first position 8176 that is out of the field-of-view region. In other words, the avatar object 6A is not arranged in the field-of-view region 15B. The processor 210B causes the monitor 130A to display the field-of-view image 8117B corresponding to the second virtual space 2711B in FIG. 81A, as in FIG. 81B, for example.

In Step S7811, the processor 210B receives the request for the second performance transmitted from the processor 210A. In Step S7812, the processor 210B notifies the user 5B of information on the requested second performance. Examples of the information on the second performance may be the content of the requested second performance. The processor 210B may also notify the user 5B of information indicating a position (hereinafter referred to as "first position") of the avatar object 6A associated with the user 5A, having requested the second performance, in the second virtual space 2711B. The processor 210B shows information on the requested second performance and information indicating the first position 8176 on the field-of-view image 8117B, as an example. The processor 210B causes the monitor 130 to display the field-of-view image 8117B including a notification image 8181 and an arrow image 8182 as in FIG. 81B, for example. The processor 210B may arrange a virtual object having the same appearance as the notification image 8181 in the second virtual space 2711B. The processor 210B may arrange a virtual object having the same appearance as the arrow image 8182 in the second virtual space 2711B.

The notification image 8181 includes an indication of the second performance being requested and the content of the requested second performance as illustrated in FIG. 81B, as an example. This enables the user 5B to recognize the fact that the second performance has been requested and the content of the requested second performance.

The arrow image 8182 is, as in FIG. 81A, an image indicating the first position 8176 when the avatar object 6A is not arranged in the field-of-view region 15B. Specifically, the arrow image 8182 is an image indicating a second direction in the field-of-view image 8117B, corresponding to a first direction 8178 from a second position 8177 in the field-of-view region 15B to the first position 8176 where the avatar object 6A is located. In other words, in the example illustrated in FIG. 81, the arrow image 8182 is an image of a rightward arrow pointing to right from left in the field-of-view image 8117B. The arrow image 8182 included in the field-of-view image 8117B enables the user 5B, by moving his/her head rightward, to easily recognize that the field-of-view image 17B includes the avatar object 6 (the avatar object 6A) associated with the user 5, having requested the second performance.

The processor 210B identifies the first position 8176 of the avatar object 6A in the second virtual space 2711B, using information identifying the avatar object 6A included in the request. Examples of the information may include an ID of the user 5A or the avatar object 6A. The processor 210B then determines whether the avatar object 6A is arranged in the field-of-view region 15B.

FIG. 82A is a diagram of the second virtual space 2711B and a field-of-view image 8217B according to at least one embodiment of this disclosure. Assume that the user 5B has moved his/her head, thereby causing the avatar object 6B to face the direction in FIG. 82A. The avatar object 6A is thus included in the field-of-view region 15B as in FIG. 82A. In other words, the processor 210B determines that the avatar object 6A is included in the field-of-view region 15B. The processor 210B causes the monitor 130B to display the field-of-view image 8117B corresponding to the second virtual space 2711B in FIG. 82A, including a frame image 8283 surrounding the avatar object 6A as in FIG. 82B. This enables the user 5B to easily identify the avatar object 6 associated with the user 5, having requested the second performance. The processor 210B may arrange a virtual object having the same appearance as the frame image 8283 in the second virtual space 2711B so as to surround the avatar object 6A.

FIG. 83 is a diagram of the user 5B's posture according to at least one embodiment of this disclosure. In Step S7813, the processor 210B detects a motion of the user 5B corresponding to the second performance. The user 5B having visually checked the notification image 8181 in FIG. 81B moves his/her body so as to take the posture in FIG. 83, in other words, thrust his/her right hand forward, for example. In this process, the user 5B operates (for example, presses down) a button on the right controller 300RB (not in FIG. 83). The posture in FIG. 83 is a posture corresponding to the second performance requested from the user 5A, that is, the pointing pose.

FIG. 84A is a diagram of the second virtual space 2711B and a field-of-view image 8417B according to at least one embodiment of this disclosure. In Step S7814, the processor 210B causes the avatar object 6B to carry out the second performance, in accordance with the detected motion. As at least one example, the processor 210B causes the avatar object 6B to carry out the pointing pose as in FIG. 84A, in accordance with the motion of the user 5B taking the posture in FIG. 83 and pressing down of the button on the right controller 300RB. Specifically, the processor 210B causes the avatar object 6B to carry out a motion of thrusting the virtual right hand 1531RB and pointing forward. The processor 210B causes the monitor 130A to display the field-of-view image 8417B corresponding to the second virtual space 2711B in FIG. 84A, as in FIG. 84B, for example. This enables the user 5B to recognize that the avatar object 6B is carrying out the pointing pose, by visually checking the field-of-view image 8417B including the virtual right hand 1531RB.

After causing the avatar object 6B to carry out the second performance, the processor 210B removes the notification image 8181 and the frame image 8283 from the field-of-view image 8417B as in FIG. 84B. As an example, the processor 210B compares information indicating the posture taken by the user 5B with information indicating the posture corresponding to the second performance stored in the storage 230 in association with the content of the second performance. If the match rate of the two pieces of information is equal to or more than a certain threshold as a result of the comparison, the processor 210B determines that the avatar object 6B has been caused to carry out the second performance and removes the notification image 8181 and the frame image 8283 from the field-of-view image 8417B.

In Step S7815, the processor 210B transmits avatar information corresponding to the second performance to the computer 200A. Specifically, the processor 210B transmits such avatar information to the server 600. The server 600 transmits the received avatar information to the computer 200A through synchronous processing.

FIG. 85A is a diagram of the second virtual space 2711A and a field-of-view image 8517A according to at least one embodiment of this disclosure. In Step S7803, the processor 210A receives the avatar information transmitted from the processor 210B on a real-time basis. In Step S7804, the processor 210A causes the avatar object 6B to carry out the second performance, based on motion information contained in the received avatar information. This enables the processor 210A to cause the avatar object 6B to carry out the second performance in accordance with the motion of the user 5B as in FIG. 83.

The processor 210A causes the avatar object 6A to view the second performance made by the avatar object 6B in the second virtual space 2711A. The processor 210A causes the monitor 130A to display the field-of-view image 8517A corresponding to the second virtual space 2711A in FIG. 85A, as in FIG. 85B, for example. This enables the user 5A to recognize that the avatar object 6B has carried out the second performance the user 5A has requested, by visually checking the field-of-view image 8517A. As a result, the user 5A may feel pleasure in the fact that the avatar object 6B has carried out the second performance the user has requested. Specifically, the user 5A may virtually experience a performance made by a performer for the user himself/herself, which is difficult to get in real live performances, for an additional charged amount. As a result, the user 5A may feel pleasure and be more satisfied. In other words, this may improve attractiveness of a live performance in a virtual space.

The user 5A may be allowed to request the second performance without specifying its content. In this case, the processor 210B, that has received the request, notifies the user 5B of only the fact that the second performance has been requested. The user 5B determines by himself/herself the second performance to be carried out by the avatar object 6B and takes the posture corresponding to the determined second performance.

The charged amount required for requesting the second performance may be set in accordance with the content of the second performance to be requested. As an example, the charged amounts for second performances may be set high if the performances are difficult for the user 5B to carry out, because they require a long period of time, a complicated task, or many steps (operations), for example.

The content of the second performance is not limited to the above-described example. For example, the second performance may include the motion of the avatar object 6B moving from the stage object 1532, approaching the avatar object 6 having requested the performance, and carrying out any performance or the requested performance. The motion of the avatar object 6B moving from the stage object 1532 may be performed by the moving method described above. Furthermore, the second performance may be a performance that is not directed to the avatar object 6 associated with the user 5 having requested the second performance Examples of such a performance may include jumping on the stage object 1532.

The notification image 8181, the arrow image 8182, and the frame image 8283 may be included in the field-of-view image 17B at a predetermined timing, instead of immediately after the reception of the request. Examples of the predetermined timing may be the start of the period set by the user 5B to carry out the second performance.

The charged amount required for requesting the second performance may be settled when an operation for requesting the second performance is performed, for example.

The request for the second performance may be made based on an auction, for example. In at least one example, the charged amount required for requesting the second performance is not set in advance. The processor 210A receives an entry of an amount of money (hereinafter referred to as "first amount of money") for the second performance. If the first amount of money is larger than an amount of money (second amount of money) for the second performance entered by a user 5 (third user) other than the user 5A, the processor 210A registers charging information indicating the first amount of money with the tag object 2733A. Comparison of the first amount of money with the second amount of money may be done by the server 600, for example. In other words, the processor 210A transmits the information indicating the first amount of money to the server 600. If the first amount of money is larger than the second amount of money, the server 600 notifies the computer 200A of this comparison result. Upon receiving this notification, the processor 210A registers the charging information indicating the first amount of money with the tag object 2733A.

If the request for the second performance is made based on an auction, the user 5B may set in advance the content of the second performance and the timing to carry out the second performance. In addition, the virtual space 11 may be divided into a plurality of regions each of which is used as a unit for accepting a bid. In this case, the processor 210B tallies the charged amount for each region and includes an image indicating the region with the highest amount of money thus tallied in the field-of-view image 17B. The second performance in this case may be carried out by the avatar object 6B moving to a stage object arranged in the region with the highest amount of money thus tallied, among stage objects arranged in some regions, and carrying out the first performance there, for example.

If the request for the second performance is made based on an auction, the lowest bid may be set. If both the first amount of money and the second amount of money are smaller than the lowest bid, the server 600 may notify the computer 200B of this fact. Upon receiving this notification, the processor 210B may notify the user 5B that the bid made is below the lowest bid. In this case, the user 5B may keep the avatar object 6B from carrying out the second performance. In at least one example, the second performance is a performance with the content requested that is carried out at a position close to the avatar object 6 associated with the user 5 having requested the performance. In at least one example, if both the first amount of money and the second amount of money are smaller than the lowest bid, the user 5B may cause the avatar object 6B to continue the first performance on the stage object 1532, instead of carrying out the second performance described above.

The request for the second performance may be made before the first performance by the avatar object 6B starts. As at least one example, this request may be made before the user 5A starts virtually experiencing a live performance. In at least one example, this request may be made based on what is called crowdfunding. For example, before a virtual experience of a live performance starts, the user 5B asks for payment of a charged amount to users 5 who want the avatar object 6B to approach them and carry out a certain performance. If the charged amount reaches a preset amount of money or more, the avatar object 6B approaches the avatar object 6 associated with the user 5 having paid the charged amount and carries out a certain performance during a live performance.

In at least one embodiment, the processor 210A performs charging- and settlement-related processing on the user 5A under a scheme using the tag object 2733A described above. This is however not construed in a limiting sense, and the processor 210A may perform charging- and settlement-related processing on the user 5A under any desired scheme different from the above description.

FIG. 86 is a sequence chart of processing to be executed by the HMD system 100. The following describes a series of processing of the user 5A (first user) for controlling the appearance of the avatar object 6A (first avatar) in the virtual space 11A and causing the avatar object 6B (second avatar) to carry out the second performance directed to the avatar object 6A. The sequence chart in FIG. 86 includes processing subsequent to Step S2614 in FIG. 26. The controlling of the appearance of the avatar object 6 may be made by either the user 5C or the user 5D.

FIG. 87A is a diagram of the second virtual space 2711A and a field-of-view image 8717A according to at least one embodiment of this disclosure. The processor 210A conveys a message for encouraging the user 5A to control the appearance of the avatar object 6A to the user 5A during the live performance. As at least one example, the controlling of the appearance is to highlight (enhance) the appearance of the avatar object 6A against other avatar objects 6. The processor 210A provides a display of the message on the tag object 2733A, for example. The message contains text for encouraging the user 5A to enhance the appearance and a charged amount required of the user 5A to enhance the appearance of the avatar object 6A.

After the message is displayed on the tag object 2733A, the processor 210A moves the virtual left hand 1531LA to be within the field-of-view region 15A as in FIG. 87A, in accordance with the motion of the left hand of the user 5A. The processor 210A causes the monitor 130A to display the field-of-view image 8717A corresponding to the second virtual space 2711A in FIG. 87A, as in FIG. 87B, for example. This enables the user 5A to check the message displayed on the tag object 2733A, by visually checking the field-of-view image 8717A. In this manner, the user 5A recognizes that the appearance of the avatar object 6A is enhanceable for an additional charged amount of 500 yen.

The user 5A, after checking the message displayed on the tag object 2733A, performs an operation for enhancing the appearance of the avatar object 6A. This operation is described with reference to FIG. 34, and the repeated description is omitted. The processor 210A detects an operation made by the user 5A for enhancing the appearance of the avatar object 6A, in response to the tag object 2733A, on which the message for encouraging enhancement of the appearance of the avatar object 6A is displayed, being selected.

FIG. 88A is a diagram of the second virtual space 2711A and a field-of-view image 8817A according to at least one embodiment of this disclosure. In Step S8601, the processor 210A registers charging information corresponding to enhancement of the avatar object 6A with the tag object 2733A. In at least one embodiment FIG. 88A, the processor 210A additionally registers charging information indicating the charged amount (500 yen) required for enhancing the avatar object 6A with the tag object 2733A, when the avatar object 6A has selected the tag object 2733A with the virtual right hand 1531RA. Settlement of the charged amount indicated by the registered charging information is performed by the method described above.

The processor 210A visualizes the charging information, after being registered, on the tag object 2733A again. The details of the processing have already been described with reference to FIG. 35, and the repeated description is omitted. The processor 210A causes the monitor 130A to display the field-of-view image 8817A corresponding to the second virtual space 2711A in FIG. 88A, as in FIG. 88B, for example. This enables the user 5A to recognize that the current total charged amount has increased to 2000 yen as a result of enhancement of the avatar object 6A, by visually checking the field-of-view image 8817A.

FIG. 89A is a diagram of the second virtual space 2711B and a field-of-view image 8117B according to at least one embodiment of this disclosure. In Step S8602, the processor 210A makes the appearance of the avatar object 6A stand out against the avatar objects 6 (third avatars, hereinafter referred to as "other avatar objects 6") associated with users 5 (third users) serving as viewers other than the user 5A. As at least one example, the processor 210A controls the appearance color of the avatar object 6A so as to stand out against the other avatar objects 6. Specifically, the processor 210A applies the texture 4137A to the avatar object 6A as in FIG. 89A, thereby changing the appearance color of the avatar object 6A. The texture 4137A is a texture colored in a first color, corresponding to charging of the charged amount (500 yen) required for enhancement of the avatar object 6A to the user 5A one time. The processor 210A causes the monitor 130A to display the field-of-view image 8917A corresponding to the second virtual space 2711A in FIG. 89A, as in FIG. 89B, for example.

Every time the number of times of charging of the charged amount required for enhancement of the avatar object 6A to the user 5A increases, the processor 210A may further make the avatar object 6A stand out. As at least one example, the appearance color of the avatar object 6A may be made further stand out as the number of times of charging of the charged amount increases. For example, after the charged amount is charged two times, a texture colored in a second color that stands out from the first color may be applied to the avatar object 6A. After the charged amount is charged three times, a texture colored in a third color that stands out from the second color may be applied to the avatar object 6A. The first color is bronze, the second color is silver, and the third color is gold, for example.

In Step S8603, the processor 210A transmits the avatar information (first information) on the avatar object 6A the appearance of which is controlled to the computer 200B. Specifically, the processor 210A transmits such avatar information to the server 600. The server 600 transmits the received avatar information to the computer 200B through synchronous processing. The avatar information contains first user information indicating the user 5A. Examples of the first user information may include an ID indicating the user 5A or an ID indicating the avatar object 6A.

FIG. 90A is a diagram of the second virtual space 2711B and a field-of-view image 9017B according to at least one embodiment of this disclosure. In Step S8611, the processor 210B receives the avatar information transmitted from the processor 210A on a real-time basis. In Step S8612, the processor 210B makes the appearance of the avatar object 6A stand out against the other avatar objects 6, based on the received avatar information. Specifically, the processor 210B applies the texture 4137A to the avatar object 6A as in FIG. 89A, based on the received avatar information, thereby changing the appearance color of the avatar object 6A. The processor 210B causes the monitor 130A to display the field-of-view image 9017B corresponding to the second virtual space 2711B in FIG. 90A, as in FIG. 90B, for example. This enables the user 5B (second user) to recognize that the appearance of the avatar object 6A has been changed to stand out from those of the other avatar objects 6, by visually checking the field-of-view image 9017B. In other words, the user 5B recognizes that the charged amount for making the avatar object 6A stand out has been charged to the user 5A.

In Step S8613, the processor 210B notifies the user 5B of a recommended second performance Specifically, the processor 210B selects at least one second performance from a plurality of second performances and preferentially notifies the user 5B of the second performance. As an example, the processor 210B selects a second performance leading to charging to the user 5A associated with the avatar object 6A with its appearance controlled and notifies the user 5B of the second performance.

FIG. 91 is a table of data referred to by the processor 210B to notify the user 5B of at least one second performance. Such data is stored in the storage 230B, for example. In the column "second performance", information (hereinafter referred to as "second information") indicating the content of each second performance, such as "pointing pose" and "waving hands", is stored. In the column "first user information", first user information associated with each piece of second information is stored. In FIG. 91, reference numerals 5A, 5C, and 5D denoting "users" herein are used as examples of the first user information.

The first user information is associated with second information by the processor 210B before the processing in FIG. 86. As at least one example, after the avatar object 6B carried out the second performance, the processor 210B waits for reception of avatar information for a certain period of time after the second performance. If avatar information is received within a certain period of time, the processor 210B associates first user information included in the avatar information with second information indicating the second performance carried out last time. In other words, if any of the users 5 serving as viewers registers charging information for making the avatar object 6 associated with the user within a certain period of time after the second performance, the processor 210B sets the second performance carried out last time as a second performance leading to charging to the user 5.

The processor 210B notifies the user 5B of the second information associated with the first user information included in the received avatar information. As at least one example, upon receiving avatar information including the first user information "5A" indicating the user 5A, the processor 210B refers to the data in FIG. 91, selects "pointing pose" associated with the first user information "5A", and notifies the user 5B of the selected second information. In other words, the processor 210B notifies the user 5B of a second performance carried out by the avatar object 6B in the past and actually leading to charging to the user 5A, as a second performance highly likely to lead to charging. The processor 210B causes the monitor 130B to display the field-of-view image 9017B including a notification image 9084 including a text indicating the content of the selected second performance as in FIG. 90B. The processor 210B may arrange a virtual object having the same appearance as the notification image 9084 in the second virtual space 2711B. This enables the user 5B to recognize the second performance highly likely to lead to charging to the user 5A, by visually checking the notification image 9084.

In Step S8614, the processor 210B detects a motion of the user 5B corresponding to the second performance. In Step S8615, the processor 210B causes the avatar object 6B to carry out the second performance, in accordance with the detected motion of the user 5B. The processor 210B causes the avatar object 6B to carry out the pointing pose, in accordance with the motion of the user 5B. Details of the pointing pose and details of the motion of the user 5B for causing the avatar object 6B to carry out the pointing pose have already been described in Embodiment 5 with reference to FIG. 83 and FIGS. 84A and 84B, and the repeated description is omitted.

After causing the avatar object 6B to carry out the second performance, the processor 210B removes the notification image 9084 from the field-of-view image 17B. As an example of this processing, the processor 210B performs the same processing as the processing for removing the notification image 8181 and the frame image 8283 from the field-of-view image 17B described above.

In Step S8616, the processor 210B transmits avatar information corresponding to the second performance to the computer 200A. Specifically, the processor 210B transmits such avatar information to the server 600. The server 600 transmits the received avatar information to the computer 200A through synchronous processing.

FIG. 92A is a diagram of the second virtual space 2711A and a field-of-view image 9217A according to at least one embodiment of this disclosure. In Step S8604, the processor 210A receives the avatar information transmitted from the processor 210B on a real-time basis. In Step S8605, the processor 210A causes the avatar object 6B to carry out the second performance, based on motion information contained in the received avatar information. This enables the processor 210A to cause the avatar object 6B to carry out the second performance in accordance with the motion of the user 5B.

The processor 210A causes the avatar object 6A to view the second performance made by the avatar object 6B in the second virtual space 2711A. The processor 210A causes the monitor 130A to display the field-of-view image 9217A corresponding to the second virtual space 2711A in FIG. 92A, as in FIG. 92B, for example. This enables the user 5A to recognize that the avatar object 6B has carried out the second performance the user 5A has requested, by visually checking the field-of-view image 8517A. The user 5A may thus feel pleasure in recognizing that the avatar object 6B has performed the second performance as a result of making the appearance of the avatar object 6A associated with the user stand out against other avatar objects 6 serving as viewers, for an additional charged amount. In other words, this may improve attractiveness of a live performance in a virtual space. The user 5A may want the second performance for the user to be carried out again and thus pay an additional charged amount to further make the avatar object 6A stand out. This also enables the user 5B to gain a larger income.

Assume that the user 5B causes the avatar object 6B to carry out the second performance (recommended second performance) the notification of which is sent. This second performance is a second performance carried out in the past and leading to charging to the user 5A, in other words, a second performance that the user 5A likes. The viewpoint of the user 5A may appreciate that the avatar object 6B has performed the second performance that the user likes as a result of making the appearance of the avatar object 6A associated with the user stand out against other avatar objects 6 serving as viewers, for an additional charged amount. The user 5A may thus feel greater pleasure. This further increases the possibility of the user 5A paying the charged amount for further making the avatar object 6A stand out.

The control on the appearance of the avatar object 6A is not limited to the above-described example in which the color of the avatar object 6A is changed, as long as the control on the appearance makes the avatar object 6A stand out when viewed from the avatar object 6B. For example, the processor 210A may change the size or the shape of the avatar object 6A. Alternatively, the processor 210A may control the appearances of the other avatar objects 6, thereby making the avatar object 6A stand out. For example, the processor 210A may make the other avatar objects 6 transparent for a certain period of time.

Conditions for selecting the second performance the notification of which is sent to the user 5B are not limited to the above-described example, that is, the "second performance leading to charging". Specifically, the processor 210B may narrow down second performances selected under this condition, using other conditions. Examples of the other conditions may include "the second performance the user 5B is good at". In other words, if a plurality of second performances have led to charging to the user 5A, the processor 210B may select a second performance the user 5B is good at and notify the user 5B of the selected second performance. The user 5B may set in advance a second performance the user 5B is good at.

At least one example of the other conditions may be "a second performance carried out without lowering evaluations by the other users 5". In other words, if a plurality of second performances have led to charging to the user 5A, the processor 210B may exclude an option of a second performance that resulted in an evaluation value, indicating evaluations on a live performance in the past, below a threshold. The evaluation value is calculated based on individual evaluations by users serving as viewers, as an example. Individual evaluations are, for example, values entered through a certain operation made by the users 5 serving as viewers with the right hand or the left hand, and these values are transmitted to the computer 200B. The processor 210B calculates an evaluation value by averaging the received values, as an example. This may prevent lowering of evaluation on the avatar object 6B or criticism over the Internet as a result of a second performance leading to charging.

The users 5 serving as viewers may enter individual evaluations and comments on the second performance. The processor 210A may arrange a bulletin board object (not illustrated) in the second virtual space 2711A and provide a display of the comments on the bulletin board object.

Furthermore, in selecting the second performance the notification of which is sent to the user 5B, the processor 210B may refer to the male-to-female ratio and the age distribution of the users 5 serving as viewers, for example. For example, assume that a second performance, among a plurality of second performances leading to charging to the user 5A, resulted in an evaluation value indicating an evaluation below the threshold when carried out in a live performance in the past. Assume that this second performance resulted in an evaluation value below the threshold in a women-only live performance, but resulted in an evaluation value equal to or more than the threshold in a men-only live performance. These results are applied to a new live performance for users 5, serving as viewers, with a male-to-female ratio of 8:2. In this case, the processor 210B may keep an option of the second performance from being excluded, as a second performance that is popular with men, and notify the user 5B of this information.

In at least one embodiment, the processor 210A performs charging- and settlement-related processing on the user 5A under a scheme using the tag object 2733A described above. This is however not construed in a limiting sense, and the processor 210A may perform charging- and settlement-related processing on the user 5A under any desired scheme different from the above description.

FIG. 93 is a flowchart of processing to be executed by the HMD system 100. The following describes a series of processing for performing staging control on a live performance, based on an entry made by the user 5A (first user). The sequence chart in FIG. 93 includes processing subsequent to Step S2613 in FIG. 26. In at least one embodiment, illumination control is described as an example of the staging control carried out by the user 5A. The staging control is however not limited to illumination control. For example, the staging control may include sound control. In this example, the processor 210A controls at least one of illumination and sound, based on an entry made by the user 5A. The staging control on a live performance may be made by either the user 5C or the user 5D.

FIG. 94A is a diagram of the second virtual space 2711A and a field-of-view image 9417A according to at least one embodiment of this disclosure. As in FIG. 94A, illumination objects 9491 that are a type of virtual objects are arranged in the second virtual space 2711A. As at least one example, the processor 210A may arrange the illumination objects 9491 along with the stage object 1532 in the second virtual space 2711A.

In Step S9301, the processor 210A causes the avatar object 6B (second avatar) to carry out the first performance, based on motion information contained in the received avatar information. In Step S9302, the processor 210A performs first stage illumination. The first stage illumination is stage illumination set by the user 5B in advance before the live performance starts. Information for performing the first stage illumination is transmitted from the computer 200B to the computer 200A via the server 600. The computer 200A may receive this information along with avatar information for arranging the avatar object 6B in the second virtual space 2711A, and perform the first stage illumination based on this information in Step S9302, for example.

Specifically, the processor 210A, serving as the virtual object control module 1427, causes the illumination objects 9491 to emit light-beam objects 9492, based on information to perform the first stage illumination as illustrated in FIG. 94A. The processor 210A may move the illumination objects 9491 based on this information. This enables the processor 210A to move the light-beam objects 9492. Note that the illumination objects 9491 may be arranged in the second virtual space 2711A at the same time as the stage object 1532 is arranged, for example.

The processor 210A conveys a message for encouraging the user 5A to control the illumination to the user 5A during the live performance. The processor 210A provides a display of the message on the tag object 2733A, for example. The message contains text for encouraging the user 5A to control the illumination and a charged amount required of the user 5A to control the illumination for the live performance.

After the message is displayed on the tag object 2733A, the processor 210A moves the virtual left hand 1531LA to be within the field-of-view region 15A as in FIG. 94A, in accordance with the motion of the left hand of the user 5A. The processor 210A causes the monitor 130A to display the field-of-view image 9417A corresponding to the second virtual space 2711A in FIG. 94A, as in FIG. 94B, for example. This enables the user 5A to check the message displayed on the tag object 2733A, by visually checking the field-of-view image 9417A. In this manner, the user 5A recognizes that the user is allowed to control the illumination for the live performance for an additional charged amount of 1,000 yen.

The user 5A, after checking the message displayed on the tag object 2733A, performs an operation for controlling the illumination for the live performance. This operation is described with reference to FIG. 34, and the repeated description is omitted. The processor 210A detects an operation made by the user 5A for the illumination control, in response to the tag object 2733A, on which the message for encouraging the illumination control is displayed, being selected.

FIG. 95A is a diagram of the second virtual space 2711A and a field-of-view image 9517A according to at least one embodiment of this disclosure. In Step S9303, the processor 210A registers charging information corresponding to the illumination control with the tag object 2733A. In at least one embodiment of FIG. 95A, the processor 210A additionally registers charging information indicating the charged amount (1000 yen) required for the illumination control with the tag object 2733A, when the avatar object 6A (first avatar) has selected the tag object 2733A with the virtual right hand 1531RA. Settlement of the charged amount indicated by the registered charging information is performed by the method described above.

The processor 210A visualizes the charging information, after being registered, on the tag object 2733A again. The details of the processing have already been described with reference to FIG. 35, and the repeated description is omitted for the sake of brevity. The processor 210A causes the monitor 130A to display the field-of-view image 9517A corresponding to the second virtual space 2711A in FIG. 95A, as in FIG. 95B, for example. This enables the user 5A to recognize that the current total charged amount has increased to 2,500 yen as a result of performing the illumination control, by visually checking the field-of-view image 9517A.

FIG. 96A is a diagram of the second virtual space 2711A and a field-of-view image 9617A according to at least one embodiment of this disclosure. In Step S9304, the processor 210A moves the avatar object 6A to a first position for performing the illumination control. The processor 210A, serving as the virtual object generation module 1421, generates an illumination control object 9693 and arranges the illumination control object 9693 in front of the avatar object 6A having moved to the first position. The illumination control object 9693 is used by the user 5C for causing the processor 210A to perform processing for controlling stage illumination. Examples of the illumination control object 9693 include partial objects, such as buttons, dials, and sliders, for receiving an operation made by the avatar object 6A. The processor 210A receives operations on the partial objects, thereby controlling stage illumination. For example, the processor 210A may change the colors of the light-beam objects 9492 or move the illumination objects 9491, in accordance with the received operation. The illumination control object 9693 may be arranged at a certain position (the position in FIG. 96A) determined based on the first position before the moving of the avatar object 6A. For example, the illumination control object 9693 may be arranged at the certain position at the same time as the stage object 1532 is arranged.

The processor 210A causes the monitor 130A to display the field-of-view image 9617A corresponding to the second virtual space 2711A in FIG. 96A, as in FIG. 96B, for example. This enables the user 5A to recognize that the avatar object 6A has moved to the first position and recognize the illumination control object 9693, by visually checking the position field-of-view image 9617A. In other words, the user 5A recognizes that the user is allowed to perform the illumination control.

FIG. 97A is a diagram of the second virtual space 2711A and a field-of-view image 9717A according to at least one embodiment of this disclosure. After the moving to the first position, the user 5A performs an operation for controlling the illumination. The user 5A moves his/her right hand so as to bring the tip of the virtual right hand 1531RA close to the illumination control object 9693. In Step S9305, the processor 210A detects a motion of the right hand of the user 5A, based on the output from the right controller 300RA. In Step S9306, the processor 210A moves the virtual right hand 1531RA in the second virtual space 2711A so as to bring the tip of the virtual right hand 1531RA close to the illumination control object 9693, in accordance with the motion of the right hand of the user 5A.

In Step S9307, the processor 210A operates the illumination control object 9693, in accordance with the motion of the virtual right hand 1531RA. Specifically, the processor 210A detects that the tip of the virtual right hand 1531RA collides with a partial object included in the illumination control object 9693 when the tip of the virtual right hand 1531RA and the partial object satisfy a first positional relation. The first position refers to, for example, the distance from the tip of the virtual right hand 1531RA to the partial object falling below a first distance. Alternatively, a collision area defined at the tip of the virtual right hand 1531RA at least partially collides with a collision area defined for the partial object. The processor 210A detects that the virtual right hand 1531RA has operated the partial object, based on the fact that the tip of the virtual right hand 1531RA collides with the partial object.

In Step S9308, the processor 210A performs second stage illumination in accordance with an operation on the illumination control object 9693, that is, an operation on the partial object. The second stage illumination is stage illumination performed under the control of the user 5A and differing from the first stage illumination. For example, the processor 210A changes the light-beam objects 9492 colored in a first color into light-beam objects 9792 colored in a second color, in accordance with an operation on the partial object, as in FIG. 97A. The processor 210A causes the monitor 130A to display the field-of-view image 9717A corresponding to the second virtual space 2711A in FIG. 97A, as in FIG. 97B, for example. This enables the user 5A to check that the second stage illumination in accordance with the user's operation is being performed in the second virtual space 2711A, by visually checking the field-of-view image 9717A.

The processor 210A transmits information for performing the second stage illumination to the server 600. The server 600 transmits such received information to the computers 200 of all the users 5. The processor 210 of each computer 200 thus becomes capable of performing the second stage illumination.

FIG. 98A is a diagram of the second virtual space 2711C and a field-of-view image 9817C according to at least one embodiment of this disclosure. Upon receiving the information for performing the second stage illumination, the processor 210C generates a UI panel 9894 and arranges the UI panel in the second virtual space 2711C. The processor 210C causes the monitor 130C to display the field-of-view image 9817C corresponding to the second virtual space 2711C illustrated in FIG. 98A, as illustrated in FIG. 98B, for example. This enables the user 5C (third user) to recognize that the UI panel 9894 is arranged in the second virtual space 2711C, by visually checking the field-of-view image 9817C.

The UI panel 9894 is a type of UI objects and is used by the user 5C for causing the processor 210C to perform processing for selecting stage illumination. The UI panel 9894 includes options 9895 and 9896 arranged on the front surface of the UI panel 9894. The options 9895 and 9896 contain information for describing the stage illumination selected when any of these options is selected by the user 5C. The option 9895 is an item for selecting first stage illumination, that is, default stage illumination, and the option 9896 is an item for selecting second stage illumination, that is, stage illumination under the control of the user 5A. This means that the user 5C may select whether to view the first performance made by the avatar object 6B under the second stage illumination.

In at least one embodiment of FIG. 98A, the option 9895 is selected. Thus, the processor 210C performs the first stage illumination in the second virtual space 2711C. The processor 210C may show the option 9895, which is currently selected, and the option 9896, which is not, in different colors, as in FIG. 98B. This enables the user 5C to recognize that the option 9895 is selected. Note that the option 9855 may be automatically selected at the time when the UI panel 9894 is arranged in the second virtual space 2711C since the first stage illumination is default stage illumination.

If the user 5C wants to perform the second stage illumination in the second virtual space 2711C, the user performs an operation for changing stage illumination. The user 5C moves his/her right hand so as to bring the tip of the virtual right hand 1531RC close to the option 9896, as an example. The processor 210C detects a motion of the right hand of the user 5C, based on the output from the right controller 300RC. The processor 210C then moves the virtual right hand 1531RC in the second virtual space 2711C so as to bring the tip of the virtual right hand 1531RC close to the option 9896, in accordance with the motion of the right hand of the user 5C.

The processor 210C moves the virtual right hand 1531RC in the second virtual space 2711C so as to bring the tip of the virtual right hand 1531RC close to the option 9896, based on the motion of the right hand of the user 5C. The processor 210C detects that the virtual right hand 1531RC has selected the option 9896, based on the fact that the tip of the virtual right hand 1531RC collides with the option 9896. In at least one embodiment, a collision area around virtual right hand 1531RC and option 9896 is used to determine selection of option 9896.

FIG. 99A is a diagram of the second virtual space 2711C and a field-of-view image 9917C according to at least one embodiment of this disclosure. Upon detection of the option 9896 being selected, the processor 210C performs the second stage illumination in the second virtual space 2711C. The processor 210C causes the monitor 130C to display the field-of-view image 9917C corresponding to the second virtual space 2711C in FIG. 99A, as in FIG. 99B, for example. This enables the user 5C to recognize that the option 9896 has been selected and the second stage illumination has started in the second virtual space 2711C, by visually checking the field-of-view image 9917C. The processor 210C that has performed second stage illumination in the second virtual space 2711C notifies the computer 200A of this fact through the server 600.

FIG. 100A is a diagram of the second virtual space 2711A and a field-of-view image 10017A according to at least one embodiment of this disclosure. In Step S9309, the processor 210A notifies the user 5A of the number of users 5 viewing the first performance made by the avatar object 6B under the second stage illumination. Specifically, the processor 210A notifies the user 5A of the number of notifications that the second stage illumination has been performed from the other computers 200 as the above-described number of users. The processor 210A includes a notification image 10085 containing a text indicating the above-described number of users in the field-of-view image 10017A corresponding to the second virtual space 2711A as in FIG. 100A, for example. The processor 210A causes the monitor 130A to display the field-of-view image 10017A as in FIG. 100B. The processor 210A may arrange a virtual object having the same appearance as the notification image 10085 in the second virtual space 2711A. This enables the user 5A to recognize the number of people viewing the first performance made by the avatar object 6B under the second stage illumination, by visually checking the field-of-view image 10017A.

FIG. 101A is a diagram of the second virtual space 2711A and a field-of-view image 10117A according to at least one embodiment of this disclosure. In FIG. 101A, the live performance in the second virtual space 2711A has finished. Following the end of the live performance, the avatar objects 6B and 6C have been removed from the second virtual space 2711A. The avatar objects 6A and 6D remain in the second virtual space 2711A after the end of the live performance.

In Step S9310, the processor 210A changes the charged amount in the charging information registered with the tag object 2733A, based on evaluations on the second stage illumination made by the other users 5. Examples of the evaluations may be the number of users 5 who viewed the first performance made by the avatar object 6B under the second stage illumination. The processor 210A may lower the charged amount in the charging information registered with the tag object 2733A as the number of users who viewed the performance increases, for example.

The processor 210A causes the monitor 130A to display the field-of-view image 10117A corresponding to the second virtual space 2711A in FIG. 101A, as in FIG. 101B, for example. This enables the user 5A to recognize that the live performance has finished, by visually checking the field-of-view image 10117A. This also enables the user 5A to recognize that the total charged amount charged to the user 5A has changed from 2,500 yen (see FIG. 95B) to 2,300 yen. In other words, the user 5A recognizes that the charged amount required for the illumination control has been lowered because of evaluations on the illumination control performed by the user.

As described above, the processor 210A allows the user 5A to control the staging of a live performance, in accordance with registration of the charging information. In this manner, the HMD system 100 may cause the user 5A to virtually experience the viewer's staging of a live performance, which is impossible in real live performances. As a result, this may improve attractiveness of a live performance in a virtual space. Since the staging control on a live performance requires payment of the charged amount, the number of users 5 performing the staging control may be optimized, which may prevent the staging by the user 5 from hampering the performance made by the avatar object 6B.

If the staging control by the user 5A is highly evaluated, the user 5A may achieve fame as a staging member for live performances in a virtual space. As a result, the user 5A may be hired by the user 5B to work as a staging member.

FIG. 102A is a diagram of the second virtual space 2711A and a field-of-view image 10217A according to at least one embodiment of this disclosure. Upon detecting a first operation made by the user 5B (second user), the processor 210A may allow staging control by the user 5A. Specifically, upon receiving a notification for allowing staging control from the computer 200B, the processor 210A provides a display, on the tag object 2733A, of a message encouraging the user 5A to perform the staging control. The processor 210A causes the monitor 130A to display the field-of-view image 10217A corresponding to the second virtual space 2711A illustrated in FIG. 102A, as in FIG. 102B, for example. In this process, the processor 210A may include a notification image 10286 indicating that staging control by the user 5A has become possible in the field-of-view image 10217A. This enables the user 5A to recognize that staging control by the user has become possible, by visually checking the field-of-view image 10217A. Note that the first operation may be, for example, the motion of the user 5B for causing the avatar object 6B to take a posture with both hands raised as in FIG. 102B. The processor 210A may arrange a virtual object having the same appearance as the notification image 10286 in the second virtual space 2711A.

The charged amount required for staging control may be set in accordance with the content of the staging control. For example, a larger charged amount may be set to control on both sound and illumination than that for controlling on any one of these. The charged amount required for staging control may be set in accordance with the period of time during which the staging control was performed. In this example, the processor 210A additionally registers charging information indicating the charged amount in accordance with the period of time required for the staging control after the end of the staging control with the tag object 2733A.

The user 5A may perform staging control through an operation on an input device connected to the computer 200A. In this example, the processor 210A causes not only the monitor 130 but also a display 430A connected to the computer 200A to display the field-of-view image 17A. Specifically, after the charging information is registered, the user 5A takes off the HMD 120 from his/her head. The user 5A then adjusts the direction of the HMD 120 such that the field-of-view image 17A suitable for staging control is displayed on the display 430A. The field-of-view image 17A suitable for staging control is, for example, a field-of-view image including the avatar object 6B and the light-beam objects 9492. The user 5A then operates input devices, such as a keyboard and a mouse, connected to the computer 200A. The processor 210A performs staging control in accordance with this operation.

The total charged amount may become a negative value as a result of a change in the charged amount in the charging information registered with the tag object 2733A, based on evaluations by the other users 5 on the second stage illumination. For example, the total charged amount may become a negative value as a result of a large decrease in the charged amount because the staging control by the user 5A is highly evaluated. In this case, the user 5B or the platformer pay the absolute value of the above-described total charged amount to the user 5A as a reward.

The staging control by the user 5A does not necessarily require charging to the user 5A.

In at least one embodiment, the processor 210A performs charging- and settlement-related processing on the user 5A under a scheme using the tag object 2733A described above. This is however not construed in a limiting sense, and the processor 210A may perform charging- and settlement-related processing on the user 5A under any desired scheme different from the above description.

FIG. 103A is a diagram of the first virtual space 2411A (first region) and a field-of-view image 10317A according to at least one embodiment of this disclosure. The processor 210A generates a UI panel 10350 and the pen object 2453 and arranges these objects in the first virtual space 2411A. The pen object 2453 is described with reference to FIG. 24, and the repeated description is omitted for the sake of brevity.

The UI panel 10350 is, like the UI panel 2450 (see FIG. 24), used by the user 5A for causing the processor 210A to perform processing for selecting a venue. The UI panel 10350 includes options 10351 and 10352 arranged on the front surface of the UI panel 10350. The options 10351 and 10352 contain information for describing the name of a venue selected when any of these options is selected by the user 5A (first user). The options 10351 and 10352 contain charged amounts when any of these options is selected by the user 5A. These charged amounts are, as an example, a venue fee (first charged amount) and a performance fee (second charged amount). The venue fee is a charged amount in accordance with the venue, and the performance fee is a charged amount in accordance with the performance made by the avatar object 6.

The option 10351 is an item for selecting a first venue, and the venue fee is 1,000 yen and the performance fee is 1,000 yen when the first venue is selected. The option 10352 is an item for selecting a second venue that is different from the first venue, and the venue fee is 500 yen and the performance fee is 800 yen when the second venue is selected. In other words, the first venue and the second venue are different venues, and thus the option 10351 and the option 10352 provide different venue fees. In addition, since the avatar object 6 performing in the first venue differs from the avatar object 6 performing in the second venue and the content of their performance may differ from each other, the option 10351 and the option 10352 provide different performance fees.

The processor 210A causes the monitor 130A to display the field-of-view image 10317A corresponding to the first virtual space 2411A in FIG. 103A, as in FIG. 103B, for example. This enables the user 5A to recognize that the option 10351 or the option 10352 on the UI panel 10350 is needed to be selected, by visually checking the field-of-view image 10317A.

FIG. 104A is a diagram of the first virtual space 2411A and a field-of-view image 10417A according to at least one embodiment of this disclosure. The processor 210A allows the user 5A to select the first venue. As in FIG. 104A, after the virtual right hand 1531RA has selected the pen object 2453, the processor 210A moves the virtual right hand 1531RA and the pen object 2453 in the first virtual space 2411A so as to bring the tip of the pen object 2453 close to the option 10351, based on the motion of the right hand of the user 5A. The processor 210A detects that the pen object 2453 has selected the option 10351, based on the fact that the tip of the pen object 2453 collides with the option 10351. The processor 210A receives selection of the first venue corresponding to the selected option 10351.

The processor 210A causes the monitor 130A to display the field-of-view image 10417A corresponding to the first virtual space 2411A in FIG. 104A, as in FIG. 104B, for example. This enables the user 5A to recognize that the option 10351 on the UI panel 10350 has been selected (in other words, the first venue has been selected), by visually checking the field-of-view image 10417A.

FIG. 105 is a flowchart of processing to be executed by a system including the HMD set 110 according to at least one embodiment of this disclosure. The following describes charging-related processing after the user 5A has selected the first venue. The sequence chart in FIG. 105 includes processing subsequent to Step S2607 in FIG. 26.

FIG. 106A is a diagram of the second virtual space 2711A and a field-of-view image 10617A according to at least one embodiment of this disclosure. In Step S10501, the processor 210A registers charging information indicating the venue fee with the tag object 2733A (performs first charging-related processing). In Step S10502, the processor 210A registers charging information indicating the performance fee with the tag object 2733A (performs second charging-related processing). The processor 210A visualizes the charging information, registered with the tag object 2733A, on the tag object 2733A. In at least one embodiment of FIG. 106A, the processor 210A provides a display, on the tag object 2733A, of a total (2,000 yen) of the venue fee and the performance fee as the total charged amount. The processing in Step S10501 and the processing in Step S10502 may be performed simultaneously, or the processing in Step S10502 may precede the processing in Step S10501.

After the charging information is registered, the user 5A moves the left hand to be within his/her field of view so that the user can check the time on his/her watch. The processor 210A detects a motion of the left hand of the user 5A, based on the output from the left controller 300LA. The processor 210A moves the virtual left hand 1531LA to be within the field-of-view region 15A as in FIG. 106A, in accordance with the motion of the left hand of the user 5A. The processor 210A causes the monitor 130A to display the field-of-view image 10617A corresponding to the second virtual space 2711A in FIG. 106A, as in FIG. 106B, for example. This enables the user 5A to check the upper-limit charged amount and the total charged amount displayed on the tag object 2733A, by visually checking the field-of-view image 10617A. In at least one embodiment of FIG. 106B, the user recognizes that the upper-limit charged amount is 30,000 yen and the current total charged amount is 2,000 yen. In other words, the user 5A figures out that the venue fee (1,000 yen) and the performance fee (1,000 yen) are charged as a result of entrance of the avatar object 6A (first avatar) to the second virtual space 2711A.

In Step S10503, the processor 210A receives avatar information on the avatar object 6B (second avatar) from the server 600 in a real-time manner. In Step S10504, the processor 210A arranges the avatar object 6B in the second virtual space 2711A, based on the firstly received avatar information on the avatar object 6B. Specifically, the processor 210A arranges the avatar object 6B on the stage object 1532.

As described with reference to FIG. 31, the user 5B (second user) moves his/her body after the start of the live performance. The processor 210B causes the avatar object 6B to carry out the first performance in the second virtual space 2711B, in accordance with the motion of the user 5B. The processor 210B transmits the avatar information containing motion information on the avatar object 6B carrying out the first performance to the server 600 on a real-time basis.

In Step S10505, the processor 210A receives the avatar information on the avatar object 6B from the server 600 on a real-time basis. In Step S10506, the processor 210A causes the avatar object 6B to carry out the first performance, based on motion information contained in the received avatar information.

As described above, when the avatar object 6A enters the second virtual space 2711A, the processor 210A registers charging information indicating the venue fee and charging information indicating the performance fee with the tag object 2733A, in accordance with the selection of a venue by the user 5A. This enables the HMD system 100 to charge a more suitable charged amount to the user 5A, in consideration of the performance made by the avatar object 6B and the venue where the performance takes place.

FIG. 107A is a diagram of the first virtual space 2411A and a field-of-view image 10717A according to at least one embodiment of this disclosure. The processor 210A generates a UI panel 10750 and the pen object 2453 and arranges these objects in the first virtual space 2411A. The first virtual space 2411A in FIG. 107 is a first virtual space generated at a different timing (for example, on another day) from the timing when the first virtual space 2411A in FIG. 103A was generated. In other words, FIG. 107A includes at least one example in which the user 5A is making selection of a venue to view a live performance on another day than the day in FIG. 103A.

In at least one embodiment of FIG. 107A, the first venue differs from the first venue illustrated in FIG. 103A. By contrast, assume that the performance made in the first venue and the avatar object 6 making the performance are the same as those in FIG. 103A. Assume that the second venue, the performance made in the second venue, and the avatar object 6 making the performance are the same as those in FIG. 103A. Thus, the venue fee (500 yen) contained in an option 10751 on the UI panel 10750 differs from the venue fee (1,000 yen) contained in the option 10351. Except for this point, the UI panel 10750 is the same as the UI panel 10350 in FIG. 103.

FIG. 108A is a diagram of the second virtual space 2711A and a field-of-view image 10817A according to at least one embodiment of this disclosure. FIG. 108A includes a state after the user 5A has selected the first venue in the first virtual space 2411A in FIG. 107A and entered the first venue, that is, the second virtual space 2711A.

The second virtual space 2711A in FIG. 108A is smaller than the second virtual space 2711A in FIG. 106A. In other words, the second virtual space 2711A in FIG. 108A accommodates a smaller number of people than the second virtual space 2711A in FIG. 106A does. In addition, a stage object 10832 arranged in the second virtual space 2711A in FIG. 108A is smaller than the stage object 1532 arranged in the second virtual space 2711A in FIG. 106A. In other words, the second virtual space 2711A in FIG. 108A provides less equipment than the second virtual space 2711A in FIG. 106A does.

For this reason, the venue fee (500 yen) for entering the second virtual space 2711A in FIG. 108A is less expensive than the venue fee (1,000 yen) for entering the second virtual space 2711A in FIG. 106A. In this manner, in at least one aspect, the venue fee is set based on attributes of the venue, that is, the second virtual space 2711A. Examples of the attributes of the second virtual space 2711A may include capacity, the range of equipment available, and sound quality.

The processor 210A causes the monitor 130A to display the field-of-view image 10817A corresponding to the second virtual space 2711A in FIG. 108A, as in FIG. 108B, for example. This enables the user 5A to recognize that 1,500 yen is charged as a result of entrance of the avatar object 6A to the second virtual space 2711A, by visually checking the field-of-view region 10817A. Specifically, the user 5A recognizes that a venue fee of 500 yen and a performance fee of 1,000 yen are charged.

FIG. 109A is a diagram of the second virtual space 2711A and a field-of-view image 10917A according to at least one embodiment of this disclosure. FIG. 109A includes a state after the avatar object 6B is arranged in the second virtual space 2711A. Note that the avatar objects 6 serving as viewers are not allowed to enter the second virtual space 2711A after the avatar object 6B is arranged in the second virtual space 2711A, that is, after the start of the live performance.

The processor 210A may set venue fees charged to the user 5A, based on the number of avatar objects 6 serving as viewers other than the avatar object 6A (third avatars, hereinafter referred to as "other avatar objects 6") in the second virtual space 2711A. In at least one example, the venue fee has not been determined at the time when the venue is selected in the first virtual space 2411A. Thus, options on the UI panel arranged in the first virtual space 2411A do not necessarily include amounts of money of venue fees. In other words, the UI panel in this example may be the UI panel 2450 in FIG. 24.

When the avatar object 6B is arranged in the second virtual space 2711A, the processor 210A counts the number of other avatar objects 6. The processor 210A determines the venue fee charged to the avatar object 6A based on the counted number and registers charging information indicating the venue fee with the tag object 2733A. At the same time, the processor 210A may also register charging information indicating the performance fee with the tag object 2733A, as an example. Alternatively, the processor 210A may register charging information indicating the performance fee with the tag object 2733A when the avatar object 6A enters the second virtual space 2711A.

As in FIG. 109A, three other avatar objects 6 are arranged in the second virtual space 2711A. In at least one example, the processor 210A determines the venue fee to be 1,000 yen and registers charging information indicating this venue fee and charging information indicating the performance fee (1,000 yen) with the tag object 2733A.

The processor 210A causes the monitor 130A to display the field-of-view image 10917A corresponding to the second virtual space 2711A in FIG. 109A, as in FIG. 109B, for example. This enables the user 5A to recognize that 2,000 yen is charged as the total of the venue fee and the performance fee as a result of entrance of the avatar object 6A to the second virtual space 2711A, by visually checking the field-of-view region 10917A.

FIG. 110A is a diagram of the second virtual space 2711A and a field-of-view image 11017A according to at least one embodiment of this disclosure. FIG. 110A includes a similar state as in FIG. 109A. In at least one example, note that the avatar objects 6 serving as viewers are not allowed to enter the second virtual space 2711A after the avatar object 6B is arranged in the second virtual space 2711A, that is, after the start of the live performance. Assume that the performance made by the avatar object 6B in this example is the same as that in the example in FIG. 109A. In other words, the performance fee in at least one example in FIG. 110A is 1,000 yen as in the example in FIG. 109.

In at least one embodiment FIG. 110A, five other avatar objects 6 are arranged in the second virtual space 2711A as in FIG. 110A, which are more than the number in the example in FIG. 109A. In at least one example, the processor 210A determines the venue fee to be 1,500 yen, which is higher than that in the example in FIG. 109A, and registers charging information indicating this venue fee and charging information indicating the performance fee (1,000 yen) with the tag object 2733A. The processor 210A causes the monitor 130A to display the field-of-view image 11017A corresponding to the second virtual space 2711A in FIG. 110A, as in FIG. 110B, for example. This enables the user 5A to recognize that 2,500 yen is charged as the total of the venue fee and the performance fee as a result of entrance of the avatar object 6A to the second virtual space 2711A, by visually checking the field-of-view region 11017A.

In this manner, the processor 210A may set a higher venue fee and optimize the venue fee if the number of avatar objects 6 serving as viewers is large, that is, the live performance is popular.

Instead of the number of other avatar objects 6, the processor 210A may set the venue fee based on attributes of the users 5 associated with the other avatar objects 6 (third users, hereinafter referred to as "other users 5"). Alternatively, the processor 210A may set the venue fee based on the number other avatar objects 6 and attributes of the other users 5. Examples of the attributes may include name recognition, sex, occupation, and annual income. These pieces of information are entered at the time of registration to a service to view live performances in a live performance, for example. The processor 210A may set a higher venue fee if an avatar object 6 associated with a celebrity is arranged in the second virtual space 2711A as an avatar object 6 serving as a viewer, for example. For at least one example, the processor 210A may set a higher venue fee if the user 5A is male and the rate of other avatar objects 6 associated with female users 5 exceeds a predetermined value.

The processor 210A may set the venue fee based on the other avatar objects 6 already arranged in the second virtual space 2711A at the time when the avatar object 6A is caused to enter the second virtual space 2711A. Specifically, the processor 210A may set the venue fee based on at least one of the number of other avatar objects 6 and attributes of the user 5 associated with the other avatar objects 6. In at least one example, the processor 210A may register charging information indicating the venue fee with the tag object 2733A when the avatar object 6A enters the second virtual space 2711A.

The processor 210A may set the venue fee based on the match rate of attributes of other users 5 the user 5A likes and attributes of the other users 5 arranged in the second virtual space 2711A. Such attributes of other users 5 the user 5A likes may be entered by the user 5A in advance, or determined by the processor 210A based on attributes of the other users 5 in live performances the user 5A viewed in the past.

The venue fee and the performance fee may be set in accordance with the period of time during which the live performance is viewed. In at least one example, the processor 210A performs settlement-related processing of the venue fee and the performance fee at the time when the user 5A finishes viewing the live performance.

The venue fee may be set in accordance with the position at which the avatar object 6A is arranged in the second virtual space 2711A. As at least one example, the processor 210A may set a higher venue fee if the avatar object 6A is arranged at a position closer to the avatar object 6B. The processor 210A may set the venue fee in accordance with the position of the avatar object 6A in the second virtual space 2711A and the period of time during which the avatar object 6A exists at this position. In other words, the processor 210A may change the charged amount per unit time before and after the position of the avatar object 6A is moved.

The processor 210A may allow the user 5A to experience a preview from the best seat in each venue in the first virtual space 2411A, that is, when the user 5A is to select a venue. The best seat may be a seat in the front row, for example.

As at least one example, when charging-related processing is performed in accordance with an entry made by the user 5A, the processor 210A moves a plurality of avatar objects 6 selected from an avatar group consisting of the avatar object 6A and other avatar objects 6 to different positions in the second virtual space 2711A. In at least one aspect, the processor 210A exchange the positions of a plurality of avatar objects 6 selected from the avatar group in the second virtual space 2711A. This exchange is hereinafter referred to as "avatar shuffle".

FIG. 111A is a diagram of the second virtual space 2711A and a field-of-view image 11017A according to at least one embodiment of this disclosure. The processor 210A conveys a message for encouraging the user 5A to perform avatar shuffle to the user 5A during the live performance. The processor 210A provides a display of the message on the tag object 2733A, for example. The message contains text for encouraging the user to perform avatar shuffle and a charged amount required of the user 5A to perform avatar shuffle.

After the message is displayed on the tag object 2733A, the processor 210A moves the virtual left hand 1531LA to be within the field-of-view region 15A as in FIG. 111A, in accordance with the motion of the left hand of the user 5A. The processor 210A causes the monitor 130A to display the field-of-view image 11117A corresponding to the second virtual space 2711A in FIG. 111A, as in FIG. 111B, for example. This enables the user 5A to check the message displayed on the tag object 2733A, by visually checking the field-of-view image 11117A. In this manner, the user 5A recognizes that the user is allowed to perform avatar shuffle for an additional charged amount of 1,000 yen.

The user 5A, after checking the message displayed on the tag object 2733A, performs an operation for performing avatar shuffle. This operation is described with reference to FIG. 34, and the repeated description is omitted for the sake of brevity. The processor 210A detects an operation made by the user 5A for performing avatar shuffle, in response to the tag object 2733A, on which the message for encouraging the user to perform avatar shuffle is displayed, being selected. Upon detecting this operation, the processor 210A registers charging information corresponding to avatar shuffle with the tag object 2733A and performs avatar shuffle. In the example in FIG. 111A, the processor 210A additionally registers charging information indicating the charged amount (1000 yen) required for performing avatar shuffle with the tag object 2733A (performs third charging-related processing), when the avatar object 6A has selected the tag object 2733A with the virtual right hand 1531RA. Settlement of the charged amount indicated by the registered charging information is performed by the method described above.

FIG. 112A is a diagram of the second virtual space 2711A and a field-of-view image 11217A according to at least one embodiment of this disclosure. The processor 210A exchanges the positions of six avatar objects 6 arranged in the second virtual space 2711A as in FIG. 112A, as an example. Through avatar shuffle, the avatar object 6A has moved to the position of the avatar object 6 in the front row in the example in FIG. 111A. In at least one embodiment of FIG. 111A, the avatar object 6 at the position closest to the avatar object 6A is the avatar object 6C. After avatar shuffle, the avatar object 6 at the position closest to the avatar object 6A is the avatar object 6D as in FIG. 112A.

The processor 210A causes the monitor 130A to display the field-of-view image 11217A corresponding to the second virtual space 2711A in FIG. 112A, as in FIG. 112B, for example. This enables the user 5A to recognize that the avatar object 6A has moved through avatar shuffle, by visually checking the field-of-view image 11217A.

The processor 210A, after performing avatar shuffle, transmits avatar information containing information on the positions of the avatar objects 6 after the avatar shuffle to the server 600. The server 600 transmits the received avatar information to the computers 200 through synchronous processing. As a result, the avatar shuffle is performed also in the virtual space 11 provided to users 5 such as the users 5B, 5C, and 5D.

FIG. 113A is a diagram of the second virtual space 2711A and a field-of-view image 11317A according to at least one embodiment of this disclosure. The processor 210A visualizes the charging information, after being registered, on the tag object 2733A again. The details of the processing have already been described with reference to FIG. 35, and the repeated description is omitted. The processor 210A causes the monitor 130A to display the field-of-view image 11317A corresponding to the second virtual space 2711A in FIG. 113A, as in FIG. 113B, for example. This enables the user 5A to recognize that the current total charged amount has increased to 2,500 yen as a result of performing avatar shuffle, by visually checking the field-of-view image 11317A.

As described above, the processor 210A performs avatar shuffle in accordance with registration of the charging information. In response to this, the other avatar objects 6 at the position closest to the avatar object 6A are changed. As a result, the user 5 may communicate with a variety of other users 5 by performing avatar shuffle during the live performance.

FIG. 114A is a diagram of the second virtual space 4411A and a field-of-view image 11417A according to at least one embodiment of this disclosure. The processor 210A arranges the avatar objects 6A to 6D and the stage object 1532 in the second virtual space 4411A, as in the second virtual space 2711A. The second virtual space 4411A includes a first region 4451. The first region 4451 corresponds to a part of the second virtual space 4411A. The processor 210A arranges a gate object 4452 at a place on an outer edge of the first region 4451.

In FIG. 114A, the avatar objects 6A to 6C and the stage object 1532 are arranged in the first region 4451. The avatar object 6D is arranged outside the first region 4451. The first region 4451 is surrounded by an opaque wall object (not illustrated). In the first region 4451, a live performance made by the avatar object 6B is taking place. The avatar objects 6 in the first region 4451 are enabled to view the performance made by the avatar object 6B. The avatar objects 6 outside the first region 4451 are not enabled to view the performance made by the avatar object 6B. In other words, in at least one example of FIG. 114A, the avatar objects 6A and 6C are enabled to view the performance made by the avatar object 6B. The avatar object 6D is not enabled to view the performance made by the avatar object 6B.

The processor 210A causes the monitor 130A to display the field-of-view image 11417A corresponding to the second virtual space 4411A in FIG. 114A, as in FIG. 114B, for example. This enables the user 5A to recognize that the avatar object 6C is in the first region 4451, by visually checking the field-of-view image 11417A.

FIG. 115A is a diagram of the second virtual space 4411A and a field-of-view image 11517A according to at least one embodiment of this disclosure. As at least one example, when charging-related processing is performed in accordance with an entry made by the user 5A, the processor 210A may perform avatar shuffle so as to move the other avatar objects 6 arranged in the first region 4451 outside the first region 4451 and move the other avatar objects 6 arranged outside the first region 4451 into the first region 4451. The processor 210A performs avatar shuffle, thereby exchanging the position of the avatar object 6C and the position of the avatar object 6D, for example. In this manner, the avatar object 6C is moved outside the first region 4451, whereas the avatar object 6D is moved into the first region as in FIG. 115A.

The processor 210A causes the monitor 130A to display a field-of-view image 11517A corresponding to the second virtual space 4411A in FIG. 115A, as in FIG. 115B, for example. This enables the user 5A to recognize that the avatar object 6D has moved to the position at which the avatar object 6C existed through avatar shuffle, by visually checking the field-of-view image 11517A. This also enables the user 5A to communicate with another user 5 (the user 5D).

In at least one embodiment, the users 5 are notified of the potential moving of the avatar objects 6 from the inside of the first region 4451 to the outside of the first region 4451 through avatar shuffle before the start of the live performance. In addition, the processor 210A may arrange the screen object 4340 (see FIG. 43) outside the first region 4451. In other words, outside the first region 4451 serves as a venue for public viewing of the live performance taking place in the first region 4451.

The processor 210A may enable avatar shuffle upon detecting a first operation made by the user 5B. Specifically, upon receiving a notification for allowing avatar shuffle from the computer 200B, the processor 210A provides a display, on the tag object 2733A, of a message encouraging the user 5A to perform avatar shuffle. In this process, the processor 210A may include a notification image indicating that avatar shuffle has become possible in the field-of-view image 17A. This enables the user 5A to recognize that avatar shuffle has become possible, by visually checking the field-of-view image 17A.

As at least one example, when charging-related processing is performed in accordance with an entry made by the user 5A, the processor 210A may move another avatar objects 6 to the position closest to the avatar object 6A.

Avatar shuffle by the user 5A does not necessarily require charging to the user 5A.

The processor 210A may perform charging-related processing for excluding the avatar object 6A from the targets of avatar shuffle performed by the other users 5, in accordance with an entry made by the user 5A.

While some embodiments of the present disclosure have been described, the technical scope of the present description is not construed in a limiting sense by the description of these embodiments. These embodiments are illustrative, and those skilled in the art would understand that various changes may be made in the embodiments without departing from the scope of the present invention set forth in the appended claims. The technical scope of the present description should be defined based on the scope of the description set forth in the appended claims and equivalents thereof. The following description includes multiple notes and multiple items. A reference in one item to another item refers to the referenced item with the same note.

[Note 1]

Details according to at least one aspect of the present description are described below.

(Item 1) A program has been described. In at least one aspect of the present disclosure, the program is executed by a computer (200A) including a processor (210A) for providing a first user (the user 5A) with a virtual experience. The program causes the processor to execute: a step (S2601) of defining a virtual space (the second virtual space 2711A) including a first region to provide the virtual experience to the user; a step (S2606) of causing a first avatar (the avatar object 6A) associated with the first user to enter the first region; a step (S2615) of registering charging information in accordance with an action of the first avatar in the first region, in association with the first avatar; a step (S2616) of removing the first avatar from the first region; and a step (S2618) of performing charging-related processing, in accordance with the registered charging information, when the first avatar is removed from the first region.

(Item 2) In (Item 1), the program further causes the processor to execute: a step of associating the first avatar with a first object (the tag object 2733A) when the first avatar enters the first region, and in the step of registering, the charging information is registered with the first object.

(Item 3) In (Item 1) or (Item 2), the program further causes the processor to execute: a step of visualizing the registered charging information on the first object.

(Item 4) In any one of (Item 1) to (Item 3), a part of the first avatar includes an operation object (the virtual left hand 1531LA), in the step of associating the first avatar with the first object, the first object is associated with the operation object, the program further causing the processor to execute: a step of detecting a motion of a first part constituting a part of the first user's body; a step of moving the operation object in accordance with the motion of the first part; a step (S2608) of controlling a field of view from the first avatar (the field-of-view region 15A) in the virtual space, in accordance with a posture of the first user's head and a position of the first avatar in the virtual space; a step (S2609) of defining a field-of-view image corresponding to the field of view from the first avatar; and a step (S2609) of outputting the field-of-view image to an image display device (monitor 130A) associated with the first user's head.

(Item 5) In any one of (Item 1) to (Item 4), the program further causes the processor to execute: a step of causing the first avatar to view a performance made by a second avatar (the avatar object 6B) associated with a second user (the user 5B) in the first region.

(Item 6) In any one of (Item 1) to (Item 5), the first region is the whole of the virtual space.

(Item 7) In any one of (Item 1) to (Item 6), the program further causes the processor to execute: a step of controlling the appearance of the first avatar in accordance with a total charged amount indicated by the registered charging information.

(Item 8) In (Item 7), in the step of controlling the appearance, the appearance of the first avatar with a larger total charged amount is made further to stand out.

(Item 9) An information processing apparatus has been described. In at least one aspect of the present disclosure, the information processing apparatus (the computer 200A) includes a storage section (the storage 230A) configured to store a program executed by the information processing apparatus for providing a first user (the user 5A) with a virtual experience; and a control section (the processor 210A) configured to control operation of the information processing apparatus by executing the program. The control section is configured to: define a virtual space (the second virtual space 2711A) including a first region to provide the virtual experience to the user; cause a first avatar (the avatar object 6A) associated with the first user to enter the first region; register charging information in accordance with an action of the first avatar in the first region, in association with the first avatar; remove the first avatar from the first region; and perform charging-related processing, in accordance with the registered charging information, when the first avatar is removed from the first region.

(Item 10) A method for executing a program has been described. In at least one aspect of the present disclosure, the program is executed by a computer (200A) including a processor (210A) for providing a first user (the user 5A) with a virtual experience. The method includes executing, by the processor: a step (S2601) of defining a virtual space (the second virtual space 2711A) including a first region to provide the virtual experience to the user; a step (S2606) of causing a first avatar (the avatar object 6A) associated with the first user to enter the first region; a step (S2615) of registering charging information in accordance with an action of the first avatar in the first region, in association with the first avatar; a step (S2616) of removing the first avatar from the first region; and a step (S2618) of performing charging-related processing, in accordance with the registered charging information, when the first avatar is removed from the first region.

[Note 2]

Details according to at least one aspect of the present description are described below.

(Item 1) A program has been described. In at least one aspect of the present disclosure, the program is executed by a first computer (the computer 200A) including a first processor (the processor 210A) for providing a first user (the user 5A) with a virtual experience. The program causes the first processor to execute: a step (S2601) of defining a virtual space (the second virtual space 2711A) to provide the virtual experience to the first user; a step (S2606, S2612) of arranging a first avatar (the avatar object 6A) associated with the first user and a second avatar (the avatar object 6B) associated with a second user (the user 5B) in the virtual space; a step (S2614) of causing the second avatar to carry out a first performance in accordance with a motion of the second user; a step (S7801) of performing charging-related processing, based on an entry made by the first user; a step (S7802) of requesting a second performance made by the second avatar from the second user when the charging-related processing is performed; and a step (S7804) of causing the second avatar to carry out the second performance, in accordance with a motion of the second user, after the second performance is requested.

(Item 2) In (Item 1), the program further causes the first processor to execute: a step (S2608) of controlling a field of view from the first avatar (the field-of-view region 15A) in the virtual space, in accordance with a posture of the first user's head and a position of the first avatar in the virtual space; a step (S2609) of defining a field-of-view image (the field-of-view image 17A) corresponding to the field of view from the first avatar; and a step (S2609) of outputting the field-of-view image to an image display device (monitor 130A) associated with the first user's head.

(Item 3) In (Item 2), in the step of performing the charging-related processing, the charging-related processing is performed, based on an entry made by the first user while the second avatar is caused to carry out the first performance.

(Item 4) In any one of (Item 1) to (Item 3), the program further causes the first processor to execute: a step (S2605) of arranging a third avatar (the avatar objects 6C, 6D) associated with a third user (the users 5C, 5D) in the virtual space; and a step of receiving an entry of a first amount of money for the second performance made by the first user. In the step of performing the charging-related processing, when the first amount of money is larger than a second amount of money for the second performance entered by the third user, the charging-related processing based on the first amount of money is performed.

(Item 5) A program has been described. In at least one aspect of the present disclosure, the program is executed by a second computer (the computer 200B) including a second processor (the processor 210B) for providing a second user (the user 5B) with a virtual experience. The program causes the second processor to execute: a step (S2601) of defining a virtual space (the second virtual space 2711B) to provide the virtual experience to the second user; a step (S2606, S2612) of arranging a first avatar (the avatar object 6A) associated with a first user (the user 5A) and a second avatar (the avatar object 6B) associated with the second user in the virtual space; a step (S1701, S1702) of detecting a motion of the second user's body; a step (S1703) of causing the second avatar to carry out a first performance in accordance with a motion of the second user; in accordance with charging-related processing performed based on an entry made by the first user, a step (S7812) of conveying information (notification image 8181) on a second performance to the second user when the second user is requested to cause the second avatar to carry out the second performance; and a step (S7814) of causing the second avatar to carry out the second performance, in accordance with a motion of the second user, after the information on the second performance is conveyed to the second user.

(Item 6) In (Item 5), the second performance is a performance directed to the first avatar associated with the first user having made an entry. in the step of conveying the information, the second user is further notified of information (the arrow image 8182, the frame image 8283) on the first avatar indicating a first position (8176) in the virtual space.

(Item 7) In (Item 6), the program further causes the second processor to execute: a step (S2608) of controlling a field of view (the field-of-view region 15B) from the second avatar in the virtual space, in accordance with a posture of the second user's head and a position of the second avatar in the virtual space; a step (S2609) of defining a field-of-view image (the field-of-view image 17B) corresponding to the field of view from the second avatar; and a step (S2609) of outputting the field-of-view image to an image display device (the monitor 130B) associated with the second user's head. In the step of conveying the information, the information indicating the first position is shown on the field-of-view image.

(Item 8) In (Item 7), when the first avatar is not included in the field-of-view image, the information indicating the first position is an image (arrow image) indicating a second direction in the field-of-view image, corresponding to a first direction (8178) from a second position (8177) in the field of view in the virtual space to the first position.

(Item 9) In any one of (Item 5) to (Item 8), the information on the second performance contains content of the second performance.

(Item 10) An information processing apparatus has been described. In at least one aspect of the present disclosure, the information processing apparatus (the computer 200A) includes a storage section (the storage 230A) configured to store a program executed by the information processing apparatus for providing a first user (the user 5A) with a virtual experience; and a control section (the processor 210A) configured to control operation of the information processing apparatus by executing the program. The control section is configured to: define a virtual space (the second virtual space 2711A) to provide the virtual experience to the first user; arrange a first avatar (the avatar object 6A) associated with the first user and a second avatar (the avatar object 6B) associated with a second user (the user 5B) in the virtual space; cause the second avatar to carry out a first performance in accordance with a motion of the second user; perform charging-related processing, based on an entry made by the first user; request a second performance made by the second avatar from the second user when the charging-related processing is performed; and cause the second avatar to carry out the second performance, in accordance with a motion of the second user, after the second performance is requested.

(Item 11) An information processing apparatus has been described. In at least one aspect of the present disclosure, the information processing apparatus (the computer 200B) includes a storage section (the storage 230B) configured to store a program executed by the information processing apparatus for providing a second user (the user 5B) with a virtual experience; and a control section (the processor 210B) configured to control operation of information processing apparatus by executing the program. The control section is configured to: define a virtual space (the second virtual space 2711B) to provide the virtual experience to the second user; arrange a first avatar (the avatar object 6A) associated with a first user (the user 5A) and a second avatar (the avatar object 6B) associated with the second user in the virtual space; detect a motion of the second user's body; cause the second avatar to carry out a first performance in accordance with a motion of the second user; in accordance with charging-related processing performed based on an entry made by the first user, convey information (notification image 8181) on a second performance to the second user when the second user is requested to cause the second avatar to carry out the second performance; and cause the second avatar to carry out the second performance, in accordance with a motion of the second user, after the information on the second performance is conveyed to the second user.

(Item 12) A method for executing a program has been described. In at least one aspect of the present disclosure, the program is executed by a first computer (the computer 200A) including a first processor (the processor 210A) for providing a first user (the user 5A) with a virtual experience. The method includes executing, by the first processor: a step (S2601) of defining a virtual space (the second virtual space 2711A) to provide the virtual experience to the first user; a step (S2606, S2612) of arranging a first avatar (the avatar object 6A) associated with the first user and a second avatar (the avatar object 6B) associated with a second user (the user 5B) in the virtual space; a step (S2614) of causing the second avatar to carry out a first performance in accordance with a motion of the second user; a step (S7801) of performing charging-related processing, based on an entry made by the first user; a step (S7802) of requesting a second performance made by the second avatar from the second user when the charging-related processing is performed; and a step (S7804) of causing the second avatar to carry out the second performance, in accordance with a motion of the second user, after the second performance is requested.

(Item 13) A method for executing a program has been described. In at least one aspect of the present disclosure, the program is executed by a second computer (the computer 200B) including a second processor (the processor 210B) for providing a second user (the user 5B) with a virtual experience. The method includes executing, by the second processor: a step (S2601) of defining a virtual space (the second virtual space 2711B) to provide the virtual experience to the second user; a step (S2606, S2612) of arranging a first avatar (the avatar object 6A) associated with a first user (the user 5A) and a second avatar (the avatar object 6B) associated with the second user in the virtual space; a step (S1701, S1702) of detecting a motion of the second user's body; a step (S1703) of causing the second avatar to carry out a first performance in accordance with a motion of the second user; in accordance with charging-related processing performed based on an entry made by the first user, a step (S7812) of conveying information (notification image 8181) on a second performance to the second user when the second user is requested to cause the second avatar to carry out the second performance; and a step (S7814) of causing the second avatar to carry out the second performance, in accordance with a motion of the second user, after the information on the second performance is conveyed to the second user.

[Note 3]

Details according to at least one aspect of the present description are described below.

(Item 1) A program has been described. In at least one aspect of the present disclosure, the program is executed by a computer (the computer 200A) including a processor (the processor 210A) for providing a first user (the user 5A) with a virtual experience. The program causes the processor to execute: a step (S2601) of defining a virtual space (the second virtual space 2711A, 4411A) including a first region for providing the virtual experience to the first user; a step (S2606) of causing a first avatar (the avatar object 6A) associated with the first user to enter the first region; a step (S2612) of arranging a second avatar (the avatar object 6B) associated with a second user (the user 5B) in the first region; a step (S10506) of causing the second avatar to carry out a performance in accordance with a motion of the second user; a step (S10501) of performing first charging-related processing with a first charged amount in accordance with the first region; and a step (S10502) of performing second charging-related processing with a second charged amount in accordance with the performance.

(Item 2) In (Item 1), the program further causes the processor to execute: a step of allowing the first user to select the virtual space including the first region.

(Item 3) In (Item 1) or (Item 2), the program further causes the processor to execute: a step (S2608) of controlling a field of view from the first avatar (the field-of-view region 15A) in the virtual space, in accordance with a posture of the first user's head and a position of the first avatar in the virtual space; a step (S2609) of defining a field-of-view image (the field-of-view image 17A) corresponding to the field of view from the first avatar; and a step (S2609) of outputting the field-of-view image to an image display device (monitor 130A) associated with the first user's head.

(Item 4) In any one of (Item 1) to (Item 3), the first charged amount is set based on an attribute of the first region.

(Item 5) In any one of (Item 1) to (Item 4), the program further causes the processor to execute: a step (S2605) of arranging third avatars (the avatar objects 6C, 6D) associated with a plurality of respective third users (the users 5C, 5D) in the virtual space.

(Item 6) In (Item 5), the program further causes the processor to execute: a step of setting the first charged amount, based on at least one of the number of third avatars arranged in the first region and an attribute of a third user associated with the third avatar.

(Item 7) In (Item 5), the program further causes the processor to execute: a step of moving a plurality of avatars selected from an avatar group consisting of the first avatar and the plurality of third avatars to different positions in the virtual space.

(Item 8) In (Item 7), the program further causes the processor to execute: a step of performing third charging-related processing in accordance with an entry made by the first user. In the step of moving, when the third charging-related processing is performed, the plurality of avatars selected are moved to different positions in the virtual space.

(Item 9) In (Item 7) or (Item 8), in the step of arranging the plurality of third avatars in the virtual space, the plurality of third avatars are arranged in the first region, and in the step of moving, the plurality of avatars selected are moved to different positions in the first region.

(Item 10) In (Item 7) or (Item 8), the plurality of avatars selected include a third avatar arranged in the first region (4451) and a third avatar arranged outside the first region. In the step of moving, the third avatar arranged in the first region is moved outside the first region, whereas the third avatar arranged outside the first region is moved into the first region.

(Item 11) In any one of (Item 7) to (Item 10), in the step of moving, positions of the plurality of avatars selected are exchanged.

(Item 12) In any one of (Item 7) to (Item 11), the program further causes the processor to execute: a step of detecting a first operation made by the second user. In the step of moving, when the first operation is detected, it is possible to move the plurality of avatars selected different positions in the virtual space.

(Item 13) An information processing apparatus has been described. In at least one aspect of the present disclosure, the information processing apparatus (the computer 200A) includes a storage section (the storage 230A) configured to store a program executed by the information processing apparatus for providing a first user (the user 5A) with a virtual experience; and a control section (the processor 210A) configured to control operation of the information processing apparatus by executing the program. The control section is configured to: define a virtual space (the second virtual space 2711A, 4411A) including a first region for providing the virtual experience to the first user; cause a first avatar (the avatar object 6A) associated with the first user to enter the first region; arrange a second avatar (the avatar object 6B) associated with a second user (the user 5B) in the first region; cause the second avatar to carry out a performance in accordance with a motion of the second user; perform first charging-related processing with a first charged amount in accordance with the first region; and perform second charging-related processing with a second charged amount in accordance with the performance.

(Item 14) A method for executing a program has been described. In at least one aspect of the present disclosure, the program is executed by a computer (the computer 200A) including a processor (the processor 210A) for providing a first user (the user 5A) with a virtual experience. The method includes executing, by the processor: a step (S2601) of defining a virtual space (the second virtual space 2711A, 4411A) including a first region for providing the virtual experience to the first user; a step (S2606) of causing a first avatar (the avatar object 6A) associated with the first user to enter the first region; a step (S2612) of arranging a second avatar (the avatar object 6B) associated with a second user (the user 5B) in the first region; a step (S10506) of causing the second avatar to carry out a performance in accordance with a motion of the second user; a step (S10501) of performing first charging-related processing with a first charged amount in accordance with the first region; and a step (S10502) of performing second charging-related processing with a second charged amount in accordance with the performance.

[Note 4]

Details according to at least one aspect of the present description are described below.

(Item 1) A program has been described. In at least one aspect of the present disclosure, the program is executed by a computer (200B) including a processor (210B) for providing a first user (the user 5B) with a virtual experience. The program causes the processor to execute: a step (S6709) of selecting a first avatar (the avatar object 7106B) out of a plurality of avatars; a step (S7002) of defining a virtual space (the second virtual space 2711B) for providing the virtual experience to the first user; a step (S7006) of arranging the first avatar in association with the first user in the virtual space; a step (S7011) of causing the first avatar to carry out a performance in accordance with a motion of the first user; a step (S7016) of determining a reward to the creator of the first avatar, in accordance with the performance in the virtual space; and a step (S7017) of performing processing for paying the reward to the creator.

(Item 2) In (Item 1), in the step of determining the reward, the reward is determined in accordance with the time for which the first avatar was used in the virtual space.

(Item 3) In (Item 1) or (Item 2), in the step of determining the reward, the reward is determined in accordance with details of the virtual space.

(Item 4) In any one of (Item 1) to (Item 3), the virtual space is a space where an event takes places in which a second avatar (the avatar object 6A) associated with a second user (the user 5A) views the performance made by the first avatar, and in the step of performing the charging-related processing, the reward is determined in accordance with sales of the event.

(Item 5) In any one of (Item 1) to (Item 4), the program further causes the processor to execute: a step of generating usage history of the first avatar in the virtual space; and a step of notifying the creator of the first avatar of the usage history.

(Item 6) In any one of (Item 1) to (Item 5), the program further causes the processor to execute: a step of controlling a field of view from the first avatar (the field-of-view region 15B) in the virtual space, in accordance with a posture of the first user's head and a position of the first avatar in the virtual space; a step of defining an field-of-view image corresponding to the field of view from the first avatar; and a step of outputting the field-of-view image to an image display device (the monitor 130B) associated with the first user's head.

(Item 7) An information processing apparatus has been described. In at least one aspect of the present disclosure, the information processing apparatus (the computer 200B) includes a storage section (the storage 230B) configured to store a program executed by the information processing apparatus; and a control section (the processor 210B) configured to control operation of the information processing apparatus for providing a first user (the user 5B) with a virtual experience. The control section is configured to: select a first avatar (the avatar object 7106B) out of a plurality of avatars; define a virtual space (the second virtual space 2711B) for providing the virtual experience to the first user; arrange the first avatar in association with the first user in the virtual space; cause the first avatar to carry out a performance in accordance with a motion of the first user; determine a reward to the creator of the first avatar in accordance with the performance in the virtual space; and perform processing for paying the reward to the creator.

(Item 8) A method for executing a program has been described. In at least one aspect of the present disclosure, the program is executed by a computer (200B) including a processor (210B) for providing a first user (the user 5B) with a virtual experience. The method includes executing, by the processor: a step (S6709) of selecting a first avatar (the avatar object 7106B) out of a plurality of avatars; a step (S7002) of defining a virtual space (the second virtual space 2711B) for providing the virtual experience to the first user; a step (S7006) of arranging the first avatar in association with the first user in the virtual space; a step (S7011) of causing the first avatar to carry out a performance in accordance with a motion of the first user; a step (S7016) of determining a reward to the creator of the first avatar, in accordance with the performance in the virtual space; and a step (S7017) of performing processing for paying the reward to the creator.

[Note 5]

Details according to at least one aspect of the present description are described below.

(Item 1) A program has been described. In at least one aspect of the present disclosure, the program is executed by a computer (200A) including a processor (210A) for providing a first user (the user 5A) with a virtual experience. The program causes the processor to execute: a step (S2601) of defining a virtual space (the second virtual space 2711A) to provide the virtual experience to the first user; a step (S2606) of arranging a first avatar associated with the first user in the virtual space; a step (S4506) of moving the first avatar in the virtual space; and a step (S4507) of performing charging-related processing, in accordance with at least one of a movement distance (4662) of the first avatar and the number of times of movement.

(Item 2) In (Item 1), the program further causes the processor to execute: a step of causing the first avatar to view a performance made by a second avatar (the avatar object 6B) associated with a second user (the user 5B) in the virtual space.

(Item 3) In (Item 2), the program further causes the processor to execute: a step of arranging the second avatar in the virtual space; and a step of moving the second avatar in the virtual space.

(Item 4) In (Item 2) or (Item 3), the program further causes the processor to execute: a step of detecting a second operation made by the second user, and in the step of moving the first avatar, when the second operation is detected, the second avatar is enabled to be moved.

(Item 5) In any one of (Item 1) to (Item 4), in the step of moving the first avatar, the first avatar is moved discretely.

(Item 6) In any one of (Item 1) to (Item 5), in the step of performing the charging-related processing, the charging-related processing is performed with a higher charged amount for a longer movement distance.

(Item 7) In any one of (Item 1) to (Item 6), the charging unit price for a certain distance varies depending on the size of the virtual space, and in the step of performing the charging-related processing, the charging-related processing is performed with charged amount calculated by multiplying the movement distance by the charging unit price.

(Item 8) In (Item 7), a lower charging unit price is set for the virtual space with a larger size.

(Item 9) In any one of (Item 1) to (Item 8), the program further causes the processor to execute: a step (S2608) of controlling a field of view from the first avatar (the field-of-view region 15A) in the virtual space, in accordance with a posture of the first user's head and a position of the first avatar in the virtual space; a step (S2609) of defining a field-of-view image corresponding to the field of view from the first avatar; and a step (S2609) of outputting the field-of-view image to an image display device (monitor 130A) associated with the first user's head.

(Item 10) An information processing apparatus has been described. In at least one aspect of the present disclosure, the information processing apparatus (the computer 200A) includes a storage section (the storage 230A) configured to store a program executed by the information processing apparatus for providing a first user (the user 5A) with a virtual experience; and a control section (the processor 210A) configured to control operation of the information processing apparatus by executing the program. The control section is configured to: define a virtual space (the second virtual space 2711A) to provide the virtual experience to the first user; arrange a first avatar associated with the first user in the virtual space; move the first avatar in the virtual space; and perform charging-related processing, in accordance with at least one of a movement distance of the first avatar and the number of times of movement.

(Item 11) A method for executing a program has been described. In at least one aspect of the present disclosure, the program is executed by a computer (200A) including a processor (210A) for providing a first user (the user 5A) with a virtual experience. The method includes executing, by the processor: a step (S2601) of defining a virtual space (the second virtual space 2711A) to provide the virtual experience to the first user; a step (S2606) of arranging a first avatar associated with the first user in the virtual space; a step (S4506) of moving the first avatar in the virtual space; and a step (S4507) of performing charging-related processing, in accordance with at least one of a movement distance of the first avatar and the number of times of movement.

[Note 6]

Details according to at least one aspect of the present description are described below.

(Item 1) A program has been described. In at least one aspect of the present disclosure, the program is executed by a computer (200A) including a processor (210A) for providing a first user (the user 5A) with a virtual experience. The program causes the processor to execute: a step (S2601) of defining a virtual space (the second virtual space 2711A) to provide the virtual experience to the first user; a step (S2605, S2606) of arranging a first avatar (the avatar object 6A) associated with the first user and a second avatar (the avatar object 6C) associated with a second user (the user 5C) in the virtual space; and a step (S5807) of causing the first avatar to have a viewpoint of the second avatar.

(Item 2) In (Item 1), the program further causes the processor to execute: a step of causing the first avatar and the second avatar to view a first performance made by a third avatar (the avatar object 6B) associated with a third user (the user 5B) in the virtual space.

(Item 3) In (Item 2), the program further causes the processor to execute: a step of arranging the third avatar in the virtual space; and a step of causing the third avatar to carry out the first performance in accordance with a motion of the third user.

(Item 4) In (Item 3), the program further causes the processor to execute: a step (S5803) of performing first charging-related processing in accordance with an entry made by the first user, and in the step of causing the first avatar to have the viewpoint of the second avatar, when the first charging-related processing is performed, the first avatar is caused to have the viewpoint of the second avatar.

(Item 5) In (Item 4), in accordance with the second charging-related processing, the second avatar views a second performance made by the third avatar for the second avatar in the virtual space, in the step of causing the first avatar to have the viewpoint of the second avatar, the first avatar is caused to have the viewpoint of the second avatar viewing the second performance for the second avatar, and the program further causes the processor to execute: after viewpoint sharing is terminated, a step (S5811) of performing third charging-related processing in accordance with an entry made by the first user, and when the third charging-related processing is performed, a step (S5814) of causing the third avatar to carry out the second performance for the first avatar, in accordance with a motion of the third user.

(Item 6) In any one of (Item 2) to (Item 5), the program further causes the processor to execute: a step of detecting the first operation made by the third user, and in the step of causing the first avatar to have the viewpoint of the second avatar, when the first operation is detected, the first avatar is enabled to have the viewpoint of the second avatar.

(Item 7) In any one of (Item 1) to (Item 6), the program further causes the processor to execute: a step of arranging a virtual camera (the virtual camera 14A) at a position of the first avatar in the virtual space, in the step of causing the first avatar to have the viewpoint of the second avatar, the virtual camera is moved from the position of the first avatar to a position of the second avatar, and the program further causes the processor to execute: after the virtual camera is moved to the position of the second avatar, a step of controlling a field of view (the field-of-view region 15A) of the virtual camera; a step of defining a first field-of-view image (field-of-view image 6317A) corresponding to the field of view from the virtual camera; and a step of outputting the first field-of-view image to an image display device (monitor 130A) associated with the first user's head.

(Item 8) In any one of (Item 1) to (Item 6), the program further causes the processor to execute: a step of receiving a second field-of-view image (field-of-view image 6017C) corresponding to a field of view (the field-of-view region 15C) from the second avatar; and a step of outputting the second field-of-view image to an image display device associated with the first user's head.

(Item 9) In any one of (Item 1) to (Item 8), the program further causes the processor to execute: a step of detecting occurrence of a first event in the virtual space, and in the step of causing the first avatar to have the viewpoint of the second avatar, when occurrence of the first event is detected, the first avatar is enabled to have the viewpoint of the second avatar.

(Item 10) An information processing apparatus has been described. In at least one aspect of the present disclosure, the information processing apparatus (the computer 200A) includes a storage section (the storage 230A) configured to store a program executed by the information processing apparatus for providing a first user (the user 5A) with a virtual experience; and a control section (the processor 210A) configured to control operation of the information processing apparatus by executing the program. The control section is configured to: define a virtual space (the second virtual space 2711A) to provide the virtual experience to the first user; arrange a first avatar (the avatar object 6A) associated with the first user and a second avatar (the avatar object 6C) associated with a second user (the user 5C) in the virtual space; and cause the first avatar to have a viewpoint of the second avatar.

(Item 11) A method for executing a program has been described. In at least one aspect of the present disclosure, the program is executed by a computer (200A) including a processor (210A) for providing a first user (the user 5A) with a virtual experience. The method includes executing, by the processor: a step (S2601) of defining a virtual space (the second virtual space 2711A) to provide the virtual experience to the first user; a step (S2605, S2606) of arranging a first avatar (the avatar object 6A) associated with the first user and a second avatar (the avatar object 6C) associated with a second user (the user 5C) in the virtual space; and a step (S5807) of causing the first avatar to have a viewpoint of the second avatar.

[Note 7]

Details according to at least one aspect of the present description are described below.

(Item 1) A program has been described. In at least one aspect of the present disclosure, the program is executed by a computer (the computer 200A) including a processor (the processor 210A) for providing a first user (the user 5A) with a virtual experience. The program causes the processor to execute: a step (S2601) of defining a virtual space (the second virtual space 2711A) to provide the virtual experience to the first user; a step (S2606, S2612) of arranging a first avatar (the avatar object 6A) associated with the first user and a second avatar (the avatar object 6B) associated with a second user (the user 5B) in the virtual space; a step (S9301) of causing the second avatar to carry out a performance in accordance with a motion of the second user; a step (S9302) of performing performance-related staging; and a step (S9308) of controlling the staging, based on an entry made by the first user.

(Item 2) In (Item 1), the program further causes the processor to execute: a step (S2608) of controlling a field of view from the first avatar (the field-of-view region 15A) in the virtual space, in accordance with a posture of the first user's head and a position of the first avatar in the virtual space; a step (S2609) of defining a field-of-view image (the field-of-view image 17A) corresponding to the field of view from the first avatar; and a step (S2609) of outputting the field-of-view image to an image display device (monitor 130A) associated with the first user's head.

(Item 3) In (Item 1) or (Item 2), the program further causes the processor to execute: a step (S9303) of performing charging-related processing, based on an entry made by the first user. When the charging-related processing is performed, the staging is controlled in the step of controlling the staging.

(Item 4) In (Item 3), the program further causes the processor to execute: a step (S2605) of arranging a third avatar (the avatar objects 6C, 6D) associated with a third user (the users 5C, 5D) in the virtual space; and a step (S9310) of determining a charged amount to the first user, based on an evaluation made by the third user on the staging controlled based on an entry made by the first user.

(Item 5) In (Item 4), in the step of determining the charged amount, the charged amount is lowered as the evaluation increases.

(Item 6) In (Item 4) or (Item 5), the third user may select whether to view the performance under the staging controlled based on an entry made by the first user. The program further causes the processor to execute: a step (S9309) of notifying the first user of the number of third users viewing the performance under the staging controlled based on an entry made by the first user.

(Item 7) In any one of (Item 1) to (Item 6), the program further causes the processor to execute: a step of detecting a first operation made by the second user. When the first operation is detected, control on the staging is enabled in the step of controlling the staging.

(Item 8) In any one of (Item 1) to (Item 7), at least one of sound and illumination related to the performance is controlled in the step of controlling the staging.

(Item 9) An information processing apparatus has been described. In at least one aspect of the present disclosure, the information processing apparatus (the computer 200A) includes a storage section (the storage 230A) configured to store a program executed by the information processing apparatus for providing a first user (the user 5A) with a virtual experience; and a control section (the processor 210A) configured to control operation of the information processing apparatus by executing the program. The control section is configured to: define a virtual space (the second virtual space 2711A) to provide the virtual experience to the first user; arrange a first avatar (the avatar object 6A) associated with the first user and a second avatar (the avatar object 6B) associated with a second user (the user 5B) in the virtual space; cause the second avatar to carry out a performance in accordance with a motion of the second user; perform performance-related staging; and control the staging based on an entry made by the first user.

(Item 10) A method for executing a program has been described. In at least one aspect of the present disclosure, the program is executed by a computer (the computer 200A) including a processor (the processor 210A) for providing a first user (the user 5A) with a virtual experience. The method includes executing, by the processor: a step (S2601) of defining a virtual space (the second virtual space 2711A) to provide the virtual experience to the first user; a step (S2606, S2612) of arranging a first avatar (the avatar object 6A) associated with the first user and a second avatar (the avatar object 6B) associated with a second user (the user 5B) in the virtual space; a step (S9301) of causing the second avatar to carry out a performance in accordance with a motion of the second user; a step (S9302) of performing performance-related staging; and a step (S9308) of controlling the staging based on an entry made by the first user.

[Note 8]

Details according to at least one aspect of the present description are described below.

(Item 1) A program has been described. In at least one aspect of the present disclosure, the program is executed by a first computer (the computer 200A) including a first processor (the processor 210A) for providing a first user (the user 5A) with a virtual experience. The program causes the first processor to execute: a step (S2601) of defining a virtual space (the second virtual space 2711A) to provide the virtual experience to the first user; a step (S2606, S2612) of arranging a first avatar (the avatar object 6A) associated with the first user and a second avatar (the avatar object 6B) associated with a second user (the user 5B) in the virtual space; a step (S2614) of causing the second avatar to carry out a first performance in accordance with a motion of the second user; a step (S8601) of performing charging-related processing, based on an entry made by the first user; and when the charging-related processing is performed, a step (S8602) of controlling the appearance of the first avatar such that the first avatar stands out from the second avatar.

(Item 2) In (Item 1), the program further causes the first processor to execute: a step (S2608) of controlling a field of view from the first avatar (the field-of-view region 15A) in the virtual space, in accordance with a posture of the first user's head and a position of the first avatar in the virtual space; a step (S2609) of defining a field-of-view image (the field-of-view image 17A) corresponding to the field of view from the first avatar; and a step (S2609) of outputting the field-of-view image to an image display device (monitor 130A) associated with the first user's head.

(Item 3) In (Item 1) or (Item 2), the program further causes the first processor to execute: a step (S2605) of arranging a third avatar (the avatar object 6C, 6D) associated with a third user (the user 5C, 5D) in the virtual space. In the step of controlling the appearance, when the charging-related processing is performed, the appearance of the first avatar is made to stand out from that of the third avatar.

(Item 4) A program has been described. In at least one aspect of the present disclosure, the program is executed by a second computer (the computer 200B) including a second processor (the processor 210B) for providing a second user (the user 5B) with a virtual experience. The program causes the second processor to execute: a step (S2601) of defining a virtual space (the second virtual space 2711B) to provide the virtual experience to the second user; a step (S2606, S2612) of arranging a first avatar (the avatar object 6A) associated with a first user (the user 5A) and a second avatar (the avatar object 6B) associated with the second user in the virtual space; a step (S1701, S1702) of detecting a motion of the second user's body; a step (S1703) of causing the second avatar to carry out a first performance in accordance with a motion of the second user; a step (S8611) of acquiring first information on the appearance of the first avatar generated in accordance with charging-related processing performed based on an entry made by the first user; and a step (S8612) of controlling the appearance of the first avatar such that the first avatar stands out from the second avatar, based on the first information.

(Item 5) In (Item 4), the program further causes the second processor to execute: a step (S2608) of controlling a field of view (the field-of-view region 15B) from the second avatar in the virtual space, in accordance with a posture of the second user's head and a position of the second avatar in the virtual space; a step (S2609) of defining a field-of-view image (the field-of-view image 17B) corresponding to the field of view from the second avatar; and a step (S2609) of outputting the field-of-view image to an image display device (the monitor 130B) associated with the second user's head.

(Item 6) In (Item 4) or (Item 5), the program further causes the second processor to execute: a step (S2605) of arranging a third avatar (the avatar object 6C, 6D) associated with a third user (the user 5C, 5D) in the virtual space. In the step of controlling the appearance, based on the first information, the appearance of the first avatar is made to stand out from that of the third avatar.

(Item 7) In (Item 6), the program further causes the second processor to execute: after the appearance of the first avatar is controlled, a step (S8615) of causing the second avatar to carry out a second performance directed to the first avatar in accordance with a motion of the second user.

(Item 8) In (Item 7), the program further causes the second processor to execute: before the second avatar is caused to carry out the second performance, a step (S8613) of notifying the second user of at least one of a plurality of pieces of second information each indicating the content of one of a plurality of second performances.

(Item 9) In (Item 8), the first information contains first user information indicating the first user. The program further causes the second processor to execute: when the first information is acquired as a result of causing the second avatar to carry out the second performance, a step of associating the first user information contained in the first information with second information indicating the content of the second performance. In the step of conveying the information, the second user is preferentially notified of the second information associated with the first user information.

(Item 10) An information processing apparatus has been described. In at least one aspect of the present disclosure, the information processing apparatus (the computer 200A) includes a storage section (the storage 230A) configured to store a program executed by the information processing apparatus for providing a first user (the user 5A) with a virtual experience; and a control section (the processor 210A) configured to control a motion of the information processing apparatus by executing the program. The control section is configured to: define a virtual space (the second virtual space 2711A) to provide the virtual experience to the first user; arrange a first avatar (the avatar object 6A) associated with the first user and a second avatar (the avatar object 6B) associated with a second user (the user 5B) in the virtual space; cause the second avatar to carry out a first performance in accordance with a motion of the second user; perform charging-related processing, based on an entry made by the first user; and when the charging-related processing is performed, control the appearance of the first avatar such that the first avatar stands out from the second avatar.

(Item 11) An information processing apparatus has been described. In at least one aspect of the present disclosure, the information processing apparatus (the computer 200B) includes a storage section (the storage 230B) configured to store a program executed by the information processing apparatus for providing a second user (the user 5B) with a virtual experience; and a control section (the processor 210B) configured to control operation of information processing apparatus by executing the program. The control section is configured to: define a virtual space (the second virtual space 2711B) to provide the virtual experience to the second user; arrange a first avatar (the avatar object 6A) associated with a first user (the user 5A) and a second avatar (the avatar object 6B) associated with the second user in the virtual space; detect a motion of the second user's body; cause the second avatar to carry out a first performance in accordance with a motion of the second user; acquire first information on the appearance of the first avatar generated in accordance with charging-related processing performed based on an entry made by the first user; and control the appearance of the first avatar such that the first avatar stands out from the second avatar, based on the first information.

(Item 12) A method for executing a program has been described. In at least one aspect of the present disclosure, the program is executed by a first computer (the computer 200A) including a first processor (the processor 210A) for providing a first user (the user 5A) with a virtual experience. The method includes executing, by the first processor: a step (S2601) of defining a virtual space (the second virtual space 2711A) to provide the virtual experience to the first user; a step (S2606, S2612) of arranging a first avatar (the avatar object 6A) associated with the first user and a second avatar (the avatar object 6B) associated with a second user (the user 5B) in the virtual space; a step (S2614) of causing the second avatar to carry out a first performance in accordance with a motion of the second user; a step (S8601) of performing charging-related processing, based on an entry made by the first user; and when the charging-related processing is performed, a step (S8602) of controlling the appearance of the first avatar such that the first avatar stands out from the second avatar.

(Item 13) A method for executing a program has been described. In at least one aspect of the present disclosure, the program is executed by a second computer (the computer 200B) including a second processor (the processor 210B) for providing a second user (the user 5B) with a virtual experience. The method includes executing, by the second processor: a step (S2601) of defining a virtual space (the second virtual space 2711B) to provide the virtual experience to the second user; a step (S2606, S2612) of arranging a first avatar (the avatar object 6A) associated with a first user (the user 5A) and a second avatar (the avatar object 6B) associated with the second user in the virtual space; a step (S1701, S1702) of detecting a motion of the second user's body; a step (S1703) of causing the second avatar to carry out a first performance in accordance with a motion of the second user; a step (S8611) of acquiring first information on the appearance of the first avatar generated in accordance with charging-related processing performed based on an entry made by the first user; and a step (S8612) of controlling the appearance of the first avatar such that the first avatar stands out from the second avatar, based on the first information.

In the at least one embodiment described above, the description is given by exemplifying the virtual space (VR space) in which the user is immersed using an HMD. However, a see-through HMD may be adopted as the HMD. In this case, the user may be provided with a virtual experience in an augmented reality (AR) space or a mixed reality (MR) space through output of a field-of-view image that is a combination of the real space visually recognized by the user via the see-through HMD and a part of an image forming the virtual space. In this case, action may be exerted on a target object in the virtual space based on motion of a hand of the user instead of the operation object. Specifically, the processor may identify coordinate information on the position of the hand of the user in the real space, and define the position of the target object in the virtual space in connection with the coordinate information in the real space. With this, the processor can grasp the positional relationship between the hand of the user in the real space and the target object in the virtual space, and execute processing corresponding to, for example, the above-mentioned collision control between the hand of the user and the target object. As a result, an action is exerted on the target object based on motion of the hand of the user.

The invention claimed is:

1. A method comprising:
    defining a virtual space associated with a first user, the virtual space comprising a second avatar associated with a second user;
    detecting a first motion of the second user;
    moving the second avatar in accordance with the detected first motion regardless of any performance request;
    receiving a first input from the first user;
    performing charging-related processing based on the received first input;
    permitting the first user to submit a special performance request in response to completing the charging-related processing;
    notifying the second user of the special performance request in response to the receipt of the special performance request from the first user;
    detecting a second motion of the second user, the second motion being related to the special performance; and
    moving the second avatar for presenting the special performance in accordance with detected motion of the second user.

2. The method according to claim 1, further comprising:
    controlling a field of view from the first avatar in the virtual space in accordance with a detected posture of a head of the first user and a position of a first avatar in the virtual space, wherein the first avatar is associated with the first user; and
    displaying a field-of-view image to the first user based on the field of view from the first avatar.

3. The method according to claim 1, wherein the performing the charging-related processing is performed while the second avatar is performing a first movement prior to the requesting of the performance.

4. The method according to claim 1,
    further comprising:
        receiving an entry of a first amount of money for the performance from the first user; and receiving an entry of a second amount of money for the performance from a third user, wherein
the performing the charging-related processing is performed based on the first amount of money in response to the first amount of money being larger than the second amount of money.

5. The method according to claim 1, further comprising:
notifying the first user of a charge associated with the performance, wherein the receiving the first input comprises receiving an input approving the charge.

6. The method according to claim 1, further comprising:
receiving a second input from the first user during the performance;
performing a second charging-related processing based on the received second input;
receiving a third input, following the performing the second charging-related processing, from the first user; and
controlling at least one aspect of the performance based on the received third input.

7. The method according to claim 6, wherein the controlling the at least one aspect comprises controlling lighting of the performance.

8. The method according to claim 1, further comprising:
receiving a second input from the first user during the performance;
performing a second charging-related processing based on the received second input; and
controlling an appearance of a first avatar in response to the performing the second charging-related processing, wherein the first avatar is associated with the first user.

9. A method comprising:
defining a virtual space associated with a first user, wherein the virtual space comprises a second avatar, wherein the second avatar is associated with a second user;
detecting a motion of the second user;
causing the second avatar to carry out a first performance in accordance with the detected motion of the second user;
performing charging-related processing based on an input received from the first user;
conveying information related to requesting a second performance, different from the first performance, to the second user in response to the performing the charging-related processing; and
causing the second avatar to carry out the second performance in response to the conveyed information based on detected motion of the second user.

10. The method according to claim 9, wherein conveying the information comprises notifying the second user of information indicating a position of a first avatar in the virtual space, wherein the first avatar is associated with the first user.

11. The method according to claim 9, further comprising:
controlling a field of view from the second avatar in the virtual space, in accordance with a detected posture of the second user's head and a position of the second avatar in the virtual space; and
displaying a field-of-view image to the second user, wherein
the conveying the information comprises conveying the information indicating a position of the first avatar in the virtual space as part of the field-of-view image.

12. The method according to claim 11, wherein in response to a first avatar, associated with the first user, being outside the field-of-view image, the information indicating the position of the first avatar includes an image indicating a direction in the field-of-view image from the field of view to the position of the first avatar.

13. The method according to claim 9, wherein the information on the second performance contains content of the second performance.

14. The method according to claim 9, wherein the information on the second performance contains venue information of the second performance.

15. An information processing apparatus comprising:
a non-transitory computer readable medium configured to store instructions thereon; and
a processor connected to the non-transitory computer readable medium, wherein the processor is configured to execute the instructions for:
defining a virtual space associated with a first user, wherein the virtual space comprises a second avatar, and the second avatar is associated with a second user;
receiving a first input from the first user;
performing charging-related processing based on the received first input;
requesting a performance by the second avatar in response to performance of the charging-related processing;
detecting a motion of the second user in response to the requesting of the performance; and
moving the second avatar in accordance with detected motion of the second user.

16. The information processing apparatus according to claim 15, wherein the processor is configured to execute the instructions for:
controlling a field of view from a first avatar in the virtual space in accordance with a detected posture of a head of the first user and a position of the first avatar in the virtual space, wherein the first avatar is associated with the first user; and
instructing a display to display a field-of-view image to the first user based on the field of view from the first avatar.

17. The information processing apparatus according to claim 15, wherein the processor is configured to execute the instructions for performing the charging-related processing while the second avatar is performing a first movement prior to the requesting of the performance.

18. The information processing apparatus according to claim 15, wherein the processor is configured to execute the instructions for:
receiving an entry of a first amount of money for the performance from the first user;
receiving an entry of a second amount of money for the performance from a third user; and
performing the charging-related processing based on the first amount of money in response to the first amount of money being larger than the second amount of money.

19. The information processing apparatus according to claim 15, wherein the processor is configured to execute the instructions for notifying the first user of a charge associated with the performance, wherein the receiving the first input comprises receiving an input approving the charge.

20. The information processing apparatus according to claim 15, wherein the processor is configured to execute the instructions for:
receiving a second input from the first user during the performance;
performing a second charging-related processing based on the received second input;

receiving a third input, following the performing the second charging-related processing, from the first user; and controlling at least one aspect of the performance based on the received third input.

\* \* \* \* \*